(12) United States Patent
Kondo

(10) Patent No.: US 7,675,541 B2
(45) Date of Patent: Mar. 9, 2010

(54) DISPLAY APPARATUS AND CONTROL METHOD

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1484 days.

(21) Appl. No.: 10/469,479

(22) PCT Filed: Dec. 12, 2002

(86) PCT No.: PCT/JP02/12992

§ 371 (c)(1),
(2), (4) Date: Aug. 27, 2003

(87) PCT Pub. No.: WO03/058952

PCT Pub. Date: Jul. 17, 2003

(65) Prior Publication Data
US 2004/0090391 A1 May 13, 2004

(30) Foreign Application Priority Data

Dec. 28, 2001 (JP) ............................. 2001-399865
Dec. 28, 2001 (JP) ............................. 2001-399867

(51) Int. Cl.
*G09G 5/00* (2006.01)
(52) U.S. Cl. ..................................................... 348/61
(58) Field of Classification Search ................. 348/153, 348/168, 170, 565, 564, 566, 700, 61; 382/304; G09G 5/00
See application file for complete search history.

(56) References Cited

U.S. PATENT DOCUMENTS

| | | | | |
|---|---|---|---|---|
| 4,800,376 A * | 1/1989 | Suga et al. | ..................... | 345/1.3 |
| 5,339,110 A * | 8/1994 | Hara et al. | ................... | 348/485 |
| 5,461,679 A * | 10/1995 | Normile et al. | ............. | 382/304 |
| 5,537,153 A * | 7/1996 | Shigihara | ...................... | 725/56 |
| 5,537,528 A * | 7/1996 | Takahashi et al. | ........... | 715/255 |
| 5,731,832 A * | 3/1998 | Ng | .............................. | 348/155 |
| 5,801,771 A * | 9/1998 | Ohwaki et al. | ........... | 348/211.7 |
| 5,974,218 A * | 10/1999 | Nagasaka et al. | ............. | 386/46 |
| 6,058,476 A | 5/2000 | Matsuzaki et al. | | |
| 6,097,429 A * | 8/2000 | Seeley et al. | ................. | 348/154 |
| 6,204,887 B1 * | 3/2001 | Hiroi | ........................... | 348/565 |
| 6,456,334 B1 * | 9/2002 | Duhault | ...................... | 348/565 |
| 6,549,669 B1 * | 4/2003 | Sundqvist et al. | ........... | 382/238 |
| 6,597,391 B2 * | 7/2003 | Hudson | ...................... | 348/153 |
| 6,640,145 B2 * | 10/2003 | Hoffberg et al. | .............. | 700/83 |
| 6,651,168 B1 * | 11/2003 | Kao et al. | .................... | 713/185 |
| 7,250,978 B2 * | 7/2007 | Lee et al. | ..................... | 348/383 |
| 2003/0014752 A1 * | 1/2003 | Zaslavsky et al. | ............. | 725/40 |

FOREIGN PATENT DOCUMENTS

| | | |
|---|---|---|
| CN | 1170995 | 1/1998 |
| EP | 0 749 243 | 12/1996 |
| GB | 2329539 | 3/1999 |
| JP | 63-254875 | 10/1988 |

(Continued)

*Primary Examiner*—Tung Vo
(74) *Attorney, Agent, or Firm*—Frommer Lawrence & Haug LLP; William S. Frommer; Thomas F. Presson

(57) ABSTRACT

A main unit (television receiver) displays a television broadcasting program and also detects its feature. In addition, the main unit detects a scene change from the feature of the television broadcasting program, and controls a subsidiary unit (television receiver) so as to display the image data of the frame immediately after the scene change. The subsidiary unit displays the frame immediately after the scene change. Then, when another scene change occurs in image data displayed on the main unit, the image data of the frame immediately after the scene change is displayed on the subsidiary unit, instead of the image data which has been displayed so far.

36 Claims, 84 Drawing Sheets

FOREIGN PATENT DOCUMENTS

| | | |
|---|---|---|
| JP | 3-256195 | 11/1991 |
| JP | 5-153539 | 6/1993 |
| JP | 08-265736 | 10/1996 |
| JP | 11-341486 | 12/1999 |
| JP | 2000-75816 | 3/2000 |
| JP | 2000-101960 | 4/2000 |
| JP | 2000-270274 | 9/2000 |
| JP | 2000-324465 | 11/2000 |

* cited by examiner

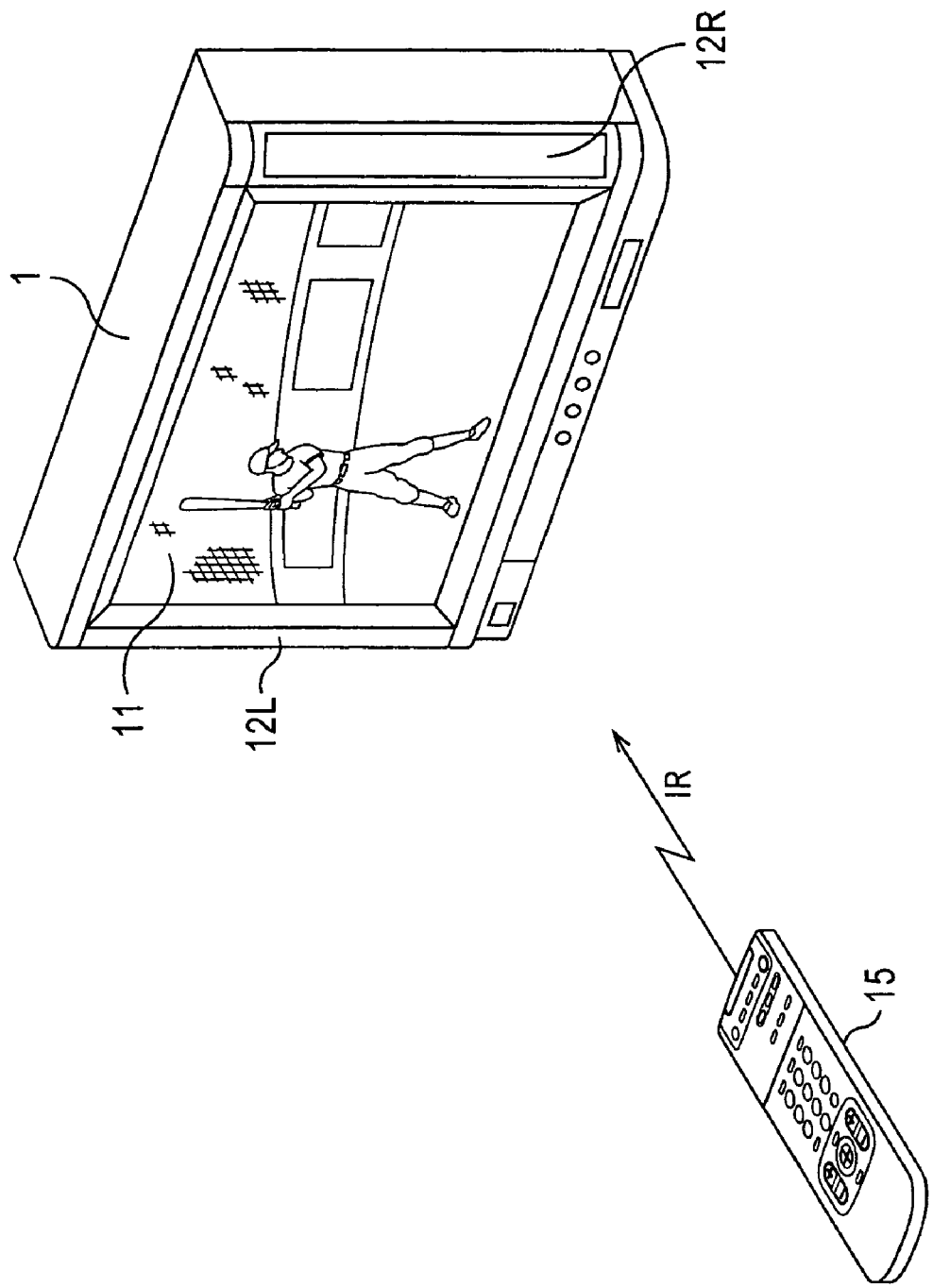

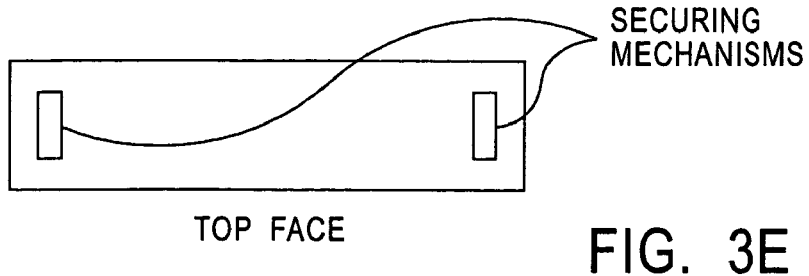
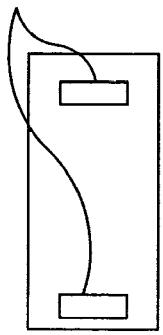
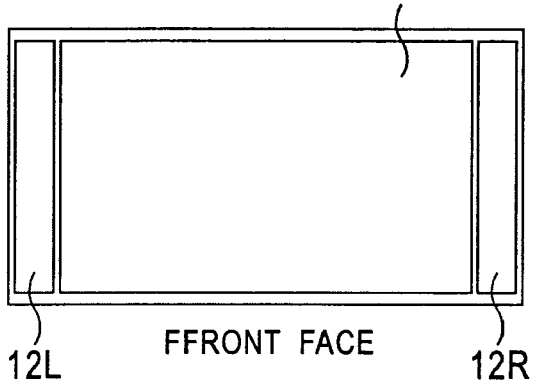
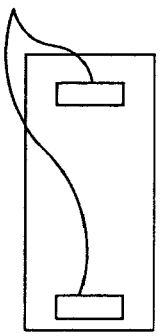
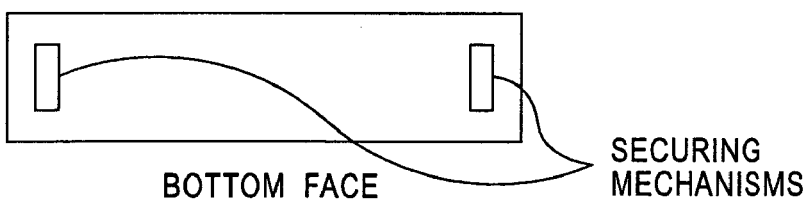
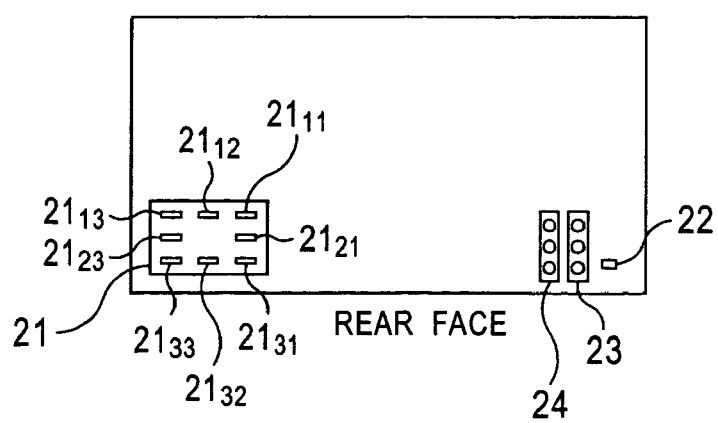

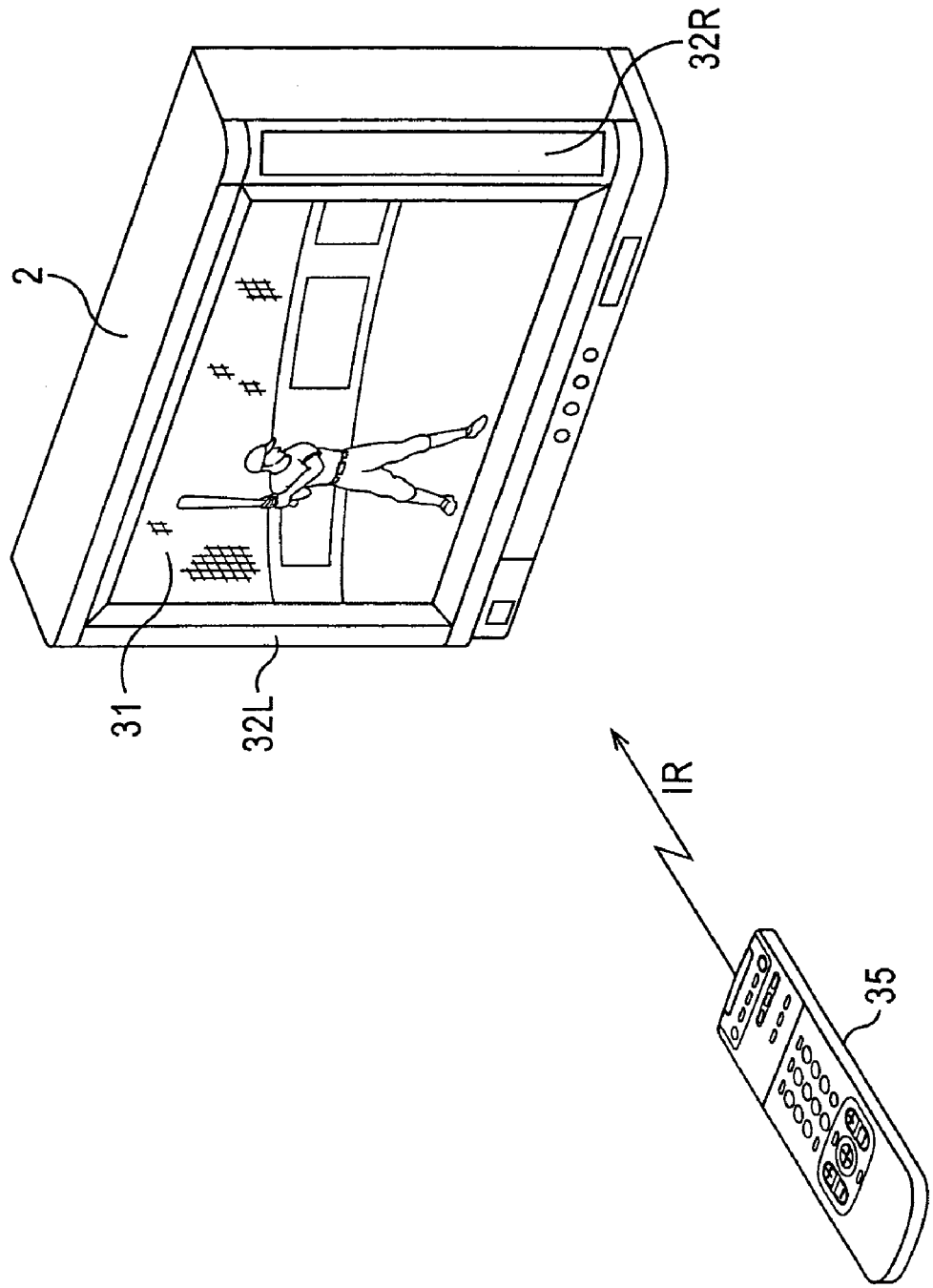

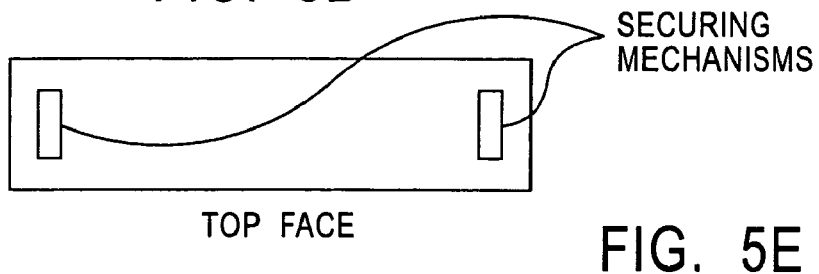
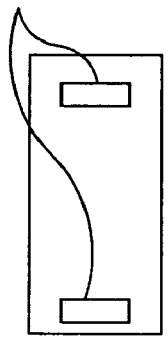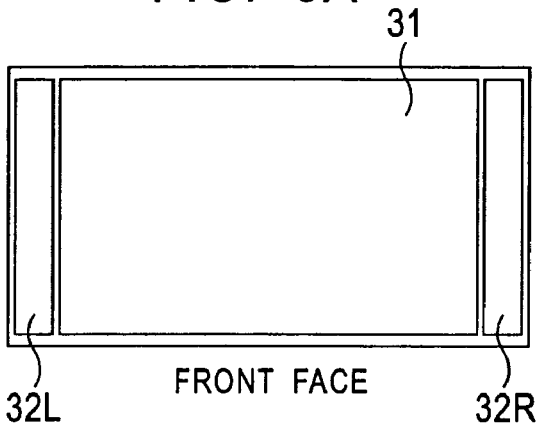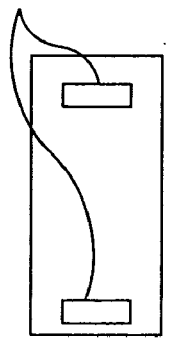
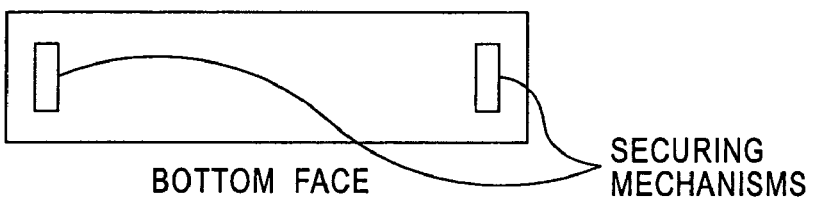
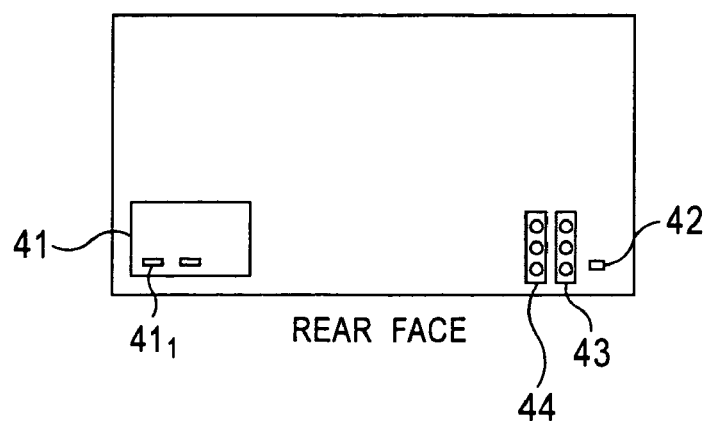

RACK

FIG. 14

| OFFSET | NAME | FUNCTION |
|---|---|---|
| 000h | STATE_CLEAR | STATE AND CONTROL INFORMATION |
| 004h | STATE_SET | SETTING STATE-CLEAR BIT |
| 000h | NODE_IDs | INDICATING 16-BIT NODE ID |
| 008h | RESET_START | STARTING COMMAND RESET |
| 018h-01Ch | SPLIT_TIMEOUT | SPECIFYING SPLIT MAXIMUM TIME |
| 00Ch | CYCLE_TIME | CYCLE TIME |
| 200h | BUSY_TIMEOUT | SPECIFYING RETRY LIMITATION |
| 210h | BUS_MANAGER | INDICATING BUS-MANAGER ID |
| 21Ch | BANDWIDTH_AVAILABLE | INDICATING BANDWIDTH WHICH CAN BE ASSIGNED TO ISOCHRONOUS COMMUNICATIONS |
| 224h-228h | CHANNELS_AVAILABLE | INDICATING USE STATE OF EACH CHANNEL |

FIG. 16

| 400h | 04h | crc_length | rom_crc_value |
|---|---|---|---|

Bus_info_block

| 404h | "1394" | | |
|---|---|---|---|
| 408h | reserved | cyc_clk_acc | max_rec | reserved |
| 40Ch | Company_ID | | Chip_ID_hi |
| 410h | Chip_ID_lo | | | lrmc / cmc / isc / bmc

Root_directory

| 414h | root_length | CRC |
|---|---|---|
| 418h | 03h | module_vender_id |
| 41Ch | 0Ch | node_oapabilitioc |
| 420h | 8Dh | node_unique_id offset |
| 424h | D1h | unit_directory offset |
| 428h ⋮ | | Optional. |

Unit_directory

| unit_directory_length | CRC |
|---|---|
| 12h | unit_spec_id |
| 13h | unit_sw_version |
| ⋮ | Optional. |

FIG. 17

| | |
|---|---|
| 900h | Output Master Control Register |
| 904h | Output Plug Control Register #0 |
| 908h | Output Plug Control Register #1 |
| ⋮ | ⋮ |
| 97Ch | Output Plug Control Register #30 |
| 980h | Input Master Control Register |
| 984h | Input Plug Control Register #0 |
| 988h | Input Plug Control Register #1 |
| ⋮ | ⋮ |
| 9FCh | Input Plug Control Register #30 |

FIG. 18A oMPR

| data rate capability | broadcast channel base | non-persistent extension field | persistent extension field | reserved | number of output plugs |
|---|---|---|---|---|---|
| 30 | 5 | 8 | 8 | 6 | 5 (bit) |

FIG. 18B oPCR[n]

| on-line | broadcast connection counter | point-to-point connection counter | reserved | channel number | data rate | overhead ID | payload |
|---|---|---|---|---|---|---|---|
| 1 | 1 | 6 | 2 | 6 | 2 | 4 | 10 (bit) |

FIG. 18C iMPR

| data rate capability | reserved | non-persistent extension field | persistent extension field | reserved | number of input plugs |
|---|---|---|---|---|---|
| 2 | 6 | 8 | 8 | 3 | 5 (bit) |

FIG. 18D iPCR[n]

| on-line | broadcast connection counter | point-to-point connection counter | reserved | channel number | reserved |
|---|---|---|---|---|---|
| 1 | 1 | 6 | 2 | 6 | 16 (bit) |

FIG. 20A

| ctype/response | | |
|---|---|---|
| Command | 0000 | CONTROL |
| | 0001 | STATUS |
| | 0010 | SPECIFIC INQUIRY |
| | 0011 | NOTIFY |
| | 0100 | GENERAL INQUIRY |
| | 0101 ~ 0111 | (reserved for future specification) |
| Response | 1000 | NOT IMPLEMENTED |
| | 1001 | ACCEPTED |
| | 1010 | REJECTED |
| | 1011 | IN TRANSITION |
| | 1100 | IMPLEMENTED STABLE |
| | 1101 | CHANGED |
| | 1110 | (reserved for future specification) |
| | 0111 | INTERM |

FIG. 20B

| subunit_type | |
|---|---|
| 00000 | Video monitor |
| ~ | (reserved) |
| 00011 | Disc recorder/Player |
| 00100 | Tape recorder/Player |
| 00101 | Tuner |
| 00111 | Video Camera |
| ~ | (reserved) |
| 11100 | Vendor unique |
| 11101 | reserved |
| 11110 | Subunit type extended to next byte |
| 11111 | Unit |

FIG. 20C

| opcode : Operation Code | |
|---|---|
| 00h | VENDER-DEPENDENT |
| 50h | SEARCH MODE |
| 51h | TIMECODE |
| 52h | ATN |
| 60h | OPEN MIC |
| 61h | READ MIC |
| 62h | WRITE MIC |
| C1h | LOAD MEDIUM |
| C2h | RECORD |
| C3h | PLAY |
| C4h | WIND |
| ~ | ~ |

| AV/C | | tape recoder/player | | | |
|---|---|---|---|---|---|
| | control | subunit | ID | PLAY | FORWARD |
| CTS=0000 | ctype=0000 | type=00100 | id=000 | opcode=C3h | operand=75h |

FIG. 21A

| AV/C | | tape recoder/player | | | |
|---|---|---|---|---|---|
| | accepted | subunit | ID | PLAY | FORWARD |
| CTS=0000 | response=1001 | type=00100 | id=000 | opcode=C3h | operand=75h |

FIG. 21B

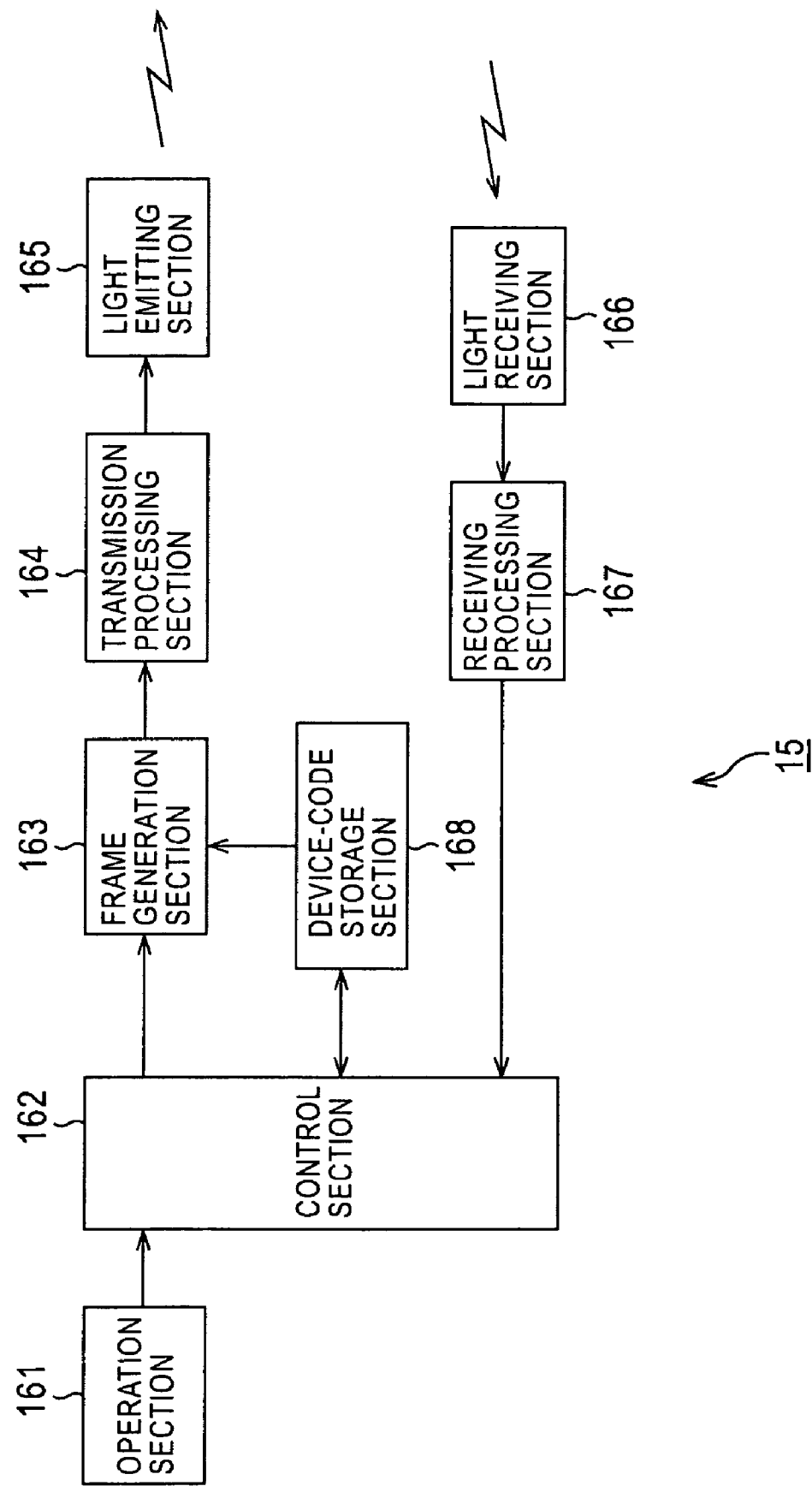

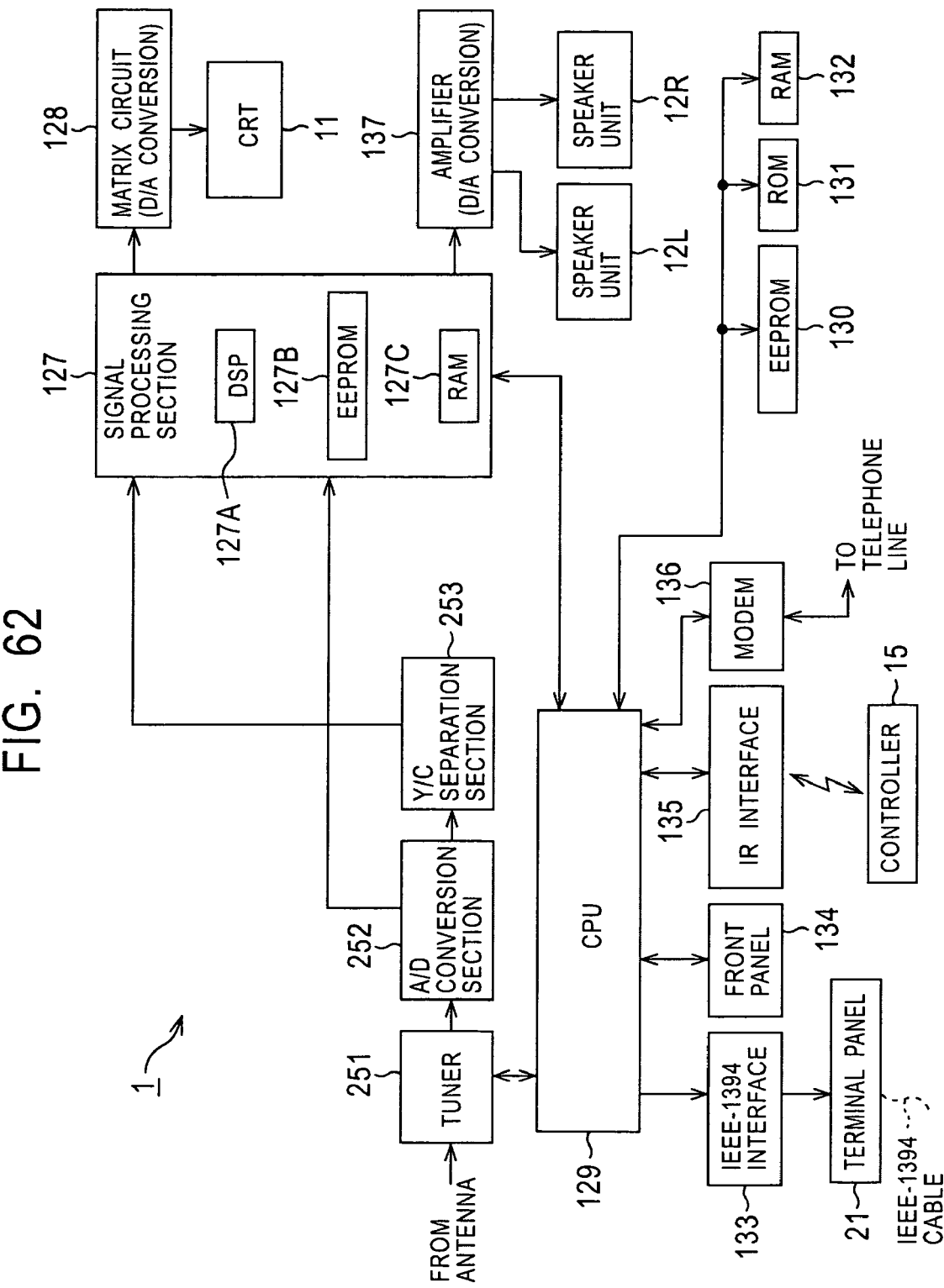

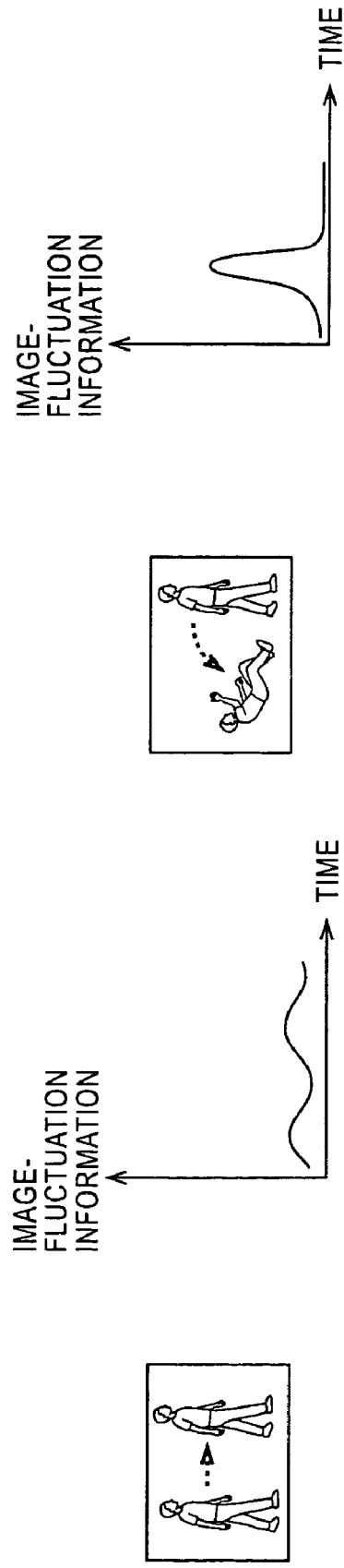

IMAGE-FLUCTUATION INFORMATION → TIME

IMAGE-FLUCTUATION INFORMATION → TIME

IMAGE-FLUCTUATION INFORMATION → TIME

AUDIO-FLUCTUATION INFORMATION → t

AUDIO-FLUCTUATION INFORMATION → t

AUDIO-FLUCTUATION INFORMATION → t

DISPLAY APPARATUS AND CONTROL METHOD

TECHNICAL FIELD

The present invention relates to display apparatuses and control methods, and more particularly, to display apparatuses and control methods which, for example, allow a higher function to be implemented when a great number of display apparatuses are connected and used than when a display apparatus is used alone, and which, for example, allow existing television receivers to be used effectively.

BACKGROUND ART

For example, television receivers receive television broadcasting signals, displays images in television broadcasting programs, and outputs sound accompanying the images.

Conventional television receivers are produced so as to operate alone. Therefore, when users buy new television receivers, the users do not need to have the old ones, and discard them in many cases even if they can be used.

If a great number of connected television receivers provide a higher function than one television receiver, television receivers which can be used are prevented from being discarded, thereby contributing to the effective use of resources.

At homes with babies and little-children, or aged persons, for example, it is difficult to always monitor them, and, in general, nursing persons including persons at the homes go and look after the babies and little children or the aged persons regularly or irregularly.

In these cases, however, the nursing persons have significant loads, and therefore, means for reducing the loads of the nursing persons have been demanded.

As such means, for example, monitoring camera systems are used in which babies and little children or aged persons in rooms are image-captured, and the images are displayed at a display unit in another room.

In conventional monitoring camera systems, however, the images sent from cameras need to be checked always, regularly, or irregularly, and the loads imposed on nursing persons are reduced to some extent, but they are still large.

Television receivers are used in many houses. When a monitoring camera system is used, it is necessary to install a display unit for the system in addition to a television receiver used, and thereby reducing the house space.

The images sent from a camera of the monitoring system can be displayed at a television receiver used in the house.

When the images sent from a camera of the monitoring system are displayed at a television receiver used in the house, however, the nursing person cannot view television broadcasting programs at the television receiver.

It is also possible for the nursing person to switch at the television receiver between television broadcasting programs and the images sent from a camera of the monitoring camera system. However, this switching operation is troublesome, and further, a case may arise in which the nursing person forgets to switch and does not notice an emergency state in a worst case.

DISCLOSURE OF INVENTION

The present invention has been made in consideration of the foregoing conditions. An object of the present invention is to allow a higher function to be implemented when a great number of display apparatuses, such as television receivers, are connected and used than when a display apparatus is used alone, and to allow the user to easily recognize an emergency state with existing television receivers to effectively use the existing television receivers.

A first display apparatus according to the present invention is characterized by including feature detection means for detecting a feature of input data which includes at least image data, and control means for performing control such that an image included in the input data is displayed on at least one of display means and another display apparatus according to the result of feature detection performed by the feature detection means.

A first control method according to the present invention is characterized by including a feature detection step of detecting a feature of input data which includes at least image data, and a control step of performing control such that an image included in the input data is displayed on at least one of display means and another display apparatus according to the result of feature detection performed in the feature detection step.

A first program according to the present invention is characterized by including a feature detection step of detecting a feature of input data which includes at least image data, and a control step of performing control such that an image included in the input data is displayed on at least one of display means and another display apparatus according to the result of feature detection performed in the feature detection step.

A first storage medium according to the present invention is characterized by having stored therein a program including a feature detection step of detecting a feature of input data which includes at least image data, and a control step of performing control such that an image included in the input data is displayed on at least one of display means and another display apparatus according to the result of feature detection performed in the feature detection step.

A second display apparatus according to the present invention is characterized by including storage means for storing one scene of image data in input data which includes at least image data, according to the control of another display apparatus, and display means for displaying the image data stored in the storage means.

A second control method according to the present invention is characterized by including a storage step of storing one scene of image data in input data which includes at least image data, according to the control of another display apparatus, and a display step of displaying the image data stored in the storage step.

A second program according to the present invention is characterized by including a storage step of storing one scene of image data in input data which includes at least image data, according to the control of another display apparatus, and a display step of displaying the image data stored in the storage step.

A second storage medium according to the present invention is characterized by having stored therein a program including a storage step of storing one scene of image data in input data which includes at least image data, according to the control of another display apparatus, and a display step of displaying the image data stored in the storage step.

A display system according to the present invention is characterized in that a first display apparatus includes first display means for displaying image data; feature detection means for detecting a feature of input data which includes at least image data; and control means for performing control such that image data included in the input data is displayed on at least one of the first display apparatus and one or more second display apparatuses, according to the result of detection of a feature of the input data, and the one or more second display apparatuses include storage means for storing one scene of image data in the input data, according to the control of the first display apparatus; and second display means for displaying the image data stored in the storage means.

In the first display apparatus, the first control method, the first program, and the first storage medium according to the present invention, a feature of input data which includes at least image data is detected, and control is performed such that an image included in the input data is displayed on at least one of the display means and the another display apparatus according to the result of feature detection.

In the second display apparatus, the second control method, the second program, and the second storage medium according to the present invention, one scene of image data in input data which includes at least image data is stored according to the control of the another display apparatus, and the stored image is displayed.

In the display system according to the present invention, in the first display apparatus, a feature of input data which includes at least image data is detected; and control is performed such that image data included in the input data is displayed on at least one of the first display apparatus and the one or more second display apparatuses, according to the result of detection. In the one or more second display apparatuses, one scene of image data in the input data is stored according to the control of the first display apparatus; and the stored image data is displayed.

BRIEF DESCRIPTION OF THE DRAWINGS

FIG. 2 is a perspective view showing an example external structure of a main unit 1.

FIG. 3A is an elevation showing an example external structure of the main unit 1.

FIG. 3B is a top view showing the example external structure of the main unit 1.

FIG. 3C is a right side view showing the example external structure of the main unit 1.

FIG. 3D is a left side view showing the example external structure of the main unit 1.

FIG. 3E is a bottom view showing the example external structure of the main unit 1.

FIG. 3F is a rear view showing the example external structure of the main unit 1.

FIG. 4 is a perspective view showing an example external structure of a subsidiary unit 2.

FIG. 5A is an elevation showing an example external structure of the subsidiary unit 2.

FIG. 5B is a top view showing the example external structure of the subsidiary unit 2.

FIG. 5C is a right side view showing the example external structure of the subsidiary unit 2.

FIG. 5D is a left side view showing the example external structure of the subsidiary unit 2.

FIG. 5E is a bottom view showing the example external structure of the subsidiary unit 2.

FIG. 5F is a rear view showing the example external structure of the subsidiary unit 2.

FIG. 14 is a view showing the offset addresses, names, and functions of CSRs.

FIG. 16 is a view showing details of a bus info block, a root directory, and a unit directory.

FIG. 17 is a view showing the structure of a PCR.

FIG. 18A is a view showing the structure of an oMPR.

FIG. 18B is a view showing the structure of an OPCR.

FIG. 18C is a view showing the structure of an iMPR.

FIG. 18D is a view showing the structure of an iPCR.

FIG. 20A is a view showing a ctype/response field in the AV/C commands.

FIG. 20B is a view showing a subunit_type field in the AV/C commands.

FIG. 20C is a view showing an opcode field in the AV/C commands.

FIG. 21A is a view showing an example specific command in the AV/C commands.

FIG. 21B is a view showing an example specific response in the AV/C commands.

FIG. 22 is a block diagram showing an example electric structure of the controller 15.

FIG. 62 is a block diagram showing another example electric structure of the main unit 1.

FIG. 77A is a view explaining the processing of a something-unusual determination section 1213.

FIG. 77B is a view explaining the processing of the something-unusual determination section 1213.

FIG. 77C is a view explaining the processing of the something-unusual determination section 1213.

FIG. 77D is a view explaining the processing of the something-unusual determination section 1213.

FIG. 80A is a view explaining the warning processing of a security controller 1137A.

FIG. 80B is a view explaining the warning processing of the security controller 1137A.

FIG. 81 is a block diagram showing another example electric structure of the main unit 1.

FIG. 82A is a view explaining the warning processing of a security controller 1137A.

FIG. 82B is a view explaining the warning processing of the security controller 1137A.

FIG. 83 is a block diagram showing still another example electric structure of the main unit 1.

FIG. 84 is a block diagram showing an example structure of one embodiment of a computer to which the present invention is applied.

BEST MODE FOR CARRYING OUT THE INVENTION

Figure 1B:
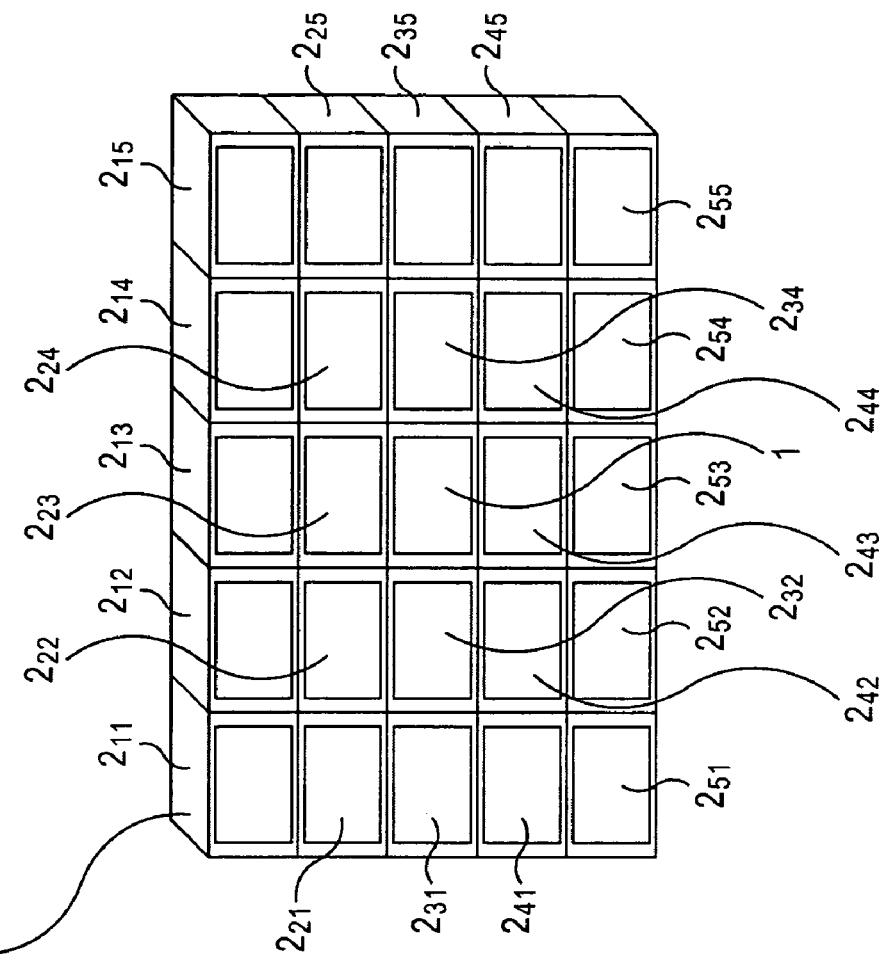
FIG. 1B is a perspective view showing an example structure of one embodiment of a scalable TV system to which the present invention is applied.
Figure 1A:
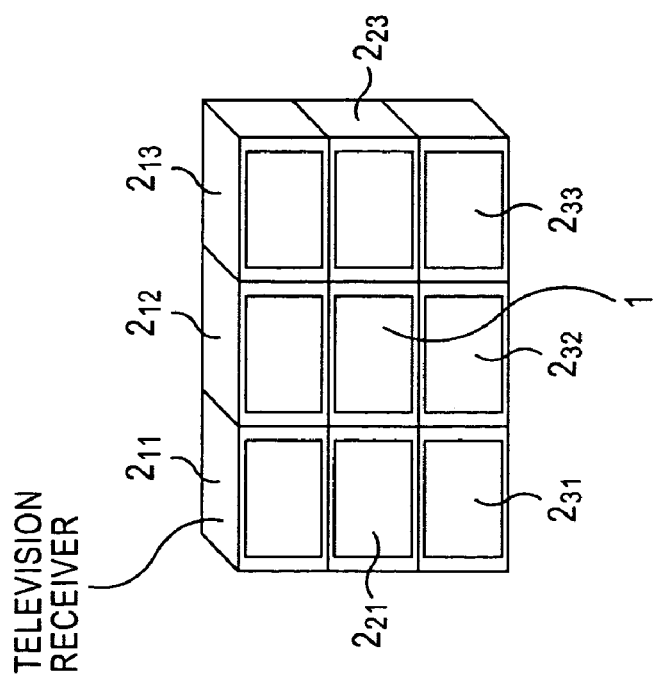
FIG. 1A is a perspective view showing an example structure of one embodiment of a scalable TV system to which the present invention is applied.

FIG. 1A and FIG. 1B are perspective views showing example structures of one embodiment of a scalable TV (television) system (a system refers to an entity in which a plurality of apparatuses are logically assembled, and whether the apparatuses are included in the same cabinet is not concerned) to which the present invention is applied.

In the embodiment shown in FIG. 1A, a scalable TV system is formed of nine television receivers 1, $2_{11}$, $2_{12}$, $2_{13}$, $2_{21}$, $2_{23}$, $2_{31}$, $2_{32}$, and $2_{33}$. In the embodiment shown in FIG. 1B, a scalable TV system is formed of 25 television receivers 1, $2_{11}$, $2_{12}$, $2_{13}$, $2_{14}$, $2_{15}$, $2_{21}$, $2_{22}$, $2_{23}$, $2_{24}$, $2_{25}$, $2_{31}$, $2_{32}$, $2_{34}$, $2_{35}$, $2_{41}$, $2_{42}$, $2_{43}$, $2_{44}$, $2_{45}$, $25_{1}$, $2_{52}$, $2_{53}$, $2_{54}$, and $2_{55}$.

The number of television receivers constituting a scalable TV system is not limited to nine or 25. In other words, a scalable TV system can be formed of any plurality of television receivers. The arrangement of television receivers constituting a scalable TV system is not limited to a three-by-three or five-by-five horizontal-and-vertical format shown in FIG. 1A or FIG. 1B. In other words, the arrangement of television receivers constituting a scalable TV system can be other horizontal-and-vertical formats, such as one-by-two, two-by-one, two-by-three horizontal-and-vertical formats. In addition, the arrangement shape of television receivers constituting a scalable TV system is not limited to a matrix shape shown in FIG. 1A and FIG. 1B, but can be a pyramid shape.

Since a scalable TV system can be structured by any plurality of television receivers any number of which are disposed horizontally and vertically in this way, it can be called a "scalable" system.

Among television receivers constituting a scalable TV system, there are two types of television receivers, a main television receiver (hereinafter called a main unit, if necessary) which can control the other television receivers, and a subsidiary television receivers (hereinafter called subsidiary units, if necessary) which can be controlled by another television receiver but cannot control the other television receivers.

To perform various types of processing described later, the scalable TV system needs to have television receivers (hereinafter called scalable-use units) conforming to a scalable TV system, and one of them needs to be a main unit. Therefore, in each of the embodiments shown in FIG. 1A and FIG. 1B, the television receiver disposed, for example, at the center serves as a main unit 1 among the television receivers constituting the scalable TV system.

Because of the above-described reasons, when television receivers which are not scalable-use units are used among television receivers constituting a scalable TV system, such television receivers cannot used the functions of the scalable TV system. In addition, even when all television receivers constituting a scalable TV system are scalable-use units, if all of them are subsidiary units, they cannot use the functions of the scalable TV system.

Therefore, to use the functions of a scalable TV system, the user needs to buy at least one or more main units or one main unit and one or more subsidiary units.

Since a main unit can serve as a subsidiary unit, a plurality of main units may be used among television receivers constituting a scalable TV system.

In the embodiment shown in FIG. 1A, the television receiver 1 disposed at the center (the second from the left and the second from the top) among the three-by-three television receivers serves a main unit, and the other eight television receivers $2_{11}$, $2_{12}$, $2_{13}$, $2_{21}$, $2_{23}$, $2_{31}$, $2_{32}$, and $2_{33}$ serve as subsidiary units. In the embodiment shown in FIG. 1B, the television receiver 1 disposed at the center (the third from the left and the third from the top) among the five-by-five television receivers serves a main unit, and the other 24 television receivers $2_{11}$, $2_{12}$, $2_{13}$, $2_{14}$, $2_{15}$, $2_{21}$, $2_{22}$, $2_{23}$, $2_{24}$, $2_{25}$, $2_{31}$, $2_{32}$, $2_{34}$, $2_{35}$, $2_{41}$, $2_{42}$, $2_{43}$, $2_{44}$, $2_{45}$, $2_{51}$, $2_{52}$, $2_{53}$, $2_{54}$, and $2_{55}$ serve as subsidiary units.

Therefore, in each of the embodiment shown in FIG. 1A and FIG. 1B, the main unit 1 is disposed at the center of the television receivers constituting the scalable TV system. The position of the main unit 1 is not limited to the center of the television receivers constituting the scalable TV system. The main unit 1 may be disposed at any position, such as the upper left corner or at the lower right corner.

Even when the main unit 1 is disposed at any position in the scalable TV system, each process described later can be performed with the television receiver disposed at the center being regarded as a main unit.

To make the following description simple, it is assumed that the scalable TV system is formed of three-by-three television receivers as shown in FIG. 1A, and the main unit 1 is disposed at the center of the television receivers constituting the scalable TV system.

The suffixes i and j used in a subsidiary unit $2_{ij}$ constituting the scalable TV system means that the subsidiary unit $2_{ij}$ is located at the i-th row and the j-th column (the i-th row from the top and the j-th column from the left) in the scalable TV system.

Hereinafter, if it is not necessary to distinguish subsidiary units $2_{ij}$, they are collectively called a subsidiary unit 2.

FIG. 2 is a perspective view showing an example structure of the television receiver serving as the main unit 1.

The main unit 1 is a television receiver having a display-screen size of, for example, 14 inches or 15 inches, and has a CRT (cathode ray tube) 11 for displaying images at the center of the front face and speaker units 12L and 12R for outputting sound at the left-hand end and the right-hand end of the front face.

The image included in a television broadcasting signal received by an antenna not shown is displayed at the CRT 11, and the L (left) channel sound and the R (right) channel sound accompanying the image are output from the speaker units 12L and 12R.

The main unit 1 is attached with a remote commander (hereinafter called a controller, if necessary) 15 for emitting an infrared ray IR. The user can operate the controller 15 to change the receiving channel and sound volume, and sends various commands to the main unit 1.

The controller 15 is not limited to a remote controller which performs infrared-ray communication. A remote controller which performs radio communication such as Blue-Tooth™ may be employed.

The controller 15 can control not only the main unit 1 but also the subsidiary unit 2.

Next, FIG. 3A to FIG. 3F show six faces of an example structure of the main unit 1 shown in FIG. 2.

FIG. 3A shows the front face of the main unit 1, FIG. 3B shows the top face of the main unit 1, FIG. 3C shows the bottom face of the main unit 1, FIG. 3D shows the left-hand-side face of the main unit 1, FIG. 3E shows the right-hand-side face of the main unit 1, and FIG. 3F shows the rear face of the main unit 1.

Securing mechanisms are provided on the top face (FIG. 3B), the bottom face (FIG. 3C), the left-hand-side face (FIG. 3D), and the right-hand-side face (FIG. 3E) of the main unit 1. As described later, similar securing mechanisms are provided on the top face, the bottom face, the left-hand-side face, and the right-hand-side face of the television receiver serving as the subsidiary unit. When the subsidiary unit 2 or another main unit is disposed at the top-face side, the bottom-face side, the left-hand-side-face side, or the right-hand-side-face side of the main unit 1, the securing mechanisms provided on the top face, the bottom face, the left-hand-side face, or the right-hand-side face of the main unit 1 and the securing mechanisms provided for the subsidiary unit 2 or another main unit at the opposite face, for example, engage to secure the main unit 1 to the subsidiary unit 2 or to another main unit so as not to easily separate. With this, the television receivers constituting the scalable TV system is prevented from shifting in position.

The securing mechanisms can be formed of mechanical mechanisms. They can also be formed, for example, of magnets.

On the rear face of the main unit 1, as shown in FIG. 3F, a terminal panel 21, an antenna terminal 22, input terminals 23, and output terminals 24 are provided.

The terminal panel 21 has eight IEEE (Institute of Electrical and Electronics Engineers) 1394 terminals $21_{11}$, $21_{12}$, $21_{13}$, $21_{21}$, $21_{23}$, $21_{31}$, $21_{32}$, and $21_{33}$ for electrically connecting the main unit 1 to the eight subsidiary units $2_{11}$, $2_{12}$, $2_{13}$, $2_{21}$, $2_{23}$, $2_{31}$, $2_{32}$, and $2_{33}$, constituting the scalable TV system shown in FIG. 1A.

In the embodiment shown in FIG. 3F, in the terminal panel 21, the IEEE 1394 terminal $21_{ij}$ connected to the subsidiary unit $2_{ij}$ is provided at the position corresponding to the position of the subsidiary unit $2_{ij}$ in the scalable TV system shown in FIG. 1A, obtained when the user views the scalable TV system from the rear-face side, so that the main unit 1 understands the position of the subsidiary unit $2_{ij}$ in the scalable TV system shown in FIG. 1A.

Therefore, in the scalable TV system shown in FIG. 1A, the user is asked to make connections from the main unit 1 to the subsidiary unit 211 through the IEEE-1394 terminal $21_{11}$, to the subsidiary unit $2_{12}$ through the IEEE-1394 terminal $21_{12}$, to the subsidiary unit $2_{13}$ through the IEEE-1394 terminal $21_{13}$, to the subsidiary unit $2_{21}$ through the IEEE-1394 terminal $21_{21}$, to the subsidiary unit $2_{23}$ through the IEEE-1394 terminal $21_{23}$, to the subsidiary unit $2_{31}$ through the IEEE-1394 terminal $21_{31}$, to the subsidiary unit $2_{32}$ through the IEEE-1394 terminal $21_{32}$, and to the subsidiary unit $2_{33}$ through the IEEE-1394 terminal $21_{33}$.

In the scalable TV system shown in FIG. 1A, which IEEE-1394 terminal in the terminal panel 21 is connected to the subsidiary unit$_{ij}$ is not limited. When the subsidiary unit$_{ij}$ is connected to a IEEE-1394 terminal other than the IEEE-1394 terminal $21_{ij}$, it is necessary to specify in the main unit 1 (to ask the user to specify) that the subsidiary unit$_{ij}$ be disposed at the i-th row and the j-th column in the scalable TV system shown in FIG. 1A.

In the embodiment shown in FIG. 3F, the eight IEEE-1394 terminals $21_{11}$ to $21_{33}$ are provided for the terminal panel 21, and the main unit 1 is connected to the eight subsidiary units $2_{11}$ to $2_{33}$ in parallel. The main unit 1 can be connected to the eight subsidiary units $2_{11}$ to $2_{33}$ in series. Also in this case, it is necessary to specify in the main unit 1 that the subsidiary unit$_{ij}$ be disposed at the i-th row and the j-th column in the scalable TV system shown in FIG. 1A. Therefore, the number of IEEE-1394 terminals provided for the terminal panel 21 is not limited to eight.

Further, the electric connections between the television receivers in the scalable TV system are not limited to IEEE 1394. A LAN (IEEE 802) and others can be employed. The electric connections between the television receivers in the scalable TV system can be performed by radio, not by wires.

The antenna terminal 22 is connected to a cable which is connected to the antenna not shown. With this, the television broadcasting signal received by the antenna is input to the main unit 1. Image data and audio data output, for example, from a VTR (video tape recorder) are input to the input terminals 23. From the output terminals 24, the image data and audio data of, for example, the television broadcasting signal being received by the main unit 1 are output.

FIG. 4 is a perspective view showing an example structure of the television receiver serving as the subsidiary unit 2.

The subsidiary unit 2 is a television receiver having the same display-screen size as the main unit 1 shown in FIG. 2, and has a CRT (cathode ray tube) 31 for displaying images at the center of the front face and speaker units 32L and 32R for outputting sound at the left-hand end and the right-hand end of the front face. Different display-screen sizes can be used for the main unit 1 and the subsidiary unit 2.

The image included in a television broadcasting signal received by an antenna not shown is displayed at the CRT 31, and the L (left) channel sound and the R (right) channel sound accompanying the image are output from the speaker units 32L and 32R.

The subsidiary unit 2 is attached with a controller 35 for emitting an infrared ray IR, like the main unit 1. The user can operate the controller 35 to change the receiving channel and sound volume, and sends various commands to the subsidiary unit 2.

The controller 35 can control not only the subsidiary unit 2 but also the main unit 1.

To make the scalable TV system shown in FIG. 1A, the user needs to buy one main unit 1 and eight subsidiary units $2_{11}$ to $2_{33}$. In this case, since the main unit 1 is attached with the controller 15, and the eight subsidiary units $2_{11}$ to $2_{33}$ are attached with the controllers 35, the user has nine controllers and their management is troublesome.

It is possible that the controller 35 for the subsidiary unit 2 is sold separately from the subsidiary unit 2 as an option. It is also possible that the controller 15 for the main unit 1 is sold separately from the main unit 1 as an option.

As described above, the controllers 15 and 35 can control both the main unit 1 and the subsidiary unit 2. Therefore, if the user has only one of the controllers 15 and 35, the user can control both the main unit 1 and the subsidiary unit 2.

Next, FIG. 5A to FIG. 5F show six faces of an example structure of the subsidiary unit 2 shown in FIG. 4.

FIG. 5A shows the front face of the subsidiary unit 2, FIG. 5B shows the top face of the subsidiary unit 2, FIG. 5C shows the bottom face of the subsidiary unit 2, FIG. 5D shows the left-hand-side face of the subsidiary unit 2, FIG. 5E shows the right-hand-side face of the subsidiary unit 2, and FIG. 5F shows the rear face of the subsidiary unit 2.

Securing mechanisms are provided on the top face (FIG. 5B), the bottom face (FIG. 5C), the left-hand-side face (FIG. 5D), and the right-hand-side face (FIG. 5E) of the subsidiary unit 2. When the main unit 1 or another subsidiary unit is disposed at the top-face side, the bottom-face side, the left-hand-side-face side, or the right-hand-side-face side of the subsidiary unit 2, the securing mechanisms provided on the top face, the bottom face, the left-hand-side face, or the right-hand-side face of the subsidiary unit 2 and the securing mechanisms provided for the main unit 1 or another subsidiary unit at the opposite face engage to secure the subsidiary unit 2 to the main unit 1 or to another subsidiary unit so as not to easily separate.

On the rear face of the subsidiary unit 2, as shown in FIG. 5F, a terminal panel 41, an antenna terminal 42, input terminals 43, and output terminals 44 are provided.

The terminal panel 41 has one IEEE-1394 terminals $41_1$ for electrically connecting the main unit 1 to the subsidiary unit 2. When the subsidiary unit 2 is, for example, the subsidiary unit $2_{11}$ disposed at the upper left in the scalable TV system shown in FIG. 2, the IEEE-1394 terminals $41_1$ in the terminal panel 41 is connected to the IEEE-1394 terminal 2111 in the terminal panel 21 shown in FIG. 3F through an IEEE-1394 cable, not shown.

The number of IEEE-1394 terminals provided for the terminal panel 41 is not limited to one.

The antenna terminal 42 is connected to a cable which is connected to the antenna not shown. With this, the television broadcasting signal received by the antenna is input to the subsidiary unit 2. Image data and audio data output, for example, from a VTR are input to the input terminals 43.

From the output terminals 44, the image data and audio data of, for example, the television broadcasting signal being received by the subsidiary unit 2 are output.

A total of nine television receivers, the one main unit 1 and the eight subsidiary units $2_{11}$ to $2_{33}$ structured as described above, are disposed horizontally and vertically each for three units to form the scalable TV system shown in FIG. 1A.

Figure 6:
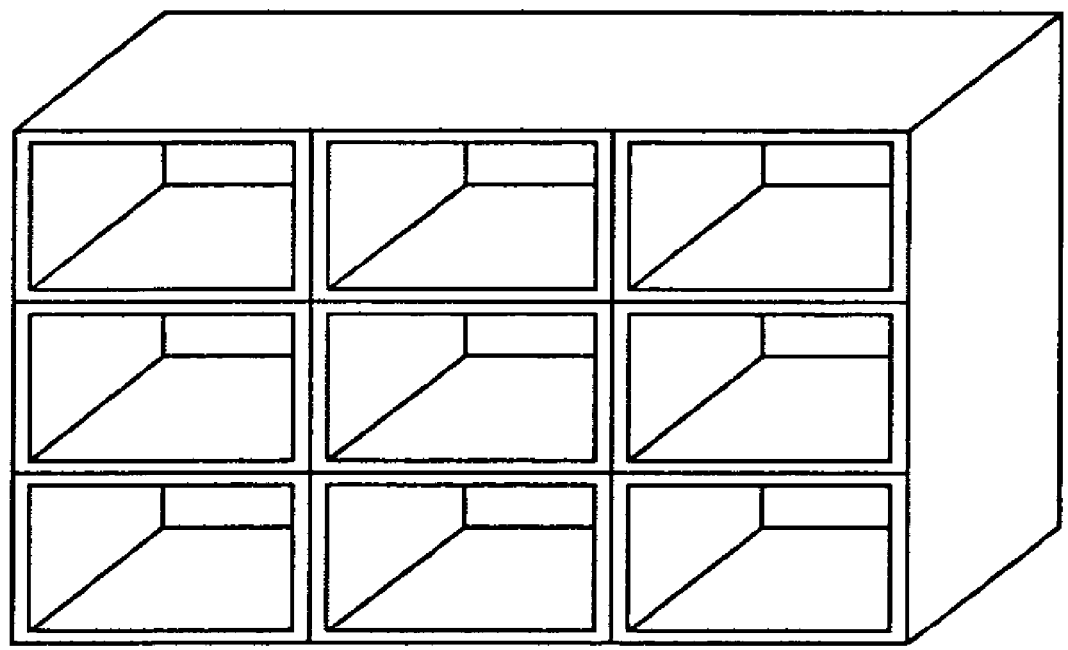
FIG. 6 is a perspective view showing an example external structure of a special rack for accommodating the main unit 1 and the subsidiary units 2 constituting a scalable TV system.

The scalable TV system shown in FIG. 1A is structured by directly locating television receivers above, below, at the left of, or at the right of a television receiver serving as a main unit or a subsidiary unit. The scalable TV system can also be structured, for example, by locating television receivers in a special rack for the system, shown in FIG. 6. When the special rack is used in this way, a positional shift of the television receivers constituting the scalable TV system can be more strongly prevented.

When the scalable TV system is structured by directly locating television receivers above, below, at the left of, or at the right of a television receiver serving as a main unit or a subsidiary unit, the main unit 1, for example, cannot be disposed at the second row and at the second column, shown in FIG. 1A, without the subsidiary unit $2_{32}$. Contrarily, when the special rack shown in FIG. 6 for the scalable TV system is used, the main unit 1 can be disposed at the second row and at the second column even without the subsidiary unit $2_{32}$.

Figure 7:
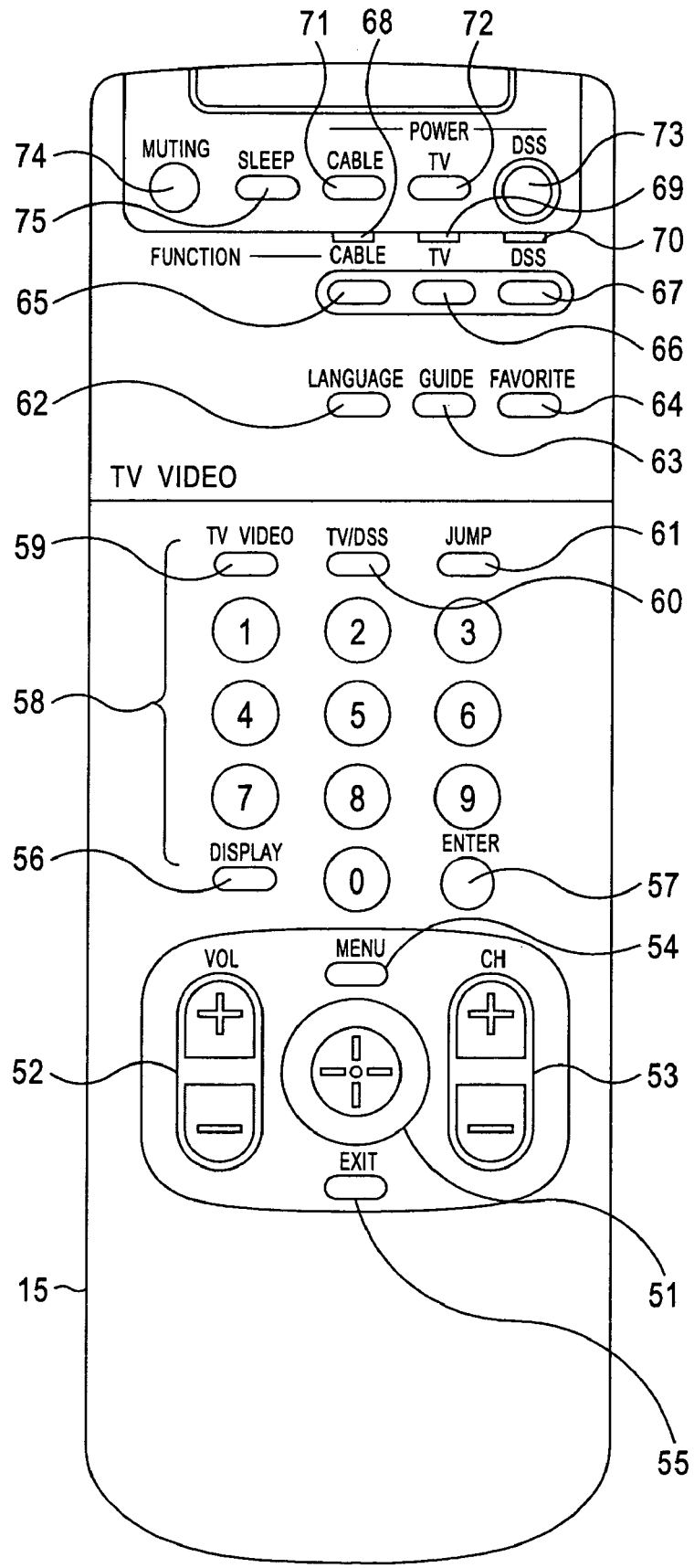
FIG. 7 is a plan showing an example external structure of a controller 15.

Next, FIG. 7 is a plan showing an example structure of the controller 15.

A selection button switch 51 can be operated (operated in a direction) in a total of eight directions, four directions of the up, down, right, and left directions, and four angled directions therebetween. In addition, the selection button switch 51 can be pressed (for selection) perpendicularly to the top face of the controller 15. A menu button switch 54 is operated in order to display a menu screen on the CRT 11 of the main unit 1 (or the CRT 31 of the subsidiary unit 2), used for inputting commands which instruct various settings (for example, specifying that the subsidiary unit$_{ij}$ be disposed at the i-th row and the j-th column in the scalable TV system as described above) and a predetermined process.

When the menu screen is displayed, a cursor for pointing an item on the menu screen is displayed on the CRT 11. The cursor is moved in the direction corresponding to the direction in which the selection button switch 51 is operated. When the cursor is disposed on a predetermined item, if the selection button switch 51 is pressed, the selection of the item is decided. In the present embodiment, as described later, icons are shown among items displayed on the menu, and the selection button switch 51 is also pressed to click on an icon.

Button switches corresponding to items and icons displayed on the menu screen can be provided for the controller 15. In this case, the user can directly operate the controller 15 to specify an item or an icon displayed on the menu screen without displaying the menu screen.

An exit button switch 55 is operated, for example, when the user wants to go back to the original usual screen from the menu screen.

A volume button switch 52 is operated to increase or reduce the volume. A channel up/down button switch 53 is operated to increase or reduce the number of the broadcasting channel to be received.

A numeral button (ten-key pad) switch 58 indicates numerals from zero to nine, and is operated to input indicated numerals. An enter button switch 57 is operated immediately after when the operation of the numeral button switch 58 is completed to show that the numeral input has been finished. When the channel is switched, the new channel number and others are OSD (on-screen display) displayed on the CRT 11 of the main unit 1 (or the CRT 31 of the subsidiary unit 2) for a predetermined period. A display button 56 is operated to switch the number of the channel currently being selected, or the on/off OSD display of the current volume.

A television/video switching button switch 59 is operated to switch the input of the main unit 1 (or the subsidiary unit 2) between the input from a built-in tuner 121 shown in FIG. 10, described later, (or a tuner 141 shown in FIG. 11, described later) and the input from the input terminal 23 shown in FIG. 3F (or the input terminal 43 shown in FIG. 5F). A television/DSS switching button switch 60 is operated to select a television mode for receiving terrestrial broadcasting or a DDS (Digital Satellite System, trademark of Hughes Communications, Inc.) mode for receiving satellite broadcasting, in the tuner 121. When the numeral button switch 58 is operated to change the channel, the channel selected before changing is stored. A jump button switch 61 is operated to return to the channel selected before changing.

A language button 62 is operated to select a predetermined language when broadcasting is performed in two or more languages. A guide button switch 63 is operated to display an EPG (electric program guide). A favorite button switch 64 is operated to select the user's-favorite channel specified in advance.

A cable button switch 65, a television switch 66, and a DSS switch 67 are used to switch the unit category of the command code corresponding to the infrared ray emitted from the controller 15. More specifically, the controller 15 (also the controller 35) can remote-control a STB and an IRD not shown, in addition to the television receivers serving as the main unit 1 and the subsidiary unit 2. The cable button switch 65 is operated to control the STB (set-top box) for receiving a signal transferred through a CATV network, by the controller 15. When the cable button switch 65 is operated, the controller 15 emits the infrared ray corresponding to the command code of the unit category assigned to the STB. In the same way, the television button switch 66 is operated to control the main unit 1 (or the subsidiary unit 1) by the controller 15. The DDS button switch 67 is operated to control the IRD (integrated receiver and decoder) for receiving a signal transferred from a satellite, by the controller 15.

An LED (light emitting diode) 68, 69, or 70 is turned on when the cable button switch 65, the television button switch 66, or the DSS button switch 67 is turned on, respectively. With these LEDs, the controller 15 shows to the user that the unit of which category is currently allowed to be controlled. The LED 68, 69, or 70 is turned off when the cable button switch 65, the television button switch 66, or the DSS button switch 67 is turned off, respectively.

A cable-power button switch 71, a television-power button switch 72, or a DSS-power button switch 73 is operated to turn on/off the power of the STB, the main unit 1 (or the subsidiary unit 2), or the IRD, respectively.

A muting button switch 74 is operated to set or release the muting condition of the main unit 1 (or the subsidiary unit 2). A sleep button switch 75 is operated to set or release a sleep mode in which the power is automatically turned off when a predetermined time is reached or when a predetermined time elapses.

Figure 8:
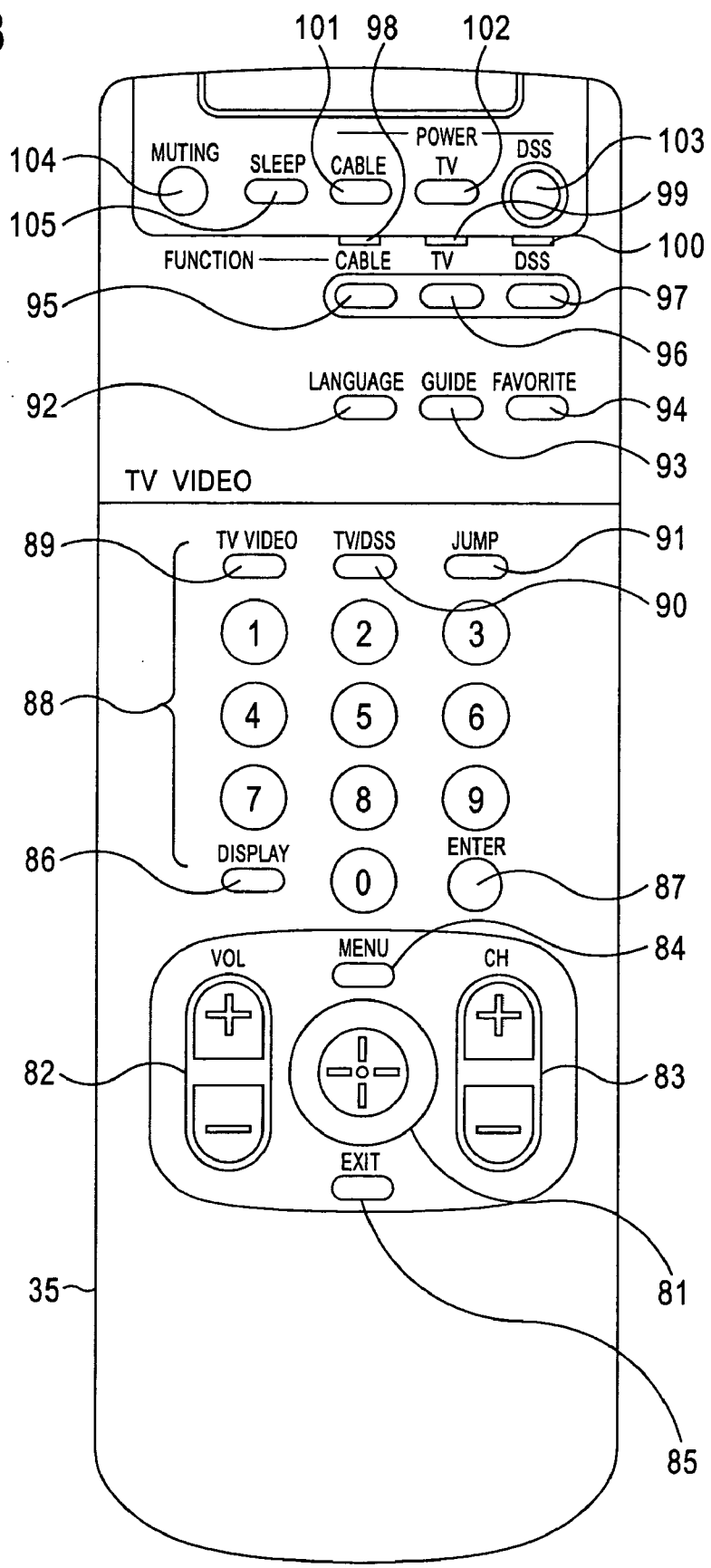
FIG. 8 is a plan showing an example external structure of a controller 35.

Next, FIG. 8 is a plan showing an example structure of the controller 35 for the subsidiary unit 2.

Since the controller 35 has a selection button switch 81 to a sleep button switch 105 structured in the same way as the selection button switch 51 to the sleep button switch 75 in the controller 15 shown in FIG. 7, a description thereof is omitted.

Figure 9:
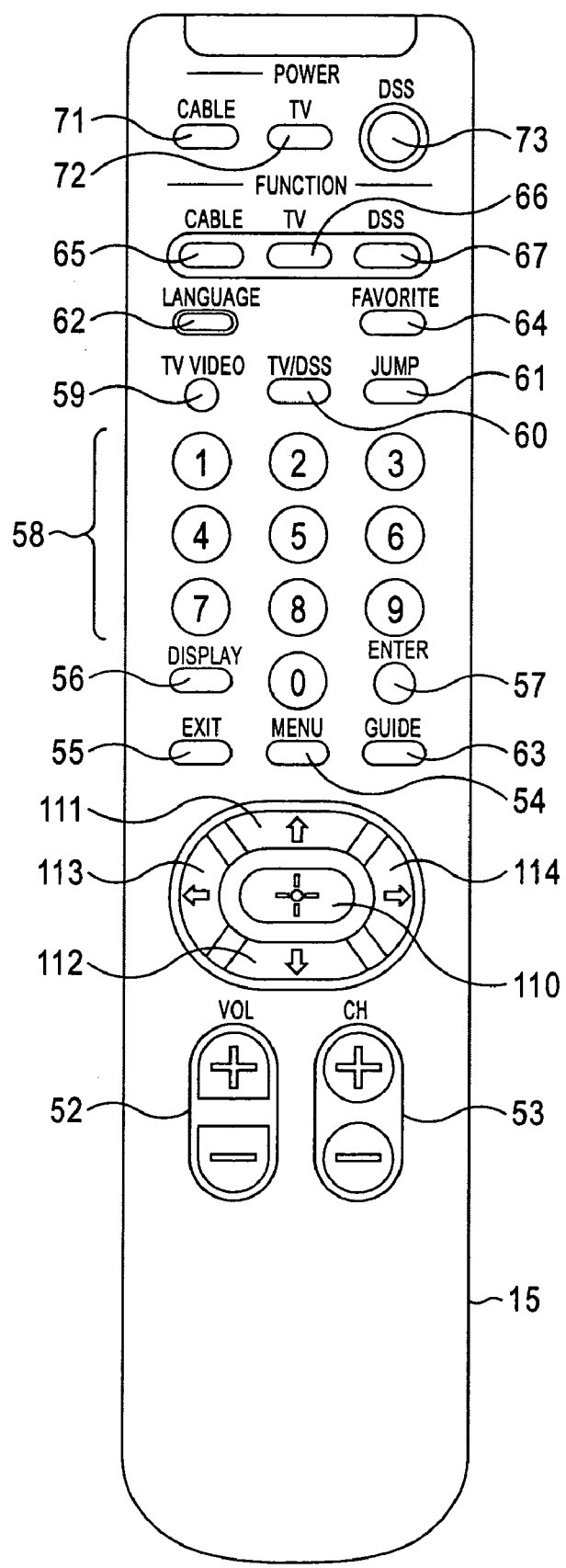
FIG. 9 is a plan showing another example external structure of the controller 15.

Next, FIG. 9 is a plan showing another example structure of the controller 15 for the main unit 1.

In an embodiment shown in FIG. 9, instead of the selection button switch 51 which can be operated in the eight directions, shown in FIG. 7, directional button switches 111, 112, 113, and 114 for four directions of up, down, right, and left, and a button switch 110 for performing a selection operation are provided. In addition, in the embodiment shown in FIG. 9, a cable button switch 65, a television button switch 66, and a DSS button switch 67 are of inner lighting type, and the LEDs 68 to 70 shown in FIG. 7 are omitted. LEDs not shown are disposed at the rear sides of the button switches 65 to 67. when the button switches 65 to 67 are operated, the LEDs disposed at the read sides are turned on or off in response to the operations.

The other button switches are basically the same as the corresponding switches shown in FIG. 7 although their positions are different.

The controller 35 for the subsidiary unit 2 can be structured in the same way as shown in FIG. 9.

The controller 15 can include a gyroscope for detecting the movement of the controller 15. In this case, it is possible that the gyroscope built in the controller 15 detects the direction and the distance of the movement of the controller 15, and the cursor displayed on the menu screen is moved in response to the direction and the distance of the movement. When the controller 15 includes a gyroscope in this way, the selection button switch 51 does not need to be operated in the eight directions in the embodiment shown in FIG. 7, and the directional button switches 111 to 114 are not necessary in the embodiment shown in FIG. 9. The controller 35 can include a gyroscope in the same way.

Figure 10:
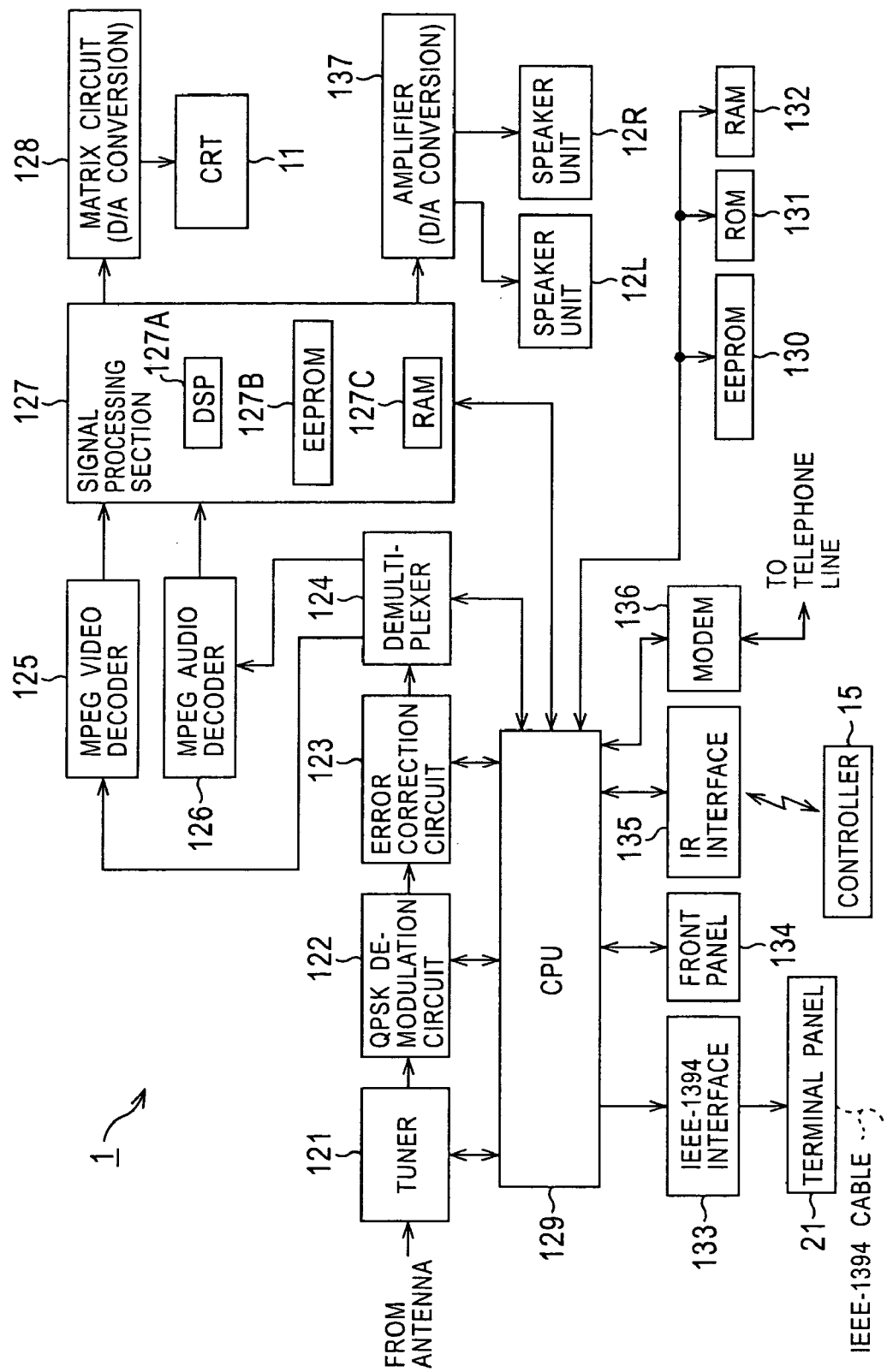
FIG. 10 is a block diagram showing an example electric structure of the main unit 1.

Next, FIG. 10 shows an example electric structure of the main unit 1.

A television broadcasting signal received by an antenna not shown is sent to the tuner 121, and detected and demodulated under the control of a CPU 129. The output of the tuner 121 is sent to a QPSK (quadrature phase shift keying) demodulation circuit 122, and QPSK-demodulated under the control of the CPU 129. The output of the QPSK demodulation circuit 122 is sent to an error correction circuit 123. An error is detected and corrected under the control of the CPU 129, and the output is sent to a demultiplexer 124.

The demultiplexer 124 de-scrambles the output of the error correction circuit 123, if necessary, under the control of the CPU 129, and extracts TS (transport stream) packets in a predetermined channel. Then, the demultiplexer 124 sends image-data (video-data) TS packets to an MPEG (Moving Picture Experts Group) video decoder 125, and sends audio-data (audio-data) TS packets to an MPEG audio decoder 126. The demultiplexer 124 also sends the TS packets included in the output of the error correction circuit 123 to the CPU 129, if necessary. The demultiplexer 124 further receives image data or audio data (including those in TS packets) sent from the CPU 129, and sends it to the MPEG video decoder 125 or to the MPEG audio decoder 126.

The MPEG video decoder 125 MPEG-decodes the image-data TS packets sent from the demultiplexer 124, and sends to a signal processing section 127. The MPEG audio decoder 126 MPEG-decodes the audio-data TS packets sent from the demultiplexer 124. The L-channel audio data and R-channel audio data obtained by decoding in the MPEG audio decoder 126 are sent to the signal processing section 127.

The signal processing section 127 sends the image data sent from the MPEG video decoder 125, to a matrix circuit 128, and sends the audio data (acoustic data) sent from the MPEG audio decoder 126, to an amplifier 137.

The signal processing section 127 is formed of a DSP (digital signal processor) 127A, an EEPROM (electrically erasable programmable read only memory) 127B, a RAM (random access memory) 127C and others, and also applies various digital signal processing to the image data and the audio data sent thereto, under the control of the CPU 129.

More specifically, the DSP 127A uses data stored in the EEPROM 127B to perform various signal processing, if necessary, according to a program stored in the EEPROM 127B. The EEPROM 127B stores programs and necessary data used when the DSP 127A performs various processing. The RAM 137C temporarily stores data and programs required by the DSP 137A for various processing.

The data and programs stored in the EEPROM 127B can be updated by over-writing.

The matrix circuit 128 converts the image data sent from the signal processing section 127, to R, G, and B (red, green, and blue) image data, and sends it to the CRT for display. The matrix circuit 128 has a D/A (digital/analog) converter, and applies D/A conversion to the image data and outputs it.

The CPU 129 performs various processing according to programs stored in an EEPROM 130 and a ROM (read only memory) 131 to control, for example, the tuner 121, the QPSK demodulation circuit 122, the error correction circuit 123, the demultiplexer 124, the signal processing section 127, an IEEE-1394 interface 133, an IR interface 135, and a modem 136. In addition, the CPU 129 sends the data sent from the demultiplexer 124, to the IEEE-1394 interface 133, and sends data sent from the IEEE-1394 interface 133, to the demultiplexer 124 and to the signal processing section 127. Further, the CPU 129 executes the processing corresponding to commands sent from a front panel 134 or from the IR interface 135. Furthermore, the CPU 129 controls the modem 136 to access a server not shown through a telephone line to obtain an updated program and necessary data.

The EEPROM 130 stores data and programs which need to be held even after power off. The ROM 131 stores, for example, an IPL (initial program loader) program. The data and programs stored in the EEPROM 130 can be updated by over-writing.

A RAM 132 temporarily stores data and programs required for the operation of the CPU 129.

The IEEE-1394 interface 133 is connected to the terminal panel 21 (to the IEEE-1394 terminals 2111 to 2133 (FIG. 3F) thereof), and functions as an interface for performing communications which conform to the IEEE 1394 standard. With this, the IEEE-1394 interface 133 sends data sent from the CPU 129, to the outside according to the IEEE 1394 standard, and receives data sent from the outside according to the IEEE 1394 standard, and sends it to the CPU 129.

Although the front panel 134 is not shown in FIG. 2 or FIG. 3A to FIG. 3F, it is provided, for example, at a part of the front face of the main unit 1. The front panel 134 includes a part of the button switches provided for the controller 15 (FIG. 7 and FIG. 9). More specifically, the front panel 134 includes button switches corresponding, for example, to the volume button switches 52, the channel up/down button switch 53, the menu button switch 54, the numeral button switch 58, and the television-power button switch 72. When a button switch on the front panel 134 is operated, the operation signal corresponding to the operation is sent to the CPU 129. In this case, the CPU 129 performs the processing corresponding to the operation signal sent from the front panel 134.

The IR interface 135 receives (receives the light of) an infrared ray sent from the controller 15 in response to an operation on the controller 15. In addition, the IR interface 135 photoelectrically converts the received infrared ray, and sends the signal obtained as a result to the CPU 129. In this case, the CPU 129 performs the processing corresponding to the signal sent from the IR interface 135, that is, the processing corresponding to the operation on the controller 15. Further, the IR interface 135 emits an infrared ray according to the control of the CPU 129. In other words, in the present embodiment, the main unit 1 can perform IEEE-1394 communications through the above-described IEEE-1394 interface 133, communications through the modem 136, described later, and infrared-ray communications through the IR interface 135.

The modem 136 controls communications through a telephone line, and thereby, sends data sent from the CPU 129, through the telephone line, receives data sent through the telephone line, and sends it to the CPU 129.

The amplifier 137 amplifies the audio data sent from the signal processing section 127, if necessary, and sends it to the speaker units 12L and 12R for output. The amplifier 137 has a D/A converter, applies D/A conversion to the audio data, and outputs it.

The main unit 1 structured as described above outputs images and sound (displays the images and outputs the sound) in a television broadcasting program in the following way.

A transport stream serving as a television broadcasting signal received by the antenna is sent to the demultiplexer 124 through the tuner 121, the QPSK demodulation circuit 122, and the error correction circuit 123. The demultiplexer 124 extracts the TS packets of a predetermined program from the transport stream, sends image-data TS packets to the MPEG video decoder 125, and sends audio-data TS packets to the MPEG audio decoder 126.

The MPEG video decoder 125 MPEG-decodes the TS packets sent from the demultiplexer 124. The image data obtained as a result is sent from the MPEG video decoder 125 through the signal processing section 127 and the matrix circuit 128 to the CRT 11 and displayed.

The MPEG audio decoder 126 MPEG-decodes the TS packets sent from the demultiplexer 124. The audio data obtained as a result is sent from the MPEG audio decoder 126 through the signal processing section 127 and the amplifier 137 to the speaker units 12L and 12R and output.

Figure 11:
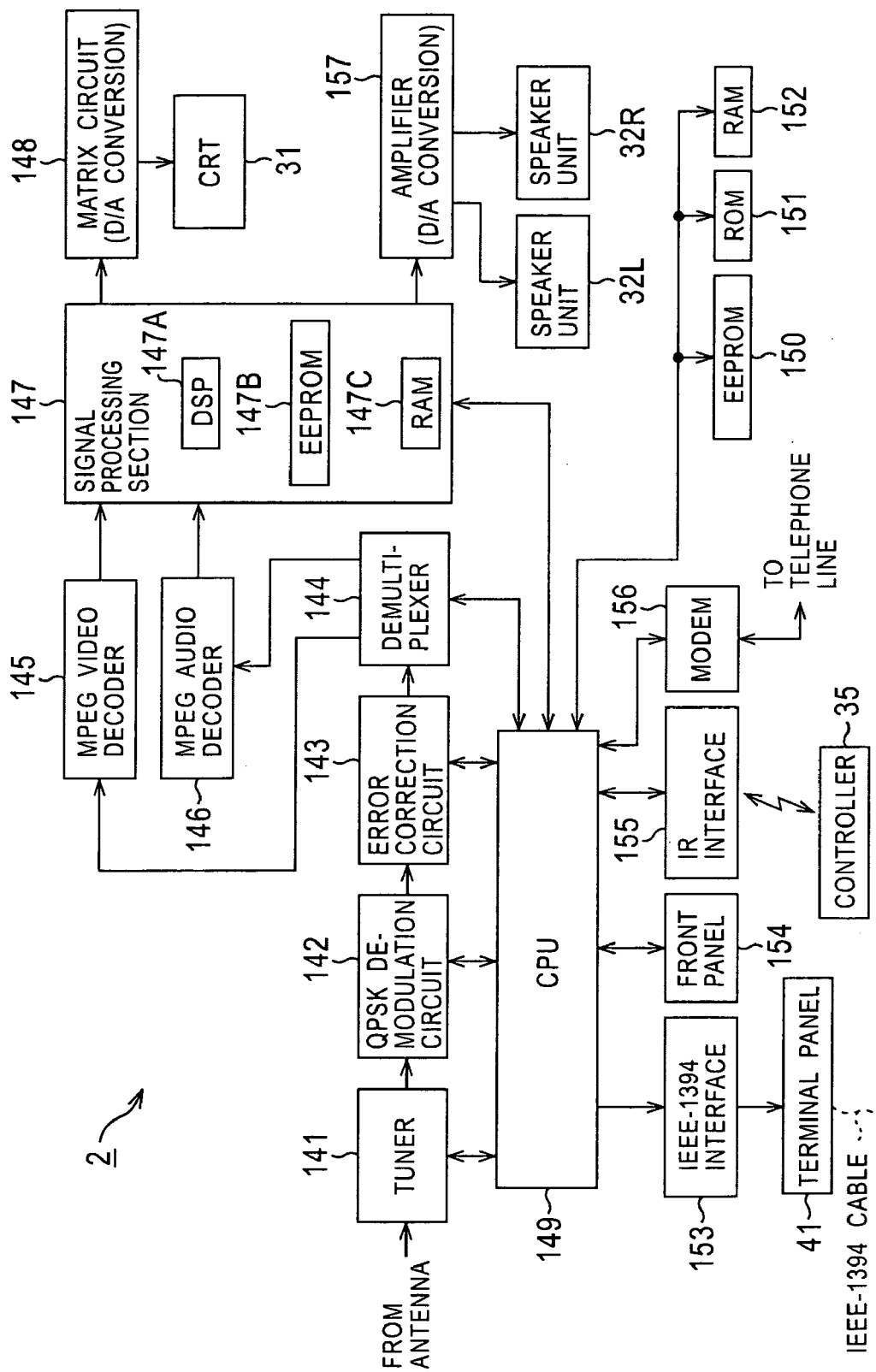
FIG. 11 is a block diagram showing an example electric structure of the subsidiary unit 2.

Next, FIG. 11 shows an example electric structure of the subsidiary unit 2.

Since the subsidiary unit 2 is formed of a tuner 141 to an amplifier 157 having the same structures as the tuner 121 to the amplifier 137 shown in FIG. 10, a description thereof is omitted.

Since the main unit 1 and the subsidiary unit 2 have the antenna terminal 22 and the antenna terminal 42 separately, as shown in FIG. 3F and FIG. 5F, an antenna (a cable therefrom) can be connected to each of the main unit 1 and the subsidiary unit 2 serving as television receivers constituting the scalable TV system shown in FIG. 1A or FIG. 1B. When antennas are connected to the main unit 1 and the subsidiary unit 2, however, wiring may become troublesome. It is possible in a scalable TV system that an antenna is connected to one of the television receivers constituting the scalable TV system, and a television broadcasting signal received by that television receiver is distributed to the other television receivers through, for example, IEEE-1394 communications.

Next, in the present embodiment, the IEEE-1394 terminal $21_{ij}$ (FIG. 3F) of the terminal panel 21 in the main unit 1 is connected to the IEEE-1394 terminal 41, (FIG. 5F) of the terminal panel 41 in the subsidiary unit $2_{ij}$ by an IEEE-1394 cable to electrically connect the main unit 1 and the subsidiary unit 2, and thereby, IEEE-1394 communications (communications conforming to the IEEE 1394 standard) is performed to transfer various types of data between the main unit 1 and the subsidiary unit 2.

IEEE-1394 communications will be briefly described below by referring to FIG. 12 to FIG. 21B.

IEEE 1394 is one of the serial-bus standards. IEEE-1394 communications allow data isochronous transfer, and therefore, are suited to the transfer of data required to be reproduced in real time, such as images and sound.

More specifically, data isochronous transfer can be performed between units (IEEE-1394 units) having IEEE-1394 interfaces at an interval of 125 µs (microseconds) in a 100-µs transfer band (called in this way although it is measured in time) at maximum. Within the above-described transfer band, isochronous transfer is allowed for a plurality of channels.

Figure 12:
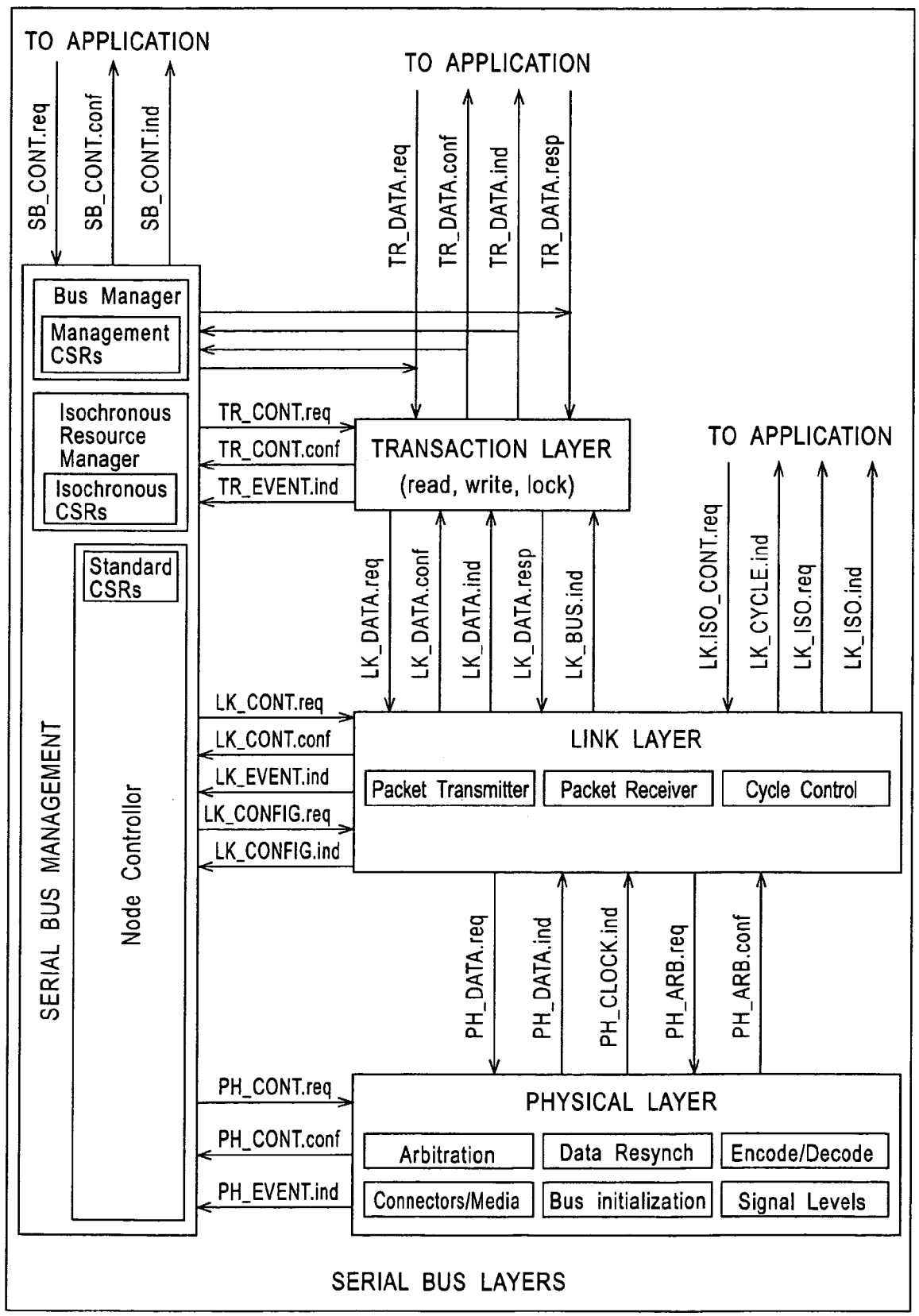
FIG. 12 is a view showing the layer structure of the IEEE-1394 communication protocol.

FIG. 12 shows the layer structure of the IEEE-1394 communication protocol.

The IEEE-1394 protocol has a three-layer hierarchical structure which includes a transaction layer, a link layer, and a physical layer. Each layer communicates with each other, and also communicates with serial-bus management. In addition, the transaction layer and the link layer also communicate with upper applications. Four types of transmission and receiving messages are used in the communications. They are request, indication (display), response, and confirmation. Arrows in FIG. 12 indicate these types of communication messages.

Communication with ".req" at the end of the name of an arrow indicates request messages, communication with ".ind" indicates indication messages, communication with ".resp" indicates response messages, and communication with ".conf" indicates confirmation messages. For example, TR_CONT.req means a request communication message sent from the serial-bus management to the transaction layer.

The transaction layer provides asynchronous transfer service for performing data communication with another IEEE-1394 unit (unit having an IEEE-1394 interface) according to an request from an application, and implements request response protocol required by ISO/IEC 13213. More specifically, data transfer methods according to the IEEE-1394 standard include the above-described isochronous transfer and asynchronous transfer. The transaction layer performs asynchronous transfer processing. Data is transferred between IEEE-1394 units by asynchronous transfer by three types of processing units required for the protocol of the transaction layer, read transaction, write transaction, and lock transaction.

The link layer provides data transfer service which uses acknowledges, address processing, data error confirmation, and data framing. One operation of packet transfer achieved by the link layer is called a subaction. There are two types of subactions, an asynchronous subaction and an isochronous subaction.

An asynchronous subaction is performed with a physical identification (ID) which specifies a node (accessible unit in IEEE 1394) and an address in the node being specified, and the node which receives data sends back an acknowledge. In an asynchronous broadcast subaction in which data is set to all nodes in the IEEE-1394 serial bus, the node which receives data does not send back an acknowledge.

In an isochronous subaction, data is transferred at the constant interval (125 µs, as described before) with a channel number specified. An acknowledge is not returned in an isochronous subaction.

The physical layer converts logical symbols used in the link layer into electric signals. In addition, the physical layer processes an arbitration (arbitration for the contention of nodes which try to perform IEEE-1394 communications) congestion request sent from the link layer, and executes the re-configuration of the IEEE-1394 serial bus when the bus is reset to automatically assign physical IDs.

The serial-bus management implements basic bus-control functions and provides CSR (control & status register architecture) of ISO/IEC 13212. The serial-bus management has the functions of a node controller, an isochronous resource manager, and a bus manager. The node controller controls the states, the physical IDs, and others of nodes, and also controls the transaction layer, the link layer, and the physical layer. The isochronous resource manager provides the state of use of resources used for isochronous communications. To perform isochronous communications, at least one IEEE-1394 units having the function of an isochronous resource manager is required among units connected to an IEEE-1394 serial bus. The bus manager has the highest function among others, and its purpose is to try to use the IEEE-1394 serial bus most suitable. The isochronous resource manager and the bus manger may be omitted.

IEEE-1394 units can be connected through node branches or through a node daisy chain. When a new IEEE-1394 unit is connected, the bus is reset and tree identification, a root node, physical IDs, an isochronous resource manager, a cycle master, a bus manager, and others are determined.

The hierarchical relationship among the IEEE-1394 units serving as nodes is determined in tree identification. The root node specifies a node which obtains a right to use the IEEE-1394 serial bus in arbitration. The physical IDs are determined when a packet called a self-ID packet is sent to each node. The self-ID packet also includes information such as a node data-transfer rate and whether the node can serve as an isochronous resource manager.

The isochronous resource manager is a node which provides the state of use of resources used for isochronous communications, as described above, and has a bandwidth register (bandwidth_available register) and a channel-number register (channels_available register), described later. In addition, the isochronous resource manager has a register which shows the physical ID of the node serving as a bus manager. When there is no bus manager in nodes serving as IEEE-1394 units connected through an IEEE-1394 serial bus, the isochronous resource manger functions as a simplified bus manager.

The cycle master sends a cycle start packet to the IEEE-1394 serial bus at an interval of 125 µs, which is the isochronous transfer interval. To this end, the cycle master has a cycle-time register (cycle_time register) for counting the interval (125 µs). The root node serves as the cycle master. When the root node does not have the function of the cycle master, the bus manager changes the root node.

The bus manager manages electric power on the IEEE-1394 serial bus, and changes the root node, as described above.

When the isochronous resource manger and others are determined after a bus reset, as described above, data transfer through the IEEE-1394 serial bus becomes ready.

In isochronous transfer, which is one of the IEEE-1394 data transfer methods, a transfer band and a transfer channel are obtained, and then, packets (isochronous packets) in which data is arranged are transferred.

More specifically, in isochronous transfer, the cycle master broadcasts cycle-start packets at an interval of 125 µs to the IEEE-1394 serial bus. When a cycle-start packet is broadcasted, the transfer of isochronous packets becomes ready.

To perform isochronous transfer, it is necessary to re-write data into the bandwidth register, provided by the isochronous resource manger to obtaining a transfer band, and the channel-number register, user for obtaining a channel, to declare the acquisition of resources for isochronous transfer.

The bandwidth register and the channel-number register are each assigned as one CSR (control & status register), described later, which has a 64-bit address space defined by ISO-IEC 13213.

The bandwidth register is a 32-bit register in which the higher-order 19 bits serve as a reserved area and the lower-order 13 bits indicate a transfer band (bw_remaining) which can be currently used.

More specifically, the initial value of the bandwidth register is 00000000000000000001001100110011B (B indicates that a binary value is written immediately before B) (=4915). This is due to the following reason. IEEE 1394 defines the time required for transferring 32 bits at 1572.864 Mbps (bit per second) as 1. The above-described interval, 125 µs, corresponds to 00000000000000000001100000000000B (=6144). However, IEEE 1394 specifies that the transfer band which can be used for isochronous transfer be 80% of the interval, 125 µs. Therefore, the maximum transfer band which can be used for isochronous transfer is 100 µs, which is 00000000000000000001001100110011B (=4915), as described above.

A remaining transfer band of 25 µs obtained by subtracting the maximum transfer band used for isochronous transfer, 100 µs, from 125 µs is used for asynchronous transfer. Asynchronous transfer is used for reading the values stored in the bandwidth register and the channel-number register, or for other purposes.

It is necessary to obtain a transfer band to start isochronous transfer. For example, when isochronous transfer is performed with the use of a transfer band of 10 µs in an interval of 125 µs, the transfer band, 10 µs, needs to be obtained. The acquisition of the transfer band is achieved by re-writing the value of the bandwidth register. More specifically, to obtain a transfer band of 10 µs, as described above, the value, 492, corresponding to 10 µs is subtracted from the value of the bandwidth register, and the difference is stored in the bandwidth register. Therefore, when the bandwidth register has a value of 4915 (if isochronous transfer is not performed at all), to obtain a transfer band of 10 µs, the value of the bandwidth register is changed from 4915, described above, to 4423 (=00000000000000000001000101000111B), which is obtained by subtracting 492, corresponding to 10 µs, from 4915.

When the value obtained by subtracting the transfer band to be obtained (used) from the value of the bandwidth register is less than zero, the transfer band cannot be obtained, the value of the bandwidth register is not re-written, and further, isochronous transfer cannot be performed.

To perform isochronous transfer, it is necessary to obtain a transfer channel in addition to the transfer band. The channel-number register is re-written to obtain a transfer channel.

The channel-number register is a 64-bit register, and each bit corresponds to a channel. More specifically, when the n-th bit (n-th bit from the least significant bit) is "1", the (n−1)-th channel is not used, and when the n-th bit is "0", the (n−1)-th channel is being used. Therefore, when no channel is being used, the channel-number register has 1111111111111111-1111111111111111111111111111111111111111111111-11B. When a first channel is obtained, for example, the channel-number register is changed to 1111111111111111111-1111111111111111111111111111111111111111101B.

Since the channel-number register has 64 bits, as described above, a total of 64 channels from the 0-th to 63rd channels can be obtained at maximum in isochronous transfer. The 63rd channel is used for broadcasting isochronous packets.

As described above, since a transfer band and a transfer channel are obtained, and then, isochronous transfer is achieved, data is transferred at a transfer rate assured. As described above, it is especially suited to data transfer which requires data to be reproduced in real time, such as images and sound.

Next, IEEE-1394 communications conform to the CSR architecture having a 64-bit address space, defined by ISO/IEC 13213.

Figure 13:
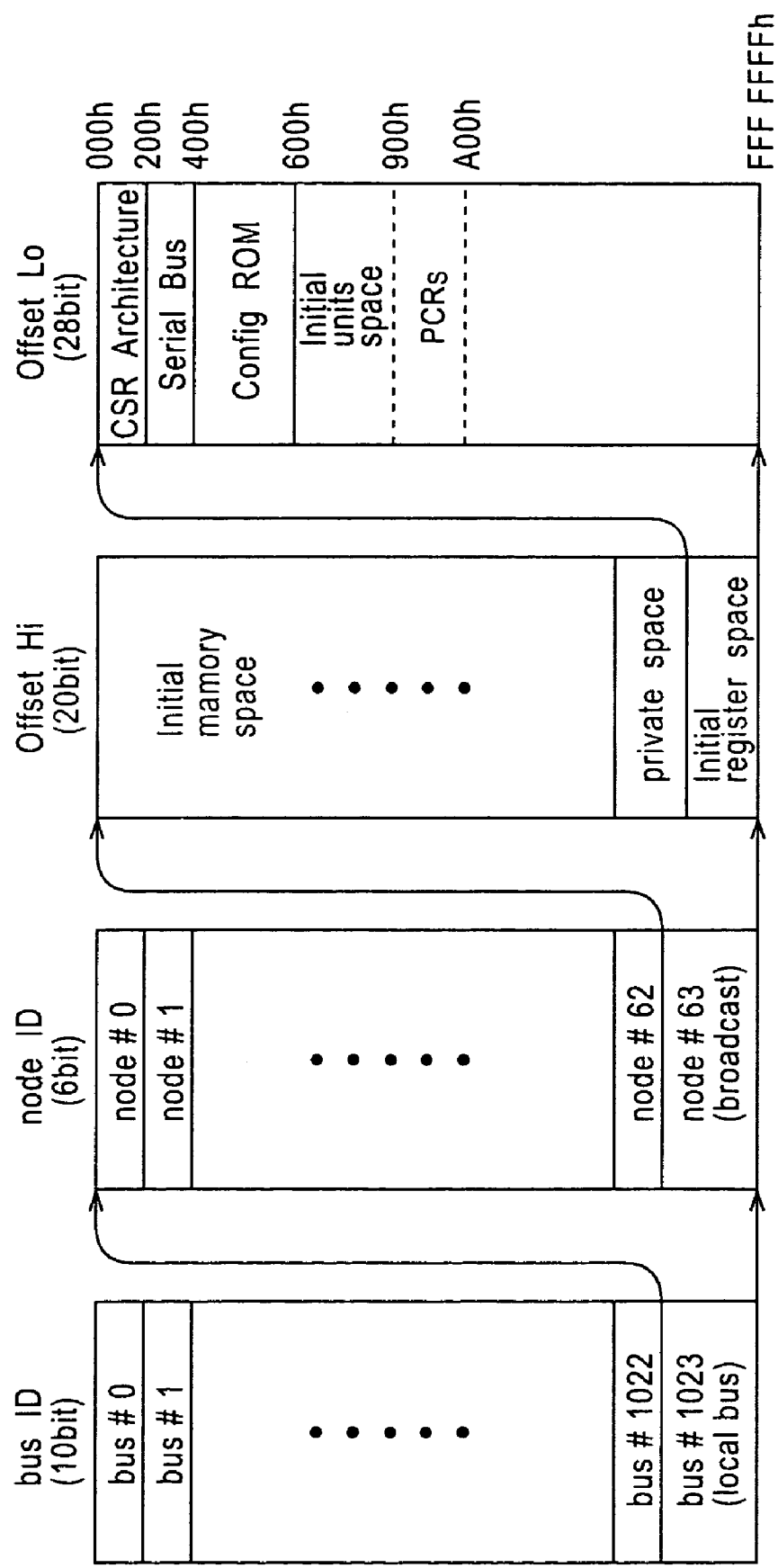
FIG. 13 is a view showing the address space of a CSR architecture.

FIG. 13 shows the address space of the CSR architecture.

The higher-order 16 bits of a CSR show the ID of each node, and the remaining 48 bits are used for specification in the address space assigned to each node. These higher-order 16 bits are further divided into 10 bits indicating a bus ID and six bits indicating a physical ID (ID of a node in the narrow sense). Since the value obtained by setting all bits to "1" is used for a special purpose, 1023 buses and 63 nodes can be specified.

Among the address space of 256 terabytes specified by the lower-order 48 bits of the CSR, a space determined by the higher-order 20 bits is divided into an initial register space used by a 2048-byte CSR-unique register, an IEEE-1394-unique register, and others; a private space; an initial memory space; and others, and a space determined by the lower-order 28 bits is used for a configuration ROM, an initial unit space used uniquely to the node, plug control registers (PCRs), and others when the space determined by the higher-order 20 bits is used for the initial register space.

FIG. 14 shows the offset addresses, the names, and the functions of main CSRs.

In FIG. 14, an "offset" column indicates offset addresses counted from FFFFF000000h ("h" indicates that a hexadecimal value is written immediately before "h") where the initial register space starts. The bandwidth register, having an offset of 220h, indicates a bandwidth which can be assigned to isochronous communications, as described above. Only the value indicated by the bandwidth register of a node serving as the isochronous resource manager is effective. In other words, each node has the CSRs shown in FIG. 13, but only the bandwidth register of the isochronous resource manger is effective. Therefore, only the isochronous resource manager substantially has a bandwidth register.

In a channel-number register having offsets of 224h to 228h, each bit corresponds to one of the channel numbers 0 to 63, and a bit having "0" indicates that the corresponding channel has already been assigned, as described above. Only the channel-number register of a node serving as the isochronous resource manger is effective.

Back to FIG. 13, a configuration ROM conforming to a general ROM format is disposed at addresses 400h to 800h in the initial register space.

Figure 15:
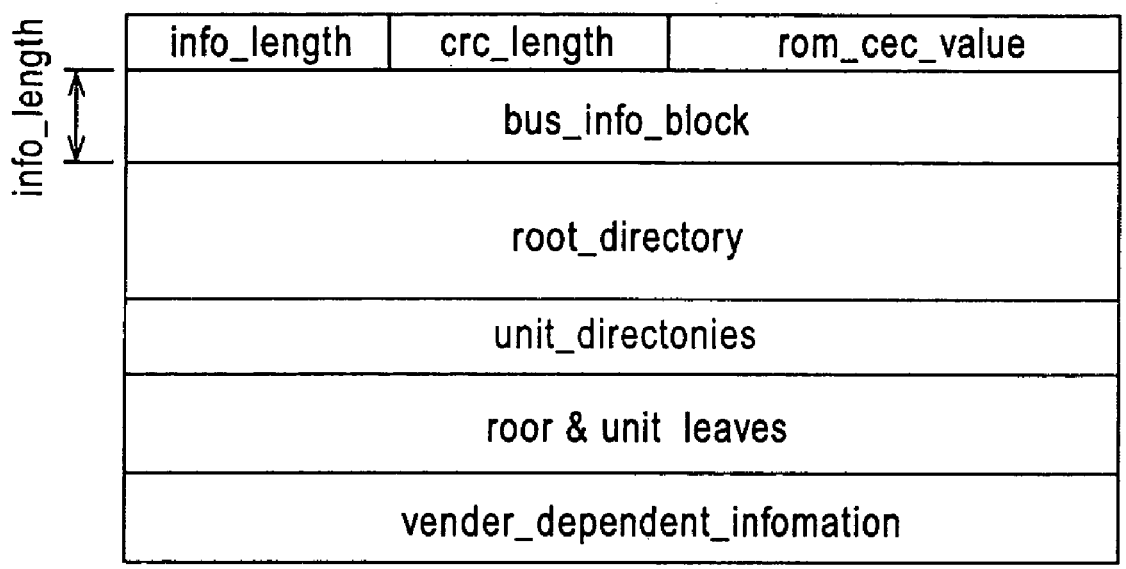
FIG. 15 is a view showing a general ROM format.

FIG. 15 shows the general ROM format.

A node, which is an access unit in IEEE 1394, can have a plurality of units in the node, which share an address space but operate independently. Unit directories can show the version and location of software assigned to this unit. The positions of a bus info block and a root direction are fixed, but the positions of the other blocks are specified by offset addresses.

FIG. 16 shows details of the bus info block, the root directory, and the unit directory.

A company ID in the bus info block stores an ID number indicating the manufacturer of the unit. A chip ID stores an ID unique to the unit, which is not equal to any IDs of the other units. According to the IEC 1833 standard, the first octet of the unit spec ID of the unit directory of a unit which satisfies IEC 1883 is set to 00h, the second octet thereof is set to A0h, and the third octet thereof is set to 2Dh. Further, the first octet of a unit sw version is set to 01h, and the LSB (least significant bit) of the third octet thereof is set to "1".

A node has a PCR (plug control register) specified in IEC 1883, at addresses 900h to 9FFh in the initial register space shown in FIG. 13. This is obtained when the concept of a plug is reduced to practice to logically form a signal path similar to an analog interface.

FIG. 17 shows the structure of the PCR.

The PCR has an OPCR (output plug control register) indicating an output plug, and an iPCR (input plug control register) indicating an input plug. The PCR also has an oMPR (output master plug register) and an iMPR (input master plug register) indicating the information of the output plug and the input plug unique to each unit, respectively. An IEEE-1394 unit does not have a plurality of oMPRs or a plurality of iMPRs, but can have the OPCR and iPCR corresponding to each plug according to the performance of the IEEE-1394 unit. The PCR shown in FIG. 17 has 31 oPCRs #0 to #30 and 31 iPCRs #0 to #30. The flow of isochronous data is controlled by operation the registers corresponding to these plugs.

FIGS. 18A to 18D show the structure of the oMPR, OPCR, iMPR, and iPCR.

FIG. 18A shows the structure of the oMPR, FIG. 18B shows the structure of the OPCR, FIG. 18C shows the structure of the iMPR, and FIG. 18D shows the structure of the iPCR.

Data rate capability fields in the oMPR and at the two highest bits of the iMPR at the MSB side store the code indicating the maximum transfer rate of isochronous data which the unit can transmit or receive. A broadcast channel base field in the oMPR specifies the number of a channel used for a broadcast output.

A number of output plugs field at the five lowest bits of the oMPR at the LSB side stores the value indicating the number of output plugs owned by the unit, that is, the number of oPCRs. A non-persistent extension field and a persistent extension field are areas defined for future extension.

On-line fields at the MSBs of the OPCR and the iPCR indicate the use state of the plug. More specifically, when the value is "1", the plug is on line, and when the value is "0", the plug is off line. Broadcast connection counter fields in the OPCR and the iPCR indicates whether a broadcast connection exists ("1") or not ("0"). Six-bit-width point-to-point connection counter fields in the OPCR and the iPCR have the value indicating the number of point-to-point connections which the plug has.

Six-bit-width channel number fields in the OPCR and the iPCR have the value indicating the number of an isochronous channel to which the plug is connected. A two-bit-width data rate field in the OPCR indicates the actual transfer rate of the packets of isochronous data output from the plug. A four-bit-width overhead ID in the OPCR has the code indicating the exceeded bandwidth of isochronous communications. A ten-bit-width payload field in the OPCR indicates the maximum value of the data included in isochronous packets, which can be handled by the plug.

An AV/C command set is specified as control commands for IEEE-1394 units which perform IEEE-1394 communications as described above. In the present embodiment, the main unit 1 and the subsidiary unit 2 can control each other by the use of the AV/C command set. It is also possible to use a special command system other than the AV/C command set to control the main unit 1 and the subsidiary unit 2.

The AV/C command set will be described briefly.

Figure 19:
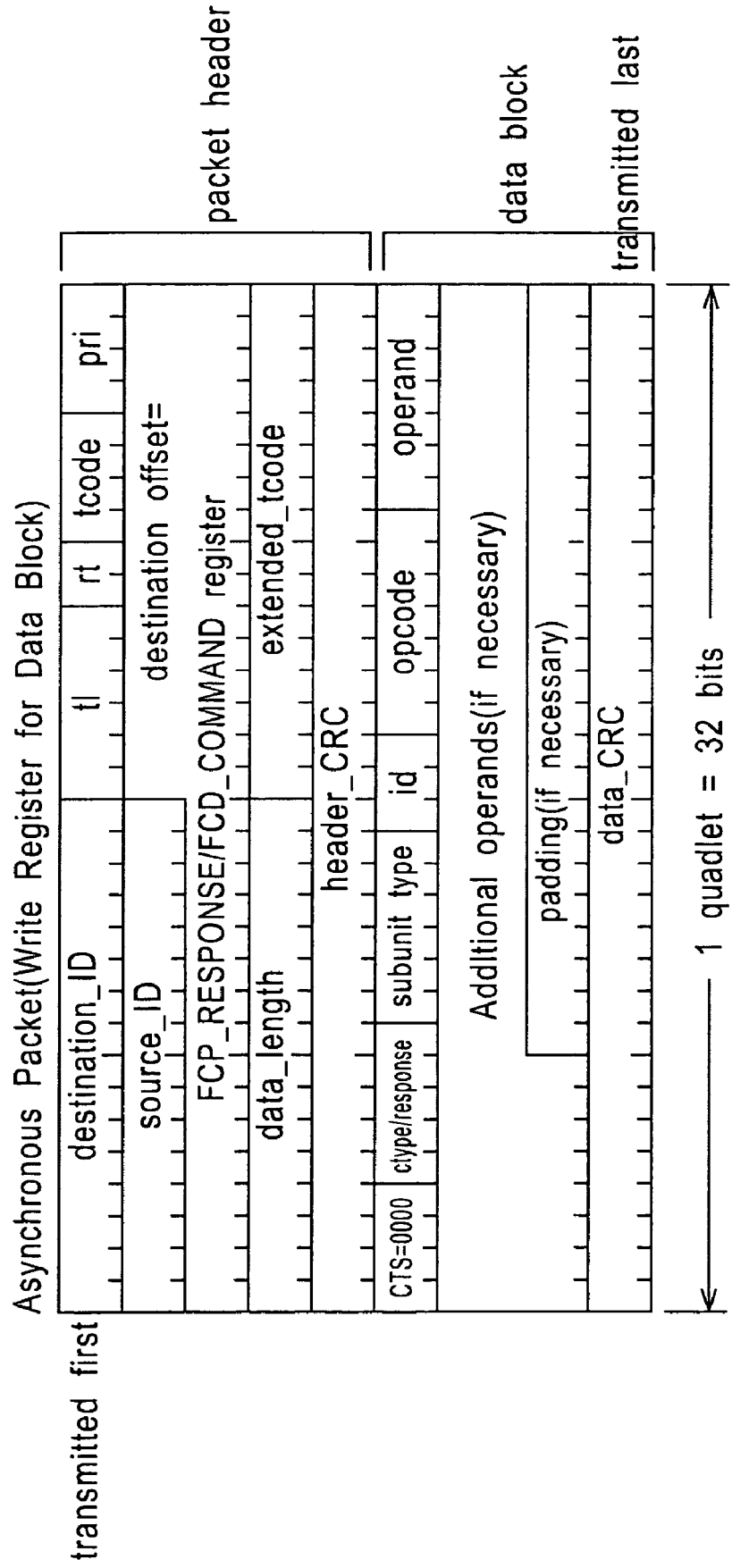
FIG. 19 is a view showing the data structure of a packet transferred in asynchronous transfer mode in AV/C commands.

FIG. 19 shows the data structure of AV/C-command-set packets transferred in the asynchronous transfer mode.

The AV/C command set is a command set for controlling AV (audio visual) units. In a control system which uses the AV/C command set, AV/C command frames and response frames are transferred by FCP (function control protocol). Reponses to commands should be sent within 100 ms so as not to impose a load on a bus and AV units.

As shown in FIG. 19, data in an asynchronous packet is formed of 32 bits (one quadlet) horizontally. An upper part in the figure indicates a packet header, and a lower part in the figure indicates a data block. A desination_ID indicates a destination.

A CTS field indicates the ID of a command set, and is "0000" for the AV/C command set. A ctype/response field indicates the functional classification of a command when the packet includes the command, and indicates the processing result of the command when the packet includes a response. Commands can be roughly divided into four types: (1) commands (CONTROL) for controlling the functions from the outside; (2) commands (STATUS) for inquiring the state from the outside; (3) commands (GENERAL INQUIRY (whether an opcode is supported or not) and SPECIFIC INQUIRY (whether an opcode and an operands are supported or not) for inquiring whether control commands are supported or not, from the outside; and (4) commands (NOTIFY) for requesting a state change to be reported to the outside.

Responses are sent back according to the types of commands. Responses to a CONTROL command include NOT INPLEMENTED (not mounted), ACCEPTED (accepted), REJECTED (rejection), and INTERIM (provisional). Responses to a STATUS command include NOT INPLEMENTED, REJECTED, IN TRANSITION (during transition), and STABLE (stability). Reponses to a GENERAL INQUIRY command and a SPECIFIC INQUIRY command include IMPLEMENTED (mounted) and NOT IMPLEMENTED. Responses to a NOTIFY command include NOT IMPLEMENTED, REJECTED, INTERIM, and CHANGED (changed).

A subunit type field is provided for identifying a function in the unit. For example, a tape recorder/player or a tuner is assigned. To differentiate a plurality of the same-type subunits, a subunit id field (disposed after the, subunit type field) is used as a differentiation number for addressing. An opcode field indicates a command. An operand field indicates a parameter for the command. An additional operands field is field where additional operands are disposed. A padding field is a field where dummy data is disposed to make the packet length equal to the predetermined number of bits. A data CRC (cycle redundancy check) field indicates CRC used for checking for an error during data transfer.

Next, FIG. 20A to FIG. 20C show specific examples in AV/C commands.

FIG. 20A shows specific examples in the ctype/response field. An upper part in the figure indicates commands and a lower part in the figure indicates responses. CONTROL is assigned to "0000", STATUS is assigned to "0001", SPECIFIC INQUIRY is assigned to "0010", NOTIFY is assigned to "0011", and GENERAL INQUIRY is assigned to "0100". "0101" to "0111" are reserved for a future specification. NOT INPLEMENTED is assigned to "1000", ACCEPTED is assigned to "1001", REJECTED is assigned to "1010", IN TRANSITION is assigned to "1011", IMPLEMENTED/ STABLE is assigned to "1100", CHNGED is assigned to "1101", and INTERIM is assigned to "1111". "1110" is reserved for a future specification.

FIG. 20B shows specific examples in the subunit type field. A video monitor is assigned to "00000", a disk recorder/ player is assigned to "00011", a tape recorder/player is assigned to "00100", a tuner is assigned to "00101", a video camera is assigned to "00111", a vendor unique is assigned to "11100", and a subunit type extended to the next byte is assigned to "11110". The unit is assigned to "11111". This is used when a setting such as turning on or off of the power is sent to the unit itself.

FIG. 20C shows specific examples in the opcode field. An opcode table exists for each subunit type, and opcodes used when the subunit type is a tape recorder/player are shown. An operand is defined for each opcode. VENDER-DEPENDENT is assigned to "00h", SEACH MODE is assigned to "50h", TIMECODE is assigned to "51h", ATN is assigned to "52h", OPEN MIC is assigned to "60h", READ MIC is assigned to "61h", WRITE MIC is assigned to "62h", LOAD MEDIUM is assigned to "C1h", RECORD is assigned to "C2h", PLAY is assigned to "C3h", and WIND is assigned to "C4h".

FIG. 21A and FIG. 21B show specific examples of an AV/C command and an AV/C response.

When a reproduction is instructed to a reproduction unit serving as a target (consumer) (side to be controlled), for example, a controller (side which controls) sends a command such as that shown in FIG. 21A to the target. Since the command uses the AV/C command set, CTS is set to "0000". Since a command (CONTROL) for controlling a unit from the outside is used, ctype is set to "0000" (FIG. 20A). Since a tape recorder/player is used, the subunit type field is set to "00100" (FIG. 20B). The id field is set to "000", which indicates that ID is not zero. The opcode field is set to "C3h", which means reproduction (FIG. 20C). The operand field is set to "75h", which means FORWARD. When reproduction is made, the target sends back a response such as that shown in FIG. 21B to the controller. "Accepted", which means acceptance, is disposed in the response field. The response field is set to "1001" (see FIG. 20A). Since the fields other than the response field have the same values as in FIG. 21A, a description thereof is omitted.

In the scalable TV system, various types of control is made between the main unit 1 and the subsidiary unit 2 by the user of the AV/C command set, described above. In the present embodiment, among control performed between the main unit 1 and the subsidiary unit 2, new commands and responses are defined for control which existing commands and responses cannot handle, and the new commands and responses are used to perform various types of control.

Details of the IEEE-1394 communications and the AV/C command set, described above, are explained in "WHITE SERIES No. 181 IEEE-1394 MULTIMEDIA INTERFACE" published by Triceps.

As described by referring to FIG. 10, the IR interface 135 of the main unit 1 can receive and transmit an infrared ray, and the controller 15 of the main unit 1 can not only transmit but also receive an infrared ray correspondingly to the IR interface 135, which can send and receive an infrared ray.

FIG. 22 shows an example electric structure of the controller 15.

An operation section 161 has various button switches provided for the controller 15, described by referring to FIG. 7 or FIG. 9, and sends the operation signal corresponding to an operated button switch to a control section 162.

The control section 162 receives the operation signal from the operation section 161 and sends the code (command code) of the command indicating the process requested by the operation signal, to a frame generation section 163. The control section 162 also performs various processes according to the output of a receiving processing section 167. In addition, the control section 162 stores a device code into a device-code storage section 168.

The frame generation section 163 generates frame-structure data (frame data) in which the command code sent from the control section 162 and the device code stored in the device storage section 168 are disposed, and sends the data to a transmission processing section 164.

The transmission processing section 164 modulates a carrier having a predetermined frequency according to the frame data sent from the frame generation section 163, and drives a light emitting section 165 according to a modulated signal obtained as a result.

The light emitting section 165 is formed, for example, of an LED, and emits an infrared ray when driven by the transmission processing section 164. The infrared ray emitted by the light emitting section 165 is, for example, received by the IR interface 135 (FIG. 10).

A light receiving section 166 receives an infrared ray and converts it into an electric signal, and sends the signal to the receiving processing section 167. The light receiving section 166 receives, for example, an infrared ray emitted by the IR interface 135.

The receiving processing section 167 demodulates the output of the light receiving section 166, and sends frame data obtained as a result to the control section 162.

Figure 23:
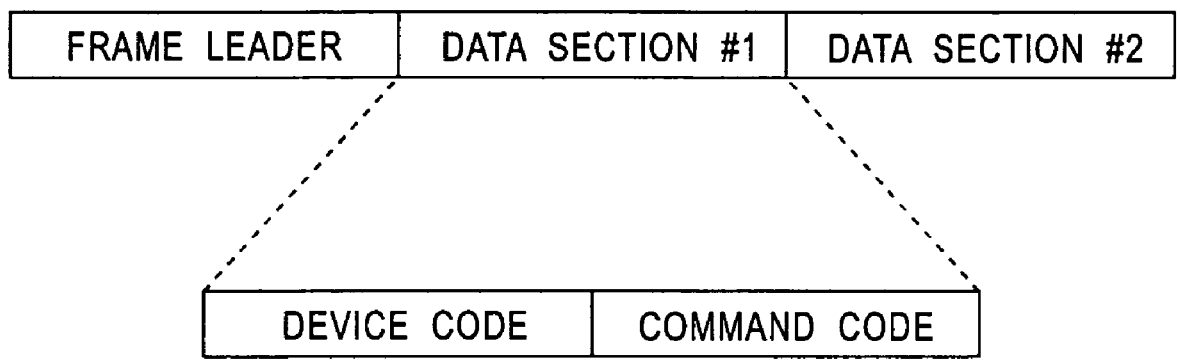
FIG. 23 is a view showing the format of frame data transmitted and received by the controller 15.

Next, FIG. 23 shows the frame format of the frame data generated by the frame generation section 163.

The frame data is formed of a frame leader disposed at the top, and two data sections #1 and #2 disposed thereafter.

The frame leader has data formed of a predetermined bit string indicating the top of a frame.

The data section #1 includes a device code and a command code.

The device code is a code assigned to an apparatus with which the transfer of frame data is performed. When an apparatus receives frame data, if the device code disposed in the frame data matches the device code assigned to the apparatus, the apparatus regards the frame data as that directed to the apparatus and performs the process corresponding to the command code disposed in the frame data.

More specifically, in the controller 15 shown in FIG. 22, when the control section 162 receives frame data from the receiving processing section 167, the control section 162 compares the device code disposed in the frame data with the device code stored in the device-code storage section 168, and only if they match, the control section 162 performs the process corresponding to the command code disposed in the frame data.

When the device code disposed in the frame data sent from the receiving processing section 167 does not match the device code stored in the device-code storage section 168, the control section 162 ignores (discards) the frame data. Therefore, in this case, the control section 162 does not perform any process.

The data section #2 has the same data as the data section #1.

In the controller 15 shown in FIG. 22, when the control section 162 receives frame data from the receiving processing section 167, the control section 162 compares the data sections #1 and #2 disposed in the frame data, and only if they match, the control section 162 compares the device codes as described above. Therefore, if the data sections #1 and #2 disposed in the frame data do not match, the control section 162 does not perform any process.

Since the control section 162 does not perform any process if the data sections #1 and #2 disposed in frame data do not match, as described above, frame data which is not successfully received (erroneous frame data) is prevented from being processed.

As described above, the IR interface 155 (FIG. 11) of the subsidiary unit 2 is also structured in the same way as the IR interface 135 of the main unit 1 shown in FIG. 10, and therefore, can transmit and receive an infrared ray. The controller 35 of the subsidiary unit 2 can not only transmit but also receive an infrared ray, correspondingly to the IR interface 155, which can transmit and receive an infrared ray.

Figure 24:
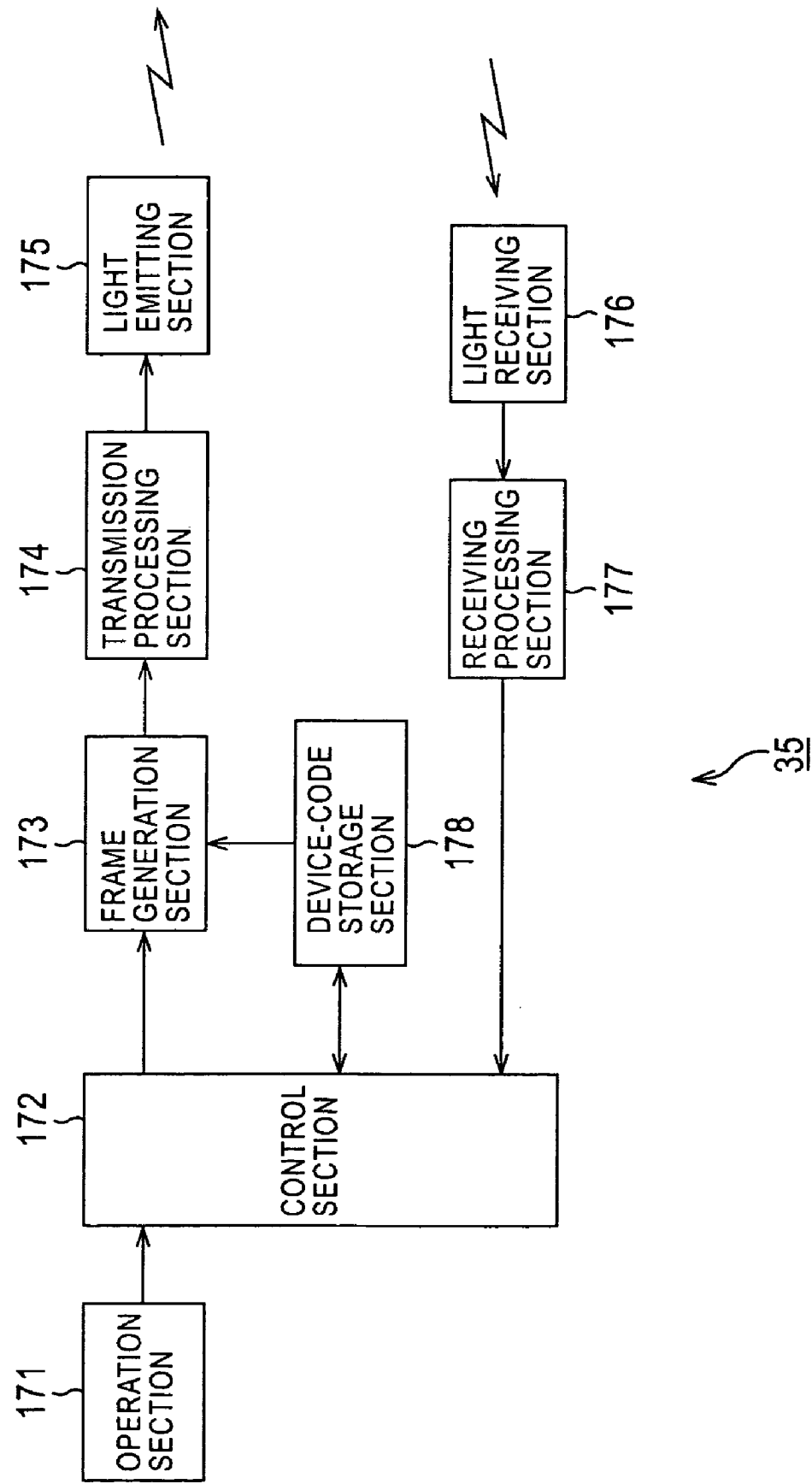
FIG. 24 is a block diagram showing an example electric structure of the controller 35.

FIG. 24 shows an example electric structure of the controller 35.

Since the controller 35 is formed of an operation section 171 to a device-code storage section 178 structured in the same way as the operation section 161 to the device-code storage section 168 shown in FIG. 22, a description thereof is omitted.

Figure 25:
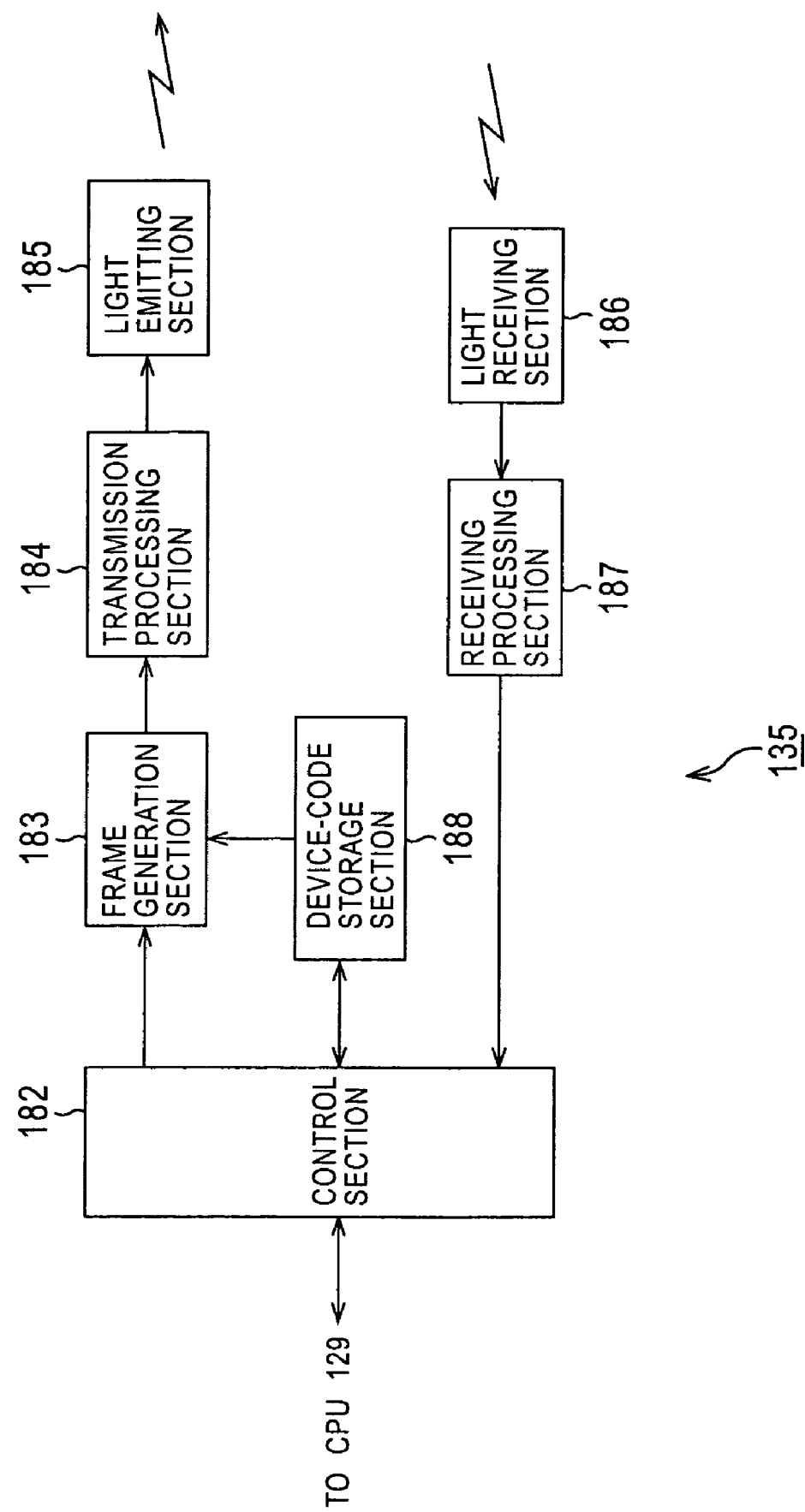
FIG. 25 is a block diagram showing an example electric structure of an IR interface 135.

Next, FIG. 25 shows an example detailed structure of the IR interface 135 (FIG. 10) of the main unit 1.

A control section 182 receives a command from the CPU 129 (FIG. 10), and sends the command code corresponding to the command to a frame generation section 183. The control section also receives frame data from a receiving processing section 187, and determines whether the data sections #1 and #2 of the frame data (FIG. 23) match. In addition, when the data sections #1 and #2 of the frame data match, the control section 182 compares the device code (FIG. 23) of the frame data with a device code stored in a device-code storage section 188, and if they match, the control section 182 sends the command corresponding to the command code (FIG. 23) of the frame data to the CPU 129.

Further, the control section 182 stores the device code in the device-code storage section 188.

The frame generation section 183 generates frame data in which the command code sent from the control section 182 and the device code stored in the device storage section 188 are disposed, and sends the data to a transmission processing section 184.

The transmission processing section 184 modulates a carrier having a predetermined frequency according to the frame data sent from the frame generation section 183, and drives a light emitting section 185 according to a modulated signal obtained as a result.

The light emitting section 185 is formed, for example, of an LED, and emits an infrared ray when driven by the transmission processing section 184. The infrared ray emitted by the light emitting section 185 is, for example, received by the light receiving section 166 (FIG. 22) of the controller 15.

A light receiving section 186 receives an infrared ray and converts it into an electric signal, and sends the signal to the receiving processing section 187. The light receiving section 186 receives, for example, an infrared ray emitted by the light emitting section 165 (FIG. 22) of the controller 15.

The receiving processing section 187 demodulates the output of the light receiving section 186, and sends frame data obtained as a result to the control section 182.

The IR interface 155 of the subsidiary unit 2 is also structured in the same way as the IR interface 135 of the main unit 1, shown in FIG. 25.

The processing (controller processing) of the controller 15 of the main unit 1, shown in FIG. 22 will be described next by referring to a flowchart shown in FIG. 26. The same processing is also performed in the controller 35 of the subsidiary unit 2, shown in FIG. 24.

In step S1, the control section 162 determines whether it has received an operation signal serving as a command from the operation section 161 when the user operated the operation section 161.

When it is determined in step S1 that an operation signal serving as a command has not been received, in other words, when the controller 15 is not operated, the processing proceeds to step S2, and the control section 162 determines whether it has received frame data.

When it is determined in step S2 that frame data has not been received, the processing returns to step S1, and the same processes are repeated thereafter.

When it is determined in step S2 that frame data has been received, in other words, when the light receiving section 166 received an infrared ray and the receiving processing section 167 has sent the frame data corresponding to the infrared ray to the control section 162, the processing proceeds to step S3, and the control section 162 determines whether the device code of the frame data matches the device code stored in the device-code storage section 168.

When it is determined in step S3 that the device code of the frame data does not match the device code stored in the device-code storage section 168, the processing returns to step S1, and the same processes are repeated thereafter.

When it is determined in step S3 that the device code of the frame data matches the device code stored in the device-code storage section 168, the processing proceeds to step S4, and the control section 162 performs the process corresponding to the command code disposed in the frame data, and the processing returns to step S1.

When it is determined in step S1 that an operation signal serving as a command has been received, in other words, when the user operated the operation section 161 and the operation signal corresponding to the operation has been sent to the control section 162, the processing proceeds to step S5, and the control section 162 determines whether the operation signal requests a device code to be set.

The device-code storage section 168 stores a default device code. The user can change the device code. More specifically, the device code of the controller 15 can be specified through a predetermined operation, such as an operation in which the user operates the menu button switch 54 and the television-power button switch 72 (FIG. 7) of the controller 15 at the same time. In step 5, it is determined whether the operation signal requests a device code to be set, according to the simultaneous operations of the menu button switch 54 and the television-power button switch 72.

When it is determined in step S5 that the operation signal sent from the operation section 161 does not request a device code to be set, the control section 162 sends the command code corresponding to the operation signal to the frame generation section 163, and the processing proceeds to step S6.

In step S6, the frame generation section 163 places the command code sent from the control section 162 and the device code stored in the device storage section 168 to generate frame data having the format shown in FIG. 23, and sends the data to the transmission processing section 164. The processing proceeds to step S7.

In step S7, the transmission processing section 164 drives the light emitting section 165 according to the frame data sent from the frame generation section 163, and the processing returns to step S1. The light emitting section 165 emits the infrared ray corresponding to the frame data.

When it is determined in step S5 that the operation signal sent from the operation section 161 requests a device code to be set, in other words, when the user operates the menu button switch 54 and the television-power button switch 72 (FIG. 7)

of the controller 15 at the same time, the processing proceeds to step S8. The control section 162 waits for the operation signal corresponding to the device code to be sent from the operation section 161, receives the operation signal, and sets (overwrites) the device code corresponding to the operation signal, in the device-code storage section 168. Then, the processing returns to step S1, and the same processes are repeated thereafter.

A device code can, for example, be a numeral having a predetermined number of figures. In this case, the user inputs a device code by operating, for example, the numeral button switch 58 (FIG. 7) of the controller 15.

Figure 27:
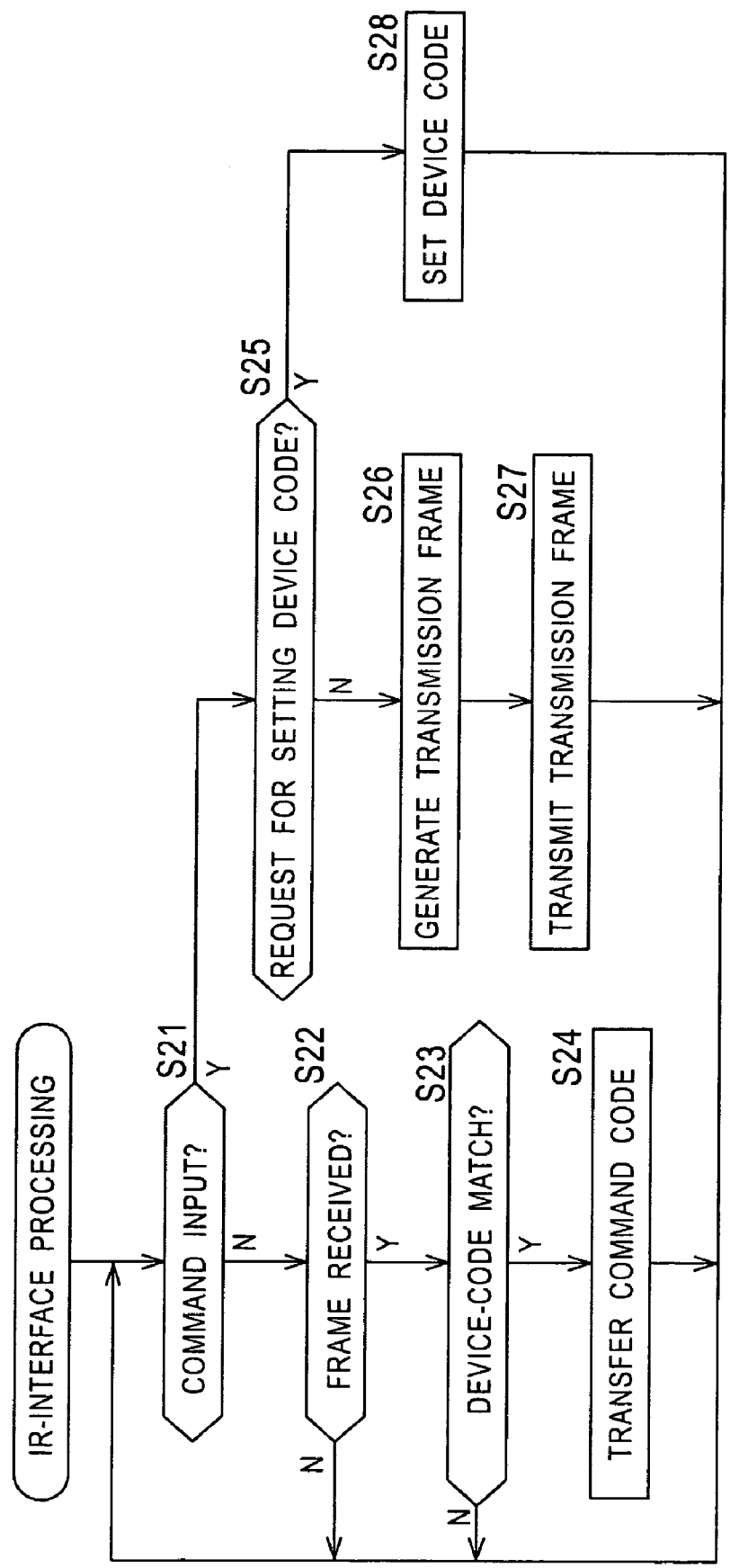
FIG. 27 is a flowchart explaining the processing of the IR interface 135.

Next, the processing (IR-interface processing) of the IR interface 135 of the main unit 1, shown in FIG. 25 will be described by referring to a flowchart shown in FIG. 27. The IR interface (FIG. 11) of the subsidiary unit 2 also performs the same processing.

In step S21, the control section 182 determines whether it has received a command from the CPU 129.

When it is determined in step S21 that a command has not been received, the processing proceeds to step S22, and the control section 182 determines whether it has received frame data from the receiving processing section 187.

When it is determined in step S22 that frame data has not been received, the processing returns to step S21, and the same processes are repeated thereafter.

When it is determined in step S22 that frame data has been received, in other words, when the light receiving section 186 received an infrared ray, for example, sent from the controller 15 and the receiving processing section 187 has sent the frame data corresponding to the infrared ray to the control section 182, the processing proceeds to step S23, and the control section 182 determines whether the device code of the frame data matches the device code stored in the device-code storage section 188.

When it is determined in step S23 that the device code of the frame data does not match the device code stored in the device-code storage section 188, the processing returns to step S21, and the same processes are repeated thereafter.

When it is determined in step S23 that the device code of the frame data matches the device code stored in the device-code storage section 188, the processing proceeds to step S24, and the control section 182 sends the command corresponding to the command code disposed in the frame data to the CPU 129, and the processing returns to step S21.

Therefore, in this case, the CPU 129 performs the process corresponding to the command sent from the IR interface 135 (control section 182).

When it is determined in step S21 that a command has been received from the CPU 129, the processing proceeds to step S25, and the control section 182 determines whether the command requests a device code to be set.

The device-code storage section 188 stores a default device code in the same way as the device-code storage section 168 shown in FIG. 22. The user can change the device code. More specifically, the device code of the IR interface 135 can be specified through a predetermined operation, such as an operation in which the user operates two button switches at the front panel 134 (FIG. 10) at the same time, the two button switches being corresponding to the menu button switch 54 and the television-power button switch 72 (FIG. 7) of the controller 15. In step S25, it is determined whether the command sent from the CPU 129 requests a device code to be set, according to the simultaneous operations of the two button switches.

When it is determined in step S25 that the command sent from the CPU 129 does not request a device code to be set, the control section 182 sends the command code corresponding to the command to the frame generation section 183, and the processing proceeds to step S26.

In step S26, the frame generation section 183 places the command code sent from the control section 182 and the device code stored in the device storage section 188 to generate frame data having the format shown in FIG. 23, and sends the data to the transmission processing section 184. The processing proceeds to step S27.

In step S27, the transmission processing section 184 drives the light emitting section 185 according to the frame data sent from the frame generation section 183, and the processing returns to step S21. The light emitting section 185 emits the infrared ray corresponding to the frame data. The infrared ray is, for example, received by the controller 15.

When it is determined in step S25 that the command sent from the CPU 129 requests a device code to be set, in other words, when the user operates two button switches at the front panel 134 (FIG. 10) at the same time, the two button switches being corresponding to the menu button switch 54 and the television-power button switch 72 (FIG. 7) of the controller 15, the processing proceeds to step S28. The control section 182 waits for a device code to be sent from the CPU 129, receives the device code, and sets (overwrites) the device code in the device-code storage section 188. Then, the processing returns to step S21, and the same processes are repeated thereafter.

In the main unit 1, the user can operate a button switch at the front panel 134 (FIG. 10), corresponding to the numeral button switch 58 of the controller 15 to input a device code.

As described above, the user can set a device code for the controllers 15 and 35, the IR interface 135 of the main unit 1 and the IR interface 155 of the subsidiary unit 2. In addition, among them, a command code can be transferred between only those having the same device code.

Therefore, to control the main unit 1 by the controller 15, for example, the device code of the controller 15 and the device code of the IR interface 135 of the main unit 1 need to be set to the same value. Further, to control the subsidiary unit 2 by the controller 15, for example, the device code of the controller 15 and the device code of the IR interface 155 of the subsidiary unit 2 need to be set to the same value. Furthermore, when the device codes of the controller 15, the IR interface 135 of the main unit 1, and the IR interface 155 of the subsidiary unit 2 are made to be equal, for example, if the user operates the controller 15, the same processing is performed in the main unit 1 and the subsidiary unit 2.

Even when the user has the controller 15 only, for example, if different device codes are set in the main unit 1 and the subsidiary unit $2_{ij}$ which serve as television receivers constituting a scalable TV system, the user can use one controller 15 to independently remote-control the main unit 1 and the subsidiary unit $2_{ij}$ which serve as television receivers constituting the scalable TV system by setting the device code of the controller 15 to the device code of the desired television receiver.

Figure 28:
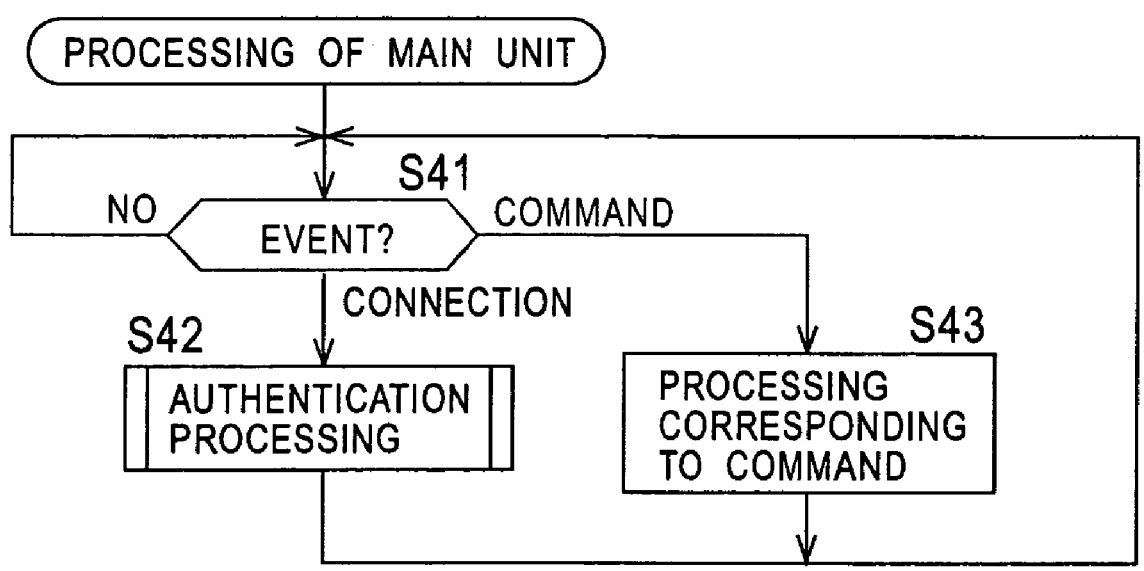
FIG. 28 is a flowchart explaining the processing of the main unit 1.

The processing of the main unit 1 shown in FIG. 10 will be next described by referring to a flowchart shown in FIG. 28.

First, in step S41, the CPU 129 determines whether an event has occurred in which any unit is connected to the terminal panel 21 or in which any command is sent through the IEEE-1394 interface 133, the IR interface 135, or others. When it is determined that no event has occurred, the processing returns to step S41.

When it is determined in step S41 that an event in which a unit is connected to the terminal panel 21 has occurred, the processing proceeds to step S42, and the CPU 129 performs authentication processing shown in FIG. 29, described later. Then, the processing returns to step S41.

To determine whether a unit has been connected to the terminal panel 21, it is necessary to detect a state in which the unit has been connected to the terminal panel 21. This detection is performed, for example, in the following way.

When a unit is connected (through an IEEE-1394 cable) to the IEEE-1394 terminal $21_{ij}$ provided for the terminal panel 21 (FIG. 3F), the terminal voltage of the IEEE-1394 terminal $21_{ij}$ is changed. The IEEE-1394 interface 133 is configured such that it reports the change of the terminal voltage to the CPU 129. The CPU 129 receives the report of the change of the terminal voltage from the IEEE-1394 interface 133 to detect a state in which a new unit has been connected to the terminal panel 21. The CPU 129 also recognizes a state in which a unit has been disconnected from the terminal panel 21 by, for example, the same method.

When it is determined in step S41 that an event has occurred in which any command is sent through the IEEE-1394 interface 133, the IR interface 135, or others, the processing proceeds to step S43, and the main unit 1 perform the processing corresponding to the command. Then, the processing returns to step S41.

Next, the authentication processing performed by the main unit 1 in step S42 shown in FIG. 28 will be described by referring to a flowchart shown in FIG. 29.

In the authentication processing performed by the main unit 1, two types of authentication is performed, whether a unit (hereinafter called, a connected unit, if necessary) newly connected to the terminal panel 21 is an authorized IEEE-1394 unit, and whether the IEEE-1394 unit is a television receiver (scalable-use unit) serving as a main unit or a subsidiary unit.

More specifically, in the authentication processing performed by the main unit 1, at first in step S51, the CPU 129 controls the IEEE-1394 interface 133 to send an authentication request command for requesting mutual authentication, to the connected unit, and the processing proceeds to step S52.

In step S52, the CPU 129 determines whether a response to the authentication request command has been returned from the connected unit. When it is determined in step S52 that a response to the authentication request command has not been returned from the connected unit, the processing proceeds to step S53, and the CPU 129 determines whether time out has occurred, that is, whether a predetermined time has elapsed since the authentication request command was sent.

When it is determined in step S53 that time out has occurred, in other words, that a response to the authentication request command was not returned from the connected unit even when the predetermined time elapsed after the authentication request command had been sent to the connected unit, the processing proceeds to step S54. The CPU 129 determines that the connected unit is not an authorized IEEE-1394 unit and authentication failed, and sets an operation mode to a stand-alone mode in which any data is not transferred with the connected unit. The processing returns.

Therefore, the main unit 1 does not transfer any data thereafter with the connected unit, which is not an authorized IEEE-1394 unit, as well as does not perform IEEE-1394 communications.

When it is determined in step S53 that time out has not yet occurred, the processing returns to step S52, and the same processes are repeated thereafter.

When it is determined in step S52 that a response to the authentication request command has been returned from the connected unit, in other words, that a response from the connected unit was received by the IEEE-1394 interface 133 and sent to the CPU 129, the processing proceeds to step S55, and the CPU 129 generates a random number (pseudo random number) R1 according to a predetermined algorithm and sends it to the connected unit through the IEEE-1394 interface 133.

Then, the processing proceeds to step S56, and the CPU 129 determines whether an encrypted random number E'(R1) obtained by encrypting the random number R1 sent in step S55, according to a predetermined algorithm (a secret-key encryption method such as DES (Data Encryption Standard), FEAL (Fast Data Encipherment Algorithm), or RC5) has been sent from the connected unit.

When it is determined in step S56 that an encrypted random number E'(R1) has not been sent from the connected unit, the processing proceeds to step S57, and the CPU 129 determines whether time out has occurred, that is, whether a predetermined time has elapsed since the random number R1 was sent.

When it is determined in step S57 that time out has occurred, in other words, that an encrypted random number E'(R1) was not returned from the connected unit even when the predetermined time elapsed after the random number R1 had been sent to the connected unit, the processing proceeds to step S54. The CPU 129, as described above, determines that the connected unit is not an authorized IEEE-1394 unit, and sets the operation mode to a stand-alone mode. The processing returns.

When it is determined in step S57 that time out has not yet occurred, the processing returns to step S56, and the same processes are repeated thereafter.

When it is determined in step S56 that an encrypted random number E'(R1) has been returned from the connected unit, in other words, that an encrypted random number E'(R1) from the connected unit was received by the IEEE-1394 interface 133 and sent to the CPU 129, the processing proceeds to step S58, and the CPU 129 encrypts the random number R1 generated in step S55, according to a predetermined encryption algorithm to generate an encrypted random number E(R1). The processing proceeds to step S59.

In step S59, the CPU 129 determines whether the encrypted random number E'(R1) sent from the connected unit is equal to the encrypted random number E(R1) generated by the CPU 129 in step S58.

When it is determined in step S59 that the encrypted random number E'(R1) is not equal to the encrypted random number E(R1), in other words, that the encryption algorithm (including the secret key used for encryption, if necessary) employed by the connected unit is different from the encryption algorithm employed by the CPU 129, the processing proceeds to step S54, and the CPU 129, as described above, determines that the connected unit is not an authorized IEEE-1394 unit, and sets the operation mode to a stand-alone mode. The processing returns.

When it is determined in step S59 that the encrypted random number E'(R1) is equal to the encrypted random number E(R1), in other words, that the encryption algorithm employed by the connected unit is equal to the encryption algorithm employed by the CPU 129, the processing proceeds to step S60, and the CPU 129 determines whether a random number R2 used by the connected unit to authenticate the main unit 1 has been sent from the connected unit.

When it is determined in step S60 that the random number R2 has not been received, the processing proceeds to step S61, and the CPU 129 determines whether time out has occurred, that is, for example, whether a predetermined time has elapsed after it was determined in step S59 that the encrypted random number E'(R1) is equal to the encrypted random number E(R1).

When it is determined in step S61 that time out has occurred, in other words, that the random number R2 was not sent from the connected unit even when the predetermined time elapsed, the processing proceeds to step S54, and the CPU 129, as described above, determines that the connected unit is not an authorized IEEE-1394 unit, and sets the operation mode to a stand-alone mode. The processing returns.

On the other hand, when it is determined in step S61 that time out has not occurred, the processing returns to step S60 and the same processes are repeated thereafter.

When it is determined in step S60 that the random number R2 has been sent from the connected unit, in other words, that the random number R2 from the connected unit was received by the IEEE-1394 interface 133 and sent to the CPU 129, the processing proceeds to step S62, and the CPU 129 encrypts the random number R2 according to a predetermined encryption algorithm to generate an encrypted random number E(R1) and sends it through the IEEE-1394 interface 133 to the connected unit.

When it is determined in step S60 that the random number R2 has been sent from the connected unit, the connected unit is successfully authenticated as an IEEE-1394 unit.

Then, the processing proceeds to step S63, and the CPU 129 controls the IEEE-1394 interface 133 to send a function-information request command for requesting the unit ID and the function information of the connected unit, and also sends the unit ID and the function information of the main unit 1 to the connected unit.

The unit ID is a unique ID identifying the television receiver serving as the main unit 1 or the subsidiary unit 2.

The function information is information related to own functions, and includes, for example, the types of commands to be received from the outside (for example, which of commands for controlling power on and off, volume adjustment, the channel, the luminance, and the sharpness is to be received from the outside), whether on-screen display (OSD display) is allowed, whether a muting state is allowed, and whether a sleep state is allowed. In addition, the function information also includes whether the unit has the functions of the main unit or the functions of a subsidiary unit.

The main unit 1 can store the unit ID and the function information, for example, in the EEPROM 130 or in the vendor_dependent_information field of the configuration ROM shown in FIG. 15.

Then, the processing proceeds to step S64, and the CPU 129 waits for the unit ID and the function information of the connected unit to reach in response to the function-information request command sent to the connected unit in step S63. The CPU 129 receives the unit ID and the function information through the IEEE-1394 interface 133 and stores them in the EEPROM 130, and the processing proceeds to step S65.

In step S65, the CPU 129 refers to the function information stored in the EEPROM 130 to determine whether the connected unit is a subsidiary unit. When it is determined in step S65 that the connected unit is a subsidiary unit, in other words, that the connected unit is successfully authenticated as a subsidiary unit, the processing skips steps S66 and S67 and proceeds to step S68. The CPU 129 sets the operation mode to a multiple-viewpoint-display possible mode in which a virtual multiple-viewpoint-display function, described later, is provided together with the connected unit serving as a subsidiary unit. The processing returns.

On the other hand, when it is determined in step S65 that the connected unit is not a subsidiary unit, the processing proceeds to step S66, and the CPU 129 refers to the function information stored in the EEPROM 130 to determine whether the connected unit is a main unit. When it is determined in step S66 that the connected unit is a main unit, in other words, that the connected unit is successfully authenticated as a main unit, the processing proceeds to step S67, and the CPU 129 performs a main-unit-and-subsidiary-unit adjustment process with the connected unit serving as a main unit.

Specifically, in this case, since the main unit 1 is connected to another main unit, there are two television receivers serving as main units among the television receivers constituting the scalable TV system. In the present embodiment, it is required that there be only one main unit in the scalable TV system. Therefore, in step S67, the main-unit-and-subsidiary-unit adjustment process is performed in which whether the main unit 1 or the connected unit serving as a main unit functions as a television receiver serving as the main unit is determined.

More specifically, it is determined, for example, whichever main unit becomes earlier a part of the scalable TV system, that is, the main unit 1 in the present embodiment, functions as a television receiver serving as the main unit. The other main unit, which is not the main unit 1, that is determined to function as the main unit, functions as a subsidiary unit.

After the main-unit-and-subsidiary-unit adjustment process is performed in step S67, the processing proceeds to step S68, and the CPU 129, as described above, sets the operation mode to the multiple-viewpoint-display possible mode, and the processing returns.

When it is determined in step S66 that the connected unit is not a main unit, in other words, that the connected unit is neither a main unit nor a subsidiary unit, therefore, that the connected unit failed to be authenticated as a main unit or a subsidiary unit, the processing proceeds to step S69, and the CPU 129 sets the operation mode to a usual-function-command receiving/providing mode in which the existing AV/C command set can be transferred with the connected unit but control commands for providing the multiple-viewpoint-display function cannot be transferred, and the processing returns.

In other words, in this case, since the connected unit is neither a main unit nor a subsidiary unit, even if such a connected unit is connected to the main unit 1., the multiple-viewpoint-display function is not provided. In this case, however, since the connected unit is an authorized IEEE-1394 unit, the existing AV/C command set is allowed to be transferred between the main unit 1 and the connected unit. Therefore, in this case, between the main unit 1 and the connected unit, one (or another IEEE-1394 unit connected to the main unit 1) can control the other by the existing AV/C command set.

Figure 30:
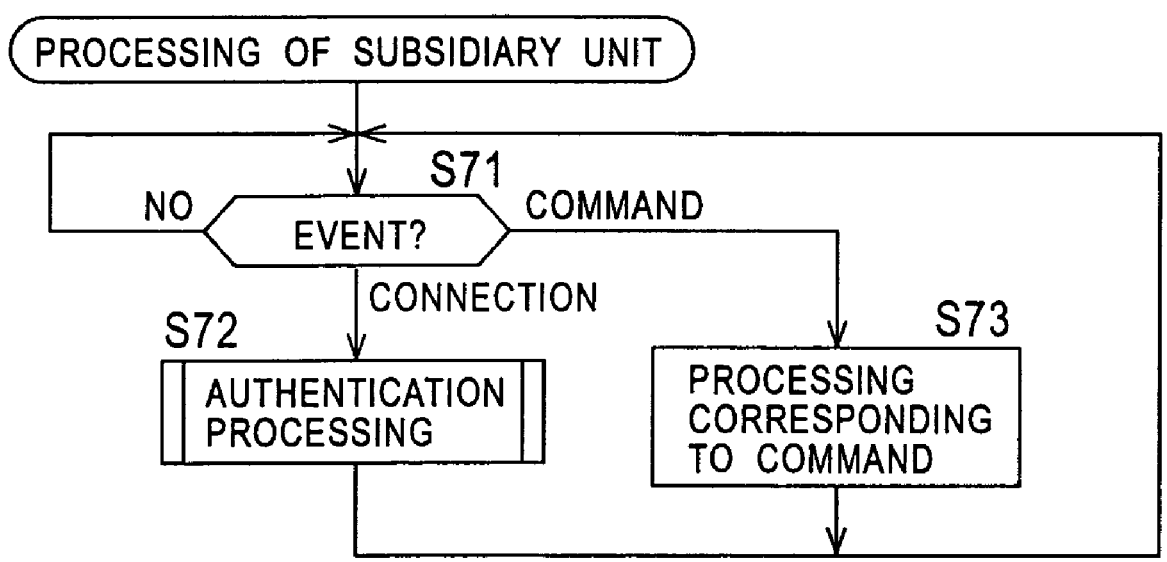
FIG. 30 is a flowchart explaining the processing of the subsidiary unit 2.

The processing of the subsidiary unit 2 shown in FIG. 11 will be next described by referring to a flowchart shown in FIG. 30.

First, in step S71, the CPU 149 determines whether an event has occurred in which any unit is connected to the terminal panel 41 or in which any command is sent through the IEEE-1394 interface 153 or the IR interface 155. When it is determined that no event has occurred, the processing returns to step S71.

When it is determined in step S71 that an event in which a unit is connected to the terminal panel 41 has occurred, the processing proceeds to step S72, and the CPU 149 performs authentication processing shown in FIG. 31, described later. Then, the processing returns to step S71.

To determine whether a unit has been connected to the terminal panel 41, it is necessary to detect a state in which the unit has been connected to the terminal panel 41. This detection is performed, for example, in the same way as that described in step S41 shown in FIG. 28.

When it is determined in step S71 that an event has occurred in which any command is sent through the IEEE-1394 interface 153 or the IR interface 155, the processing proceeds to step S73, and the subsidiary unit 2 perform the processing corresponding to the command. Then, the processing returns to step S71.

Next, the authentication processing performed by the subsidiary unit 2 in step S72 shown in FIG. 30 will be described by referring to a flowchart shown in FIG. 31.

In the authentication processing performed by the subsidiary unit 2, two types of authentication is performed, whether a unit (hereinafter called, a connected unit, if necessary) newly connected to the terminal panel 41 is an authorized IEEE-1394 unit, and whether the IEEE-1394 unit is the main unit.

More specifically, in the authentication processing performed by the subsidiary unit 2, at first in step S81, the CPU 149 determines whether an authentication request command for requesting mutual authentication has been sent from the connected unit. When it is determined that the command has not been sent, the processing proceeds to step S82.

In step S82, the CPU 149 determines whether time out has occurred, that is, whether a predetermined time has elapsed since the authentication processing was started.

When it is determined in step S82 that time out has occurred, in other words, that an authentication request command was not sent from the connected unit even when the predetermined time elapsed after the authentication request command had been started, the processing proceeds to step S83. The CPU 149 determines that the connected unit is not an authorized IEEE-1394 unit and authentication failed, and sets an operation mode to a stand-alone mode in which any data is not transferred with the connected unit. The processing returns.

Therefore, the subsidiary unit 2 does not transfer any data with the connected unit, which is not an authorized IEEE-1394 unit, as well as does not perform IEEE-1394 communications, in the same way as the main unit 1.

When it is determined in step S82 that time out has not yet occurred, the processing returns to step S81, and the same processes are repeated thereafter.

Figure 29:
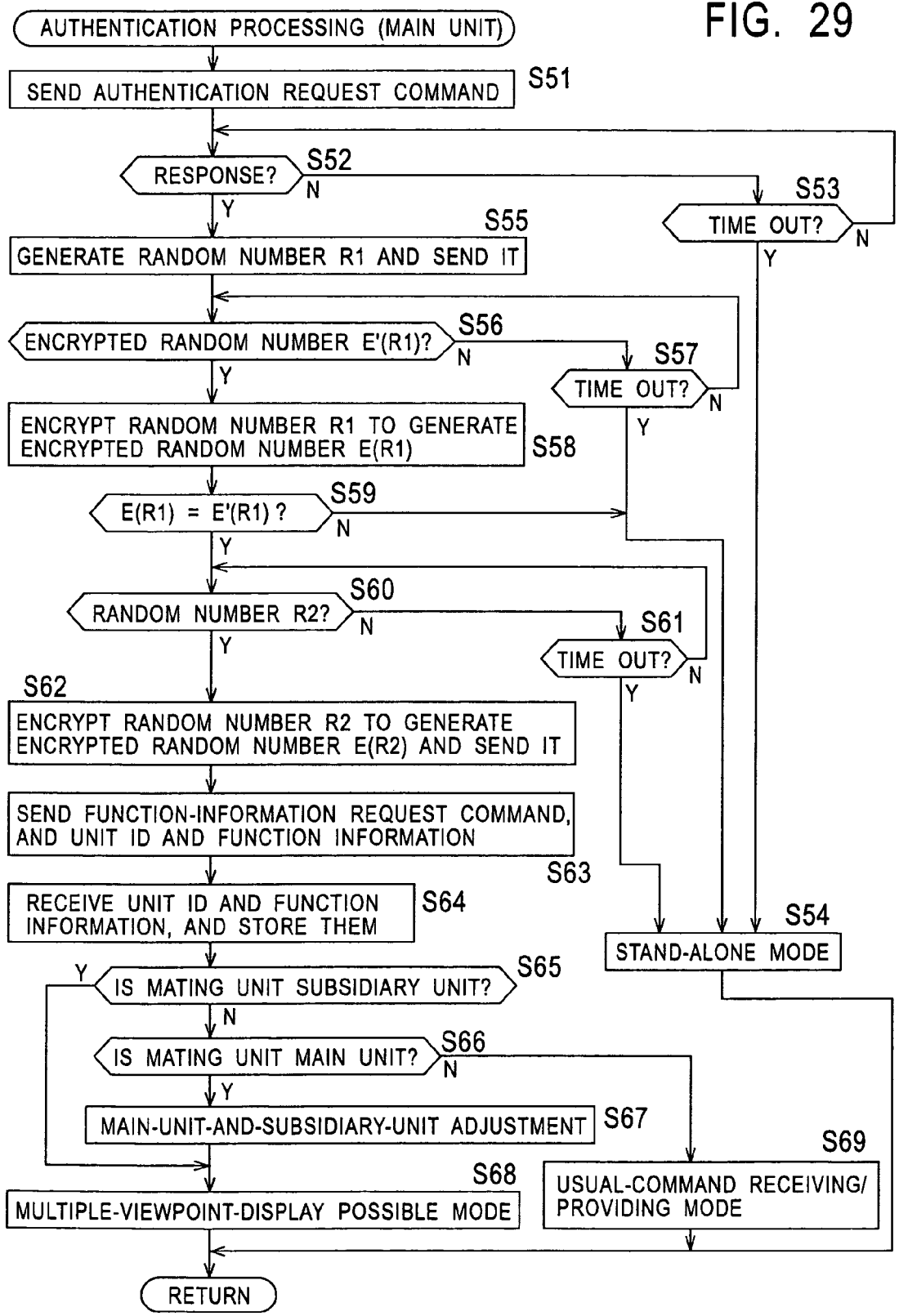
FIG. 29 is a flowchart explaining the authentication processing of the main unit 1.

When it is determined in step S81 that an authentication request command has been sent from the connected unit, in other words, that an authentication command sent from the main unit 1 serving as the connected unit, in step S51 shown in FIG. 29, was received by the IEEE-1394 interface 153 and sent to the CPU 149, the processing proceeds to step S84, and the CPU 149 controls the IEEE-1394 interface 153 to send a response to the authentication request command to the connected unit.

Figure 31:
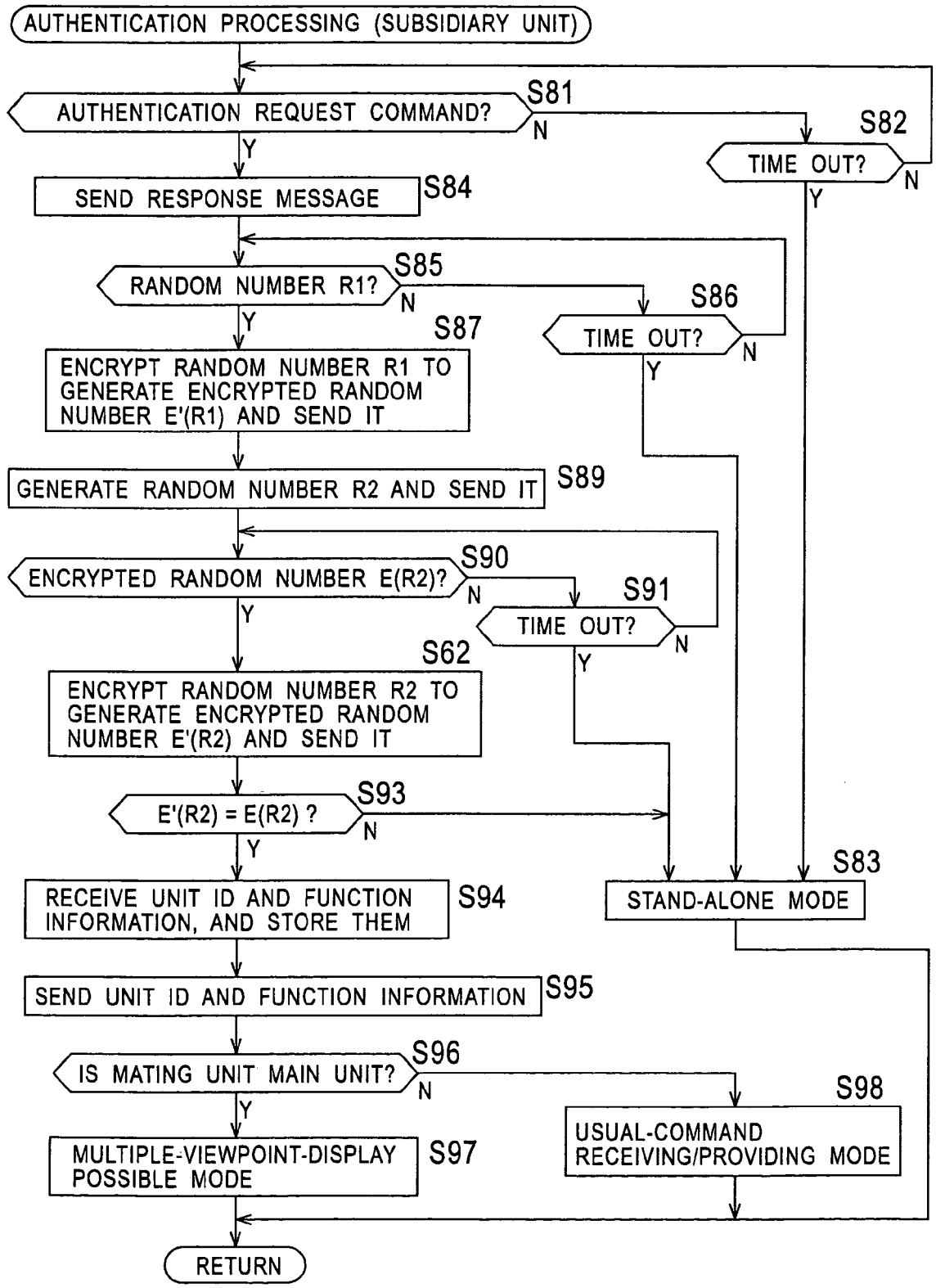
FIG. 31 is a flowchart explaining the authentication processing of the subsidiary unit 2.

In the present embodiment, the main unit 1 performs the processes of steps S51 to S53 shown in FIG. 29, and the subsidiary unit 2 performs the processes of steps S81, S82, and S84 shown in FIG. 31. It is also possible that the subsidiary unit 2 performs the processes of steps S51 to S53 shown in FIG. 29, and the main unit 1 performs the processes of steps S81, S82, and S84 shown in FIG. 31. In other words, either the main unit 1 or the subsidiary unit 2 may sends the authentication request command.

Then, the processing proceeds to step S85, and the CPU 149 determines whether a random number R1 has been sent from the connected unit. When it is determined that the random number R1 has not been sent, the processing proceeds to step S86.

In step S86, the CPU 149 determines whether time out has occurred, that is, whether a predetermined time has elapsed since the CPU 149 sent the response to the authentication request command in step S84.

When it is determined in step S86 that time out has occurred, in other words, that the random number R1 was not sent from the connected unit even when the predetermined time elapsed after the CPU 149 had sent the response to the authentication command, the processing proceeds to step S83. The CPU 149, as described above, determines that the connected unit is not an authorized IEEE-1394 unit, and sets the operation mode to a stand-alone mode in which any data is not transferred with the connected unit. The processing returns.

When it is determined in step S86 that time out has not yet occurred, the processing returns to step S85, and the same processes are repeated thereafter.

When it is determined in step S85 that the random number R1 has been sent from the connected unit, in other words, that the random number R1 sent from the main unit 1 serving as the connected unit in step S55 shown in FIG. 29 was received by the IEEE-1394 interface 153 and sent to the CPU 149, the processing proceeds to step S87, and the CPU 149 encrypts the random number R1 according to a predetermined encryption algorithm to generate an encrypted random number E'(R1). In addition, in step S87, the CPU 149 controls the IEEE-1394 interface 153 to send the encrypted random number E'(R1) to the connected unit. The processing proceeds to step S89.

In step S89, the CPU 149 generates a random number (pseudo random number) R2, and controls the IEEE-1394 interface 153 to send the random number R2 to the connected unit. The processing proceeds to step S90.

In step S90, the CPU 149 determines whether the encrypted random number E(R2) generated by the main unit 1 serving as the connected unit in step S62 shown in FIG. 29 by encrypting the random number R2 has been sent from the connected unit.

When it is determined in step S90 that the encrypted random number E(R2) has not been received, the processing proceeds to step S91, and the CPU 149 determines whether time out has occurred, that is, whether a predetermined time has elapsed after the CPU 149 sent the random number R2.

When it is determined in step S91 that time out has occurred, in other words, that the encrypted random number E(R2) was not sent from the connected unit even when the predetermined time elapsed after the CPU had sent the random number R2 to the connected unit, the processing proceeds to step S83, and the CPU 149, as described above, determines that the connected unit is not an authorized IEEE-1394 unit, and sets the operation mode to a stand-alone mode. The processing returns.

On the other hand, when it is determined in step S91 that time out has not occurred, the processing returns to step S90 and the same processes are repeated thereafter.

When it is determined in step S90 that the encrypted random number E(R2) has been sent from the connected unit, in other words, that the encrypted random number E(R2) from the connected unit was received by the IEEE-1394 interface 153 and sent to the CPU 149, the processing proceeds to step S92, and the CPU 149 encrypts the random number R2 generated in step S89, according to a predetermined encryption algorithm to generate an encrypted random number E'(R2). The processing proceeds to step S93.

In step S93, the CPU 149 determines whether the encrypted random number E(R2) sent from the connected unit is equal to the encrypted random number E'(R2) generated by the subsidiary unit 2 in step S92.

When it is determined in step S93 that the encrypted random number E(R2) is not equal to the encrypted random number E'(R2), in other words, that the encryption algorithm (including the secret key used for encryption, if necessary) employed by the connected unit is different from the encryption algorithm employed by the CPU 149, the processing proceeds to step S83, and the CPU 149, as described above, determines that the connected unit is not an authorized IEEE-1394 unit, and sets the operation mode to a stand-alone mode. The processing returns.

When it is determined in step S93 that the encrypted random number E(R2) is equal to the encrypted random number E'(R2), in other words, that the encryption algorithm employed by the connected unit is equal to the encryption algorithm employed by the CPU 149, and thereby the connected unit is successfully authenticated as an authorized IEEE-1394 unit, the processing proceeds to step S94, and the CPU 149 receives through the IEEE-1394 interface 153 the unit ID and the function information sent together with the function-information request command by the main unit 1 serving as the connected unit in step S63 shown in FIG. 29, and stores them in the EEPROM 150.

Then, the processing proceeds to step S95, and the CPU 149 controls the IEEE-1394 interface 153 to send the unit ID and the function information of the subsidiary unit 2 to the connected unit, in response to the function-information request command received from the connected unit in step S94. Then, the processing proceeds to step S96.

The subsidiary unit 2 can store the unit ID and the function information in the EEPROM 150 or in the vendor_dependent_information field of the configuration ROM shown in FIG. 15, in the same way as the main unit 1 described by referring to FIG. 29.

In step S96, the CPU 149 refers to the function information stored in the EEPROM 150 to determine whether the connected unit is a main unit. When it is determined in step S96 that the connected unit is a main unit, in other words, that the connected unit is successfully authenticated as a main unit, the processing proceeds to step S97, and the CPU 149 sets the operation mode to a multiple-viewpoint-display possible mode in which a virtual multiple-viewpoint-display function can be provided together with the connected unit serving as a main unit. The processing returns.

On the other hand, when it is determined in step S96 that the connected unit is not a main unit, in other words, that the connected unit failed to be authenticated as a main unit, the processing proceeds to step S98, and the CPU 149 sets the operation mode to a usual-function-command receiving/providing mode in which the existing AV/C command set can be transferred with the connected unit but control commands for providing the multiple-viewpoint-display function cannot be transferred, and the processing returns.

In other words, in this case, since the connected unit is not a main unit, even if such a connected unit is connected to the subsidiary unit 2, the multiple-viewpoint-display function is not provided. Therefore, the multiple-viewpoint-display function is not provided just by connecting another subsidiary unit to the subsidiary unit 2. In this case, however, since the connected unit is an authorized IEEE-1394 unit, the existing AV/C command set is allowed to be transferred between the subsidiary unit 2 and the connected unit. Therefore, in this case, between the subsidiary unit 2 and the connected unit (including other subsidiary units), one can control the other by the existing AV/C command set.

Next, after the main unit 1 and the subsidiary unit 1 successfully finish the authentication processing described by referring to FIG. 29 and FIG. 31, respectively, and the main unit 1 and the subsidiary unit 2 set their operation mode to the multiple-viewpoint-display possible mode, when the user operates the controller 15 (or the controller 35) to request multiple-viewpoint display, the main unit 1 and the subsidiary unit 2 perform virtual multiple-viewpoint-display processing, described later.

An instruction to perform the virtual multiple-viewpoint-display processing can, for example, be issued from the menu screen.

More specifically, as described above, when the user operates the menu button switch 54 on the controller 15 (FIG. 7) (or the menu button switch 84 on the controller 35 (FIG. 8)), the menu screen is displayed on the CRT 11 of the main unit 1 (or the CRT 31 of the subsidiary unit 2). On this menu screen, an icon (hereinafter called a virtual-multiple-viewpoint-display icon, if necessary) indicating the virtual-multiple-viewpoint-display processing, for example, is displayed. When the user operates the controller 15 to click on the virtual-multiple-viewpoint-display icon, the virtual-multiple-viewpoint-display processing is performed in the main unit 1 and the subsidiary unit 2.

Figure 32:
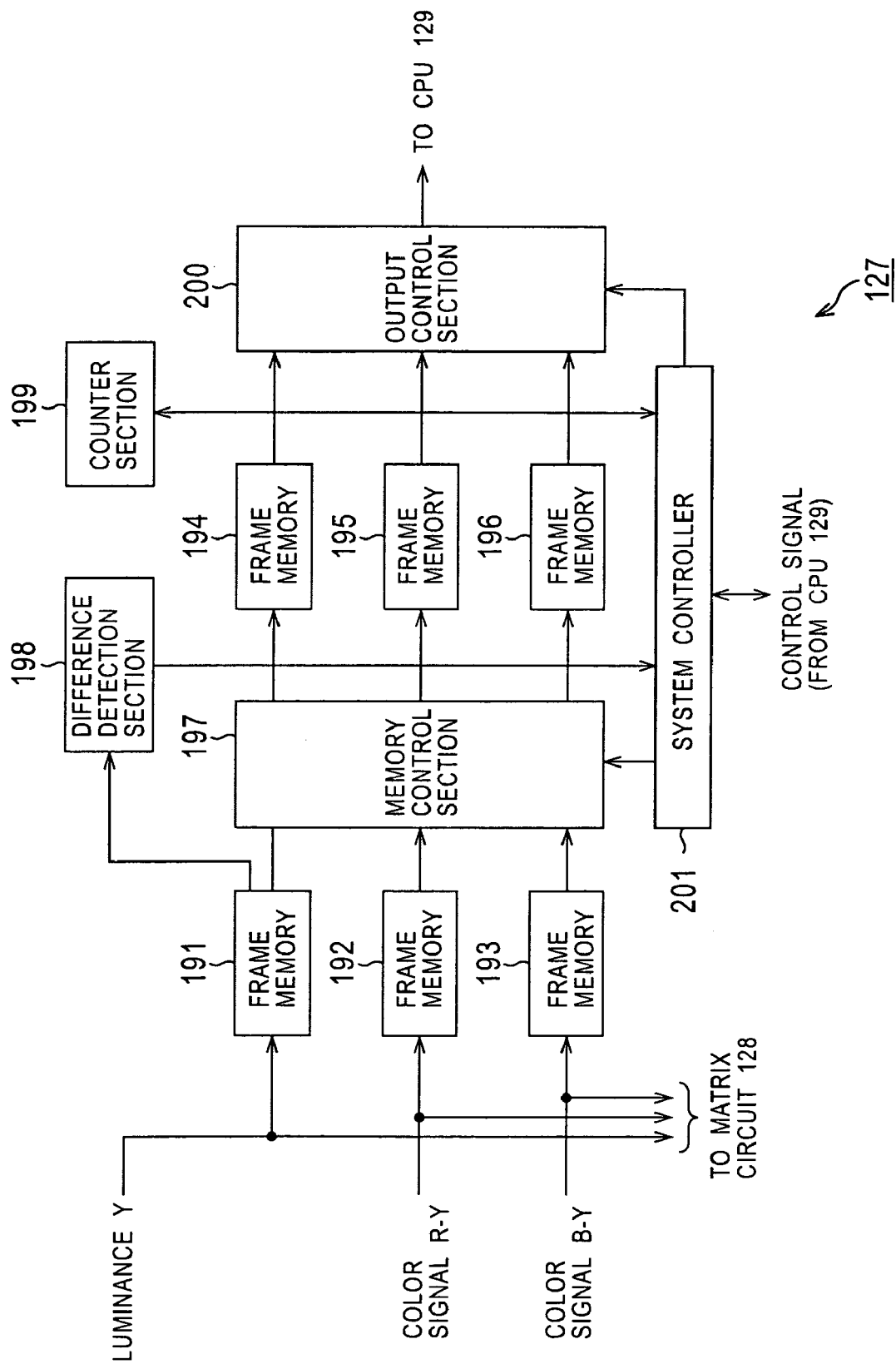
FIG. 32 is a block diagram showing a first example structure of a signal processing section 127.

FIG. 32 shows a first example functional structure of the signal processing section 127 (FIG. 10) in the main unit 1, which performs virtual-multiple-viewpoint-display processing. When clicking is performed on the virtual-multiple-viewpoint-display icon, the CPU 129 of the main unit 1 controls the signal processing section 127 to make the DSP 127A execute a predetermined program stored in the EEPROM 127B. The functional structure shown in FIG. 32 is implemented when the DSP 127A executes the program stored in the EEPROM 127B. The other functional structures of the signal processing section 127, described later, are also implemented in the same way.

Frame memories 191, 192, and 193 temporarily store a luminance signal Y and color signals R-Y and B-Y serving as image data output from the MPEG video decoder 125 (FIG. 10) in units of frames (or in units of fields). Specifically, the MPEG decoder 125 MPEG-decodes the image-data TS packets of a program of the predetermined channel, output from the demultiplexer 124, and outputs image data formed of the luminance signal Y and the color signals R-Y and B-Y as a decoding result. The frame memories 191, 192, and 193 store the luminance signal Y and the color signals R-Y and B-Y output from the MPEG video decoder 125 in this way.

In the embodiment shown in FIG. 32, the frame memories 191 to 193 have a storage capacity which allows at least two-frame (or two-field) image data to be stored. Specifically, the frame memories 191 to 193 have two banks each of which can store one-frame image data, and store image data in the two banks alternately.

Therefore, when the latest frame stored in the frame memory 191 is called a current frame, the frame memory 191 always stores the image data of the current frame and the frame (hereinafter called a preceding frame, if necessary) one frame before the current frame. The frame memories 192 and 193 store image data in the same way.

Frame memories 194, 195, and 196 store the luminance signal Y and the color signals R-Y and B-Y of one-frame (or one-field) image data stored in the frame memories 191, 192, and 193 and sent from a memory control section 197, respectively.

The memory control section 197 is controlled by a system controller 201 and sends the image data (luminance signal Y and color signals R-Y and B-Y) of the current frame stored in the frame memories 191 to 193 to the frame memories 194 to 196, respectively, and stores the data in an over-writing manner.

A difference detection section 198 obtains the difference between the luminance signals Y of the image data in the current frame and the preceding frame stored in the frame memory 191, as a feature of the image data in the current frame, and sends the difference to the system controller 201. Specifically, for example, the difference detection section 198 obtains the sum of the absolute values of the differences between the luminance signals Y of the pixels in the current frame and the luminance signals of the pixels in the preceding frame, as a feature of the image data in the current frame, and sends the sum to the system controller 201.

A counter section 199 performs counting for a predetermined value and sends the count to the system controller 201 under the control of the system controller 201. The counter section 199 also resets its count according to the control of the system controller 201.

An output control section 200 reads the luminance signal Y and the color signals R-Y and B-Y of one-frame image data stored in the frame memories 194 to 196 and sends them to the CPU 129 under the control of the system controller 201.

The system controller 201 controls the memory control section 197, the counter section 199, and the output control section 200.

More specifically, the system controller 201 compares a predetermined threshold with the sum of the absolute values of the differences, serving as a feature of the image data in the current frame and sent from the difference detection section 198, and controls the counter section 199 according to the comparison result. The system controller 201 also controls the memory control section 197 and the output control section 200 according to the count of the counter section 199.

Here, the system controller 201 controls the counter section 199 according to the sum of the absolute values of the differences of the luminance signals Y. It is also possible, for example, that the difference detection section 198 obtains the sum of the absolute values of the differences of the color signals R-Y or B-Y and the system controller 201 controls the counter section 199 with the sum of the absolute values of the differences of the color signals R-Y or B-Y also being taken into account.

The luminance signal Y and the color signals R-Y and B-Y serving as image data output from the MPEG video decoder 125 (FIG. 10) are sent to the frame memories 191 to 193, and also to the matrix circuit 128 located after the signal processing section 127. The matrix circuit 128 converts the luminance signal Y and the color signals R-Y and B-Y sent in this way to RGB image data.

FIG. 32 does not show audio data output from the MPEG audio decoder 126 (FIG. 10) in the main unit 1. The audio data output from the MPEG audio decoder 126 is, for example, sent to the amplifier 137 at a subsequent stage as is.

Next, the virtual-multiple-viewpoint-display processing in the main unit, performed by the signal processing section 127 shown in FIG. 32 will be described by referring to a flowchart shown in FIG. 33.

First, in step S101, the frame memories 191 to 193 wait for a luminance signal Y and color signals R-Y and B-Y serving as one-frame image data to reach from the MPEG video decoder 125 (FIG. 10) and store the luminance signal Y and the color signals R-Y and B-Y. The processing proceeds to step S102.

In step S102, the difference detection section 198 detects (obtains) the sum (hereinafter called the sum of the absolute values of the differences for the current frame, if necessary) of the absolute values of the differences between the luminance signals Y of the image data stored in the frame memory 191 in step S101 performed immediately before, that is, the luminance signals Y of the image data in the current frame, and the luminance signals Y of the image data stored in the frame memory 191 in step S101 performed in the preceding operation, that is, the luminance signals Y of the image data in the preceding frame, as a feature of the current-frame image data, and sends the sum to the system controller 201. The processing proceeds to step S103.

In step S103, the system controller 201 determines whether the sum of the absolute values of the differences for the current frame is almost zero, that is, whether the sum is equal to or less than (or less than) a small positive threshold.

When it is determined in step S103 that the sum of the absolute values of the differences for the current frame is not zero or a value close to zero, the processing skips steps S104 to S108, and proceeds to step S109.

When it is determined in step S103 that the sum of the absolute values of the differences for the current frame is zero or a value close to zero, in other words, that the current-frame image is hardly (or not) changed from the preceding-frame image and therefore, the current-frame image can be deemed as a still picture, the processing proceeds to step S104, and the system controller 201 controls the counter section 199 to increment the count by one. The processing proceeds to step S105.

In step S105, the system controller 201 refers to the count of the counter section 199 to determine whether the count is larger than (or equal to or larger than) a predetermined threshold $Th_c$ (such as five).

When it is determined in step S105 that the count of the counter section 199 is not larger than the threshold $Th_c$, the processing skips steps S106 to S108 and proceeds to step S109.

When it is determined in step S105 that the count of the counter section 199 is larger than the threshold The, in other words, that the image data of a predetermined number of frames output from the MPEG video decoder 125 does not include any motion, the processing proceeds to step S106, and the system controller 201 controls the memory control section 197 to send the image data (luminance signal Y and color signals R-Y and B-Y) in the current frame stored in the frame memories 191 to 193 to the frame memories 194 to 196 and stores the data therein in an over-writing manner. The processing proceeds to step S107.

In step S107, the system controller 201 resets the count of the counter section 199. The processing proceeds to step S108. In step S108, the system controller 201 controls the output control section 200 to read the luminance signal Y and the color signals R-Y and B-Y of the one-frame image data stored in the frame memories 194 to 196, and send the signals to the CPU 129. In addition, in step S108, the system controller 201 sends a display request command for instructing the image data to be displayed at a predetermined subsidiary unit $2_{ij}$, to the CPU 129. The processing proceeds to step S109.

When the CPU 129 receives the display request command from the system controller 201, the CPU 129 controls the IEEE-1394 interface 133 to send the one-frame image data (luminance signal Y and color signals R-Y and B-Y) sent from the output control section 200, to the subsidiary unit 2 together with the display request command for instructing the image data to be displayed. When the subsidiary unit 2 which is executing the virtual-multiple-viewpoint-display processing receives the image data together with the display request command from the main unit 1, the subsidiary unit displays the image data, as described later.

Therefore, for example, when the above-described threshold $Th_c$ is five, if image data in consecutive six frames is almost the same, the sixth-frame image data is sent from the main unit 1 to the subsidiary unit $2_{ij}$ and displayed.

In step S109, it is determined whether the system controller 201 has received a termination command for instructing the virtual-multiple-viewpoint-display processing to be terminated, from the CPU 129.

When it is determined in step S109 that a termination command has not been received, the processing returns to step S101 and the same processes are repeated thereafter.

When it is determined in step S109 that a termination command has been received, in other words, for example, when the user operates the controller 15 (FIG. 7) to display the menu screen on the CRT 11 and further clicks again on the virtual-multiple-viewpoint-display icon in the menu screen to thereby instruct the CPU 129 to terminate the virtual-multiple-viewpoint-display processing and the CPU 129 sends a termination command to the system controller 201, the virtual-multiple-viewpoint-display processing is terminated in the main unit.

Figure 34:
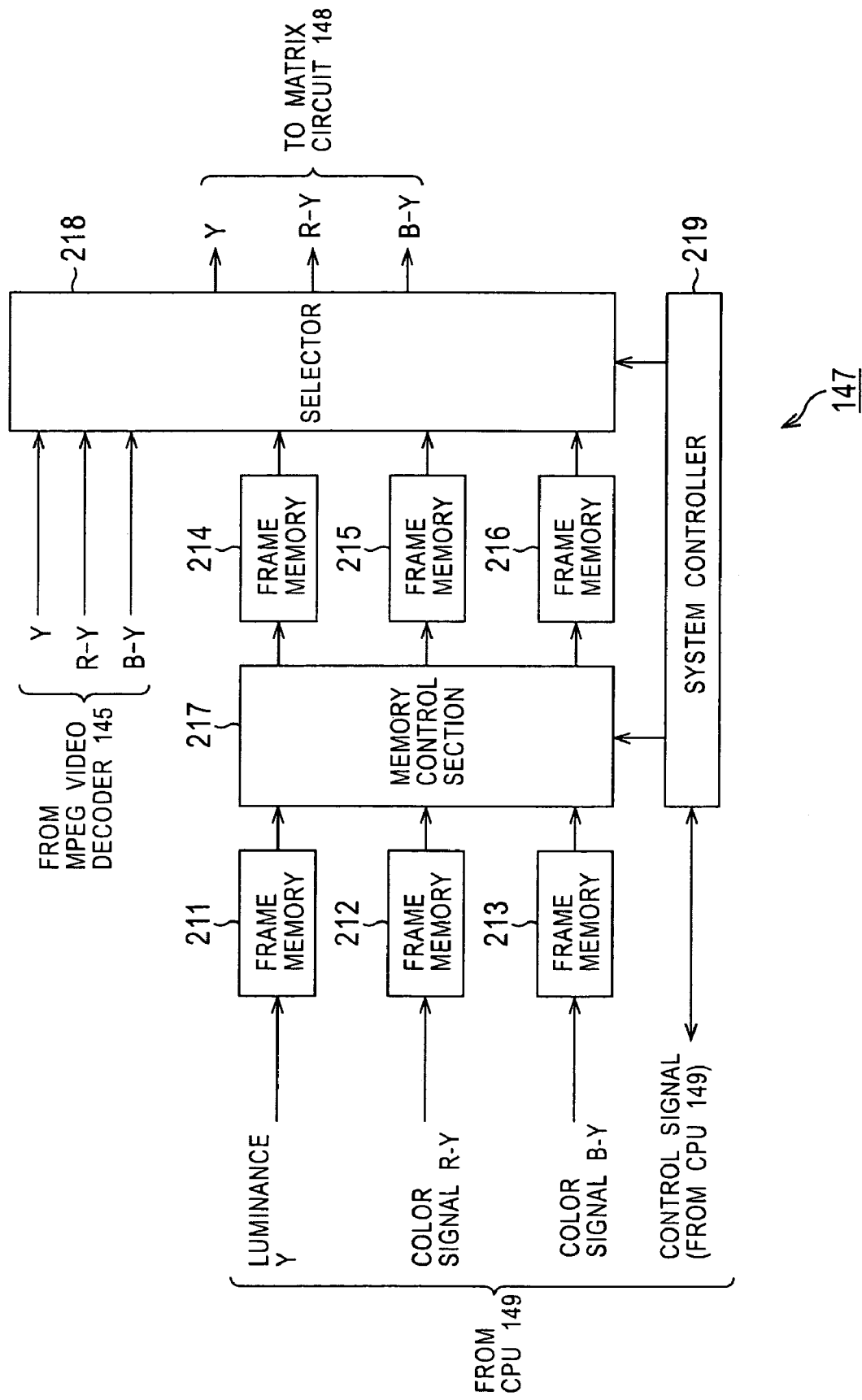
FIG. 34 is a block diagram showing a first example structure of a signal processing section 147.

FIG. 34 shows an example functional structure of the signal processing section 147 (FIG. 11) in the subsidiary unit $2_{ij}$ which performs the virtual-multiple-viewpoint-display processing. When clicking is performed on the virtual-multiple-viewpoint-display icon, the CPU 129 of the main unit 1 controls, as described above, the IEEE-1394 interface 133 (FIG. 10) to send a start command for instructing the subsidiary unit to perform the virtual-multiple-viewpoint-display processing to each subsidiary unit $2_{ij}$. In the subsidiary unit $2_{ij}$, when the CPU 149 (FIG. 11) receives the start command through the IEEE-1394 interface 153, the CPU 149 makes the DSP 147A of the signal processing section 147 execute a predetermined program stored in the EEPROM 147B. The functional structure shown in FIG. 34 is implemented when the DSP 147A executes the program stored in the EEPROM 147B. The other functional structures of the signal processing section 147, described later, are also implemented in the same way.

Frame memories 211, 212, and 213 temporarily store the luminance signal Y and color signals R-Y and B-Y of one-frame (or one-field) image data sent from the CPU 149.

Figure 33:
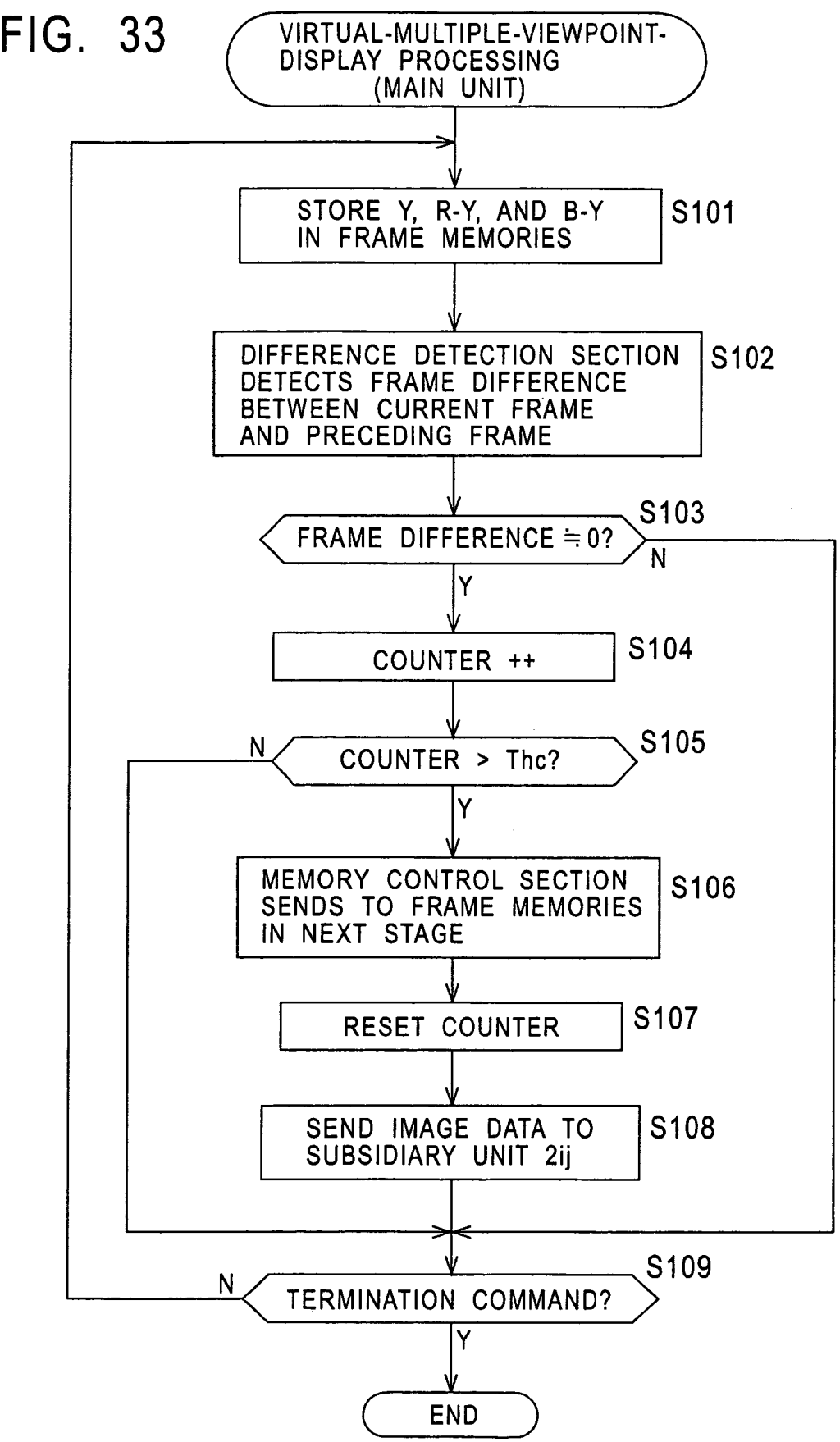
FIG. 33 is a flowchart explaining first virtual-multiple-viewpoint-display processing of the main unit, performed by the signal processing unit 127.

More specifically, according to the virtual-multiple-viewpoint-display processing of the main unit, described by referring to FIG. 33, when the CPU 129 receives the display request command from the system controller 201, the CPU 129 controls the IEEE-1394 interface 133 to send the one-frame image data (luminance signal Y and color signals R-Y and B-Y) sent from the output control section 200, to the subsidiary unit $2_{ij}$ together with the display request command. In the subsidiary unit $2_{ij}$, the CPU 149 receives the display request command and the one-frame image data through the IEEE-1394 interface 153 (FIG. 11). The CPU 149 sends the display request command to a system controller 219, described later, and also sends the luminance signal Y and the color signals R-Y and B-Y of the one-frame image data to the frame memories 211, 212, and 213. The frame memories 211, 212, and 213 temporarily store the luminance signal Y and the color signals R-Y and B-Y of the one-frame image data sent from the CPU 149 in this way.

Frame memories 214, 215, and 216 store the luminance signal Y and the color signals R-Y and B-Y of one-frame (or one-field) image data stored in the frame memories 211, 212, and 213 and sent from a memory control section 217, respectively.

The memory control section 217 is controlled by the system controller 219 and sends the one-frame image data (luminance signal Y and color signals R-Y and B-Y) stored in the frame memories 211 to 213 to the frame memories 214 to 216, respectively, and stores the data in an over-writing manner.

A selector 218 selects the luminance signal Y and the color signals R-Y and B-Y of the one-frame image data stored in the frame memories 214 to 216, or the luminance signal Y and the color signals R-Y and B-Y of image data output from the MPEG video decoder 145 (FIG. 11) of the subsidiary unit $2_{ij}$, and sends them to the matrix circuit 148 (FIG. 11) in a subsequent stage, under the control of the system controller 219.

Therefore, when the selector 218 selects the image data output from the MPEG video decoder 145 (FIG. 11), the image data of a program in the channel selected by the tuner 141 (FIG. 11) is displayed on the CRT 31 of the subsidiary unit $2_{ij}$, and when the selector 218 selects the image data stored in the frame memories 214 to 216, the image data, that is, the image data sent from the main unit 1 as described above, is displayed on the CRT 31 of the subsidiary unit $2_{ij}$.

The system controller 219 controls the memory control section 217 and the selector 218 under the control of the CPU 149.

Like FIG. 32, FIG. 34 does not show audio data output from the MPEG audio decoder 146 (FIG. 11) in the subsidiary unit $2_{ij}$. The audio data output from the MPEG audio decoder 146 is, for example, sent to the amplifier 157 in a subsequent stage as is.

Next, the virtual-multiple-viewpoint-display processing in a subsidiary unit, performed by the signal processing section 147 shown in FIG. 34 will be described by referring to a flowchart shown in FIG. 35.

First, in step S121, the system controller 219 controls the selector 218 to select the luminance signal Y and the color signals R-Y and B-Y of the one-frame image data stored in the frame memories 214 to 216, and starts displaying the data. More specifically, thereby, the selector 218 repeatedly reads the luminance signal Y and the color signals R-Y and B-Y of the one-frame image data stored in the frame memories 214 to 216 and sends them to the matrix circuit 148 (FIG. 11) in a subsequent stage. With this, the image data sent from the main unit 1 in the way described by referring to FIG. 33 is displayed on the CRT 32 of the subsidiary unit $2_{ij}$.

When the virtual-multiple-viewpoint-display processing is not being performed in the subsidiary unit 2, the selector 218 selects the image data output from the MPEG video decoder 145 (FIG. 11) and outputs it to the matrix circuit 148 in a subsequent stage. Therefore, in this case, the image data of a program in the channel selected by the tuner 141 is displayed on the CRT 31 of the subsidiary unit 2.

Then, the processing proceeds to step S122, and the system controller 219 determines whether the CPU has sent one-frame image data together with a display request command.

When it is determined in step S122 that neither display request command nor image data has been received, the processing skips steps S123 and S124 and returns to step S125, and the same processes are repeated thereafter.

When it is determined in step S122 that a display request command and image data have been received, in other words, that the main unit 1 has sent a display request command and image data to the subsidiary unit $2_{ij}$ by the virtual-multiple-viewpoint-display processing of the main unit, described by referring to FIG. 33, the processing proceeds to step S123, and the frame memories 211 to 213 store the luminance signal Y and the color signals R-Y and B-Y of the image data, respectively. The processing proceeds to step S124.

In step S124, the system controller 219 controls the memory control section 217 to wait for the one-frame image data to be read from the frame memories 214 to 216 by the selector 218; sends the luminance signal Y and the color signals R-Y and B-Y of the image data stored in the frame memories 211 to 213 in step S123 performed immediately before to the frame memories 214 to 216, respectively; and stores them in an over-writing manner. The processing proceeds to step S125.

With this, from the next-frame display timing, the selector 218 reads the image data newly stored in the frame memories 214 to 216. The image data is sent to the CRT 31 through the matrix circuit 148 in a subsequent stage, and displayed.

In step S125, the system controller 219 determines whether a termination command has been sent from the CPU 149 (FIG. 11).

More specifically, as described by referring to FIG. 33, when the termination of the virtual-multiple-viewpoint-display processing is instructed, the CPU 129 (FIG. 10) of the main unit 1 sends a termination command to the system controller 201. At the same time, the CPU 129 controls the IEEE-1394 interface 133 (FIG. 10) to send the termination command also to the subsidiary unit $2_{ij}$. In the subsidiary unit $2_{ij}$, the CPU 149 receives the termination command from the main unit 1 through the IEEE-1394 interface 153. When the CPU 149 receives the termination command, it sends the command to the system controller 219. In step S125, it is determined whether the termination command has been sent from the CPU 149 to the system controller 219 in this way.

When it is determined in step S125 that the termination command-has not been sent from the CPU 149, the processing returns to step S122, and the same processes are repeated thereafter.

When it is determined in step S125 that the termination command has been sent from the CPU 149, the processing proceeds to step S126, the system controller 219 controls the selector 218 to return the selection state to the preceding state used before it was changed in step S121, and the virtual-multiple-viewpoint-display processing of the subsidiary unit is terminated.

Figure 35:
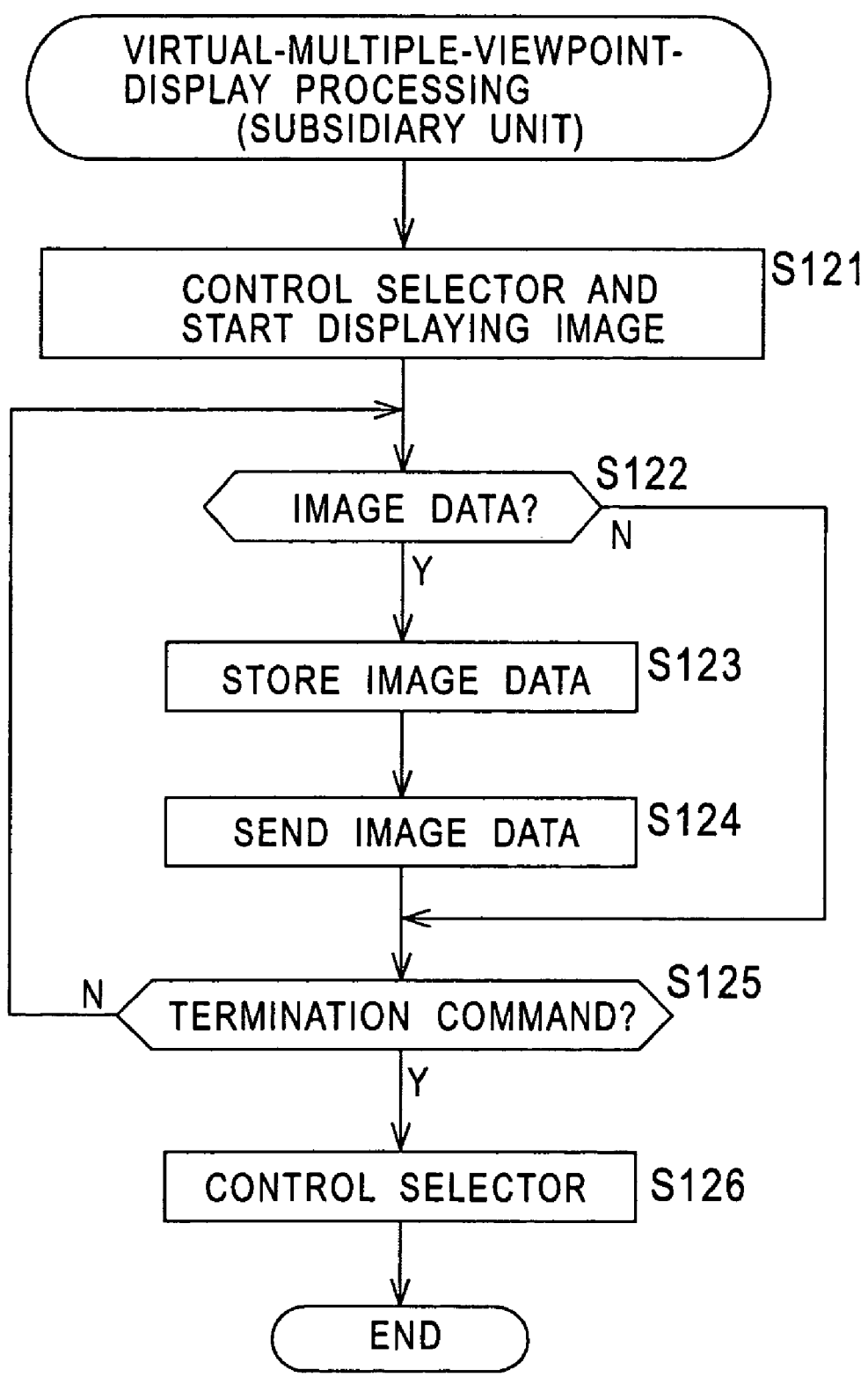
FIG. 35 is a flowchart explaining first virtual-multiple-viewpoint-display processing of the subsidiary unit, performed by the signal processing unit 147.
Figure 36A:
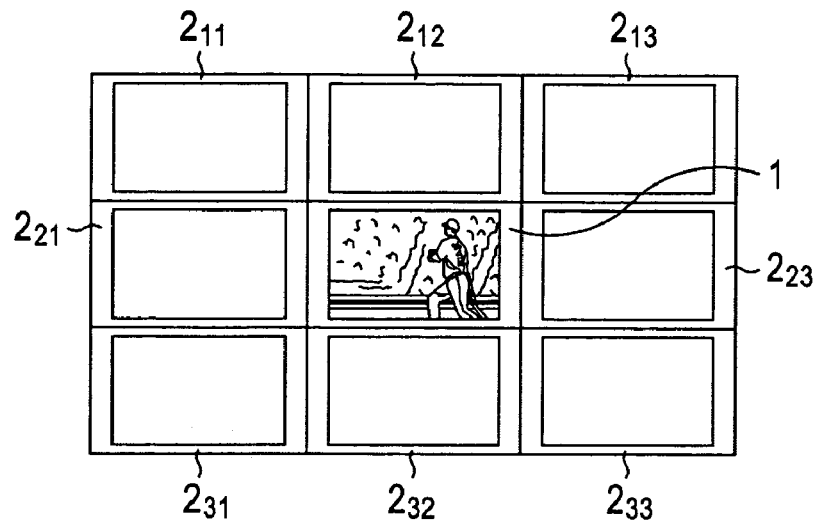
FIG. 36A is a view showing example display in the main unit 1 and the subsidiary units 2 constituting a scalable TV system.
Figure 36B:
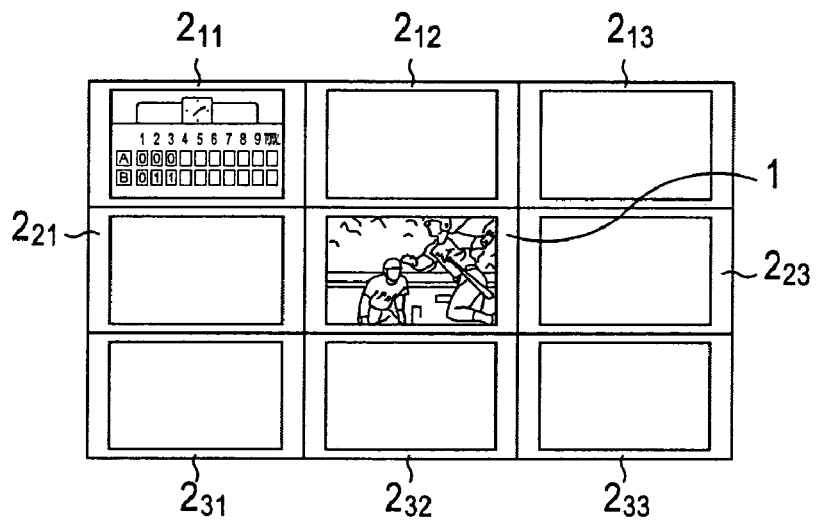
FIG. 36B is a view showing example display in the main unit 1 and the subsidiary units 2 constituting the scalable TV system.

According to the virtual-multiple-viewpoint-display processing described by referring to FIG. 32 to FIG. 35, when the main unit 1 displays the image data of a program as shown in FIG. 36A, if motion does not occur (or hardly occurs) in consecutive frames, the image data of the frames which include no motion is sent from the main unit 1 to a subsidiary unit constituting the scalable TV system, for example, to the subsidiary unit $2_{11}$ and displayed on the CRT 31 thereof, as shown in FIG. 36B.

Figure 36C:
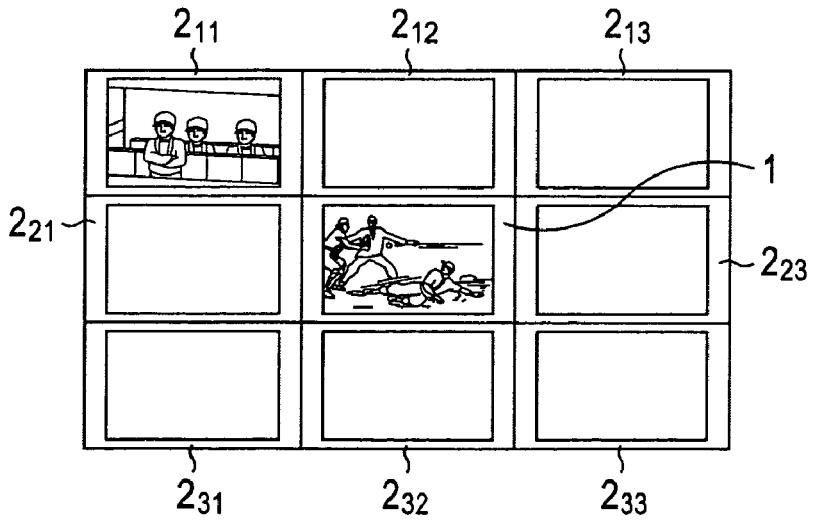
FIG. 36C is a view showing example display in the main unit 1 and the subsidiary units 2 constituting the scalable TV system.

Then, if motion does not occur in consecutive frames again in the image data displayed in the main unit 1, the image data of the frames which include no motion is sent from the main unit 1 to the subsidiary unit $2_{11}$, and displayed on the CRT 31 thereof instead of the image data which has been displayed so far, as shown in FIG. 36C.

In FIG. 36A, the main unit 1 displays the image data of a real-time television broadcasting program of a professional baseball game. In FIG. 36B, the main unit 1 continues to display the image data of the real-time television broadcasting program of the professional baseball game, and the subsidiary unit 211 displays the image data of a scoreboard as the image data of frames which include no motion. Further, in FIG. 36C, the main unit 1 continues to display the image data of the real-time television broadcasting program of the professional baseball game, and the subsidiary unit 211 displays image data showing a player's bench as the image data of frames which include no motion.

In other words, in the embodiment shown in FIG. 36A to FIG. 36C, the main unit 1 displays the image data of the real-time television broadcasting program of the professional baseball game in the same way as in a usual television receiver. Since the camera is changed in the real-time television broadcasting program of the professional baseball game, the scoreboard is shown in a close-up manner, and that scene continues for several frames, the main unit 1 sends the image data of the scoreboard to the subsidiary unit $2_{11}$, and the subsidiary unit $2_{11}$, displays the image data (FIG. 36B). Further, after that, since the camera is changed in the real-time television broadcasting program of the professional baseball game, the player's bench is shown, and that scene continues for several frames, the main unit 1 sends the image data of the scoreboard to the subsidiary unit $2_{11}$, and the subsidiary unit $2_{11}$ displays the image data (FIG. 36C).

As described above, according to the virtual-multiple-viewpoint-display processing described by referring to FIG. 32 to FIG. 35, when consecutive frames have no motion in a program displayed in the main unit 1, the image data of the frames is sent to the subsidiary unit 2 and displayed. Therefore, the user can view the image data displayed in the main unit 1 and a scene other than the image data, in other words, the use can view at the same time image data taken from different viewpoints.

In general, real-time broadcasting programs of professional baseball games show the scoreboard in a close-up manner at the start of each inning. In this case, according to the virtual-multiple-viewpoint-display processing, even if the user fails to see the scoreboard displayed in a close-up manner at the start of an inning, since that scene is displayed on the subsidiary unit 2, the user can recognize the score immediately.

In the embodiment shown in FIG. 36A to FIG. 36C, image data is always sent from the main unit 1 to the subsidiary unit $2_{11}$. The subsidiary unit $2_{ij}$ to which image data is sent from the main unit 1 and displayed can be changed.

Figure 37A:
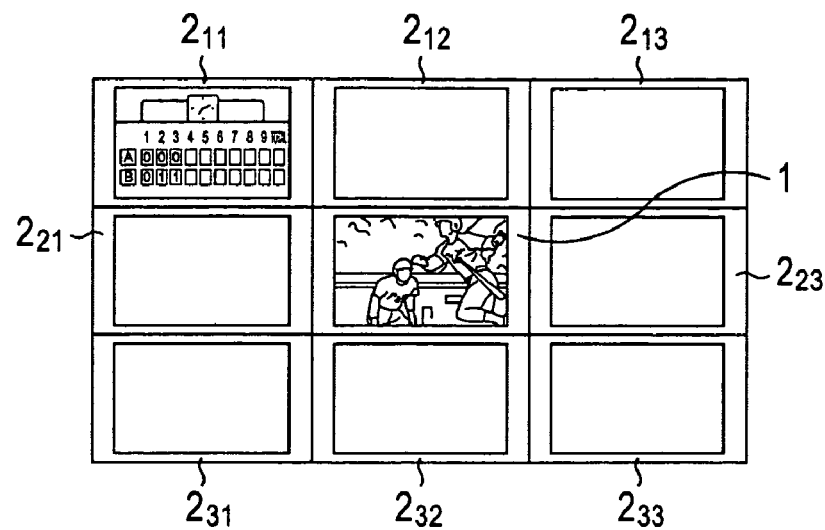
FIG. 37A is a view showing example display in the main unit 1 and the subsidiary units 2 constituting the scalable TV system.
Figure 37B:
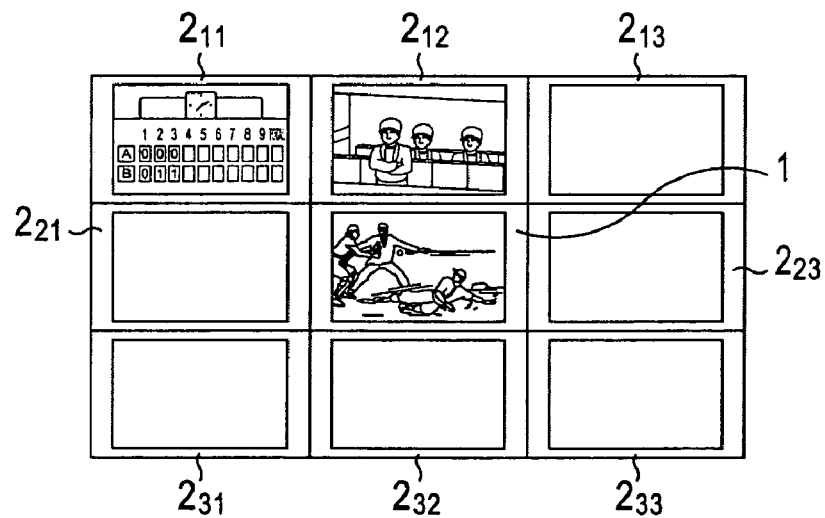
FIG. 37B is a view showing example display in the main unit 1 and the subsidiary units 2 constituting the scalable TV system.

Specifically, for example, it is possible that the image data of a first set of frames having no motion is sent from the main unit 1 to the subsidiary unit $2_{11}$, as shown in FIG. 37A, the image data of a second set of frames having no motion is sent from the main unit 1 to the subsidiary unit $2_{12}$, as shown in FIG. 37B, and the subsidiary unit$_{ij}$ to which image data is sent and displayed is sequentially changed in the same way. In this case, when image data is sent to all subsidiary units $2_{ij}$ and displayed, as shown in FIG. 37C, it is possible that the image data of the next set of frames having no motion is sent, for example, to the subsidiary unit $2_{11}$, to which the image data was first sent and displayed, and displayed instead of the image data which has been displayed so far.

In this case, the user can view at the same time the image data displayed in the main unit 1 and many scenes other than the image data.

Figure 37C:
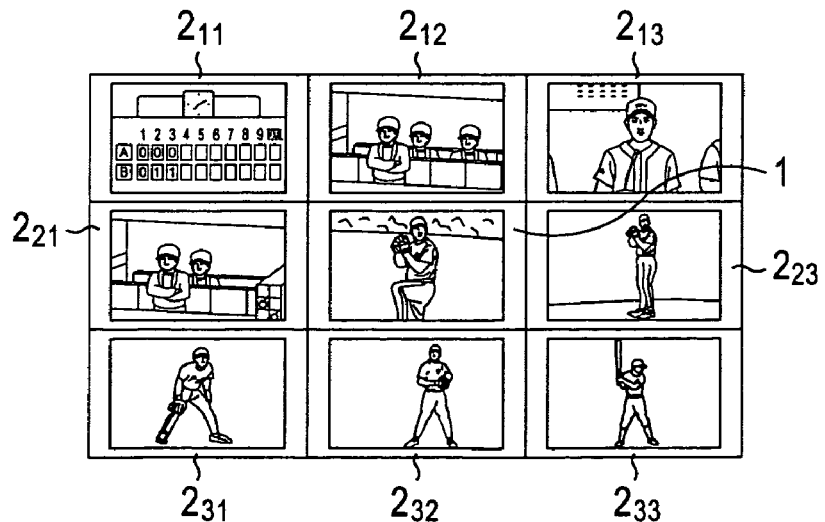
FIG. 37C is a view showing example display in the main unit 1 and the subsidiary units 2 constituting the scalable TV system.

In the embodiment shown in FIG. 37A to FIG. 37C, image data is sent from the main unit 1 to all subsidiary units $2_{ij}$ constituting the scalable TV system and displayed. It is possible that image data is sent from the main unit 1 to only some subsidiary units $2_{ij}$ constituting the scalable TV system and displayed. The some subsidiary units $2_{ij}$ can be specified, for example, on the menu screen.

Figure 38:
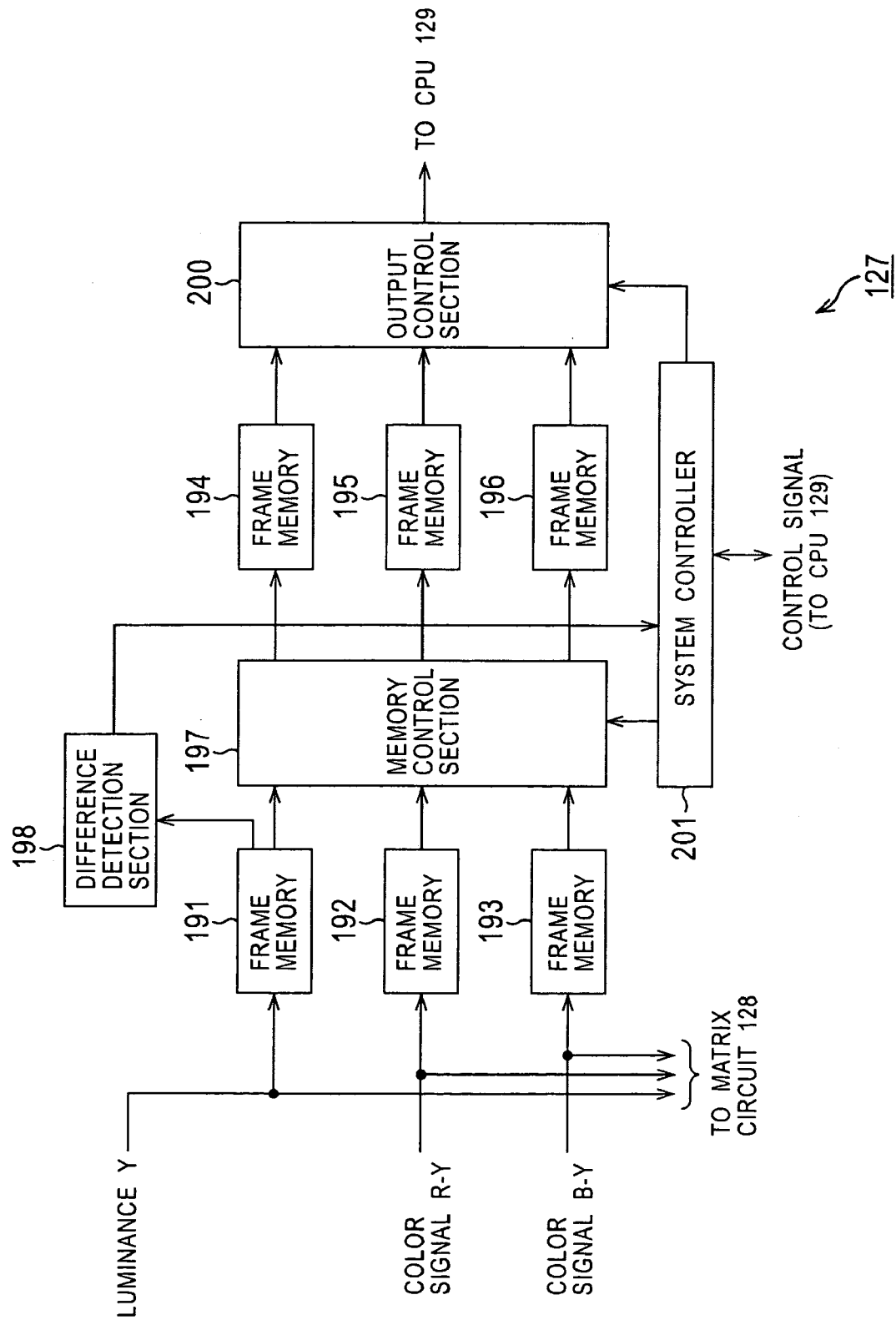
FIG. 38 is a block diagram showing a second example structure of the signal processing section 127.

Next, FIG. 38 shows a second example functional structure of the signal processing section 127 (FIG. 10) in the main unit 1, which performs virtual-multiple-viewpoint-display processing. In the figure, the same symbols as those used in FIG. 32 are assigned to the portions corresponding to those shown in FIG. 32, and a description thereof is omitted, if unnecessary. Specifically, the signal processing section 127 shown in FIG. 38 has basically the same structure as in FIG. 32 except that the counter section 199 is not provided.

Next, the virtual-multiple-viewpoint-display processing in the main unit, performed by the signal processing section 127 shown in FIG. 38 will be described by referring to a flowchart shown in FIG. 39.

In steps S131 and S132, the same processes as in steps S101 and S102 shown in FIG. 33 are performed.

After the difference detection section 198 detects the sum of the absolute values of the differences for the current frame as a feature of the current-frame image data, and sends the sum to the system controller 201 in step S132, the processing proceeds to step S133, and the system controller 201 determines whether the sum of the absolute values of the differences for the current frame is larger than (or equal to or larger than) a predetermined threshold Th1.

When it is determined in step S133 that the sum of the absolute values of the differences for the current frame is not larger than the threshold Th1, the processing skips steps S134 and S135, and proceeds to step S136.

When it is determined in step S133 that the sum of the absolute values of the differences for the current frame is larger than the threshold Th1, in other words, that the current-frame image is largely changed from the preceding-frame image and therefore, the scene has been changed in the current-frame image, the processing proceeds to step S134, and the system controller 201 controls, in the same way as in step S106 shown in FIG. 33, the memory control section 197 to send the luminance signal Y and color signals R-Y and B-Y of the image data in the current frame stored in the frame memories 191 to 193 to the frame memories 194 to 196 and stores the data therein in an over-writing manner. The processing proceeds to step S135.

In step S135, the system controller 201 controls the output control section 200 to read the luminance signal Y and the color signals R-Y and B-Y of the one-frame image data stored in the frame memories 194 to 196, and send the signals to the CPU 129. In addition, in step S135, the system controller 201 sends a display request command for instructing the image data to be displayed at a predetermined subsidiary unit $2_{ij}$, to the CPU 129. The processing proceeds to step S136.

When the CPU 129 receives the display request command from the system controller 201, the CPU 129 controls the IEEE-1394 interface 133 to send the one-frame image data (luminance signal Y and color signals R-Y and B-Y) sent from the output control section 200, to the subsidiary unit 2 together with the display request command, as described above. In this case, the signal processing section 147 of the subsidiary unit $2_{ij}$ is structured as shown in FIG. 34 and is executing the virtual-multiple-viewpoint-display processing described by referring to FIG. 35. Therefore, the subsidiary units $2_{ij}$ display the image data sent from the main unit 1 together with the display request command, as described by referring to FIG. 36A to FIG. 36C or FIG. 37A to FIG. 37C.

Figure 39:
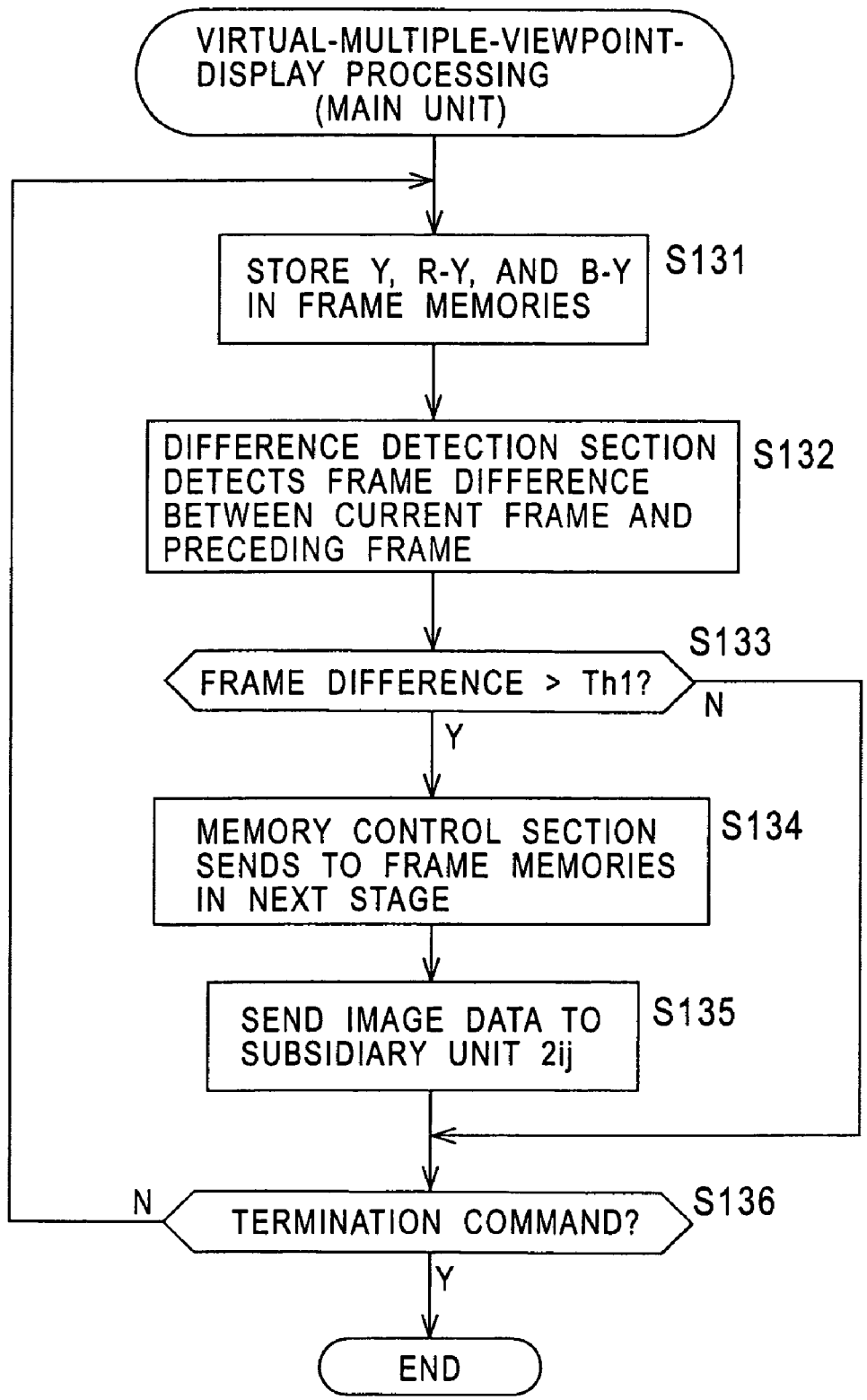
FIG. 39 is a flowchart explaining second virtual-multiple-viewpoint-display processing of the main unit, performed by the signal processing unit 127.

In the embodiment shown in FIG. 39, since the first frame obtained after the scene was changed is sent from the main unit 1 to the subsidiary unit $2_{ij}$, the subsidiary unit $2_{ij}$ displays a digest of the program displayed in the main unit 1.

In step S136, it is determined whether the system controller 201 has received a termination command for instructing the virtual-multiple-viewpoint-display processing to be terminated, from the CPU 129.

When it is determined in step S136 that a termination command has not been received, the processing returns to step S131 and the same processes are repeated thereafter.

When it is determined in step S131 that a termination command has been received, in other words, for example, when the user operates the controller 15 (FIG. 7) to display the menu screen on the CRT 11 and further clicks again on the virtual-multiple-viewpoint-display icon in the menu screen to thereby instruct the CPU 129 to terminate the virtual-multiple-viewpoint-display processing and the CPU 129 sends a termination command to the system controller 201, the virtual-multiple-viewpoint-display processing is terminated in the main unit.

Figure 40:
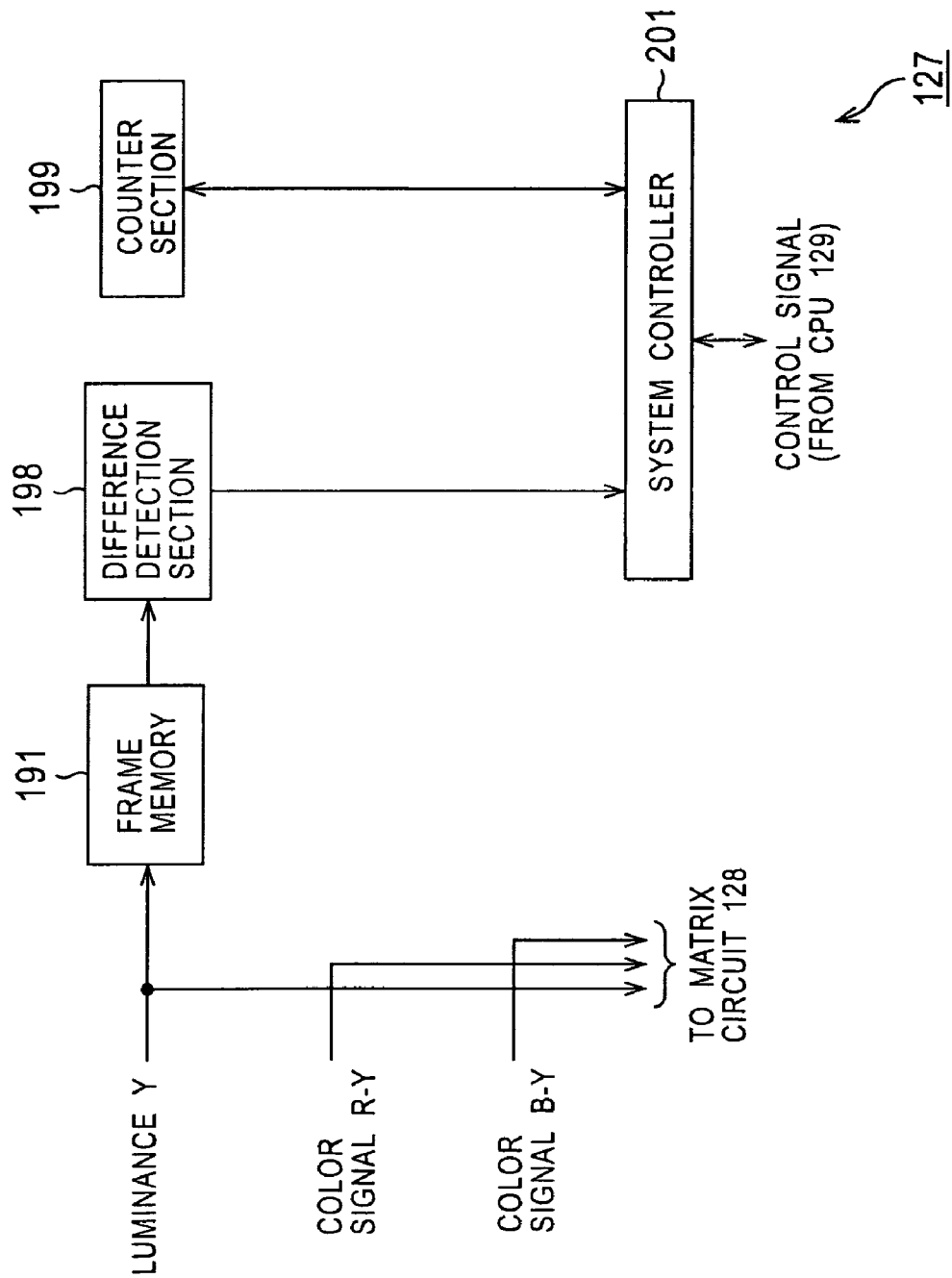
FIG. 40 is a block diagram showing a third example structure of the signal processing section 127.

Next, FIG. 40 shows a third example functional structure of the signal processing section 127 (FIG. 10) in the main unit 1, which performs virtual-multiple-viewpoint-display processing. In the figure, the same symbols as those used in FIG. 32 are assigned to the portions corresponding to those shown in FIG. 32, and a description thereof is omitted, if unnecessary. In other words, the signal processing section 127 shown in FIG. 40 has basically the same structure as in FIG. 32 except that the frame memories 192 to 196, the memory control section 197, or the output control section 200 is not provided.

Next, the virtual-multiple-viewpoint-display processing in the main unit, performed by the signal processing section 127 shown in FIG. 40 will be described by referring to a flowchart shown in FIG. 41.

In steps S141 to S145, the same processes as those in steps S101 to S105 in FIG. 33 are performed. In step S141, however, only the luminance signal Y among the image data output from the MPEG video decoder 125 (FIG. 10) is stored in the frame memory 191.

When it is determined in step S145 that the count of the counter section 199 is not larger than the threshold $Th_c$, the processing skips steps S146 and S147 and proceeds to step S148.

When it is determined in step S145 that the count of the counter section 199 is larger than the threshold $Th_c$, in other words, that the image data of a predetermined number of frames output from the MPEG video decoder 125 does not include any motion, the processing proceeds to step S146, and the system controller 201 tunes the subsidiary unit $2_{ij}$ to the channel (current channel) selected by the tuner 121 of the main unit 1, and sends a freeze command for instructing the frame of image data in the program broadcasted in the channel to be frozen and displayed, to the CPU 129. The processing proceeds to step S147.

When the CPU 129 receives the freeze command from the system controller 201, the CPU 129 controls the IEEE-1394 interface 133 to send the freeze command to the subsidiary unit $2_{ij}$. When the subsidiary unit $2_{ij}$ which is executing the virtual-multiple-viewpoint-display processing receives the freeze command from the main unit 1, the subsidiary unit receives the channel specified by the freeze command, stores the image data of the program in the channel, and displays it, as described later.

In the embodiment shown in FIG. 32 and FIG. 33, when the image data displayed in the main unit 1 does not change (hardly changes) in several consecutive frames, the unchanged image data is sent from the main unit 1 to the subsidiary unit $2_{ij}$ and displayed. In the embodiment shown in FIG. 40 and FIG. 41, however, image data is not sent from the main unit 1 to the subsidiary unit $2_{ij}$, but the freeze command that includes the channel in which the program for the image data is being broadcasted is sent. In the subsidiary unit 2*ij*, as described later, the tuner 141 selects the channel included in the freeze command, and image data of the program broadcasted in the channel is stored and displayed.

In step S147, the system controller 201 resets the count of the counter section 199 to zero. The processing proceeds to step S148.

In step S148, it is determined whether the system controller 201 has received a termination command for instructing the virtual-multiple-viewpoint-display processing to be terminated, from the CPU 129.

When it is determined in step S148 that a termination command has not been received, the processing returns to step S141 and the same processes are repeated thereafter.

When it is determined in step S148 that a termination command has been received, in other words, for example, when the user operates the controller 15 (FIG. 7) to display the menu screen on the CRT 11 and further clicks again on the virtual-multiple-viewpoint-display icon in the menu screen to thereby instruct the CPU 129 to terminate the virtual-multiple-viewpoint-display processing and the CPU 129 sends a termination command to the system controller 201, the virtual-multiple-viewpoint-display processing is terminated in the main unit.

Figure 42:
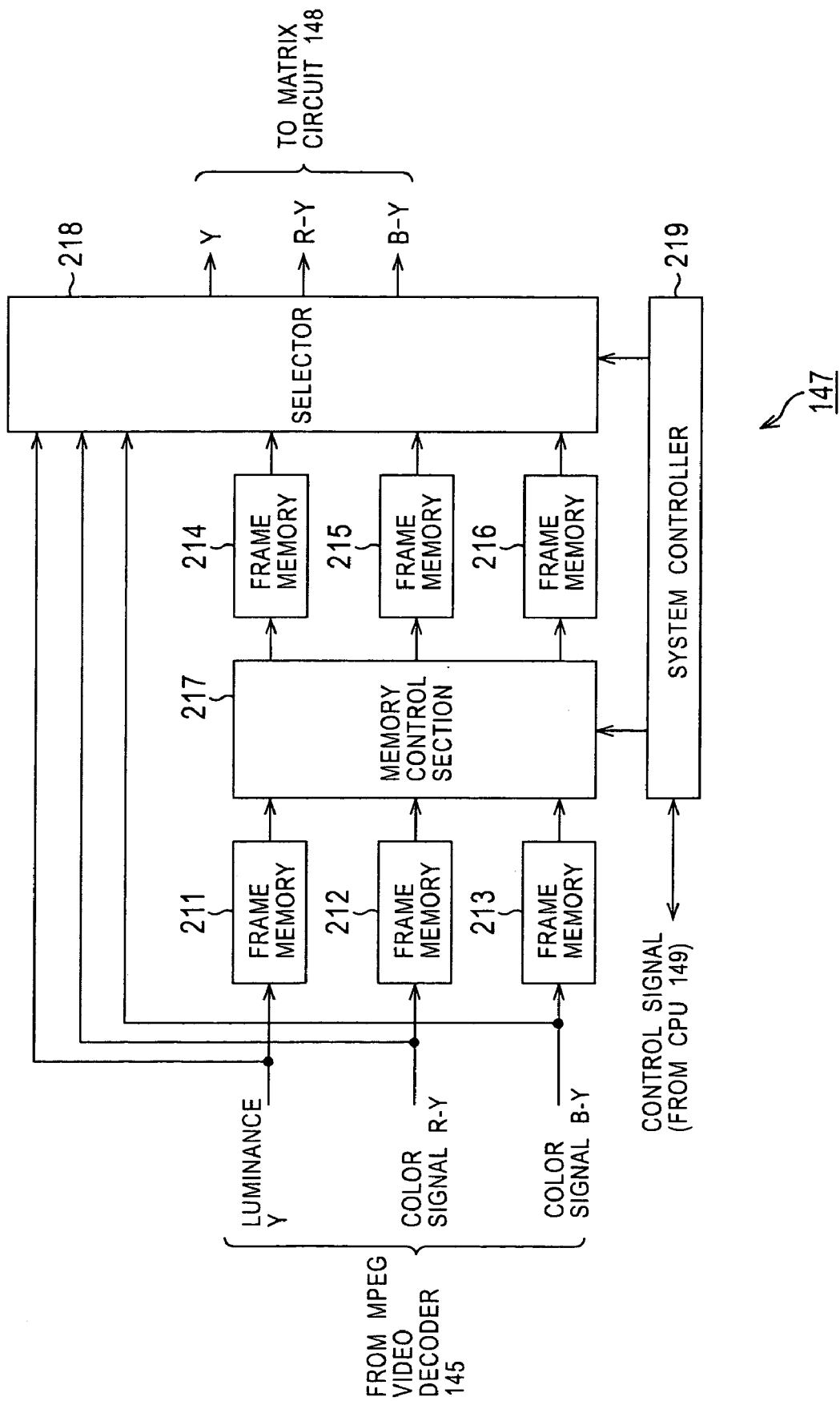
FIG. 42 is a block diagram showing a second example structure of the signal processing section 147.

Next, FIG. 42 shows an example functional structure of the signal processing section 147 (FIG. 11) in the subsidiary unit $2_{ij}$, corresponding to a case in which the signal processing section 127 of the main unit 1 is structured as shown in FIG. 40. In FIG. 42, the same symbols as those used in FIG. 34 are assigned to the portions corresponding to those shown in FIG. 34, and a description thereof is omitted, if unnecessary. Specifically, the signal processing section 147 shown in FIG. 42 has basically the same structure as in FIG. 34.

In the embodiment shown in FIG. 42, to the frame memories 211 to 213, not image data output from the CPU 149 (FIG. 11) but image data output from the MPEG video decoder 145 (FIG. 11) is sent.

Next, the virtual-multiple-viewpoint-display processing in a subsidiary unit, performed by the signal processing section 147 shown in FIG. 42 will be described by referring to a flowchart shown in FIG. 43.

First, in step S151, the system controller 219 controls the selector 218 to select the luminance signal Y and the color signals R-Y and B-Y of the image data stored in the frame memories 214 to 216, and starts displaying the data. More specifically, thereby, the selector 218 repeatedly reads the luminance signal Y and the color signals R-Y and B-Y of the one-frame image data stored in the frame memories 214 to 216 and sends them to the matrix circuit 148 (FIG. 11) in a subsequent stage. With this, the image data stored in the frame memories 214 to 216 is displayed on the CRT 32 of the subsidiary unit $2_{ij}$.

Figure 43:
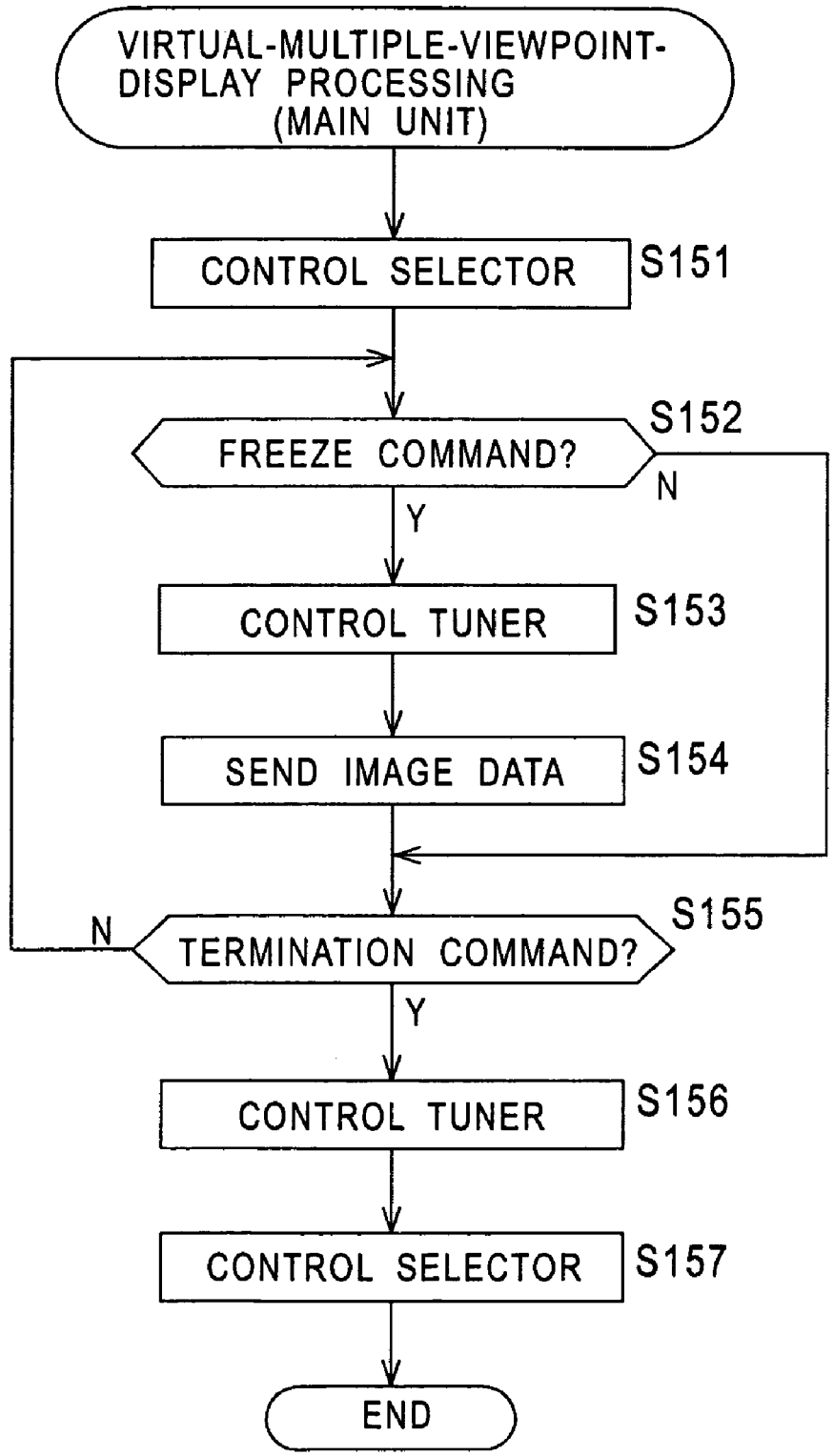
FIG. 43 is a flowchart explaining second virtual-multiple-viewpoint-display processing of the subsidiary unit, performed by the signal processing unit 147.

In the embodiment shown in FIG. 43, before the virtual-multiple-viewpoint-display processing is started, it is assumed that the frame memories 214 to 216 store, for example, image data having a black level. In this case, image data having the black level is displayed on the CRT 32 of the subsidiary unit $2_{ij}$ immediately after the process of step S151 is performed.

Then, the processing proceeds to step S152, and the system controller 219 determines whether a freeze command has been received. When it is determined that a freeze command has not been received, the processing skips steps S153 and S154 and proceeds to step S155.

Figure 41:
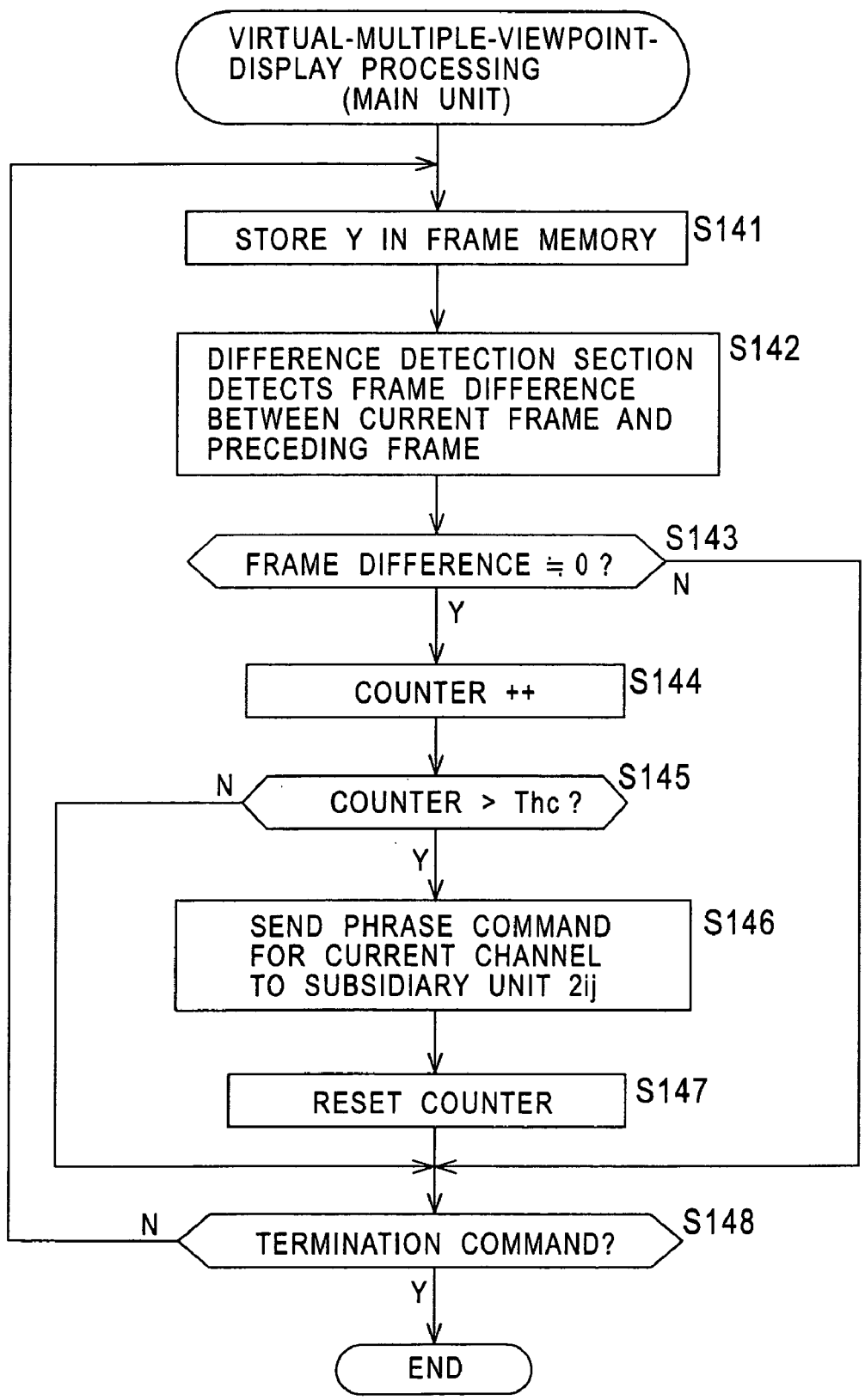
FIG. 41 is a flowchart explaining third virtual-multiple-viewpoint-display processing of the main unit, performed by the signal processing unit 127.

When it is determined in step S152 that a freeze command has been received, in other words, that the freeze command sent by the main unit 1 in step S146 shown in FIG. 41 has been received by the CPU 149 through the IEEE-1394 interface 153 (FIG. 11), and sent to the system controller 219, the processing proceeds to step S153, and the system controller 219 requests the CPU 149 to receive the channel included in the freeze command, by the tuner 141. The CPU 149 controls the tuner 141 so as to receive the channel included in the freeze command, according to the request from the system controller 219.

With this, the tuner 141 receives the channel included in the freeze command, and sends it through a QPSK demodulation circuit 142, an error correction circuit 143, and a demultiplexer 144 and further through the MPEG video decoder 145 and the MPEG audio decoder 146 to the signal processing section 147.

The storage of image data in the channel included in the freeze command, sent as described above, is started in the frame memories 211 to 213 of the signal processing section 147, and the processing proceeds to step S154.

The frame memories 211 to 213 sequentially store the frames of image data supplied thereto, in an over-writing manner.

In step S154, the system controller 219 controls the memory control section 217 to wait for the latest-frame image data to be stored in the frame memories 211 to 213; sends the luminance signal Y and the color signals R-Y and B-Y of the image data to the frame memories 214 to 216, respectively; and stores them in an over-writing manner. The processing proceeds to step S155.

With this, the selector 218 reads the image data newly stored in the frame memories 211 to 213 in step S154. Therefore, the image data newly stored in the frame memories 214 to 216, that is, the image data in the same channel as the channel being received by the main unit 1, obtained immediately after image data having no (little) motion is displayed in several consecutive frames in the main unit 1, is displayed on the CRT 31 of the subsidiary unit $2_{ij}$.

In step S155, the system controller 219 determines whether a termination command has been sent from the CPU 149 (FIG. 11).

More specifically, as described above, the CPU 129 (FIG. 10) of the main unit 1 sends a termination command to the system controller 201, and at the same time, the CPU 129 sends the termination command also to the subsidiary unit $2_{ij}$. In the subsidiary unit $2_{ij}$, the CPU 149 receives the termination command from the main unit 1 through the IEEE-1394 interface 153. When the CPU 149 receives the termination command, it sends the command to the system controller 219. In step S155, it is determined whether the termination command has been sent from the CPU 149 to the system controller 219 in this way.

When it is determined in step S155 that the termination command has not been sent from the CPU 149, the processing returns to step S152, and the same processes are repeated thereafter.

When it is determined in step S155 that the termination command has been sent from the CPU 149, the processing proceeds to step S156, the system controller 219 controls the tuner 141 to return the tuning state to the preceding state used immediately before the virtual-multiple-viewpoint-display processing is started. The processing proceeds to step S157.

In step S157, the system controller 219 controls the selector 218 to return the selection state to the preceding state used before it was changed in step S151, and the virtual-multiple-viewpoint-display processing is terminated in the subsidiary unit.

Also according to the virtual-multiple-viewpoint-display processing described by referring to FIG. 40 to FIG. 43, in the same way as in the virtual-multiple-viewpoint-display processing described by referring to FIG. 32 to FIG. 35, when consecutive frames have no (little) motion as the image data of the program being displayed in the main unit 1, the subsidiary unit $2_{ij}$ displays the image data of the frames having no motion, as described by referring to FIG. 36A to FIG. 36C or FIG. 37A to FIG. 37C.

Figure 44:
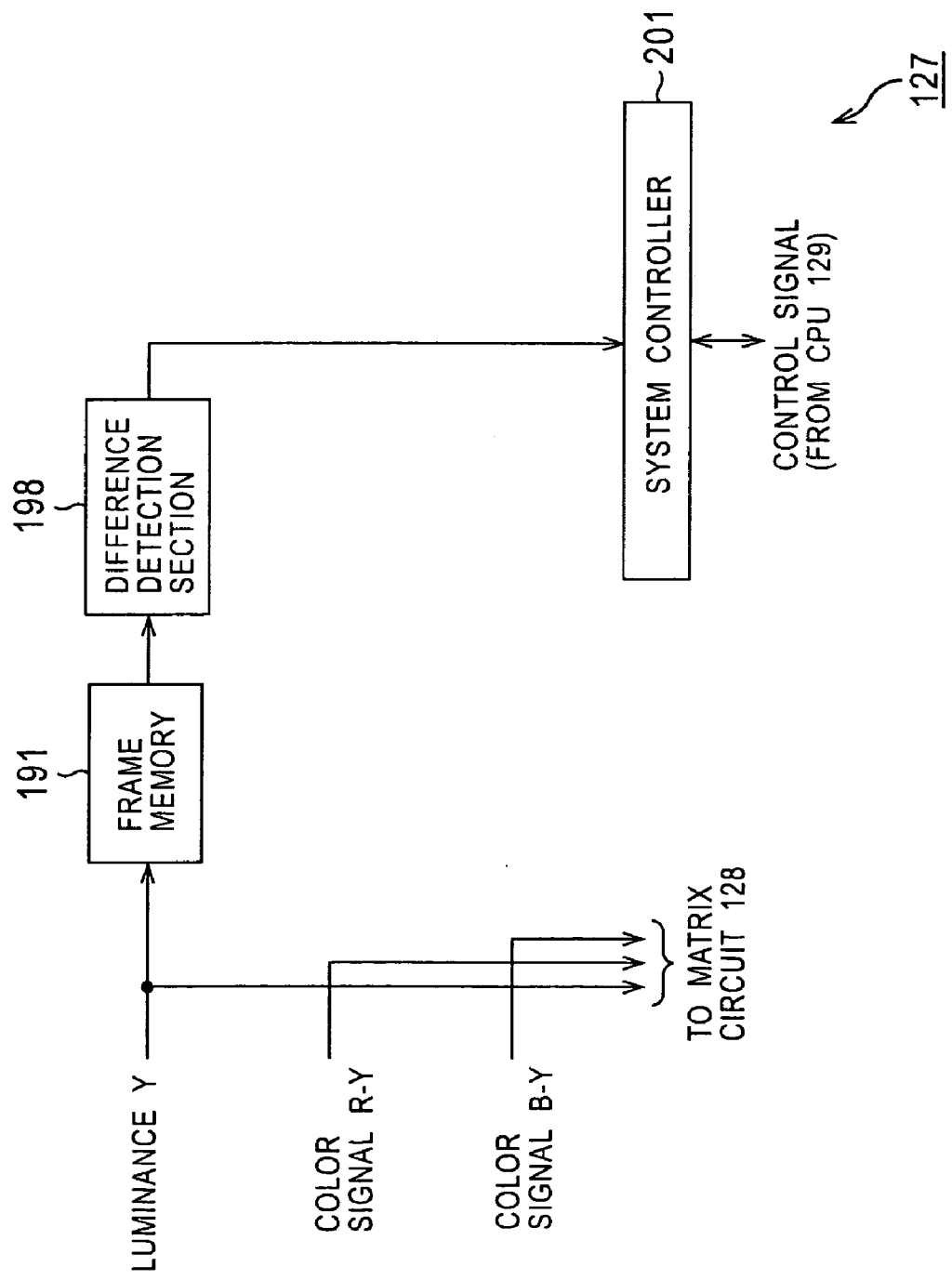
FIG. 44 is a block diagram showing a fourth example structure of the signal processing section 127.

Next, FIG. 44 shows a fourth example functional structure of the signal processing section 127 (FIG. 10) in the main unit 1, which performs virtual-multiple-viewpoint-display processing. In the figure, the same symbols as those used in FIG. 38 are assigned to the portions corresponding to those shown in FIG. 38, and a description thereof is omitted, if unnecessary. In other words, the signal processing section 127 shown in FIG. 44 has basically the same structure as in FIG. 38 except that the frame memories 192 to 196, the memory control section 197, or the output control section 200 is not provided.

In the embodiment shown in FIG. 38 and FIG. 39, when the image data displayed in the main unit 1 has a change in scene, the image data of the frame immediately after the scene was changed is sent from the main unit 1 to the subsidiary unit $2_{ij}$ and displayed. In the embodiment shown in FIG. 44, however, image data is not sent from the main unit 1 to the subsidiary unit $2_{ij}$, but the freeze command that includes the channel being received by the main unit 1 is sent, as in the case shown in FIG. 40 and FIG. 41. In the subsidiary unit 2ij, as described by referring to FIG. 42 and FIG. 43, the tuner 141 selects the channel included in the freeze command sent from the main unit 1, and the image data of the program broadcasted in the channel is immediately stored and displayed.

Figure 45:
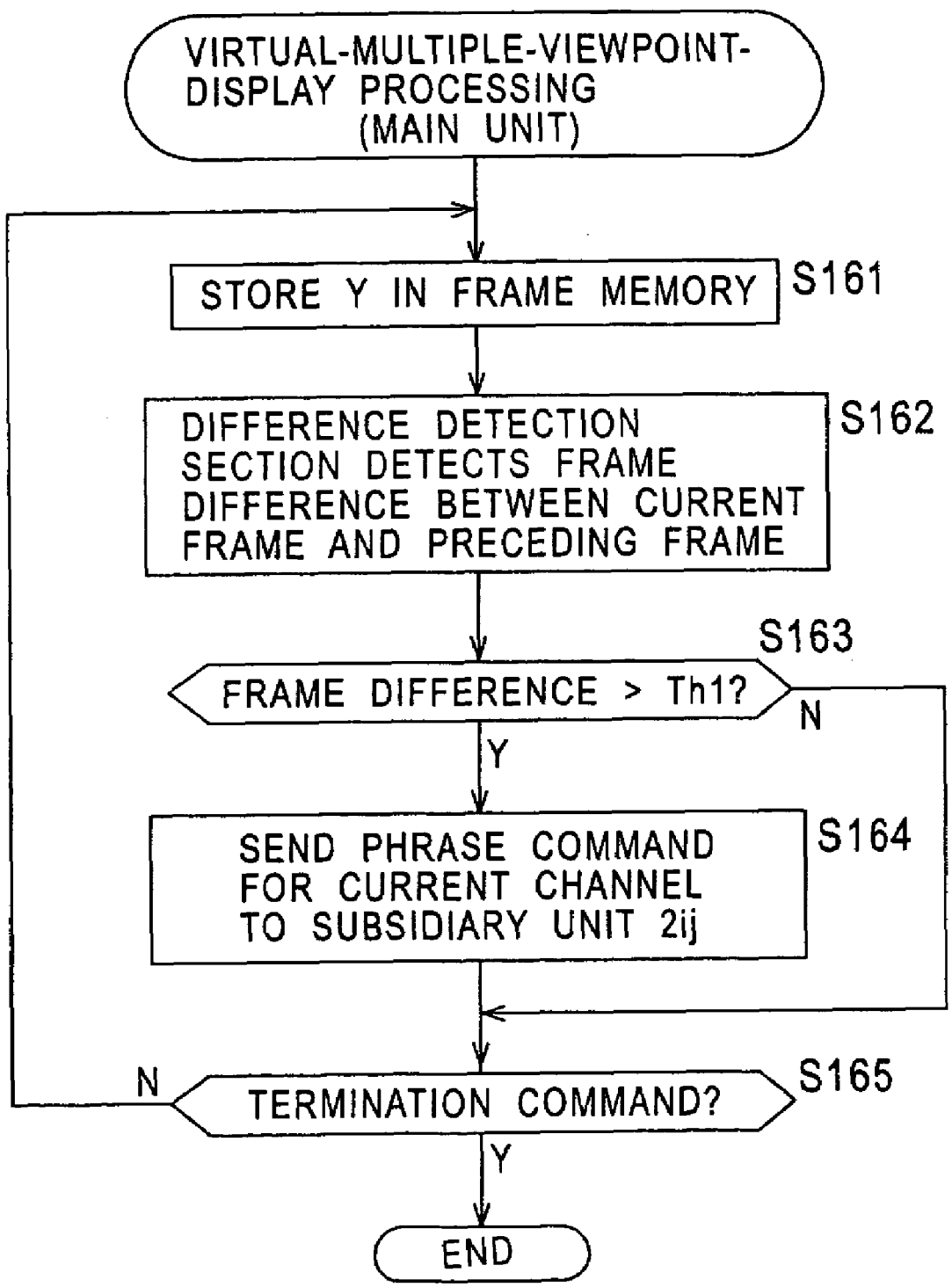
FIG. 45 is a flowchart explaining fourth virtual-multiple-viewpoint-display processing of the main unit, performed by the signal processing unit 127.

Specifically, FIG. 45 is a flowchart describing the virtual-multiple-viewpoint-display processing in the main unit, performed by the signal processing section 127 shown in FIG. 44.

In steps S161 and S163, the same processes as in steps S131 and S133 shown in FIG. 39 are performed.

When it is determined in step S163 that the sum of the absolute values of the differences for the current frame is not larger than the threshold Th1, the processing skips steps S164, and proceeds to step S165.

When it is determined in step S163 that the sum of the absolute values of the differences for the current frame is larger than the threshold Th1, in other words, that the current-frame image is largely changed from the preceding-frame image and therefore, the scene has been changed in the current-frame image, the processing proceeds to step S164, and the system controller 201 sends, in the same way as in step S146 shown in FIG. 41, a freeze command to the CPU 129. The processing proceeds to step S165.

When the CPU 129 receives the freeze command from the system controller 201, the CPU 129 controls the IEEE-1394 interface 133 to send the freeze command to the subsidiary unit $2_{ij}$.

In this case, the signal processing section 147 of the subsidiary unit $2_{ij}$ is structured as shown in FIG. 42 and is executing the virtual-multiple-viewpoint-display processing described by referring to FIG. 43. Therefore, when the subsidiary unit $2_{ij}$ receives the freeze command from the main unit 1, receiving the channel which has been received by the main unit 1 is immediately started, and further, the image data of the program in the channel is immediately stored and displayed. In other words, also in this case, the subsidiary unit $2_{ij}$ displays a digest of the program displayed in the main unit 1, in the same way as described in the embodiment shown in FIG. 38 and FIG. 39.

In step S165, it is determined whether the system controller 201 has received a termination command for instructing the virtual-multiple-viewpoint-display processing to be terminated, from the CPU 129.

When it is determined in step S165 that a termination command has not been received, the processing returns to step S161 and the same processes are repeated thereafter.

When it is determined in step S165 that a termination command has been received, in other words, for example, when the user operates the controller 15 (FIG. 7) to display the menu screen on the CRT 11 and further clicks again on the virtual-multiple-viewpoint-display icon in the menu screen to thereby instruct the CPU 129 to terminate the virtual-multiple-viewpoint-display processing and the CPU 129 sends a termination command to the system controller 201, the virtual-multiple-viewpoint-display processing is terminated in the main unit.

In the embodiment shown in FIG. 40 to FIG. 45, the freeze command is sent from the main unit 1 to the subsidiary unit $2_{ij}$ by IEEE-1394 communications. The transmission of the freeze command can be performed, for example, by infrared-ray communications through the controller 15 (or 35) as shown in FIG. 46.

Figure 46:
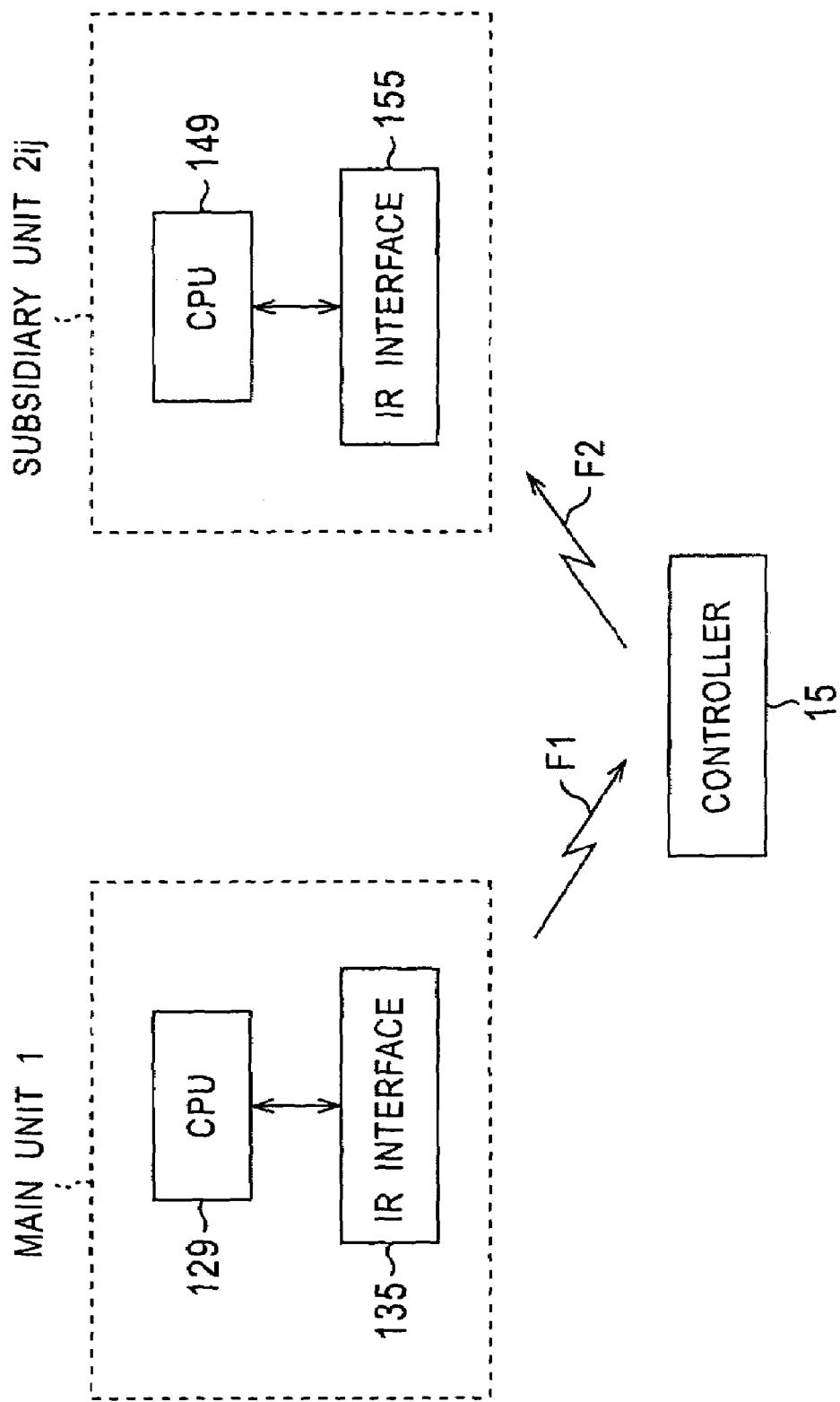
FIG. 46 is a view showing command transmission from the main unit 1 to the subsidiary unit 2 by infrared-ray communications.

More specifically, in the embodiment shown in FIG. 46, the CPU 129 of the main unit 1 instructs the IR interface 135 to send a freeze command to the subsidiary unit $2_{ij}$. In response to the instruction from the CPU 129, the IR interface 135 emits the infrared ray corresponding to a transmission command for instructing a freeze command to be sent to the subsidiary unit $2_{ij}$. The infrared ray is received by the controller 15, and the controller 15 emits the infrared ray corresponding to a freeze command to the subsidiary unit $2_{ij}$ in response to the transmission command corresponding to the received infrared ray. The infrared ray corresponding to a freeze command is received by the IR interface 155 of the subsidiary unit $2_{ij}$, and the IR interface 155 sends the freeze command corresponding to the infrared ray to the CPU 149.

The IR interface 135 of the main unit 1 and the controller 15 send frame data having the format described by referring to FIG. 23, by infrared rays. Frame data sent from the IR interface 135 is called F1, and frame data sent from the controller 15 is called F2. The frame data F1 includes the device codes assigned to the IR interface 135 and the controller 15, and thereby, the frame data F1 sent from the IR interface 135 is received by the controller 15.

In the current case, the frame data F1 sent from the IR interface 135 to the controller 15 requests a freeze command to be sent to the subsidiary unit $2_{ij}$. Therefore, the frame data F1 needs to include a transmission command for instructing transmission to the subsidiary unit $2_{ij}$, and also a freeze command to be transmitted, and further the device code of the subsidiary unit $2_{ij}$, which is the transmission destination.

In the command code of the frame data F1, the command code of the transmission command is included as a so-called op-code, and the command code of the freeze command and the device code (in this case, the device code of the IR interface 155 of the subsidiary unit $2_{ij}$) of the transmission destination to which the freeze command is transmitted by the transmission command are included as so-called operands.

In this case, the main unit 1, which transmits the frame data F1, needs to recognize the device code of the subsidiary unit $2_{ij}$, which is the transmission destination to which the freeze command is to be sent by the transmission command. The device code of the subsidiary unit 2ij is reported to the main unit 1 by IEEE-1394 communications when the device code is changed, and immediately after the above-described authentication processing (FIG. 31), which is performed, for example, when the subsidiary unit $2_{ij}$ is connected to the main unit 1 by an IEEE-1394 cable. With this, the main unit 1 recognizes the device codes of all subsidiary units $2_{ij}$ constituting the scalable TV system.

Figure 26:
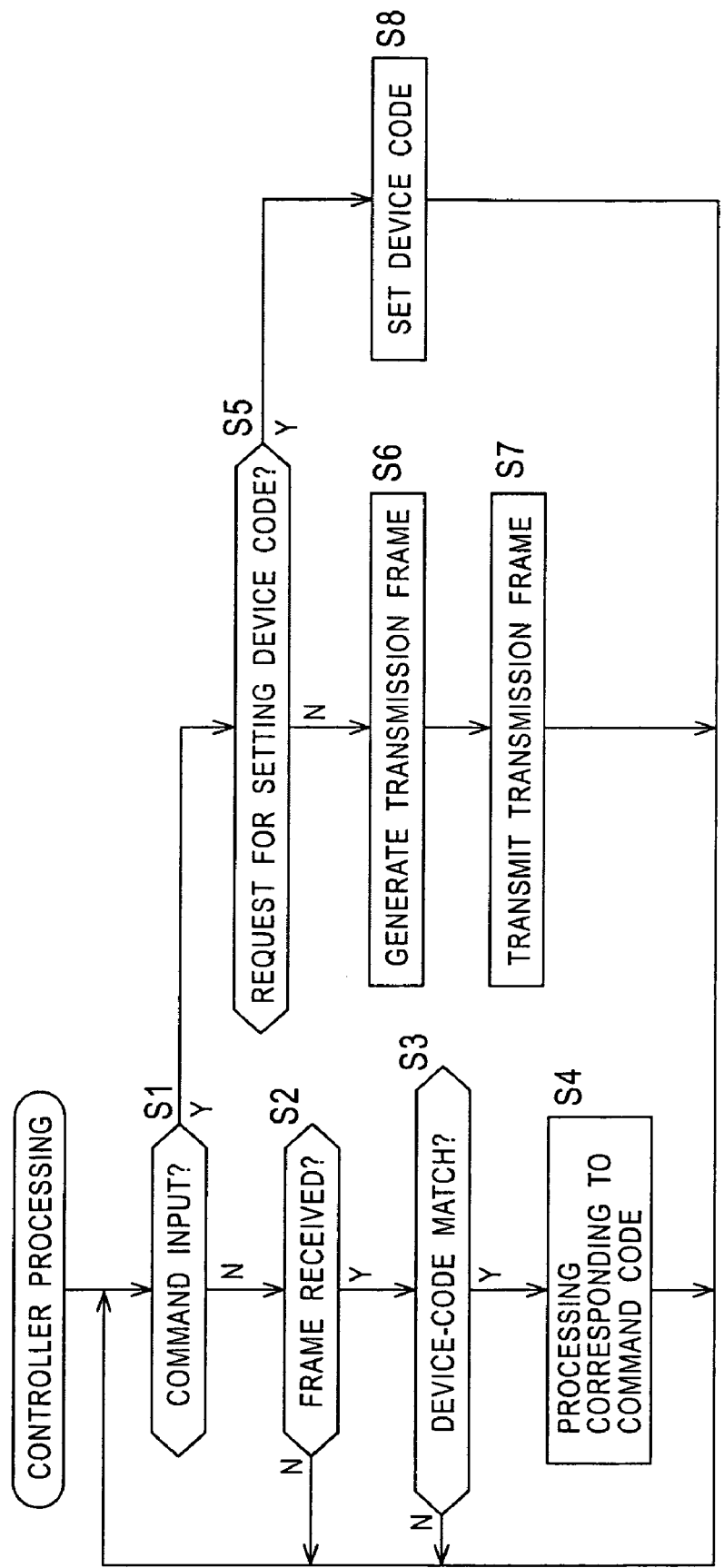
FIG. 26 is a flowchart explaining the processing of the controller 15.

When the controller 15 receives the above-described frame data F1, the controller 15 performs the process corresponding to the command code disposed in the frame data F1 in step S4 of the controller processing described by referring to FIG. 26 to generate the frame data F2, in which the code of the freeze command disposed in the frame data F1 and the device code of the transmission destination are disposed, and to send it to the subsidiary unit $2_{ij}$.

Figure 47:
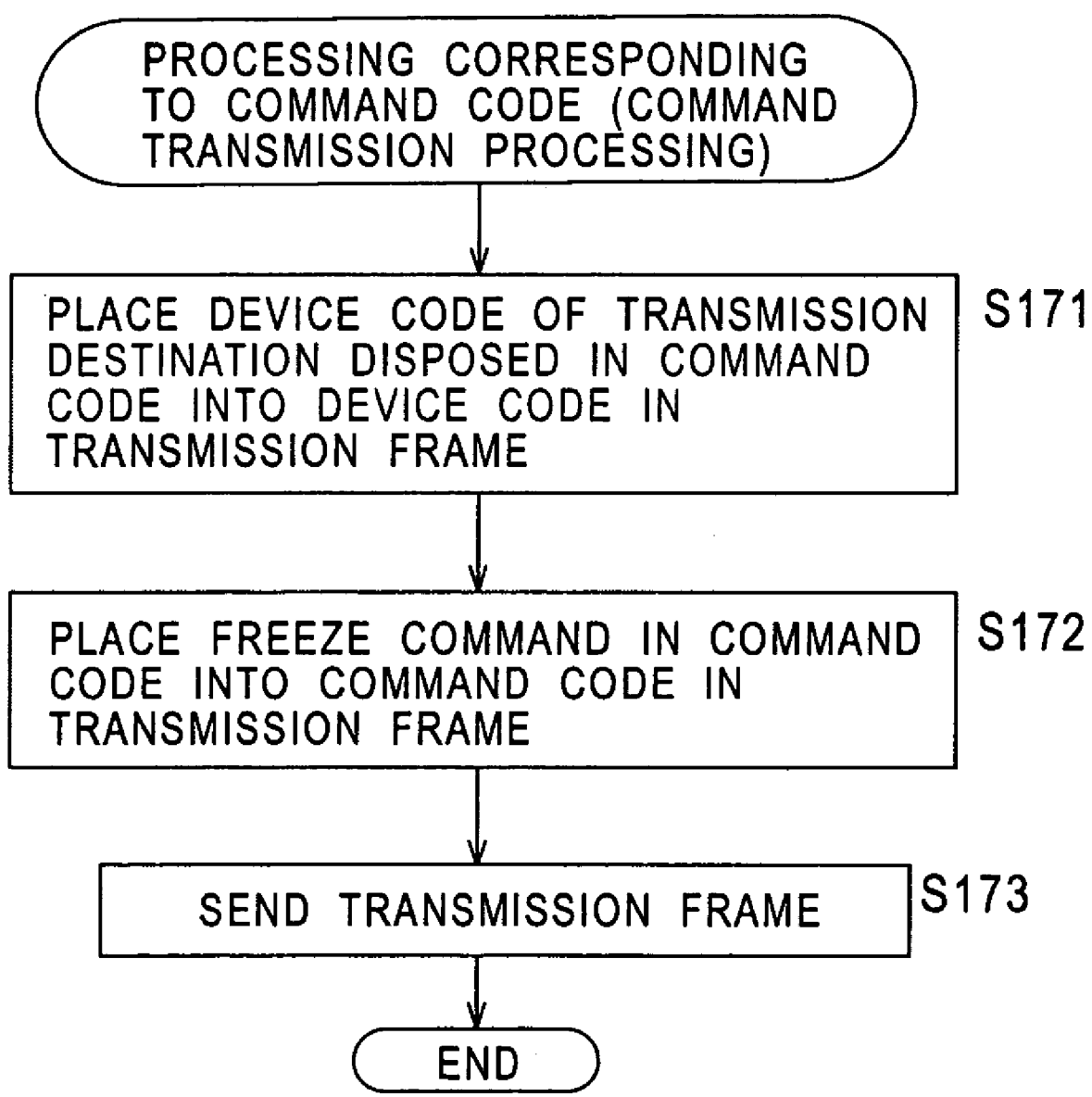
FIG. 47 is a flowchart explaining the processing of the controller 15, executed when a command is transmitted from the main unit 1 to the subsidiary unit 2.

More specifically, in this case, the controller 15 shown in FIG. 22 performs command transmission processing according to a flowchart shown in FIG. 47 in response to the transmission command disposed in the frame data F1, as the processing corresponding to a command code, performed in step S4 of FIG. 26.

In the command transmission processing, first, in step S171, when the control section 162 receives the frame data F1 from the receiving processing section 167, the control section 162 controls the frame generation section 163 to place the device code of the transmission destination disposed in the command code of the frame data F1 into the device code in the frame data F2. The processing proceeds to step S172.

In step S172, the control section 162 controls the frame generation section 163 to place the code of the freeze command disposed in the command code of the frame data F1 into the command code in the frame data F2. The processing proceeds to step S173.

In step S173, the frame generation section 163 sends the frame data F2, in which the device code of the transmission destination and the command code of the freeze command have been placed as described above, to the transmission processing section 164, and thereby, the frame data F2 is output by an infrared ray, and the processing is finished.

In this case, the frame data F2 includes the device code of the transmission destination, that is, the device code of the subsidiary unit $2_{ij}$. Therefore, in the subsidiary unit $2_{ij}$, the IR interface 155 receives the frame data F2, and sends the command corresponding to the command code, that is, the freeze command, to the CPU 149.

A command sent from the main unit 1 to the subsidiary unit $2ij$ by infrared-ray communications is not limited to a freeze command. Other commands can also be transmitted.

Figure 48:
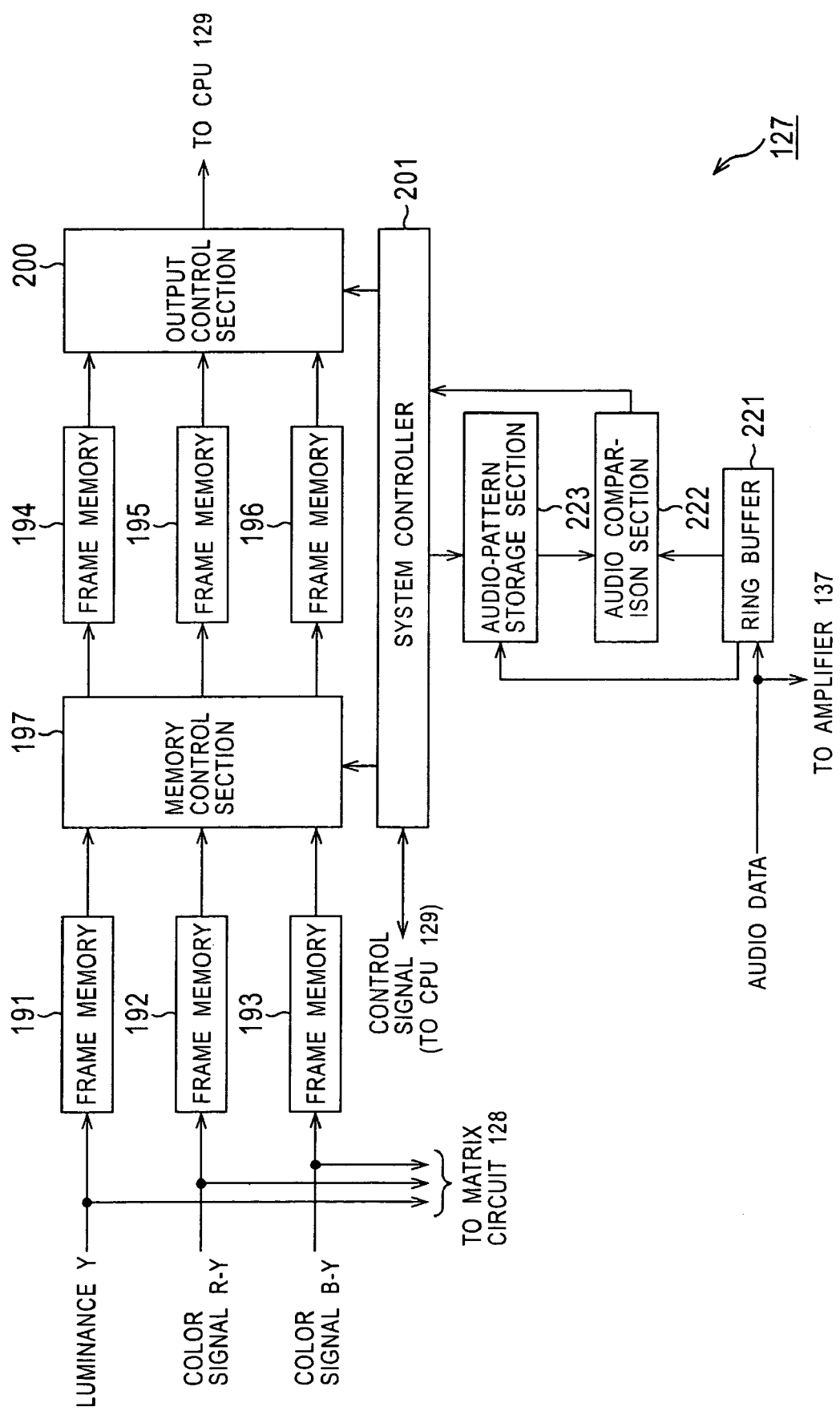
FIG. 48 is a block diagram showing a fifth example structure of the signal processing section 127.

Next, FIG. 48 shows a fifth example functional structure of the signal processing section 127 (FIG. 10) in the main unit 1, which performs virtual-multiple-viewpoint-display processing. In the figure, the same symbols as those used in FIG. 32 are assigned to the portions corresponding to those shown in FIG. 32, and a description thereof is omitted, if unnecessary. In other words, the signal processing section 127 shown in FIG. 48 has basically the same structure as in FIG. 32 except that the difference detection section 198 or the counter section 199 is not provided, and a ring buffer 221, an audio comparison section 222, and an audio-pattern storage section 223 are newly provided.

The ring buffer 221 receives audio data output from the MPEG audio decoder 126 (FIG. 10), and sequentially stores the audio data.

The audio data output from the MPEG audio decoder 126 is sent to the ring buffer, and is also sent to the amplifier 137 in a subsequent stage as is.

The audio comparison section 222 handles the audio data stored in the ring buffer 221 as an input pattern, compares the input pattern with audio data which has been stored in the audio-pattern storage section 223 as a reference pattern, and sends the result of comparison to the system controller 201.

The audio-pattern storage section 223 stores audio data serving as a reference pattern.

The audio data output from the MPEG audio decoder 126 (FIG. 10) and stored in the ring buffer 221 is sent to the audio-pattern storage section 223, and the audio-pattern storage section 223 can store the audio data stored in the ring buffer 221, as a new reference pattern under the control of the system controller 201. In other words, the audio reference pattern stored in the audio-pattern storage section 223 can be updated.

Next, the virtual-multiple-viewpoint-display processing in the main unit, performed by the signal processing section 127 shown in FIG. 48 will be described by referring to a flowchart shown in FIG. 49.

The frame memories 191 to 193 have sequentially stored the luminance signal Y and the color signals R-Y and B-Y of image data sent from the MPEG video decoder 125 (FIG. 10) in an over-writing manner.

The ring buffer 221 has also stored audio data sent from the MPEG audio decoder 126 (FIG. 10) sequentially in an over-writing manner.

In the virtual-multiple-viewpoint-display processing, first, in step S181, the system controller 201 determines whether an audio-pattern registration request has been sent from the CPU 129.

As described above, the audio-pattern storage section 223 can store the audio data stored in the ring buffer 221 as a new reference pattern, that is, can register a new reference pattern. A request for this registration can be performed, for example, by clicking on an audio-pattern-registration-request icon on the menu screen displayed when the menu button switch 84 is operated on the controller 15 (FIG. 7).

In step S181, it is determined whether clicking has been performed on the audio-pattern-registration-request icon.

When it is determined in step S181 that an audio-pattern registration request has not been received, the processing skips step S182 and proceeds to step S183.

When it is determined in step S181 that an audio-pattern registration request has been received, in other words, when the user clicks on the audio-pattern-registration-request icon to thereby send an audio-pattern registration request for requesting the registration of a new reference pattern, from the CPU 129 to the system controller 201, the processing proceeds to step S182, and the system controller 201 stores in the audio-pattern storage section 223, for example, audio data from the latest audio-data sample stored in the ring buffer 221 to the sample back in the past by a predetermined period, as a new reference pattern.

Therefore, when audio data which the user wants to use as a reference pattern is output while the user is listening to the sound of a program output from the speaker units 12L and 12R, the user can operate the controller 15 to register the audio data as a reference pattern.

The audio-pattern storage section 223 can store one reference pattern, that is, can store a new reference pattern on the reference pattern which has already been stored in the audio-pattern storage section 223 in an over-writing manner, and also can store a plurality of reference patterns, that is, can store a new reference pattern in addition to the reference patterns which have already been stored in the audio-pattern storage section 223.

When a new reference pattern is stored in the audio-pattern storage section 223 in step S182, the processing proceeds to step S183, and the audio comparison section 222 reads, for example, all audio data stored in the ring buffer 221 as an input pattern. The processing proceeds to step S184.

In step S184, the audio comparison section 222 reads the reference pattern stored in the audio-pattern storage section 223 to compare it with the input pattern. More specifically, the audio comparison section 222 obtains the distance (hereinafter called a distance between audio patterns, if necessary) between the input pattern and the reference pattern according to a predetermined scale while extending or contracting the time axis, obtains the minimum distance between audio patterns as a feature of the input pattern (against the reference pattern), and sends it to the system controller 201.

Then, the processing proceeds to step S185, and the system controller 201 determines whether the distance between audio patterns obtained as a feature of the input pattern is equal to or smaller than (or smaller than) a predetermined threshold.

When it is determined in step S185 that the distance between audio patterns is larger than the predetermined threshold, the processing skips steps S186 and S187, and proceeds to step S188.

When it is determined in step S185 that the distance between audio patterns is not larger than the predetermined threshold, in other words, that it can be deemed that the input pattern and the reference patter match, the processing proceeds to steps S186 and S187 to perform the same processes as those performed in steps S106 and S108 of FIG. 33. Then, the processing proceeds to step S188.

With this, in the main unit 1, when audio data which is the same as or similar to the reference pattern is output from the MPEG audio decoder 126, the frame of the image data output from the MPEG video decoder 125 is sent to the subsidiary unit $2_{ij}$.

In this case, the signal processing section 147 of the subsidiary unit $2_{ij}$ is structured as shown in FIG. 34, and is executing the virtual-multiple-viewpoint-display processing shown in FIG. 35. Therefore, in the subsidiary unit $2_{ij}$, the frame of the image data sent from the main unit 1 in the above-described way is displayed.

In step S188, it is determined whether the system controller 201 has received a termination command for instructing the termination of the virtual-multiple-viewpoint-display processing, from the CPU 129.

When it is determined in step S188 that a termination command has not been received, the processing returns to step S181, and the same processes are repeated.

When it is determined in step S188 that a termination command has been received, in other words, for example, when the user operates the controller 15 (FIG. 7) to display the menu screen on the CRT 11 and further clicks again on the virtual-multiple-viewpoint-display icon in the menu screen to thereby instruct the CPU 129 to terminate the virtual-multiple-viewpoint-display processing and the CPU 129 sends a termination command to the system controller 201, the virtual-multiple-viewpoint-display processing is terminated in the main unit.

Figure 49:
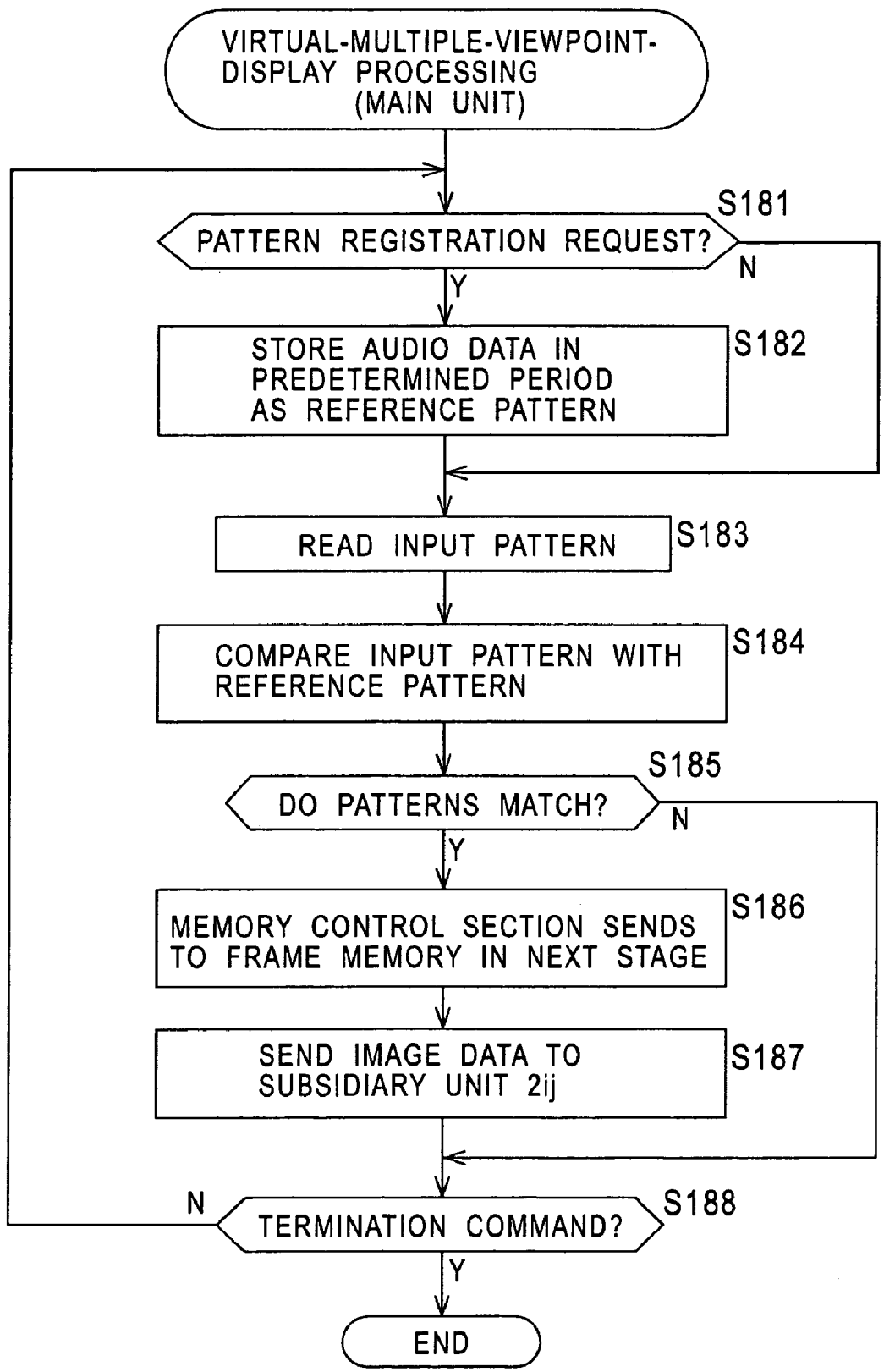
FIG. 49 is a flowchart explaining fifth virtual-multiple-viewpoint-display processing of the main unit, performed by the signal processing unit 127.

According to the virtual-multiple-viewpoint-display processing shown in FIG. 49, when audio data which is the same as or similar to the reference pattern is output from the MPEG audio decoder 126, the frame of the image data output from the MPEG video decoder 125 is displayed in the subsidiary unit $2_{ij}$. Therefore, when audio data output when a special-news telop is run is stored as the reference pattern, for example, the image data broadcasted when the audio data is output, that is, the image data which includes the special-news telop, is displayed in the subsidiary unit $2_{ij}$.

When the audio-pattern storage section 233 has stored a plurality of reference patterns, the input pattern is compared with each of the plurality of reference patterns in step S184 of FIG. 49. If it can be deemed that the input pattern matches at least one of the plurality of patterns, for example, the processes of steps S186 and S187 are performed.

In the above-described case, the distance between audio patterns is obtained as a feature of the audio data serving as the input pattern. The power (or the amplitude level) of the audio data serving as the input pattern can be obtained its feature. In this case, it is possible that the power of the audio data serving as the input pattern is compared with a predetermined threshold, and the fame of the image data output from the MPEG video decoder 125 immediately after the power of the audio data becomes lager or smaller (equal to or larger, or equal to or smaller) than the predetermined threshold is displayed in the subsidiary unit $2_{ij}$.

In addition, the image data displayed in the subsidiary unit $2_{ij}$ is transmitted from the main unit 1 to the subsidiary unit $2_{ij}$, and further, as described above, can be received by the subsidiary unit $2_{ij}$ by sending a freeze command from the main unit 1 to the subsidiary unit $2_{ij}$.

Figure 50:
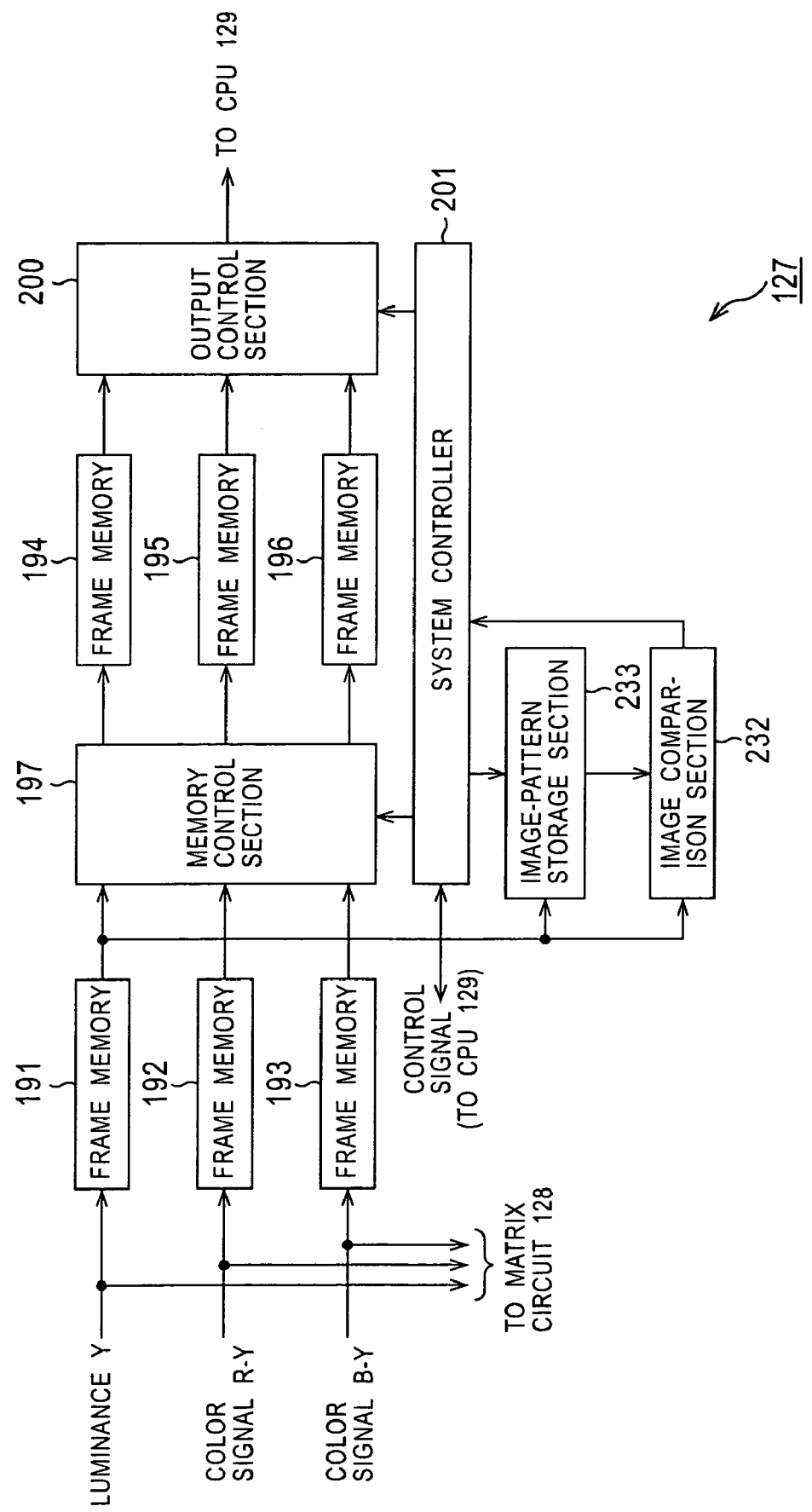
FIG. 50 is a block diagram showing a sixth example structure of the signal processing section 127.

Next, FIG. 50 shows a sixth example functional structure of the signal processing section 127 (FIG. 10) in the main unit 1, which performs virtual-multiple-viewpoint-display processing. In the figure, the same symbols as those used in FIG. 32 are assigned to the portions corresponding to those shown in FIG. 32, and a description thereof is omitted, if unnecessary. In other words, the signal processing section 127 shown in FIG. 50 has basically the same structure as in FIG. 32 except that the difference detection section 198 or the counter section 199 is not provided, and an image comparison section 232 and an image-pattern storage section 233 are newly provided.

The image comparison section 232 handles image data stored in the frame memory 191 as an input pattern, compares the input pattern with image data which has been stored in the image-pattern storage section 233 as a reference pattern, and sends the result of comparison to the system controller 201.

The image-pattern storage section 233 stores image data serving as a reference pattern.

The image data (luminance signal Y thereof) output from the MPEG video decoder 125 (FIG. 10) and stored in the frame memory 191 is sent to the image-pattern storage section 233, and the image-pattern storage section 233 can store the image data stored in the frame memory 191, as a new reference pattern under the control of the system controller 201. In other words, the image reference pattern stored in the image-pattern storage section 233 can be updated.

Next, the virtual-multiple-viewpoint-display processing in the main unit, performed by the signal processing section 127 shown in FIG. 50 will be described by referring to a flowchart shown in FIG. 51.

The frame memories 191 to 193 have sequentially stored the luminance signal Y and the color signals R-Y and B-Y of image data sent from the MPEG video decoder 125 (FIG. 10) in an over-writing manner.

In the virtual-multiple-viewpoint-display processing, first, in step S191, the system controller 201 determines whether an image-pattern registration request has been sent from the CPU 129.

As described above, the image-pattern storage section 233 can store the image data stored in the frame memory 191 as a new reference pattern, that is, can register a new reference pattern. A request for this registration can be performed, for example, by clicking on an image-pattern-registration-request icon on the menu screen displayed when the menu button switch 84 is operated on the controller 15 (FIG. 7).

In step S191, it is determined whether clicking has been performed on the image-pattern-registration-request icon.

When it is determined in step S191 that an image-pattern registration request has not been received, the processing skips step S192 and proceeds to step S193.

When it is determined in step S191 that an image-pattern registration request has been received, in other words, when the user clicks on the image-pattern-registration-request icon to thereby send an image-pattern registration request for requesting the registration of a new reference pattern, from the CPU 129 to the system controller 201, the processing proceeds to step S192, and the system controller 201 stores the image data of the latest frame stored in the frame memory 191 into the image-pattern storage section 233 as a new reference pattern.

Therefore, when image data which the user wants to use as a reference pattern is displayed while the user is viewing the images of a program displayed on the CRT 11, the user can operate the controller 15 to register the image data as a reference pattern.

The image-pattern storage section 233 can store one reference pattern, and also can store a plurality of reference patterns, in the same way as the audio-pattern storage section 223.

When a new reference pattern is stored in the image-pattern storage section 233 in step S192, the processing proceeds to step S193, and the image comparison section 232 reads, for example, the image data of the latest frame stored in the frame memory 191, as an input pattern. The processing proceeds to step S194.

In step S194, the image comparison section 232 reads the reference pattern stored in the image-pattern storage section 233 to compare it with the input pattern. More specifically, the image comparison section 232 obtains the distance (hereinafter called a distance between image patterns, if necessary) between the input pattern and the reference pattern according to a predetermined scale as a feature of the input pattern (against the reference pattern), and sends it to the system controller 201.

The distance between image patterns can, for example, be the sum of the absolute values of the differences between the pixel values of the pixels of the image data serving as an input pattern and the pixel values of the corresponding pixels of the image data serving as a reference pattern.

Here, the input pattern and the reference pattern each are one-frame image data. A part of one-frame image data can be used as the input pattern and the reference pattern.

Further, it is also possible that one-frame image data is used as the input pattern, and a part of one-frame image data is used as the reference pattern. In this case, it is possible that the distances between image patterns are obtained while the positional correspondence between the one-frame image data serving as the input pattern and the part of the one-frame image data serving as the reference pattern is being changed, and the minimum value obtained is used as the final distance between image patterns.

When the distance between image patterns is obtained in step S194, the processing proceeds to step S195, and the system controller 201 determines whether the distance between image patterns obtained as a feature of the input pattern is equal to or smaller than (or smaller than) a predetermined threshold.

When it is determined in step S195 that the distance between image patterns is larger than the predetermined threshold, the processing skips steps S196 and S197, and proceeds to step S198.

When it is determined in step S195 that the distance between image patterns is not larger than the predetermined threshold, in other words, that it can be deemed that the input pattern and the reference patter match, the processing proceeds sequentially to steps S196 and S197 to perform the same processes as those performed in steps S106 and S108 of FIG. 33. Then, the processing proceeds to step S198.

With this, in the main unit 1, when image data which is the same as or similar to the reference pattern is output from the MPEG image decoder 125, the frame of the image data is sent to the subsidiary unit $2_{ij}$.

In this case, the signal processing section 147 of the subsidiary unit $2_{ij}$ is structured as shown in FIG. 34, and is executing the virtual-multiple-viewpoint-display processing shown in FIG. 35. Therefore, in the subsidiary unit $2_{ij}$, the frame of the image data sent from the main unit 1 in the above-described way is displayed.

In step S198, it is determined whether the system controller 201 has received a termination command for instructing the termination of the virtual-multiple-viewpoint-display processing, from the CPU 129.

When it is determined in step S198 that a termination command has not been received, the processing returns to step S191, and the same processes are repeated.

When it is determined in step S198 that a termination command has been received, in other words, for example, when the user operates the controller 15 (FIG. 7) to display the menu screen on the CRT 11 and further clicks again on the virtual-multiple-viewpoint-display icon in the menu screen to thereby instruct the CPU 129 to terminate the virtual-multiple-viewpoint-display processing and the CPU 129 sends a termination command to the system controller 201, the virtual-multiple-viewpoint-display processing is terminated in the main unit.

Figure 51:
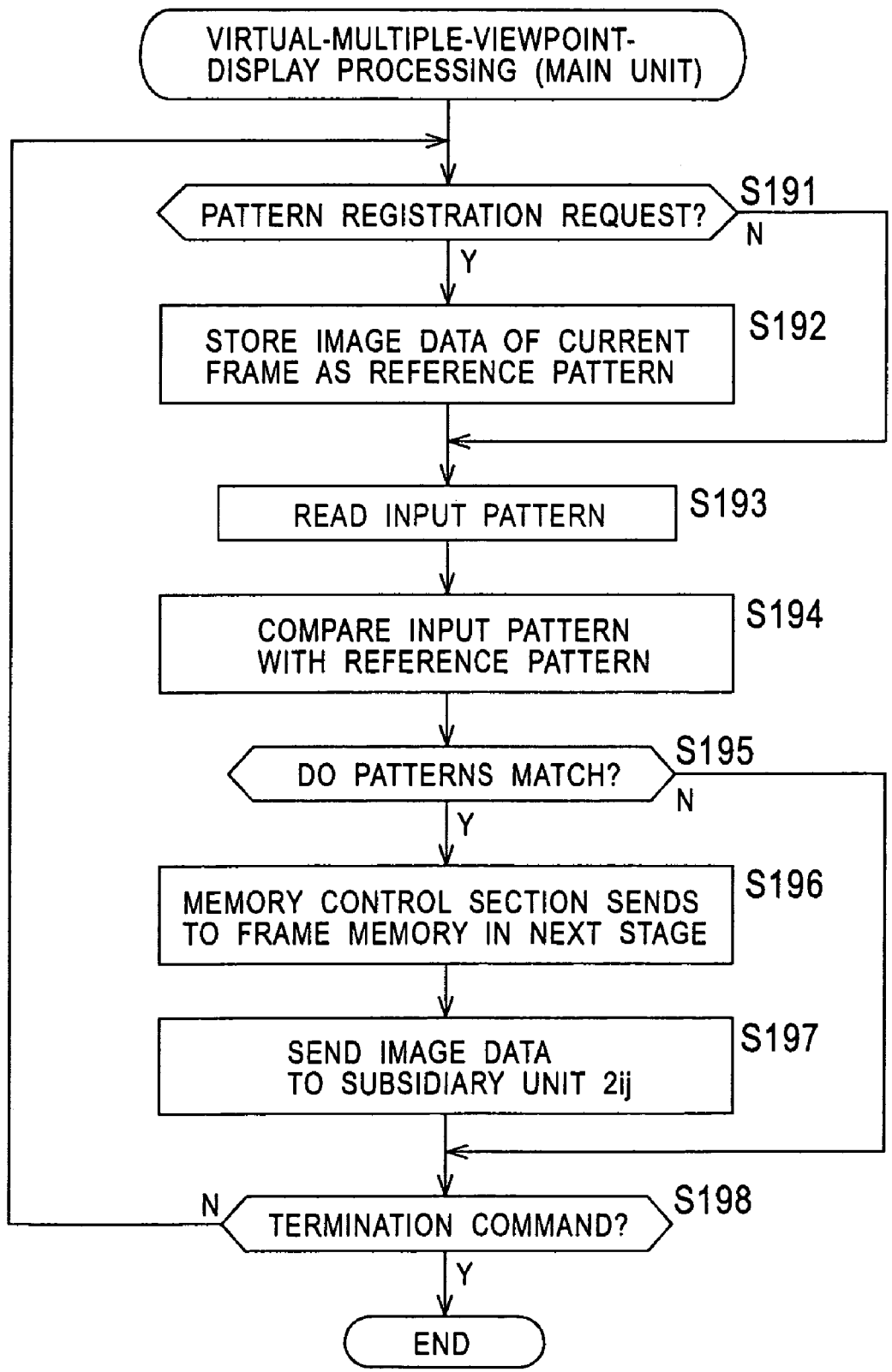
FIG. 51 is a flowchart explaining sixth virtual-multiple-viewpoint-display processing of the main unit, performed by the signal processing unit 127.

According to the virtual-multiple-viewpoint-display processing shown in FIG. 51, when image data which is the same as or similar to the reference pattern is output from the MPEG image decoder 125, the frame of the image data is displayed in the subsidiary unit $2_{ij}$.

Therefore, when image data of a scoreboard shown in a close-up manner in a real-time program of a professional baseball game is stored as a reference pattern, image data broadcasted thereafter and having the same pattern as or a similar pattern to the image data serving as a reference pattern, that is, image data broadcasted thereafter of the scoreboard displayed in a close-up manner, is displayed in the subsidiary unit $2_{ij}$.

Figure 52A:
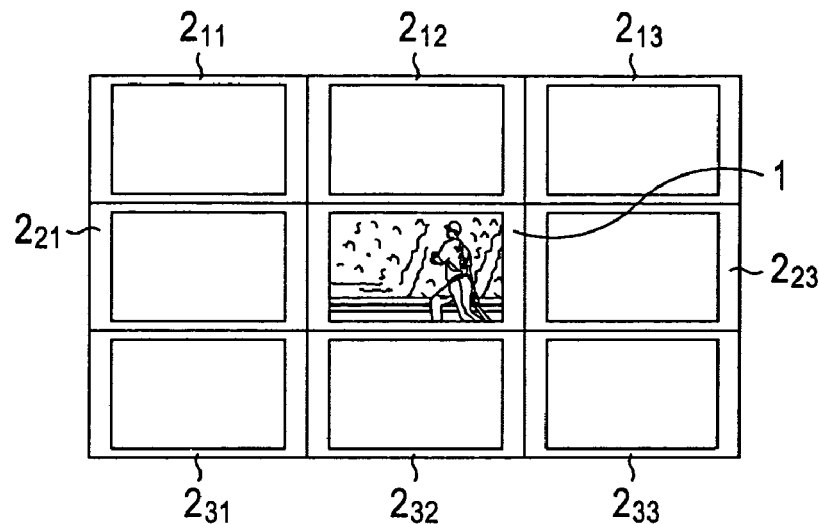
FIG. 52A is a view showing example display in the main unit 1 and the subsidiary units 2 constituting the scalable TV system.
Figure 52B:
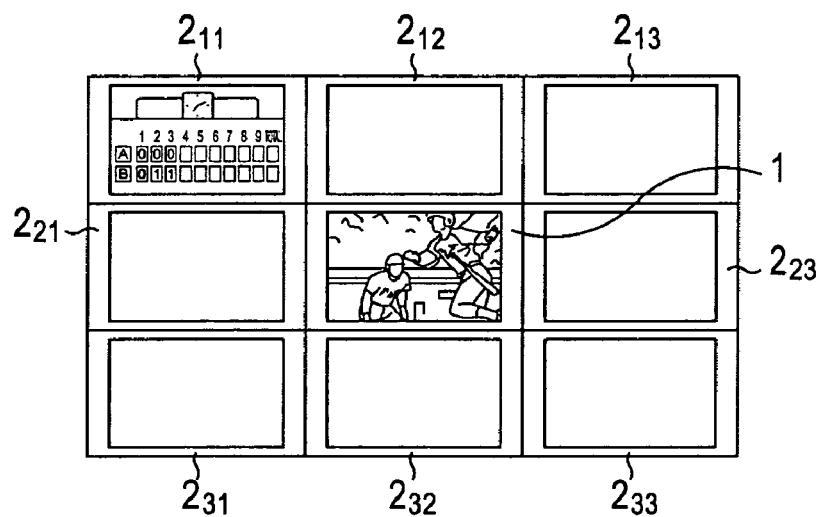
FIG. 52B is a view showing example display in the main unit 1 and the subsidiary units 2 constituting the scalable TV system.
Figure 52C:
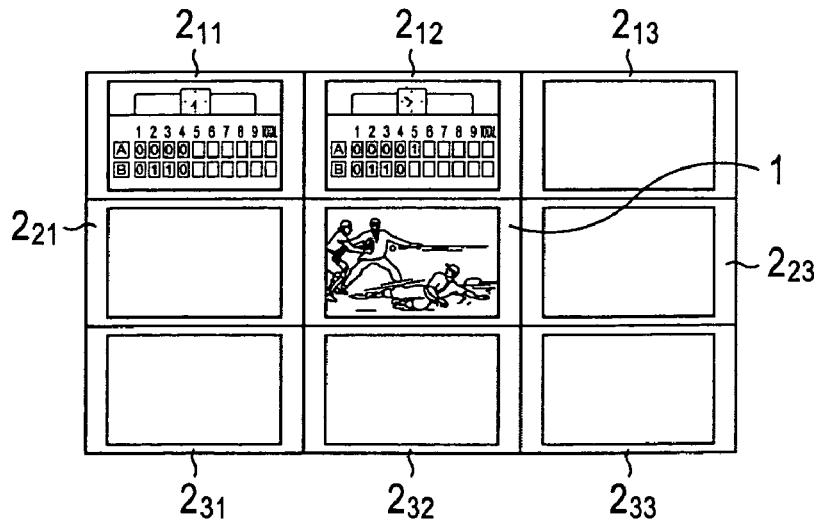
FIG. 52C is a view showing example display in the main unit 1 and the subsidiary units 2 constituting the scalable TV system.

More specifically, when image data of a scoreboard shown in a close-up manner in a real-time program of a professional baseball game is stored as a reference pattern, while the main unit 1 is receiving the program of the professional baseball game as shown in FIG. 52A, if the image data of the scoreboard is broadcasted in a close-up manner in a certain inning thereafter, the image data of the scoreboard is displayed in a close-up manner in the subsidiary unit $2_{11}$, for example, as shown in FIG. 52B. Further, thereafter, when the image data of the scoreboard is broadcasted in a close-up manner in the next inning again, the image data of the scoreboard is displayed in a close-up manner in the subsidiary unit $2_{12}$, for example, as shown in FIG. 52C.

When the image of a scoreboard is broadcasted in a close-up manner at the start of each inning in a real-time television broadcasting program of a professional baseball game, the image of the scoreboard is sequentially displayed in a close-up manner in the subsidiary unit $2_{ij}$ constituting the scalable TV system, as described above.

Therefore, in this case, the user can see the display of the subsidiary unit $2_{ij}$ to recognize the transition of the score in each inning.

Figure 53:
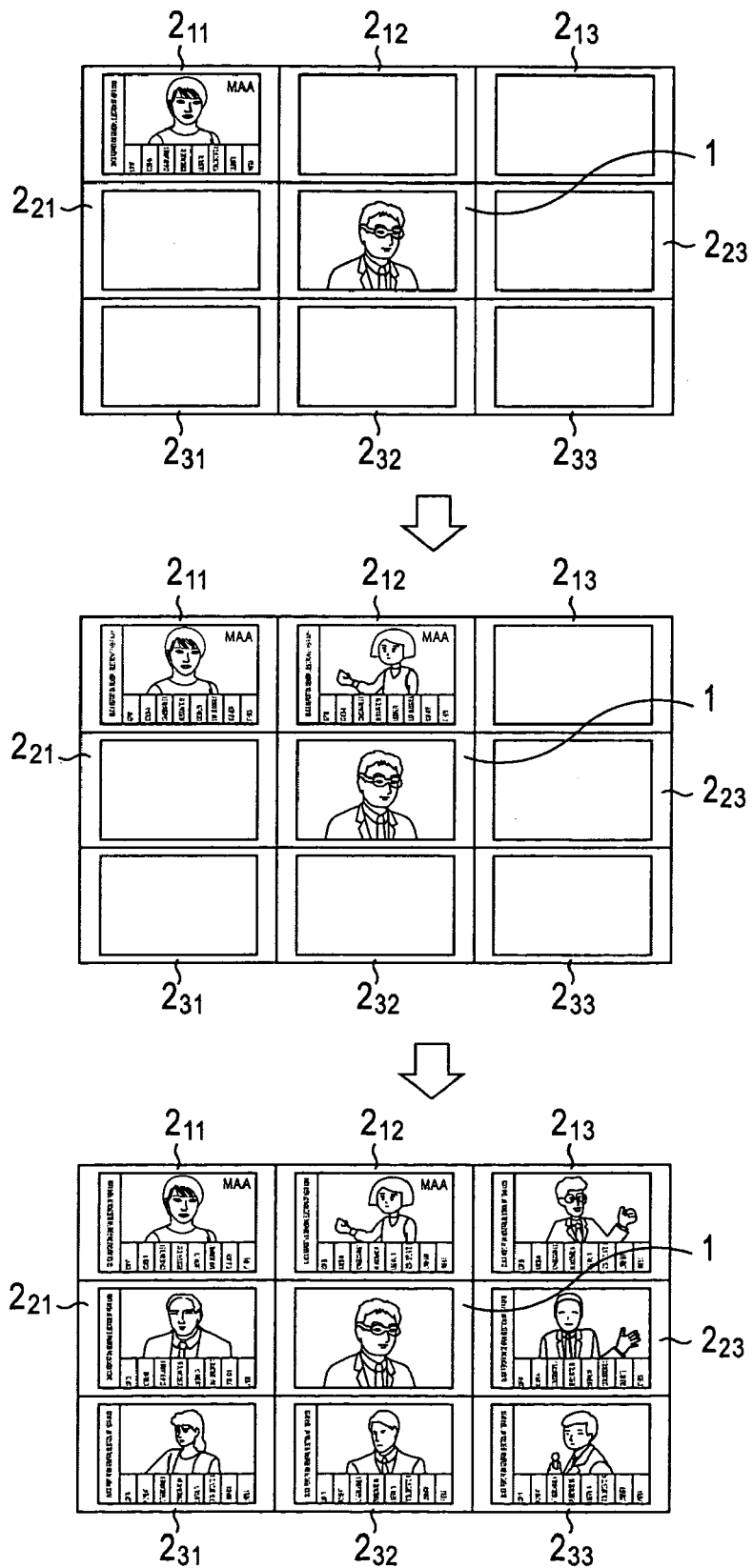
FIG. 53 is a view showing example display in the main unit 1 and the subsidiary units 2 constituting the scalable TV system.

In a quick-report program of elections, image data is displayed in which the face of an elected person is shown in a close-up manner while a telop indicating the number of elected persons in each party is superposed thereon. When such image data is stored in the image-pattern storage section 233 as a reference pattern, if the main unit 1 receives the quick-report program of elections, image data broadcasted in the quick-report program of elections, in which the face of an elected person is shown in a close-up manner is sequentially displayed in the subsidiary unit $2_{ij}$ constituting the scalable TV system, as shown in FIG. 53.

Therefore, in this case, the user can see the display of the subsidiary unit $2ij$ to recognize the elected persons.

Figure 54:
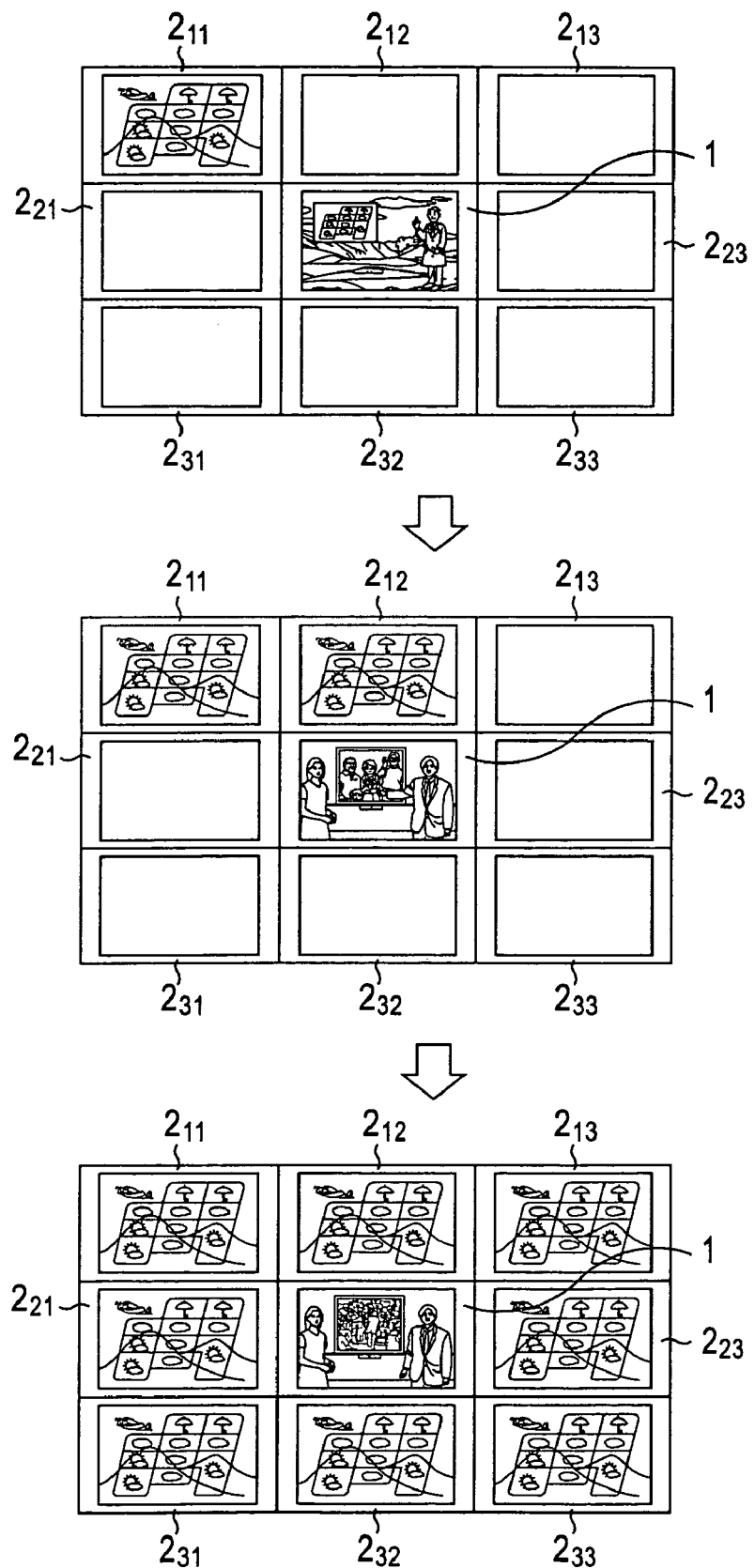
FIG. 54 is a view showing example display in the main unit 1 and the subsidiary units 2 constituting the scalable TV system.

Furthermore, for example, a broadcasting station frequently broadcasts weather forecasts in a day. When the image data of a map of Japan (or a map of a local area, such as the Kanto area) used in a weather-forecast program is stored in the image-pattern storage section 233 as a reference pattern, if the main unit 1 receives a weather-forecast program, weather charts broadcasted in the weather forecast are sequentially displayed in the subsidiary unit $2_{ij}$ constituting the scalable TV system, as shown in FIG. 54.

Therefore, in this case, the user can see the display of the subsidiary unit $2_{ij}$ to easily recognize weather forecasts broadcasted in the same channel at different time zones and weather forecasts broadcasted in different channels.

Image data to be displayed in the subsidiary unit $2_{ij}$ is sent from the main unit 1 to the subsidiary unit $2_{ij}$. In addition, as described above, the image data can be received by the subsidiary unit $2_{ij}$ by sending a freeze command from the main unit 1 to the subsidiary unit $2_{ij}$.

Figure 55:
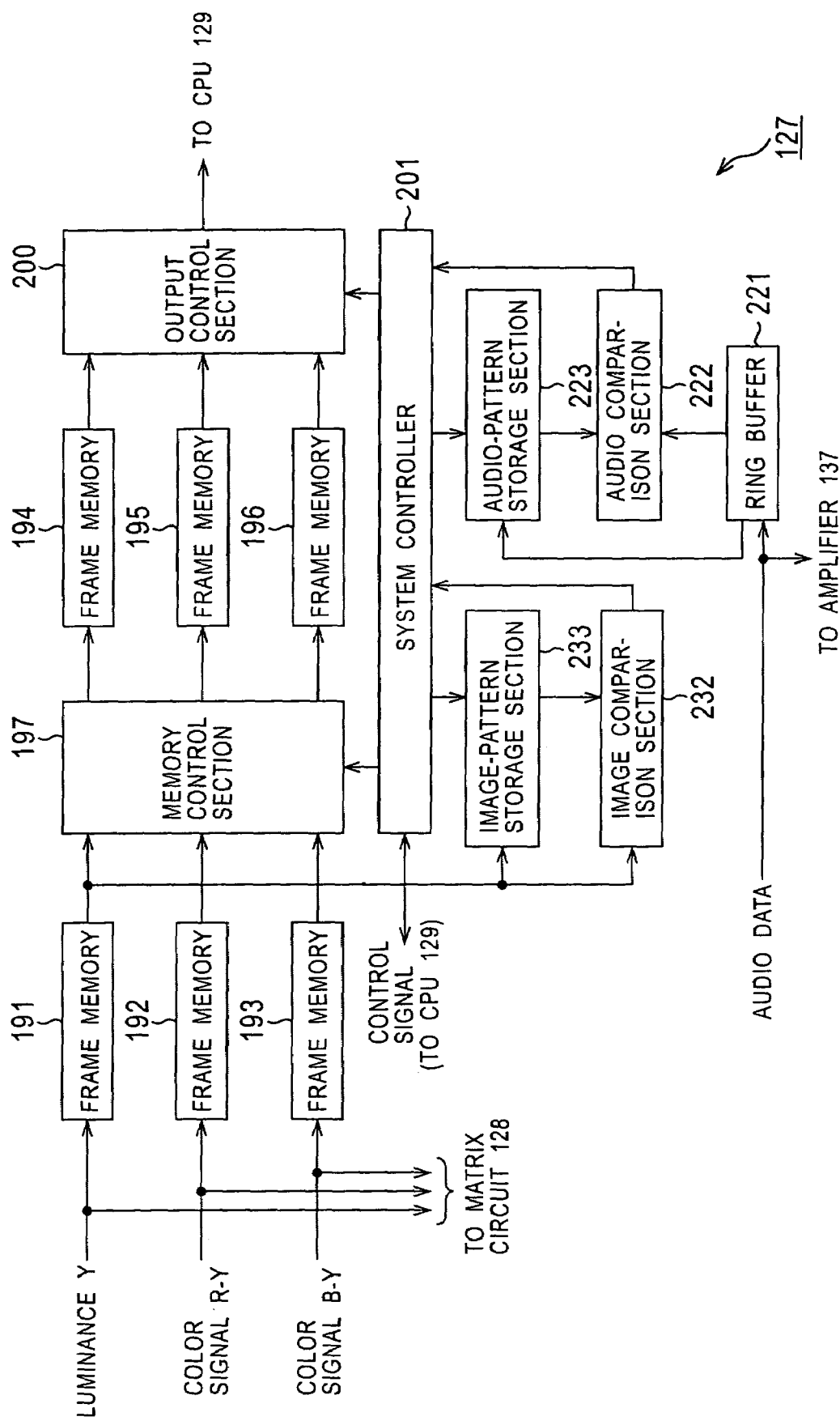
FIG. 55 is a block diagram showing a seventh example structure of the signal processing section 127.

Next, FIG. 55 shows a seventh example functional structure of the signal processing section 127 (FIG. 10) in the main unit 1, which performs virtual-multiple-viewpoint-display processing. In the figure, the same symbols as those used in FIG. 32, FIG. 48, or FIG. 50 are assigned to the portions corresponding to those shown in FIG. 32, FIG. 48, or FIG. 50, and a description thereof is omitted, if unnecessary. In other words, the signal processing section 127 shown in FIG. 55 has basically the same structure as in FIG. 32 except that the difference detection section 198 or the counter section 199 shown in FIG. 32 is not provided, the ring buffer 221, the audio comparison section 222, and the audio-pattern storage section 223 shown in FIG. 48 are newly provided, and the image comparison section 232 and the image-pattern storage section 233 shown in FIG. 50 are newly provided.

Figure 56:
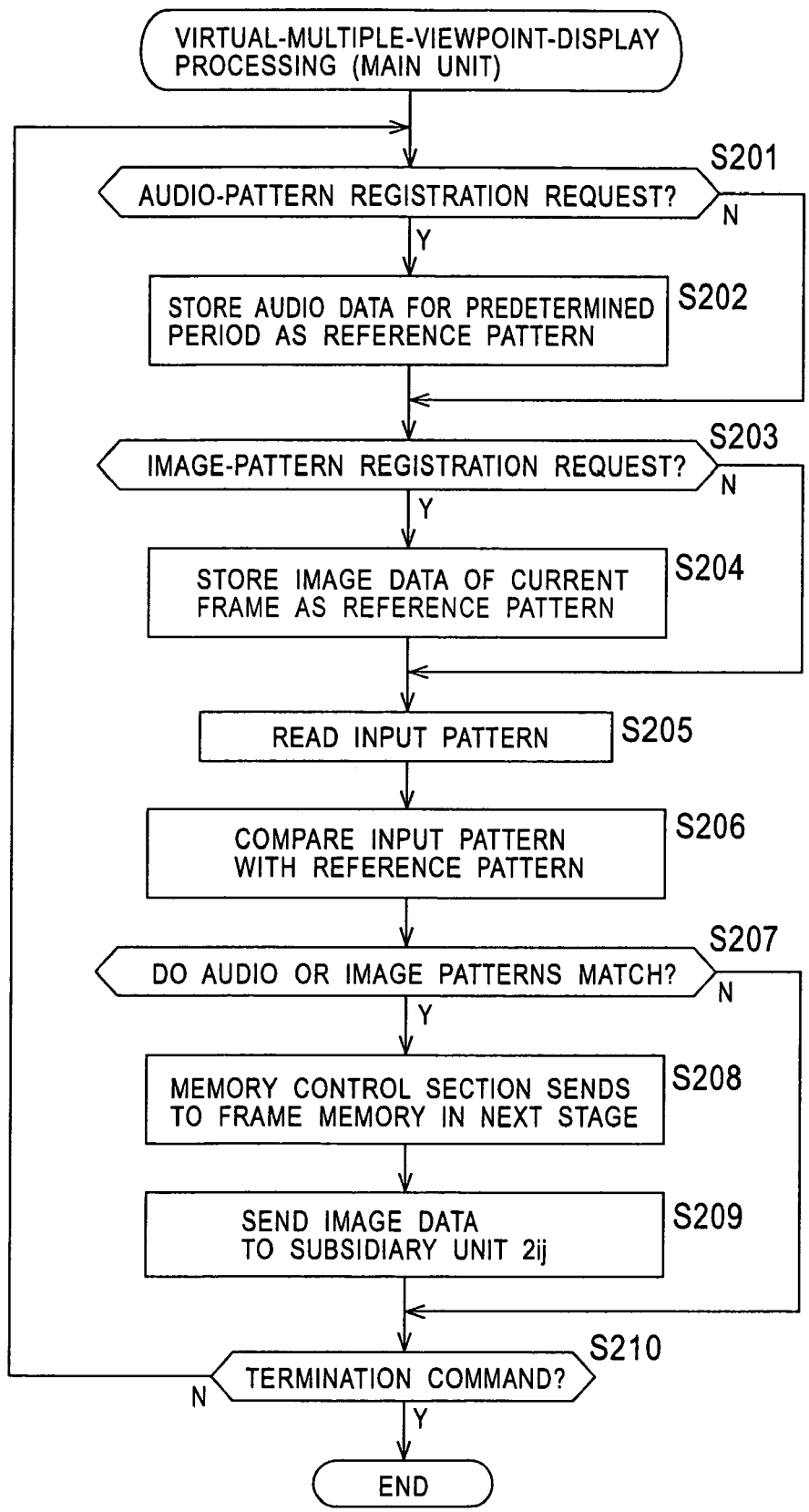
FIG. 56 is a flowchart explaining seventh virtual-multiple-viewpoint-display processing of the main unit, performed by the signal processing unit 127.

Next, the virtual-multiple-viewpoint-display processing in the main unit, performed by the signal processing section 127 shown in FIG. 55 will be described by referring to a flowchart shown in FIG. 56.

The frame memories 191 to 193 have sequentially stored the luminance signal Y and the color signals R-Y and B-Y of image data sent from the MPEG video decoder 125 (FIG. 10) in an over-writing manner.

The ring buffer 221 has also stored audio data sent from the MPEG audio decoder 126 (FIG. 10) sequentially in an over-writing manner.

In the virtual-multiple-viewpoint-display processing, first, in step S201, the system controller 201 determines whether an audio-pattern registration request has been sent from the CPU 129, in the same way as in step S181 of FIG. 49. When it is determined that an audio-pattern registration request has not been received, the processing skips step S202 and proceeds to step S203.

When it is determined in step S201 that an audio-pattern registration request has been received, the processing proceeds to step S202, and the system controller 201 stores audio data stored in the ring buffer 221 for a predetermined period as a new reference pattern in the audio-pattern storage section 223, in the same way as in step S183 of FIG. 49. The processing proceeds to step S203.

In step S203, the system controller 201 determines whether an image-pattern registration request has been sent from the CPU 129, in the same way as in step S191 of FIG. 51. When it is determined that an image-pattern registration request has not been received, the processing skips step S204 and proceeds to step S205.

When it is determined in step S203 that an image-pattern registration request has been received, the processing proceeds to step S204, and the system controller 201 stores the image data of the latest frame stored in the frame memory 191 into the image-pattern storage section 233 as a new reference pattern, in the same way as in step S192 of FIG. 51. The processing proceeds to step S205.

In step S205, the audio comparison section 222 reads audio data stored in the ring buffer 221 as an audio input pattern, in the same way as in step S183 of FIG. 49. Also in step S205, the image comparison section 232 reads the image data stored in the frame memory 191 as an image input pattern, in the same way as in step S193 of FIG. 51. The processing proceeds to step S206.

In step S206, the audio comparison section 222 compares the audio reference pattern stored in the audio-pattern storage section 223 with the audio input pattern, in the same way as in step S184 of FIG. 49, to thereby obtain the distance between audio patterns as a feature of the audio data serving as the audio input pattern, and sends it to the system controller 201. Also in step S206, the image comparison section 232 compares the image reference pattern stored in the image-pattern storage section 233 with the image input pattern, in the same way as in step S194 of FIG. 51, to thereby obtain the distance between image patterns as a feature of the image data serving as the image input pattern, and sends it to the system controller 201.

Then, the processing proceeds to step S207, the system controller 201 determines whether the distance between audio patterns obtained as a feature of the audio input pattern is equal to or smaller than (or smaller than) a predetermined threshold, in the same way as in step S185 of FIG. 49, or determines whether the distance between image patterns obtained as a feature of the image input pattern is equal to or smaller than (or smaller than) a predetermined threshold, in the same way as in step S195 of FIG. 51.

When it is determined in step S207 that the distance between audio patterns is larger than the predetermined threshold and the distance between image patterns is also larger than the predetermined threshold, the processing skips steps S208 and S209, and proceeds to step S210.

When it is determined in step S207 that the distance between audio patterns is equal to or smaller than the predetermined threshold, or the distance between image patterns is equal to or smaller than the predetermined threshold, in other words, that it can be deemed that the audio input pattern and the audio reference pattern match or it can be deemed that the image input pattern and the image reference pattern match, the processing proceeds sequentially to steps S208 and S209 to perform the same processes as those performed in steps S106 and S108 of FIG. 33. Then, the processing proceeds to step S210.

With this, in the main unit 1, the frame of the image data output from the MPEG video decoder 125 when audio data which is the same as or is similar to the audio reference pattern is output from the MPEG audio decoder 126 is sent to the subsidiary unit $2_{ij}$, or when image data which is the same as or similar to the image reference pattern is output from the MPEG image decoder 125, the frame of the image data is sent to the subsidiary unit $2_{ij}$.

In step S210, it is determined whether the system controller 201 has received a termination command for instructing the termination of the virtual-multiple-viewpoint-display processing, from the CPU 129.

When it is determined in step S210 that a termination command has not been received, the processing returns to step S201, and the same processes are repeated.

When it is determined in step S210 that a termination command has been received, in other words, for example, when the user operates the controller 15 (FIG. 7) to display the menu screen on the CRT 11 and further clicks again on the virtual-multiple-viewpoint-display icon in the menu screen to thereby instruct the CPU 129 to terminate the virtual-multiple-viewpoint-display processing and the CPU 129 sends a termination command to the system controller 201, the virtual-multiple-viewpoint-display processing is terminated in the main unit.

When the signal processing section 127 of the main unit 1 is structured as shown in FIG. 55, the signal processing section 147 of the subsidiary unit $2_{ij}$ is structured as shown in FIG. 34, and is executing the virtual-multiple-viewpoint-display processing shown in FIG. 35. Therefore, in the subsidiary unit $2_{ij}$, the frame of the image data sent from the main unit 1 in the above-described way is displayed. More specifically, in the subsidiary unit $2_{ij}$, the frame of the image data output from the MPEG video decoder 125 when audio data which is the same as or is similar to the audio reference pattern is output from the MPEG audio decoder 126 is displayed, or when image data which is the same as or similar to the image reference pattern is output from the MPEG image decoder 125, the frame of the image data is displayed.

In the above-described case, when the distance between audio patterns is equal to or smaller than the predetermined threshold, or the distance between image patterns is equal to or smaller than the predetermined threshold, the processes of steps S208 and S209 are performed. It is also possible that the processes of steps S208 and S209 are performed, for example, only when the distance between audio patterns is equal to or smaller than the predetermined threshold, and the distance between image patterns is equal to or smaller than the predetermined threshold, in other words, when it can be deemed that the audio input pattern and the audio reference pattern match and it can be deemed that the image input pattern and the image reference pattern match.

In this case, in the subsidiary unit $2_{ij}$, if the image data output from the MPEG video decoder 125 when audio data which is the same as or is similar to the audio reference pattern is output from the MPEG audio decoder 126 is the same as or similar to the image reference pattern, the frame of the image data is displayed.

Figure 57:
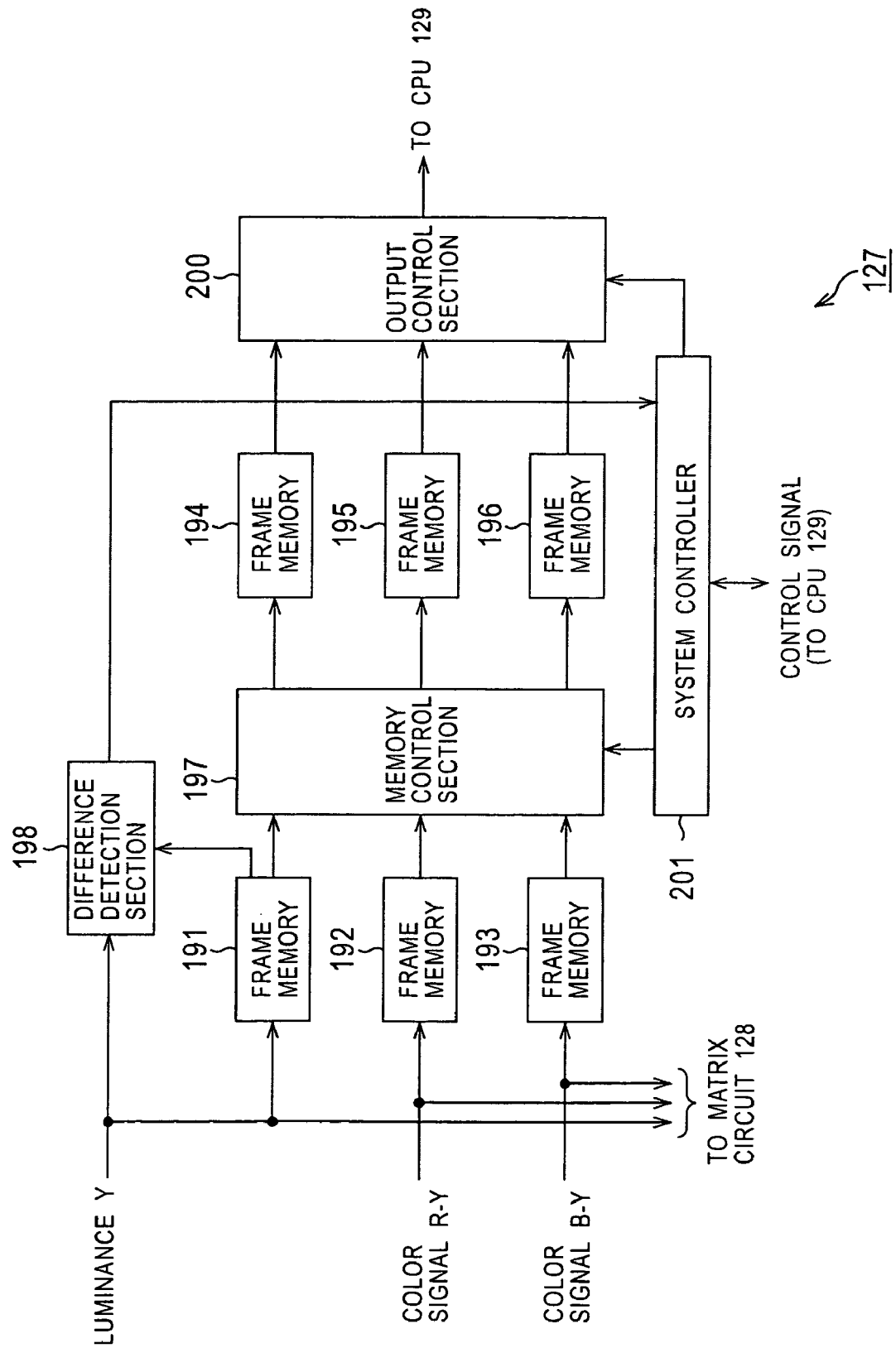
FIG. 57 is a block diagram showing an eighth example structure of the signal processing section 127.

Next, FIG. 57 shows an eighth example functional structure of the signal processing section 127 (FIG. 10) in the main unit 1, which performs virtual-multiple-viewpoint-display processing. In the figure, the same symbols as those used in FIG. 38 are assigned to the portions corresponding to those shown in FIG. 38, and a description thereof is omitted, if unnecessary. In other words, the signal processing section 127 shown in FIG. 57 has basically the same structure as the signal processing section 127 shown in FIG. 38.

Next, the virtual-multiple-viewpoint-display processing in the main unit, performed by the signal processing section 127 shown in FIG. 57 will be described by referring to a flowchart shown in FIG. 58.

First, in step S221, the system controller 201 specifies a default still-picture subsidiary unit and a default scene-change subsidiary unit among the subsidiary units 2 constituting the scalable TV system.

The still-picture subsidiary unit is a subsidiary unit for displaying image data which can be regarded as a still picture having no (little) motion among image data displayed in the main unit 1. The scene-change subsidiary unit is a subsidiary unit for displaying image data obtained immediately after the scene is changed, among image data displayed in the main unit 1.

In step S221, for example, the system controller 201 sets the subsidiary unit $2_{21}$, disposed next to the main unit 1 in the left to the default still-picture subsidiary unit, and the subsidiary unit $2_{23}$, disposed next to the main unit in the right to the default scene-change subsidiary unit.

Then, the processing proceeds to step S222, and the system controller 201 determines whether the CPU 129 has specified a still-picture subsidiary unit.

More specifically, as a still-picture subsidiary unit, a subsidiary unit $2_{ij}$ other than the subsidiary unit $2_{21}$, which has been specified as the default still-picture subsidiary unit, can be specified. For example, the user can operate the menu button switch 84 on the controller 15 (FIG. 7) to display the menu screen and click on an icon for specifying a still-picture subsidiary unit to specify a still-picture subsidiary unit.

In step S222, it is determined whether clicking has been made on the icon for specifying a still-picture subsidiary unit.

When it is determined in step S222 that a still-picture subsidiary unit has not been specified, the processing skips step S223 and proceeds to step S224.

When it is determined in step S222 that a still-picture subsidiary unit has been specified, in other words, when the user operates the controller 15, clicks on the icon for specifying a still-picture subsidiary unit, and specifies a subsidiary unit $2_{ij}$ as a still-picture subsidiary unit, and thereby, the CPU 129 sends a command for instructing the subsidiary unit $2_{ij}$ to be specified as a still-picture subsidiary unit, to the system controller 201, the processing proceeds to step S223 and the system controller 201 sets the specified subsidiary unit $2_{ij}$ (recognizes it as a still-picture subsidiary unit) as a still-picture subsidiary unit. Then, the processing proceeds to step S224.

In step S224, the system controller 201 determines whether the CPU 129 has specified a scene-change subsidiary unit.

More specifically, as a scene-change subsidiary unit, a subsidiary unit $2_{ij}$ other than the subsidiary unit $2_{23}$, which has been specified as the default scene-change subsidiary unit, can be specified. For example, the user can operate the menu button switch 84 on the controller 15 (FIG. 7) to display the menu screen and click on an icon for specifying a scene-change subsidiary unit to specify a scene-change subsidiary unit.

In step S224, it is determined whether clicking has been made on the icon for specifying a scene-change subsidiary unit.

When it is determined in step S224 that a scene-change subsidiary unit has not been specified, the processing skips step S225 and proceeds to step S226.

When it is determined in step S224 that a scene-change subsidiary unit has been specified, in other words, when the user operates the controller 15, clicks on the icon for specifying a scene-change subsidiary unit, and specifies a subsidiary unit $2_{ij}$ as a scene-change subsidiary unit, and thereby, the CPU 129 sends a command for instructing the subsidiary unit $2_{ij}$ to be specified as a scene-change subsidiary unit, to the system controller 201, the processing proceeds to step S225 and the system controller 201 sets the specified subsidiary unit $2_{ij}$ as a scene-change subsidiary unit. Then, the processing proceeds to step S226.

In step S226, the frame memories 191 to 193 wait for a luminance signal Y and color signals R-Y and B-Y serving as one-frame image data to reach from the MPEG video decoder 125 (FIG. 10) and store the luminance signal Y and the color signals R-Y and B-Y. The processing proceeds to step S227.

In step S227, the difference detection section 198 detects (obtains) the sum of the absolute values of the differences between the luminance signals Y (the luminance signals Y of the image data in the current frame) of the image data stored in the frame memory 191 in step S101 performed immediately before, and the luminance signals Y (the luminance signals Y of the image data in the preceding frame) of the image data stored in the frame memory 191 in step S101 performed in the preceding operation, that is, the sum of the absolute values of the differences for the current frame, as a feature of the current-frame image data, and sends the sum to the system controller 201.

Then, the processing proceeds to step S228. The system controller 201 determines whether the sum of the absolute values of the differences for the current frame is almost zero, that is, whether the sum is less than (or equal to or less than) a small positive threshold Th2.

When it is determined in step S228 that the sum of the absolute values of the differences for the current frame is less than the threshold Th2, that is, when the current-frame image has little (or no) change from the preceding-frame image, and therefore, is can be deemed that the current-frame image is a still picture, the processing proceeds to step S229, and the system controller 210 controls the memory control section 197 to send the image data (the luminance signal Y and the color signals R-Y and B-Y thereof) of the current frame stored in the frame memories 191 to 193 to the frame memories 194 to 196, and to store the data therein in an over-writing manner. The processing proceeds to step S230.

In step S230, the system controller 201 controls the output control section 200 to read the luminance signal Y and the color signals R-Y and B-Y of the one-frame image data stored in the frame memories 194 to 196, and to send them to the CPU 129. In addition, in step S230, the system controller 201 sends a display request command for instructing the image data to be displayed in the subsidiary unit, to the CPU 129. The processing proceeds to step S234.

When the CPU 129 receives the display request command for instructing the display in the still-picture subsidiary unit, from the system controller 201, the CPU 129 controls the IEEE-1394 interface 133 to send the one-frame image data (luminance signal Y and color signals R-Y and B-Y thereof) sent from the output control section 200, to the still-picture subsidiary unit together with the display request command for instructing the image data to be displayed. The signal processing section 147 of the subsidiary unit $2_{ij}$ serving as a still-picture subsidiary unit is structured as shown in FIG. 34 and is executing the virtual-multiple-viewpoint-display processing shown in FIG. 35. Therefore, in the still-picture subsidiary unit, the image data of the current frame having little change from the preceding frame is sent among image data displayed in the main unit 1, and displayed.

On the other hand, when it is determined in step S228 that the sum of the absolute values of the differences for the current frame is not smaller than the threshold Th2, the processing proceeds to step S231, and the system controller 201 determines whether the sum of the absolute values of the differences for the current frame is larger (or equal to or larger than) a threshold Th1 which is sufficiently larger than the threshold Th2.

When it is determined in step S231 that the sum of the absolute values of the differences for the current frame is not larger than the threshold Th1, the processing skips steps S232 and S233 and proceeds to step S234.

When it is determined in step S231 that the sum of the absolute values of the differences for the current frame is larger than the threshold Th1, in other words, when the image of the current frame has been changed largely from the image of the preceding frame, and therefore, the current frame has a scene change, the processing proceeds to step S232, and the system controller 210 controls, in the same way as in step S229, the memory control section 197 to send the luminance signal Y and the color signals R-Y and B-Y the image data of the current frame stored in the frame memories 191 to 193 to the frame memories 194 to 196, and to store them therein in an over-writing manner. The processing proceeds to step S233.

In step S233, the system controller 201 controls the output control section 200 to read the luminance signal Y and the color signals R-Y and B-Y of the one-frame image data stored in the frame memories 194 to 196, and to send them to the CPU 129. In addition, in step S233, the system controller 201 sends a display request command for instructing the image data to be displayed in the scene-change subsidiary unit, to the CPU 129. The processing proceeds to step S234.

When the CPU 129 receives the display request command for instructing the display in the scene-change subsidiary unit, from the system controller 201, the CPU 129 controls the IEEE-1394 interface 133 to send the one-frame image data (luminance signal Y and color signals R-Y and B-Y thereof) sent from the output control section 200, to the scene-change subsidiary unit together with the display request command. The signal processing section 147 of the subsidiary unit $2_{ij}$ serving as a scene-change subsidiary unit is structured as shown in FIG. 34 and is executing the virtual-multiple-viewpoint-display processing shown in FIG. 35. Therefore, in the scene-change subsidiary unit, the image data obtained immediately after a scene change is sent among image data displayed in the main unit 1, and displayed.

In step S234, it is determined whether the system controller 201 has received a termination command for instructing the virtual-multiple-viewpoint-display processing to be terminated, from the CPU 129.

When it is determined in step S234 that a termination command has not been received, the processing returns to step S221 and the same processes are repeated thereafter.

When it is determined in step S234 that a termination command has been received, in other words, for example, when the user operates the controller 15 (FIG. 7) to display the menu screen on the CRT 11 and further clicks again on the virtual-multiple-viewpoint-display icon in the menu screen to thereby instruct the CPU 129 to terminate the virtual-multiple-viewpoint-display processing and the CPU 129 sends a termination command to the system controller 201, the virtual-multiple-viewpoint-display processing is terminated in the main unit.

As described above, according to the embodiment shown in FIG. 57 and FIG. 58, image data having no motion in the program being received by the main unit 1 is displayed in the still-picture subsidiary unit, image data obtained after a scene change in the program being received by the main unit 1 is displayed in the scene-change subsidiary unit.

Here, one subsidiary unit serves as a still-picture subsidiary unit. It is possible that a plurality of subsidiary units serve as still-picture subsidiary units and the plurality of subsidiary units sequentially display image data sent from the main unit 1 as described by referring to FIG. 37A to FIG. 37C. This can also be applied to scene-change subsidiary units.

Figure 59:
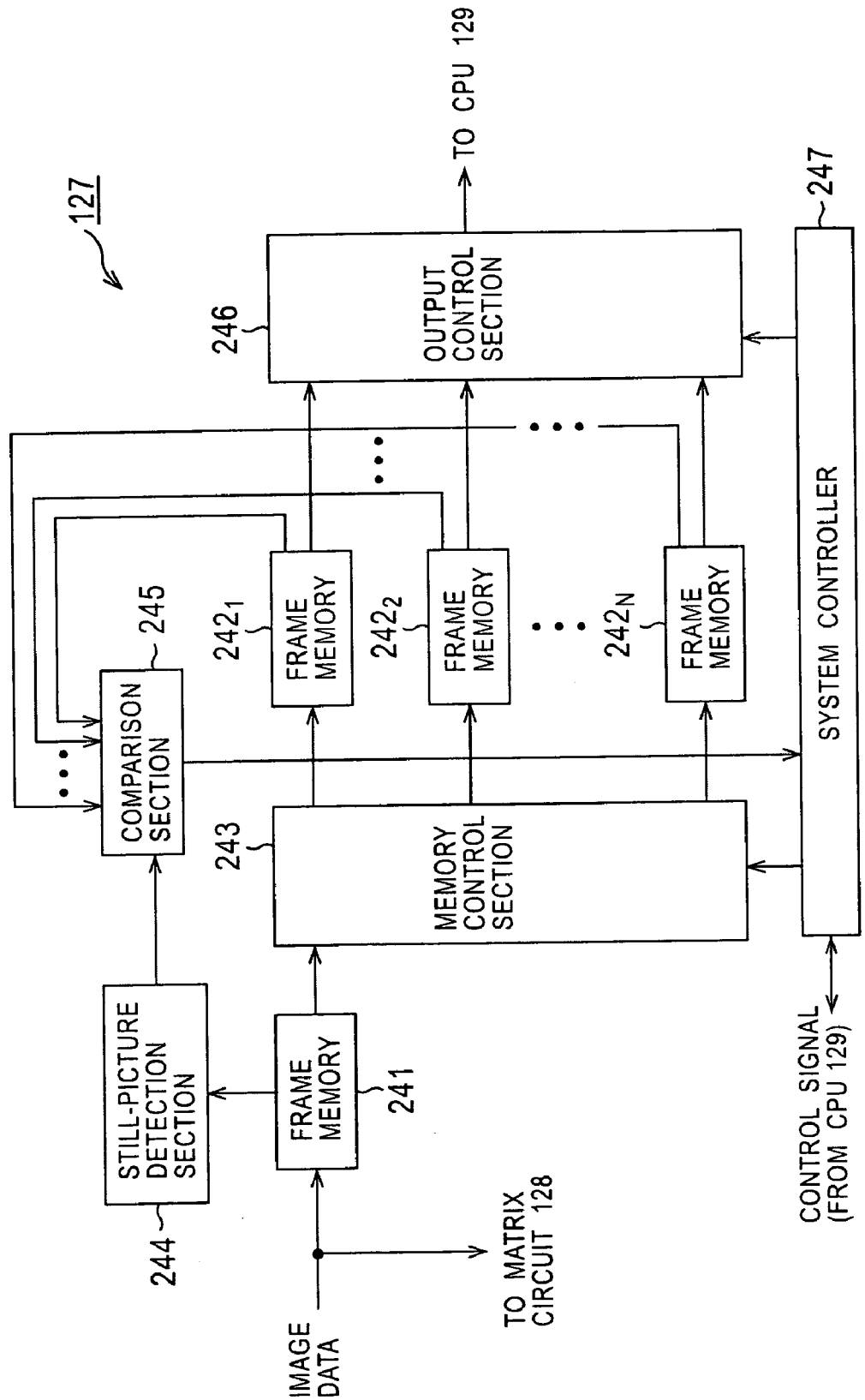
FIG. 59 is a block diagram showing a ninth example structure of the signal processing section 127.

Next, FIG. 59 shows a ninth example functional structure of the signal processing section 127 (FIG. 10) in the main unit 1, which performs virtual-multiple-viewpoint-display processing.

A frame memory 241 receives image data output from the MPEG video decoder 125 (FIG. 10), and temporarily stores the image data. More specifically, the frame memory 241 has, for example, a storage capacity that allows image data of at least two frames to be stored, and sequentially stores image data in a manner in which the latest image data is overwritten on image data of a frame older in time.

In the present embodiment, as described above, the MPEG video decoder 125 outputs a luminance signal Y and color signals R-Y and B-Y as image data. In FIG. 59, the luminance signal Y and the color signals R-Y and B-Y are collectively called image data.

The image data output from the MPEG video decoder 125 is sent to the matrix circuit 128 (FIG. 10) in a subsequent stage as is, as well as to the frame memory 241.

In the embodiment shown in FIG. 59, audio data output from the MPEG audio decoder 126 is sent to the amplifier 137 in a subsequent stage through the signal processing section 127, but the audio data is not shown in FIG. 59.

N frame memories $242_1$ to $242_N$ temporarily store the image data stored in the frame memory 241 and sent from the memory control section 243.

The memory control section 243 is controlled by a system controller 247, and sends the image data (the luminance signal Y and the color signals R-Y and B-Y thereof) of the current frame stored in the frame memory 241 to one of the N frame memories $242_1$ to $242_N$ and stores the data therein in an over-writing manner.

A still-picture detection section 244 detects a still picture (what can be regarded as a still picture) in the image data stored in the frame memory 241, reads the image data from the frame memory 241, and sends it to a comparison section 245.

More specifically, the still-picture detection section 224 obtains, for example, the sum of the absolute values of the differences between the image data of the latest frame (current frame) stored in the frame memory 241 and the image data of the preceding frame, and when the sum of the absolute values of the differences is zero or close to zero, the still-picture detection section 244 reads the image data of the current frame from the frame memory 241 as a still picture (having no (or little) motion) and sends it to the comparison section 245.

It is also possible that, when the sum of the absolute values of the differences in each of several consecutive frames is zero or close to zero, the still-picture detection section 244 detects the image data of the last frame as a still picture.

The comparison section 245 compares the image data of the still picture sent from the still-picture detection section 244 with the image data stored in each of the frame memories $242_1$ to $242_N$ (determines the matching of two pieces of image data), and sends the result of comparison to the system controller 247.

More specifically, the comparison section 245 obtains, for example, the sum of the absolute values of the differences between the image data of the still picture sent from the still-picture detection section 244 and the image data stored in each of the frame memories $242_1$ to $242_N$, and sends the result of comparison to the system controller 247.

An output control section 246 reads one-frame image data stored in the frame memory $242_n$ and sends the data to the CPU 129 under the control of the system controller 247.

The system controller 247 controls the memory control section 243 and the output control section 246 according to the control of the CPU 129 and the output of the comparison section 245.

The virtual-multiple-viewpoint-display processing in the main unit, performed by the signal processing section 127 shown in FIG. 59 will be described next by referring to a flowchart shown in FIG. 60.

First, in step S241, the system controller 247 sets the maximum number N of still-picture subsidiary units to the total number of the subsidiary units 2 constituting the scalable TV system. Therefore, in the present embodiment, the maximum number N of still-picture subsidiary units is set to eight in step S241.

Then, the processing proceeds to step S242, and the system controller 247 sets storage flags flg(1) to flg(N) indicating whether the frame memories $242_1$ to $242_N$ have stored image data, respectively, to a value which indicates that image data has not been stored, such as "0". The processing proceeds to step S243.

The storage flags flg(1) to flg(N) are stored in a memory not shown and built in the system controller 247.

In step S243, the system controller 247 determines whether the CPU 129 has specified a still-picture subsidiary unit.

Figure 60:
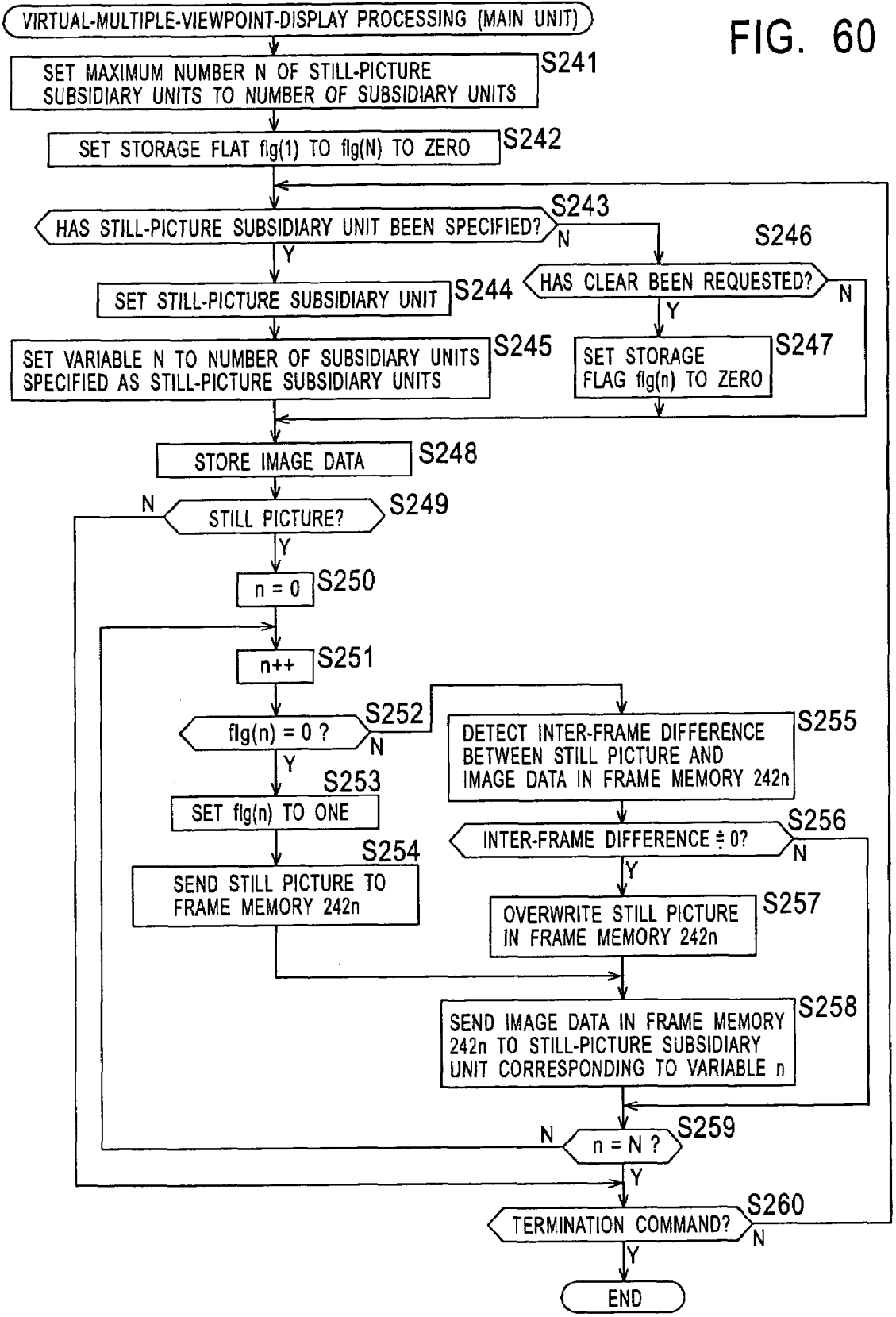
FIG. 60 is a flowchart explaining ninth virtual-multiple-viewpoint-display processing of the main unit, performed by the signal processing unit 127.

More specifically, in the embodiment shown in FIG. 60, all the subsidiary units 2 constituting the scalable TV system have been specified as still-picture subsidiary units by default. The user can specify a subsidiary unit 2 serving as a still-picture subsidiary unit. For example, the user can operate the menu button switch 84 on the controller 15 (FIG. 7) to display the menu screen and click on the icon for specifying a still-picture subsidiary unit to specify the subsidiary unit. In step S243, it is determined whether clicking has been made on the icon for specifying a still-picture subsidiary unit.

When it is determined in step S243 that a still-picture subsidiary unit has been specified, in other words, when the user operates the controller 15, clicks on the icon for specifying a still-picture subsidiary unit, and further specifies one or more subsidiary units 2 as still-picture subsidiary units, and thereby the CPU 129 outputs a command for instructing the one or more subsidiary units 2 to be specified as still-picture subsidiary units, to the system controller 247, the processing proceeds to step S244, and the system controller 247 sets the specified one or more subsidiary units 2 to still-picture subsidiary units (recognizes as still-picture subsidiary units). Then, the processing proceeds to step S245.

In step S245, the system controller 247 sets again the maximum number N of still-picture subsidiary units to the number of the subsidiary units specified by the CPU 129 as still-picture subsidiary units. The processing proceeds to step S248.

On the other hand, when it is determined in step S243 that a still-picture subsidiary unit has not been specified, the processing proceeds to step S246, and the system controller 247 determines whether the CPU 129 has sent a clear request for clearing the image data stored in the frame memory $242_n$.

As described later, the frame memory $242_n$ stores the image data of a still picture received by the main unit 1 in the past, and after that, when the main unit 1 newly receives the image data of a still picture similar to the image data of the still picture stored in the frame memory $242_n$, the storage content of the frame memory $242_n$ is updated. Therefore, when the frame memory $242_n$ stores the image data of a still picture, only the image data of a still picture similar to the image data of the still picture stored is stored in the frame memory $242_n$.

In the embodiment shown in FIG. 60, the user can operate the controller 15 to clear the storage content of the frame memory $242_n$. In step S246, it is determined whether the user has operated the controller 15 to clear the frame memory $242_n$ and thereby, the CPU 129 has sent a clear request for clearing the image data stored in the frame memory $242_n$, to the system controller 247.

A request for clearing the frame memory $242_n$ can be performed, for example, on the menu screen.

When it is determined in step S246 that a request for clearing the frame memory $242_n$ has not been sent, the processing skips a step S247, and proceeds to step S248.

When it is determined in step S246 that a request for clearing the frame memory $242_n$ has been sent, in other words, when the system controller 247 has received a command for instructing the frame memory $242_n$ to be cleared, from the CPU 129, the processing proceeds to step S247, and the system controller 247 sets the storage flag flg(n) to zero. Then, the processing proceeds to step S248.

In step S248, the frame memory 241 waits for the frame of new image data to be sent from the MPEG video decoder 125 (FIG. 10), and stores the image data. The processing proceeds to step S249.

In step S249, it is determined whether the image data of the current frame stored in the frame memory by the still-picture detection section 244 in step S244 immediately before shows a still picture. When it is determined that the image data does not show a still picture, the processing skips steps S250 to S259, and proceeds to step S260.

When it is determined in step S249 that the image data of the current frame shows a still picture, the still-picture detection section 244 reads the image data of the current frame, which shows a still picture, from the frame memory 241, and sends it to the comparison section 245. The processing proceeds to step S250. In step S250, the system controller 247 sets the variable "n" indicting the frame memory $242_n$ to be processed among the frame memories $242_1$ to $242_N$ to zero. The processing proceeds to step S251. In step S251, the system controller 247 increments the variable "n" by one. The processing proceeds to step S252. The system controller 247 determines whether the storage flag flg(n) is zero.

When it is determined in step S252 that the storage flag flg(n) is zero, in other words, when the frame memory $242_n$ has not stored image data, the processing proceeds to step S253, and the system controller 247 sets the storage flag flg(n) to a value indicating that the frame memory $242_n$ has stored the image data of a still picture, such as "1". The processing proceeds to step S254.

In step S254, the system controller 247 controls the memory control section 243 to send the image data (the luminance signal Y and the color signals R-Y and B-Y thereof) of the current frame stored in the frame memory 241 to the frame memory $242_n$ and to store therein in an overwriting manner. The processing proceeds to step S258.

In step S258, the system controller 247 controls the output control section 246 to read the one-frame image data from the frame memory 242n, and to send it to the CPU 129. In addition, in step S258, the system controller 247 sends a display request command for instructing the image data stored in the frame memory $242_n$ to be displayed in the still-picture subsidiary unit, to the CPU 129. The processing proceeds to step S259.

When the CPU 129 receives a display request command for instructing the image data stored in the frame memory $242_n$ to be displayed, from the system controller 247, the CPU 129 controls the IEEE-1394 interface 133 to send the one-frame image data (the luminance signal Y and the color signals R-Y and B-Y thereof) sent from the output control section 246, to the subsidiary unit $2_{ij}$ corresponding to the frame memory $242_n$ among the subsidiary unit 2 serving as the still-picture subsidiary unit, together with the display request command for instructing the image data to be displayed.

More specifically, the number N of frame memories $242_1$ to $242_N$ is equal to the number (maximum number) N of subsidiary units 2 serving as still-picture subsidiary units. Immediately after step S241 or step S244, the system controller 247 assigns one of the subsidiary units 2 serving as still-picture subsidiary units to each frame memory $242_n$. Thereby, one frame memory 242 corresponds to one subsidiary unit 2 serving as a still-picture subsidiary unit.

When the CPU 129 receives a display request command for instructing the image data stored in the frame memory $242_n$ to be displayed, from the system controller 247, the CPU 129 sends the display request command to the subsidiary unit corresponding to the frame memory $242_n$.

The signal processing section 147 of the subsidiary unit 2 serving as a still-picture subsidiary unit is structured as shown in FIG. 34 and is executing the virtual-multiple-viewpoint-display processing shown in FIG. 35. Therefore, when the still-picture subsidiary unit 2 receives the image data stored in the frame memory $242_n$ together with the display request command, it displays the image data stored in the frame memory $242_n$.

On the other hand, when it is determined in step S252 that the storage flag flg(n) is not zero, in other words, when the frame memory $242_n$ has stored image data, the processing proceeds to step S255, and the comparison section 245 compares the image data of the current frame, which shows a still picture, sent from the still-picture detection section 244 with the image data stored in the frame memory $242_n$ to obtain the sum of the absolute values of the differences (the sum of the absolute values of the differences for the current frame) as a feature of the image data of the current frame, and sends the sum to the system controller 247.

When the system controller 247 receives the sum of the absolute values of the differences for the current frame from the comparison section 245, the system controller 247 determines in step S256 whether the sum of the absolute values of the differences for the current frame is almost zero, that is, is equal to or smaller than (or smaller than) a positive small threshold.

When it is determined in step S256 that the sum of the absolute values of the differences for the current frame is neither zero nor close to zero, the processing skips steps S257 and S258, and proceeds to step S259.

When it is determined in step S256 that the sum of the absolute values of the differences for the current frame is zero or close to zero, in other words, when the image data of the current frame has a similar pattern to that of the image data stored in the frame memory $242_n$, and therefore, the image data of the current frame has been received by the main unit 1 and is similar to the image data stored in the frame memory $242_n$, the processing proceeds to step S257, and, the system controller 247 controls the memory control section 246 to send the image data of the current frame, which shows a still picture, stored in the frame memory 241 to the frame memory $242_n$, and to store therein in an over-writing manner to update the storage content of the frame memory $242_n$.

Then, the processing proceeds to step S258, and as described above, the system controller 247 controls the output control section 246 to read the one-frame image data stored in the frame memory $242_n$ and to send it to the CPU 129. In addition, in step S258, the system controller 246 sends the image data stored in the frame memory $242_n$ and a display request command for instructing the image data stored in the frame memory $242_n$ to be displayed in the still-picture subsidiary unit, to the CPU 129. The processing proceeds to step S259.

With this, as described above, the image data of the current frame newly stored in the frame memory $242_n$ is sent from the main unit 1 to the subsidiary unit 2 corresponding to the frame memory $242_n$ and displayed.

In step S259, the system controller 247 determines whether the variable "n" is equal to the maximum number N of the still-picture subsidiary units. When it is determined that they are not equal, the processing returns to step S251 and the same processes are repeated thereafter.

When it is determined in step S259 that the variable "n" is equal to the maximum number N of the still-picture subsidiary units, in other words, when the comparison section 245 finishes the comparison between the image data of the current frame, which shows a still picture, stored in the frame memory 241 and the image data stored in each of the frame memories $242_1$ to $242_N$, the processing proceeds to step S260, and it is determined whether the system controller 247 has received a termination command for instructing the virtual-multiple-viewpoint-display processing to be terminated, from the CPU 129.

When it is determined in step S260 that a termination command has not been received, the processing returns to step S243 and the same processes are repeated thereafter.

When it is determined in step S260 that a termination command has been received, in other words, for example, when the user operates the controller 15 (FIG. 7) to display the menu screen on the CRT 11 and further clicks again on the virtual-multiple-viewpoint-display icon in the menu screen to thereby instruct the CPU 129 to terminate the virtual-multiple-viewpoint-display processing and the CPU 129 sends a termination command to the system controller 247, the virtual-multiple-viewpoint-display processing is terminated in the main unit.

Figure 58:
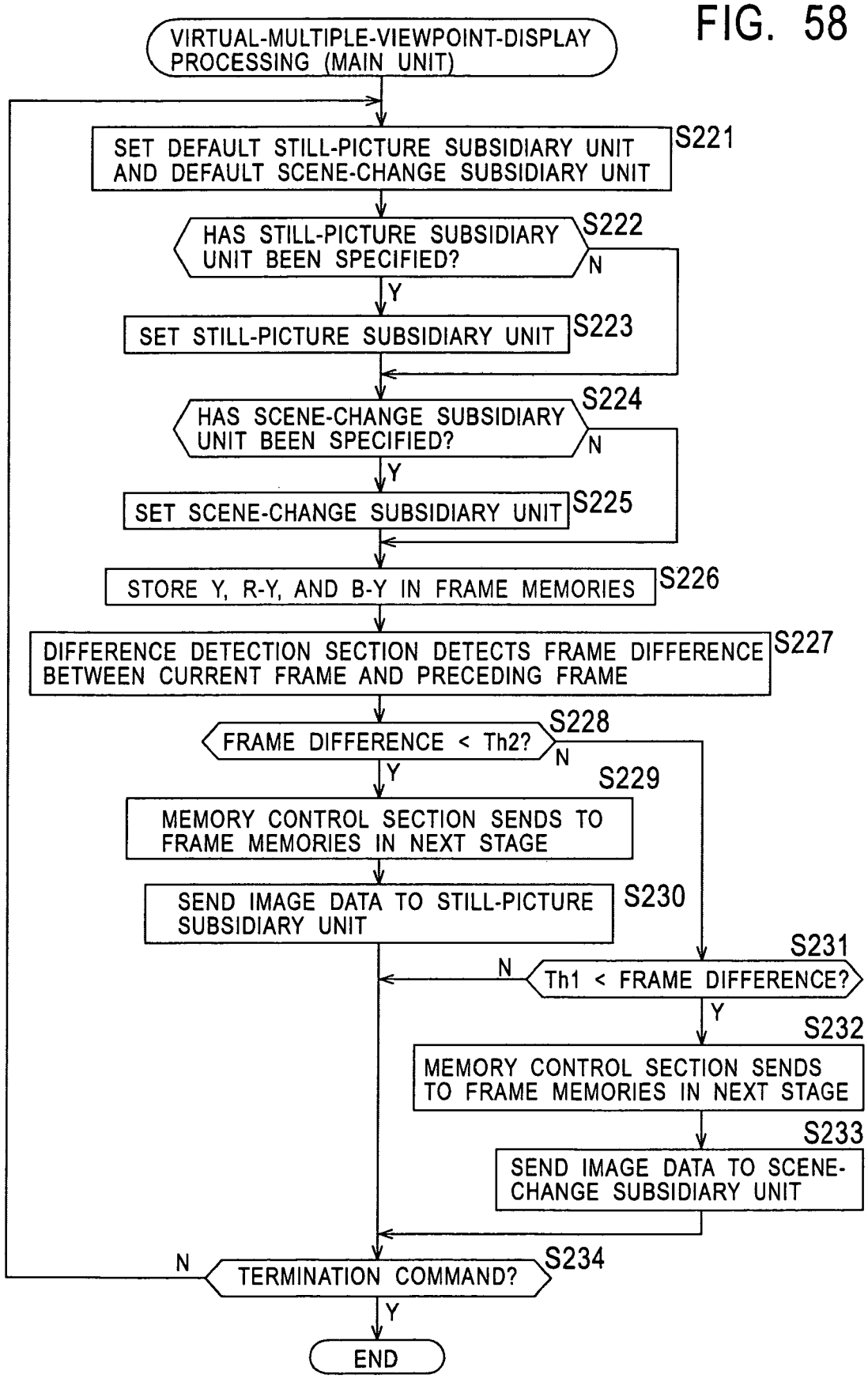
FIG. 58 is a flowchart explaining eighth virtual-multiple-viewpoint-display processing of the main unit, performed by the signal processing unit 127.
Figure 61A:
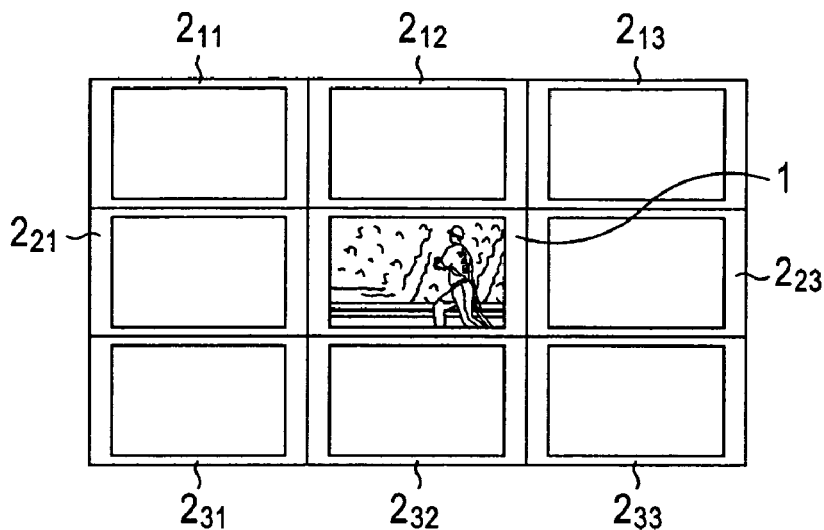
FIG. 61A is a view showing example display in the main unit 1 and the subsidiary units 2 constituting the scalable TV system.

According to the virtual-multiple-viewpoint-display processing shown in FIG. 58, as shown in FIG. 61A, for example, after the main unit 1 starts showing a real-time program of a professional baseball game, when the main unit 1 displays the image data of a still picture indicating a scoreboard in a close-up manner, for example, the image data of the scoreboard is stored in the frame memory $242_1$, and also sent to the still-picture subsidiary unit corresponding to the frame memory $242_1$ and displayed.

Figure 61B:
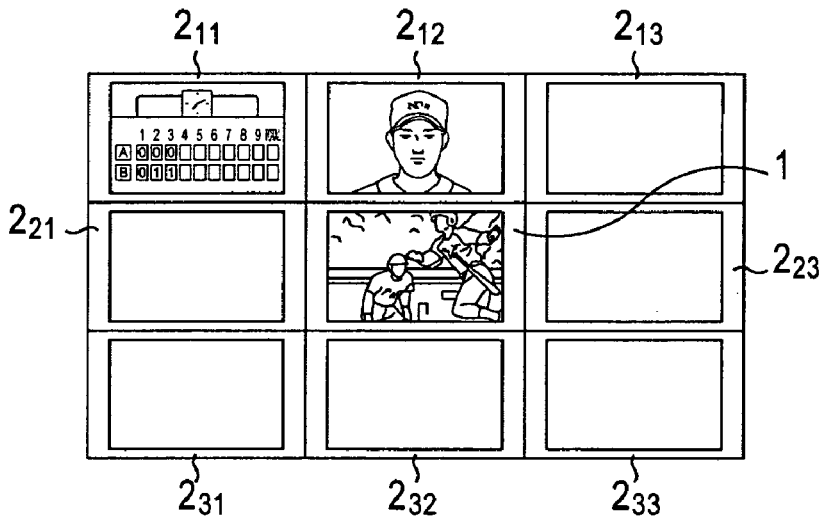
FIG. 61B is a view showing example display in the main unit 1 and the subsidiary units 2 constituting the scalable TV system.
Figure 61C:
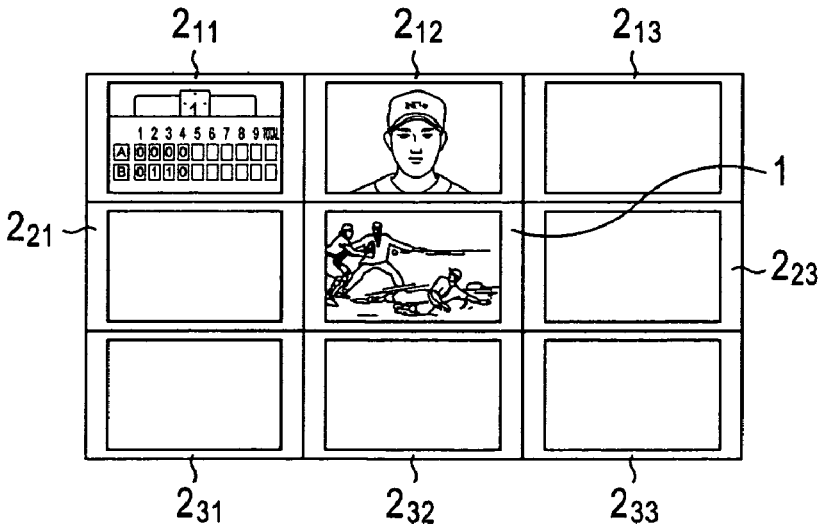
FIG. 61C is a view showing example display in the main unit 1 and the subsidiary units 2 constituting the scalable TV system.

Specifically, when the still-picture subsidiary unit corresponding to the frame memory $242_1$ is the subsidiary unit $2_{11}$, for example, the frame of the image data of the scoreboard, stored in the frame memory $242_1$ is displayed in the subsidiary unit $2_{11}$, as shown in FIG. 61B.

Further, after that, if the main unit 1 displays the image data of a still picture in which a baseball player is shown in a close-up manner in an interview, for example, the image data of the still picture in which the baseball player is shown in a close-up manner is stored in the frame memory $242_2$ and also sent to the subsidiary unit corresponding to the frame memory $242_2$ and displayed.

Specifically, when the still-picture subsidiary unit corresponding to the frame memory $242_2$ is the subsidiary unit $2_{12}$, for example, the frame of the image data of the baseball player, stored in the frame memory $242_2$ is displayed in the subsidiary unit $2_{12}$, as shown in FIG. 61B.

Then, after that, when the main unit 1 displays again the image data of a still picture indicating the scoreboard in a close-up manner, for example, the storage content of the frame memory $242_1$ is updated to the image data of the scoreboard, and the updated image data in the frame memory $242_1$ is sent to the still-picture subsidiary unit $2_{11}$ corresponding to the frame memory $242_1$ and displayed. In this case, the image data of the scoreboard displayed in the subsidiary unit $2_{11}$ has been updated to the latest one.

Therefore, the user can view the latest image data of various still pictures displayed in the main unit 1.

Next, FIG. 62 shows another example electric structure of the main unit 1. In the figure, the same symbols as those used in FIG. 10 are assigned to the portions corresponding to those shown in FIG. 10, and a description thereof is omitted, if unnecessary.

Whereas the main unit 1 shown in FIG. 10 is a television receiver for receiving digital broadcasting, the main unit 1 shown in FIG. 62 is a television receiver for receiving analog broadcasting.

A tuner 251 detects and demodulates an analog television broadcasting signal in a predetermined channel. An A/D conversion section 252 applied A/D conversion to the output of the tuner 251, and sends image data among the results of A/D conversion to a Y/C separation section 253, and sends audio data to a signal processing section 127.

The Y/C separation section 253 separates a luminance signal Y and color signals R-Y and B-Y from the output of the tuner 251, and sends them to the signal processing section 127.

Even the television receiver for receiving analog broadcasting, structured in the foregoing way can serve as the main unit 1 in a scalable TV system.

Like the television receiver shown in FIG. 62, serving as the main unit, television receivers for receiving analog broadcasting can also be used as television receivers serving as subsidiary units 2.

In the above-described embodiments, the sales prices of television receivers constituting the scalable TV system can be made difference depending, for example, on whether a television receiver serves as a main unit or a subsidiary unit, and further on, if it serves as a subsidiary unit, how many subsidiary units have been used before the subsidiary unit is used.

Since the virtual-multiple-viewpoint-display function cannot be provided in the scalable TV system if there is no main unit, as described above, the main unit has a high value and the sales price of the main unit can be set high.

It is expected that the user will additionally buy subsidiary units, if necessary, after the user buys the main unit. It is possible that the sales prices of first several subsidiary units are set, for example, lower than the sales price of the main unit but higher than usual television receivers. It is also possible that the sales prices of subsidiary units to be bought thereafter are set further lower.

In the above-described embodiments, a television receiver serving as the main unit in a scalable TV system can be structured, for example, by adding the signal processing section 127 to a usual digital television receiver and by changing the program to be executed by the CPU 129. Therefore, since a television receiver serving as the main unit in a scalable TV system can be relatively easily manufactured by using a usual digital television receiver, high cost effectiveness is provided with a high function of virtual multiple viewpoint display provided by the scalable TV system, described above, being taken into account. This point is also applied to television receivers serving as subsidiary units.

Further, in the above embodiments, image data sent from the main unit 1 (or image data received by the tuner 141 (FIG. 11) according to a freeze command sent from the main unit 1) is stored in the frame memories 214 to 216 (FIG. 34) in an overwriting manner in the subsidiary unit 2. It is possible that the subsidiary unit 2 is provided, for example, with a hard disk or others, image data sent from the main unit 1 is recorded in the hard disk, and the image data is later reproduced according to an instruction of the user.

In the above embodiments, the main unit 1 sends one-frame image data to the subsidiary unit 2, and it is displayed in the subsidiary unit 2. It is possible that the main unit 1 sends the image data of a plurality of frames to the subsidiary unit 2, and the subsidiary unit 2 repeatedly displays the scene formed of the image data of the plurality of frames. Also when image data received by the tuner (FIG. 11) of the subsidiary unit 2 according to a freeze command sent from the main unit 1 is displayed in the subsidiary unit 2, it is possible that one scene formed of the image data of a plurality of frames is repeatedly displayed in the same way. One scene may be one-frame image data or one-field image data, or may be the image data of a plurality of frames from the frame immediately after a scene change to the frame of the next scene change.

Furthermore, in the above embodiments, the virtual-multiple-viewpoint-display processing is applied to a television broadcasting program received by the main unit 1. The virtual-multiple-viewpoint-display processing can also be applied, for example, to image data and audio data sent from a VTR or others serving as an external apparatus to the main unit 1 and displayed.

Figure 63B:
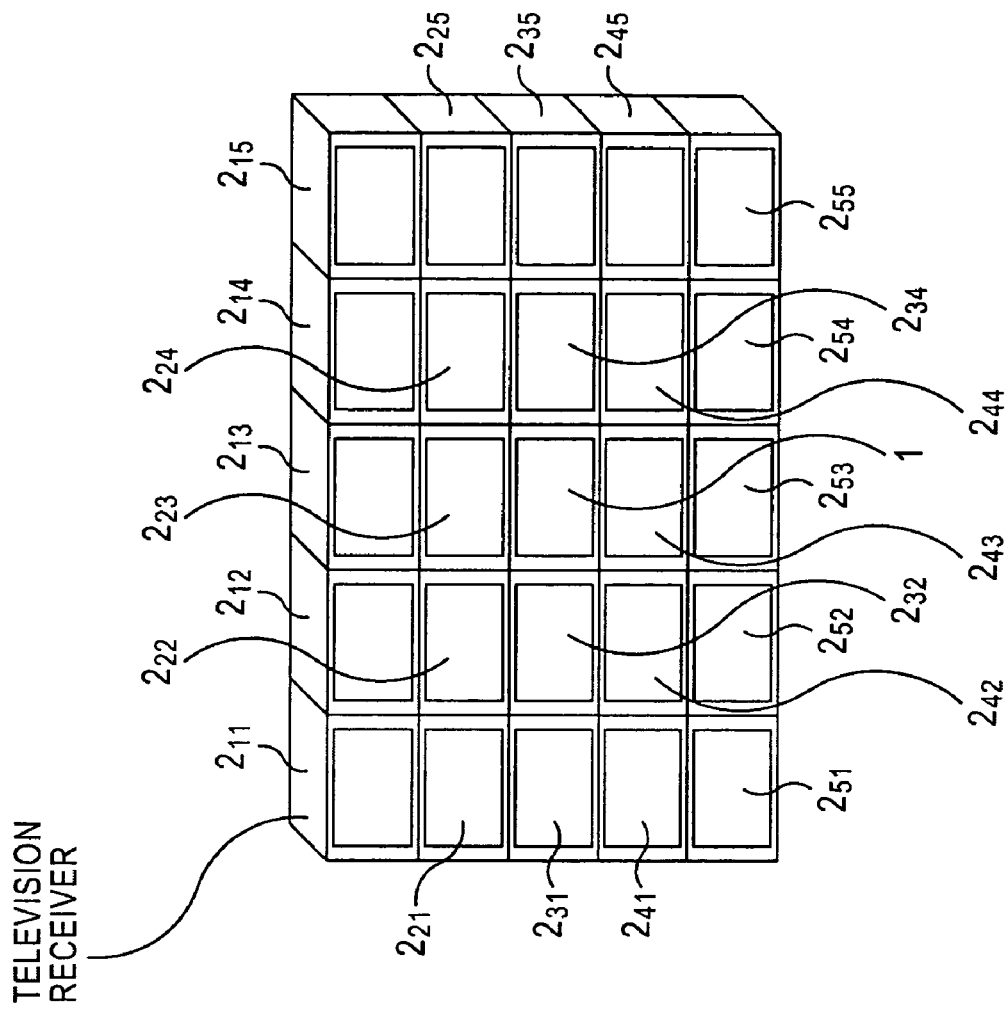
FIG. 63B is a perspective view showing an example structure of another embodiment of a scalable TV system to which the present invention is applied.
Figure 63A:
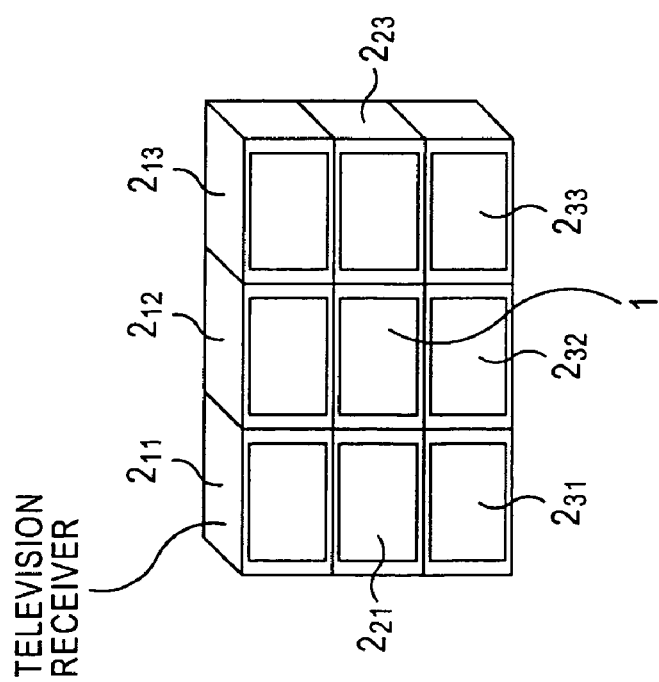
FIG. 63A is a perspective view showing an example structure of another embodiment of a scalable TV system to which the present invention is applied.

Next, FIG. 63A and FIG. 63B are perspective views showing example structures of another embodiment of a scalable TV system to which the present invention is applied. In the figures, the same symbols as those used in FIG. 1A and FIG. 1B are assigned to the portions corresponding to those shown in FIG. 1A and FIG. 1B, and a description thereof is omitted, if unnecessary. In other words, the scalable TV systems shown in FIG. 63A and FIG. 63B basically have the same structure as the scalable TV systems shown in FIG. 1A and FIG. 1B.

In the embodiment shown in FIG. 63A, a scalable TV system is formed of nine television receivers 1, $2_{11}$, $2_{12}$, $2_{13}$, $2_{21}$, $2_{23}$, $2_{31}$, $2_{32}$, and $2_{33}$. In the embodiment shown in FIG. 63B, a scalable TV system is formed of 25 television receivers 1, $2_{11}$, $2_{12}$, $2_{13}$, $2_{14}$, $2_{15}$, $2_{21}$, $2_{22}$, $2_{23}$, $2_{24}$, $2_{25}$, $2_{31}$, $2_{32}$, $2_{34}$, $2_{35}$, $2_{41}$, $2_{42}$, $2_{43}$, $2_{44}$, $2_{45}$, $2_{51}$, $2_{52}$, $2_{53}$, $2_{54}$, and $2_{55}$.

The number of television receivers constituting a scalable TV system is not limited to nine or 25. In other words, a scalable TV system can be formed of any plurality of television receivers. The arrangement of television receivers constituting a scalable TV system is not limited to a three-by-three or five-by-five horizontal-and-vertical format shown in FIG. 63A or FIG. 63B. In other words, the arrangement of television receivers constituting a scalable TV system can be other horizontal-and-vertical formats, such as one-by-two, two-by-one, two-by-three horizontal-and-vertical formats. In addition, the arrangement shape of television receivers constituting a scalable TV system is not limited to a matrix shape shown in FIG. 63A and FIG. 63B, but can be a pyramid shape.

Since a scalable TV system can be structured by any plurality of television receivers any number of which are disposed horizontally and vertically in this way, it can be called a "scalable" system.

Among television receivers constituting a scalable TV system, there are two types of television receivers, a main television receiver (hereinafter called a main unit, if necessary) which can control other television receivers, and a subsidiary television receivers (hereinafter called subsidiary units, if necessary) which can be controlled by another television receiver but can not control other television receivers.

In any scalable TV system, as described later, full screen display is possible in which an image is displayed over all the display screens of all television receivers constituting the scalable TV system.

To perform full screen display in a scalable TV system, the scalable TV system needs to have television receivers (hereinafter called scalable-use units) conforming to a scalable TV system, and one of them needs to be a main unit. Therefore, in each of the embodiments shown in FIG. 63A and FIG. 63B, the television receiver disposed, for example, at the center serves as a main unit 1 among the television receivers constituting the scalable TV system.

Because of the above-described reasons, when television receivers which are not scalable-use units are used among television receivers constituting a scalable TV system, full screen display cannot be provided. In addition, even when all television receivers constituting a scalable TV system are scalable-use units, if all of them are subsidiary units, full screen display cannot be provided either.

Therefore, to use the full-screen-display function of a scalable TV system, the user needs to buy at least one or more main units or one main unit and one or more subsidiary units.

Since a main unit can serve as a subsidiary unit, a plurality of main units may be used among television receivers constituting a scalable TV system.

In the embodiment shown in FIG. 63A, the television receiver 1 disposed at the center (the second from the left and the second from the top) among the three-by-three television receivers serves a main unit, and the other eight television receivers $2_{11}$, $2_{12}$, $2_{13}$, $2_{21}$, $2_{23}$, $2_{31}$, $2_{32}$, and $2_{33}$ serve as subsidiary units. In the embodiment shown in FIG. 63B, the television receiver 1 disposed at the center (the third from the left and the third from the top) among the five-by-five television receivers serves a main unit, and the other 24 television receivers $2_{11}$, $2_{12}$, $2_{13}$, $2_{14}$, $2_{15}$, $2_{21}$, $2_{22}$, $2_{23}$, $2_{24}$, $2_{25}$, $2_{31}$, $2_{32}$, $2_{34}$, $2_{35}$, $2_{41}$, $2_{42}$, $2_{43}$, $2_{44}$, $2_{45}$, $2_{51}$, $2_{52}$, $2_{53}$, $2_{54}$, and $2_{55}$ serve as subsidiary units.

Therefore, in each of the embodiment shown in FIG. 63A and FIG. 63B, the main unit 1 is disposed at the center of the television receivers constituting the scalable TV system. The position of the main unit 1 is not limited to the center of the television receivers constituting the scalable TV system. The main unit 1 may be disposed at any position, such as the upper left corner or at the lower right corner.

To make the following description simple, it is assumed that the scalable TV system is formed of three-by-three television receivers as shown in FIG. 63A, and the main unit 1 is disposed at the center of the television receivers constituting the scalable TV system.

The suffixes i and j used in a subsidiary unit $2_{ij}$ constituting the scalable TV system means that the subsidiary unit $2_{ij}$ is located at the i-th row and the j-th column (the i-th row from the top and the j-th column from the left) in the scalable TV system.

Hereinafter, if it is not necessary to distinguish subsidiary units $2_{ij}$, they are collectively called a subsidiary unit 2.

Since the external structures of the main units 1 and the subsidiary units $2_{ij}$ constituting the scalable TV systems shown in FIG. 63A and FIG. 63B are the same as those described by referring to FIG. 2, FIG. 3A to FIG. 3F, FIG. 4, and FIG. 5A to FIG. 5F, a description thereof is omitted. Therefore, the main units 1 and the subsidiary units $2ij$ have accessories of the controllers 15 (FIG. 2) and the controllers 35 (FIG. 4), respectively, since the structures thereof are the same as those described by referring to FIG. 7 to FIG. 9, a description thereof is omitted.

Figure 64:
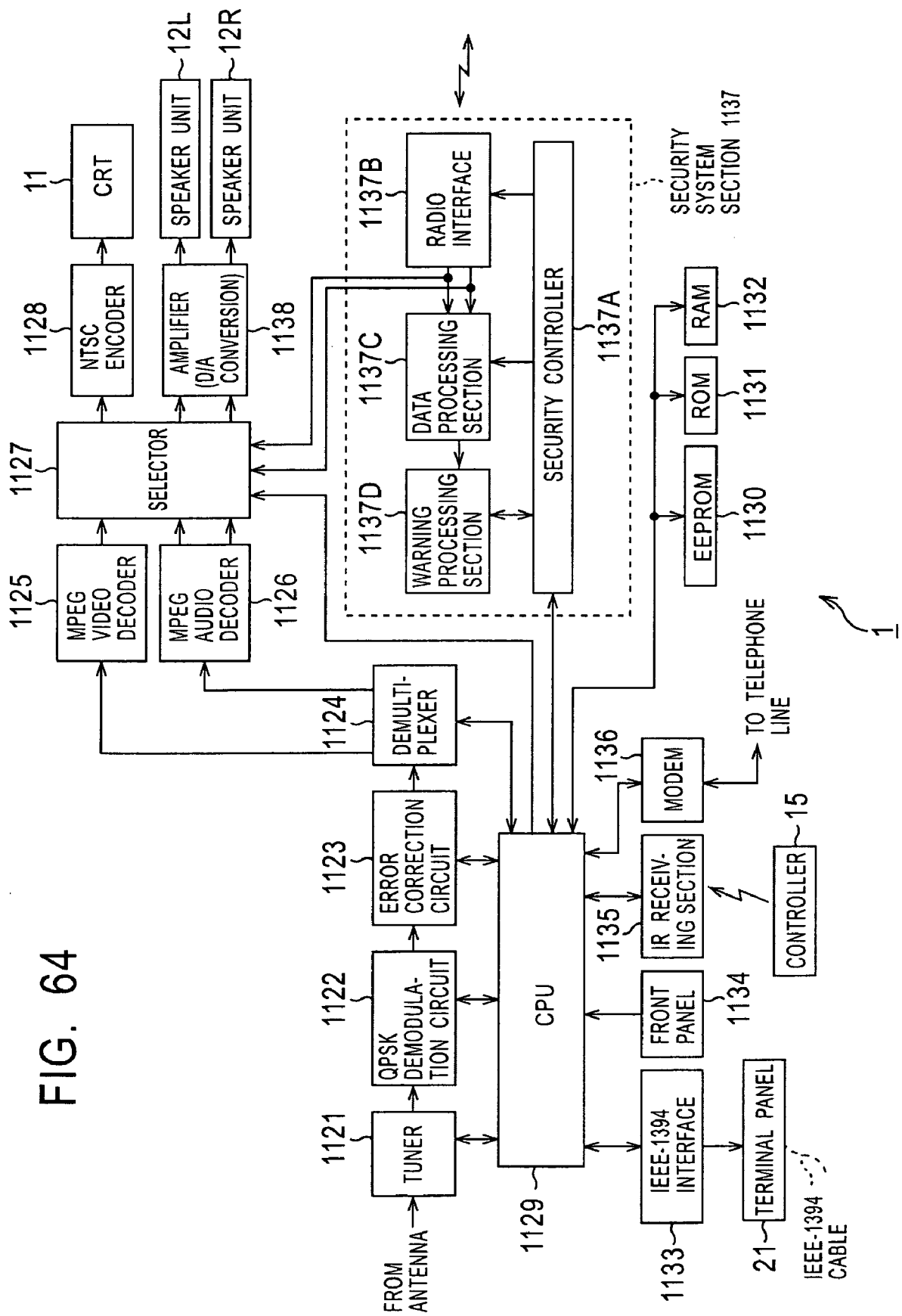
FIG. 64 is a block diagram showing an example electric structure of the main unit 1.

Next, FIG. 64 shows an example electric structure of the main unit 1 used in FIG. 63A and FIG. 63B.

A television broadcasting signal received by an antenna not shown is sent to the tuner 1121, and detected and demodulated under the control of a CPU 1129. The output of the tuner 1121 is sent to a QPSK (quadrature phase shift keying) demodulation circuit 1122, and QPSK-demodulated under the control of the CPU 1129. The output of the QPSK demodulation circuit 1122 is sent to an error correction circuit 1123. An error is detected and corrected under the control of the CPU 1129, and the output is sent to a demultiplexer 1124.

The demultiplexer 1124 de-scrambles the output of the error correction circuit 1123, if necessary, under the control of the CPU 1129, and extracts TS (transport stream) packets in a predetermined channel. Then, the demultiplexer 1124 sends image-data (video-data) TS packets to an MPEG (Moving Picture Experts Group) video decoder 1125, and sends audio-data (audio-data) TS packets to an MPEG audio decoder 1126. The demultiplexer 1124 also sends the TS packets included in the output of the error correction circuit 1123 to the CPU 1129, if necessary. The demultiplexer 1124 further receives image data or audio data (including those in TS packets) sent from the CPU 1129, and sends it to the MPEG video decoder 1125 or to the MPEG audio decoder 1126.

The MPEG video decoder 1125 MPEG-decodes the image-data TS packets sent from the demultiplexer 1124, and sends to a selector 1127. The MPEG audio decoder 1126 MPEG-decodes the audio-data TS packets sent from the demultiplexer 1124. The L-channel audio data and R-channel audio data obtained by decoding in the MPEG audio decoder 1126 are sent to the selector 1127.

Under the control of the CPU 1129, the selector 1127 selects image data output from the MPEG video decoder 1125, image data output from the CPU 1129, or image data sent from a security system section 1137, and sends to an NTSC (National Television System Committee) encoder 1128. The NTSC encoder 1128 converts the image data sent from the selector 1127 to NTSC image data, and sends it to the CRT 11 and displays thereon. Under the control of the CPU 1129, the selector 1127 also selects L-channel and R-channel audio data sent from the MPEG audio decoder 1126, audio data sent from the CPU 1129, or audio data sent from the security system section 1137, and sends to an amplifier 1138.

The CPU 1129 performs various processing according to programs stored in an EEPROM (electrically erasable programmable read only memory) 1130 and a ROM (read only memory) 1131 to control, for example, the tuner 1121, the QPSK demodulation circuit 1122, the error correction circuit 1123, the demultiplexer 1124, the selector 1127, an IEEE-1394 interface 1133, a modem 1136, and the security system section 1137. In addition, the CPU 1129 sends the data sent from the demultiplexer 1124, to the IEEE-1394 interface 1133, and sends data sent from the IEEE-1394 interface 1133, to the demultiplexer 1124 and to the selector 1127. Further, the CPU 1129 executes the processing corresponding to commands sent from a front panel 1134 or from an IR receiving section 1135. Furthermore, the CPU 1129 controls the modem 1136 to access a server not shown through a telephone line to obtain an updated program and necessary data.

The EEPROM 1130 stores data and programs which need to be held even after power off. The ROM 1131 stores, for example, an IPL (initial program loader) program. The data and programs stored in the EEPROM 1130 can be updated by over-writing.

A RAM 1132 temporarily stores data and programs required for the operation of the CPU 1129.

The IEEE-1394 interface 1133 is connected to the terminal panel 21 (to the IEEE-1394 terminals $21_{11}$ to $21_{33}$ (FIG. 3F) thereof), and functions as an interface for performing communications which conform to the IEEE 1394 standard. With this, the IEEE-1394 interface 1133 sends data sent from the CPU 1129, to the outside according to the IEEE 1394 standard, and receives data sent from the outside according to the IEEE 1394 standard, and sends it to the CPU 1129.

The front panel 1134 is provided at a part of the front face of the main unit 1. The front panel 1134 includes a part of the button switches provided for the controller 15 (FIG. 7). When a button switch on the front panel 1134 is operated, the operation signal corresponding to the operation is sent to the CPU 1129. In this case, the CPU 1129 performs the processing corresponding to the operation signal sent from the front panel 1134.

The IR receiving section 1135 receives (receives the light of) an infrared ray sent from the controller 15 in response to an operation on the controller 15. In addition, the IR receiving section 1135 photoelectrically converts the received infrared ray, and sends the signal obtained as a result to the CPU 1129. In this case, the CPU 1129 performs the processing corresponding to the signal sent from the IR receiving section 1135, that is, the processing corresponding to the operation on the controller 15.

The modem 1136 controls communications through a telephone line, and thereby, sends data sent from the CPU 1129, through the telephone line, receives data sent through the telephone line, and sends it to the CPU 1129.

The security system section 1137 is formed of a security controller 1137A, a radio interface 1137B, a data processing section 1137C, and a warning processing section 1137D, and performs various processing, described later, for warning the user of the occurrence of an emergency state (something unusual) under the control of the CPU 1129.

More specifically, the security controller 1137A controls the radio interface 1137B, the data processing section 1137C, and the warning processing section 1137D under the control of the CPU 1129.

The radio interface 1137B functions as an interface for performing radio communications, receives image (moving image) data and audio data sent from a camera 1162 (FIG. 67), described later, and sends them to the selector 1127 and to the data processing section 1137. As the radio interface 1137B, for example, an NIC (network interface card), specified in IEEE 802.11 and performing communications through a so-called radio LAN, can be employed.

As the radio interface 1137B, a unit which performs radio communications according to a standard other than IEEE 802.11 can also be employed. It is preferred, however that the radio interface 1137B conform to a standard which has a sufficient transfer band for transmitting and receiving moving-image data.

The data processing section 1137C detects the feature amount of the image data or the audio data sent from the radio interface 1137B at a predetermined interval, and sends it to the warning processing section 1137D.

The warning processing section 1137D analyzes the fluctuation in time of the feature amount of the image data or the audio data, sent from the data processing section 1137C. In addition, the warning processing section 1137D determines whether the fluctuation in time of the feature amount of the image data or the audio data satisfies a predetermined condition, and requests the security controller 1137A to warn the user, according to the result of determination.

The amplifier 1138 amplifies the audio data sent from the selector 1127, if necessary, and sends it to the speaker units 12L and 12R. The amplifier 1138 has a D/A (digital/analog) converter, applies D/A conversion to the audio data, if necessary, and outputs it.

The main unit 1 structured as described above outputs images and sound (displays the images and outputs the sound) in a television broadcasting program in the following way.

A transport stream serving as a television broadcasting signal received by the antenna is sent through the tuner 1121, the QPSK demodulation circuit 1122, and the error correction circuit 1123 to the demultiplexer 1124. The demultiplexer 1124 extracts the TS packets of a predetermined program from the transport stream, sends image-data TS packets to the MPEG video decoder 1125, and sends audio-data TS packets to the MPEG audio decoder 1126.

The MPEG video decoder 1125 MPEG-decodes the TS packets sent from the demultiplexer 1124. The image data obtained as a result is sent from the MPEG video decoder 1125 through the selector 1127 and the NTSC encoder 1128 to the CRT 11 and displayed.

The MPEG audio decoder 1126 MPEG-decodes the TS packets sent from the demultiplexer 1124. The audio data obtained as a result is sent from the MPEG audio decoder 1126 through the selector 1127 and the amplifier 1138 to the speaker units 12L and 12R and output.

In the main unit 1, the IEEE-1394 interface 1133 receives TS packets sent from another unit. Among the TS packets, image-data TS packets and audio-data TS packets are sent through the CPU 1129 and the demultiplexer 1124 to the MPEG video decoder 1125 and to the MPEG audio decoder 1126, and output (displayed) in the same way as the image data and the audio data of a television broadcasting signal.

In the main unit 1, the radio interface 1137B of the security system section 1137 receives image data and audio data sent from another unit. The image data received by the radio interface 1137B is sent through the selector 1127 and the NTSC encoder 1128 to the CRT 11 and displayed. The audio data received by the radio interface 1137B is sent through the selector 1127 and the amplifier 1138 to the speaker units 12L and 12R and output.

Therefore in the embodiment shown in FIG. 64, the main unit 1 has three input systems for receiving image data and audio data, the tuner 1121, the IEEE-1394 interface 1133, and the radio interface 1137B. Although not shown in FIG. 64, an input terminal 23 is provided for the main unit as shown in FIG. 3F. Therefore, when the input terminal 23 is included, the main unit 1 has four input systems.

The number of input systems provided for the main unit 1 is not limited.

Figure 65:
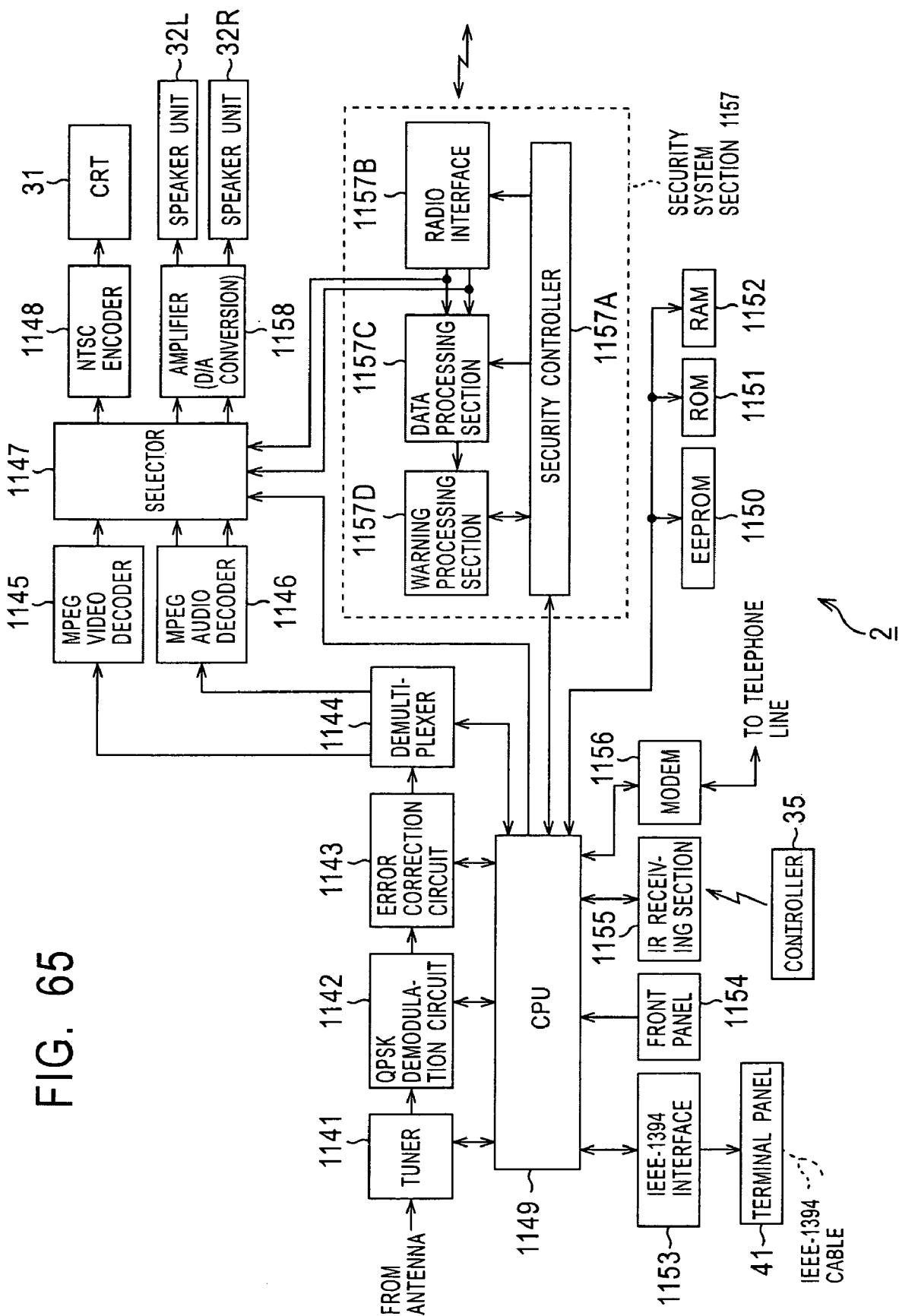
FIG. 65 is a block diagram showing an example electric structure of the subsidiary unit 2.

Next, FIG. 65 shows an example electric structure of the subsidiary unit 2 used in FIG. 63A and FIG. 63B.

Since the subsidiary unit 2 is formed of a tuner 1141 to an amplifier 1158 having the same structures as the tuner 1121 to the amplifier 1138 shown in FIG. 64, a description thereof is omitted.

Figure 66:
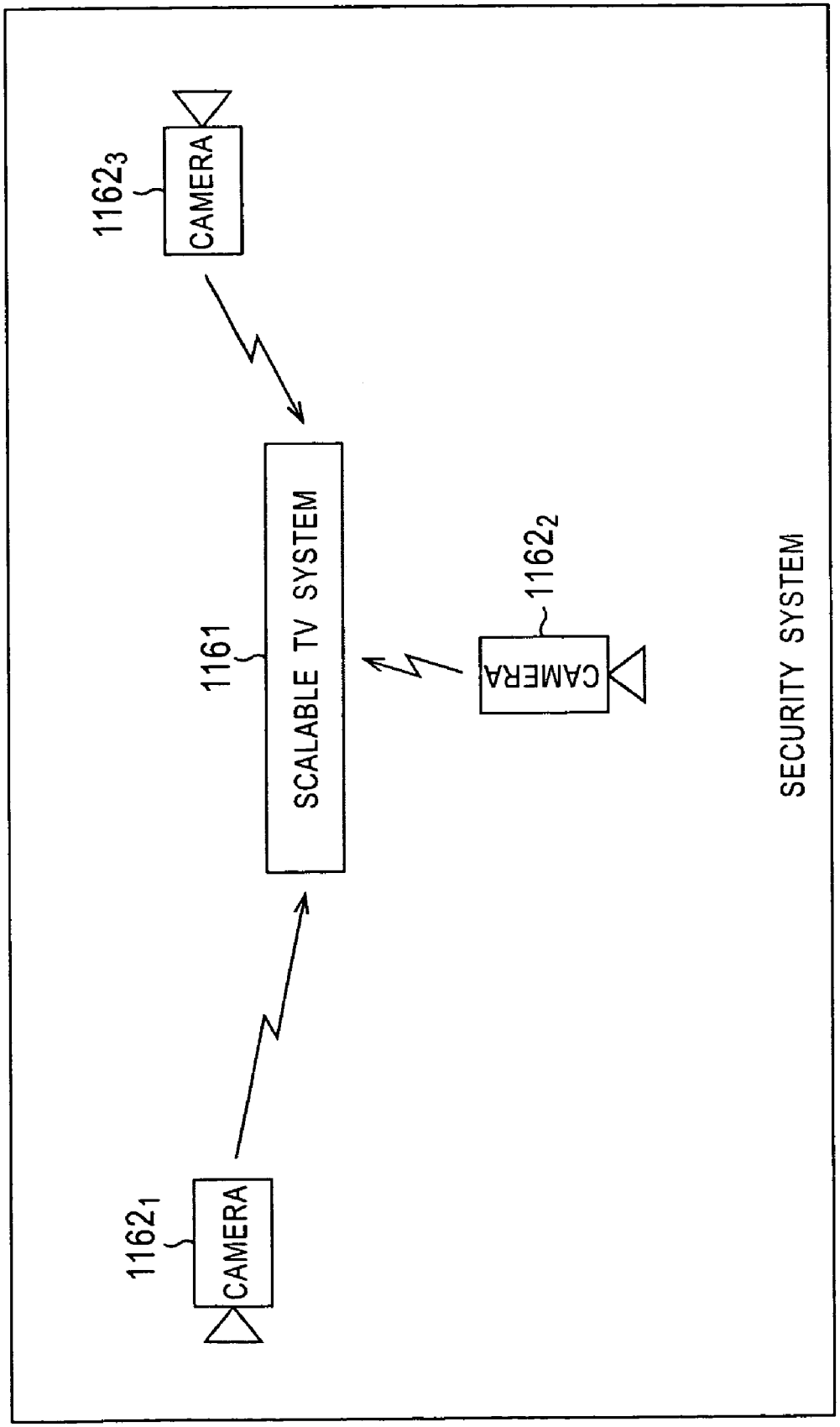
FIG. 66 is a block diagram showing an example structure of one embodiment of a security system to which the present invention is applied.

Next, FIG. 66 shows an example structure of a security system in which the scalable TV systems shown in FIG. 63A and FIG. 63B are used.

In the embodiment shown in FIG. 66, the security system is formed of a scalable TV system 1161 having a plurality of television receivers, and three cameras (video cameras) $1162_1$, $1162_2$, and $1162_3$.

The scalable TV system 1161 is formed, for example, in the same way as the scalable TV system shown in FIG. 63A.

The cameras $1162_1$, $1162_2$, and $1162_3$ are, for example, digital video cameras, and capture images, collect sound, and send image data and audio data obtained as a result to predetermined television receivers constituting the scalable TV system 1161 by radio.

The security system in the embodiment shown in FIG. 66 is formed of the three cameras $1162_1$ 5o $1162_3$. The number of cameras included in the security system is not limited to three. The security system can be provided with one or more cameras.

In the security system, the maximum number of television receivers which can receive image data and audio data from the cameras 1162 is equal to the number of television receivers constituting the scalable TV system 1161. Therefore, when the security system is provided with cameras 1162 the number of which exceeds the number of television receivers constituting the scalable TV system 1161, the scalable TV system 1161 cannot receive image data and audio data sent from cameras 1162 which do not correspond to any television receivers. It is possible for each television receiver of the scalable TV system 1161 to switch the camera from which image data and audio data are received.

Hereinafter, the cameras $1162_1$ to $1162_3$ are collectively called a camera 1162 if it is not necessary to differentiate them.

Figure 67:
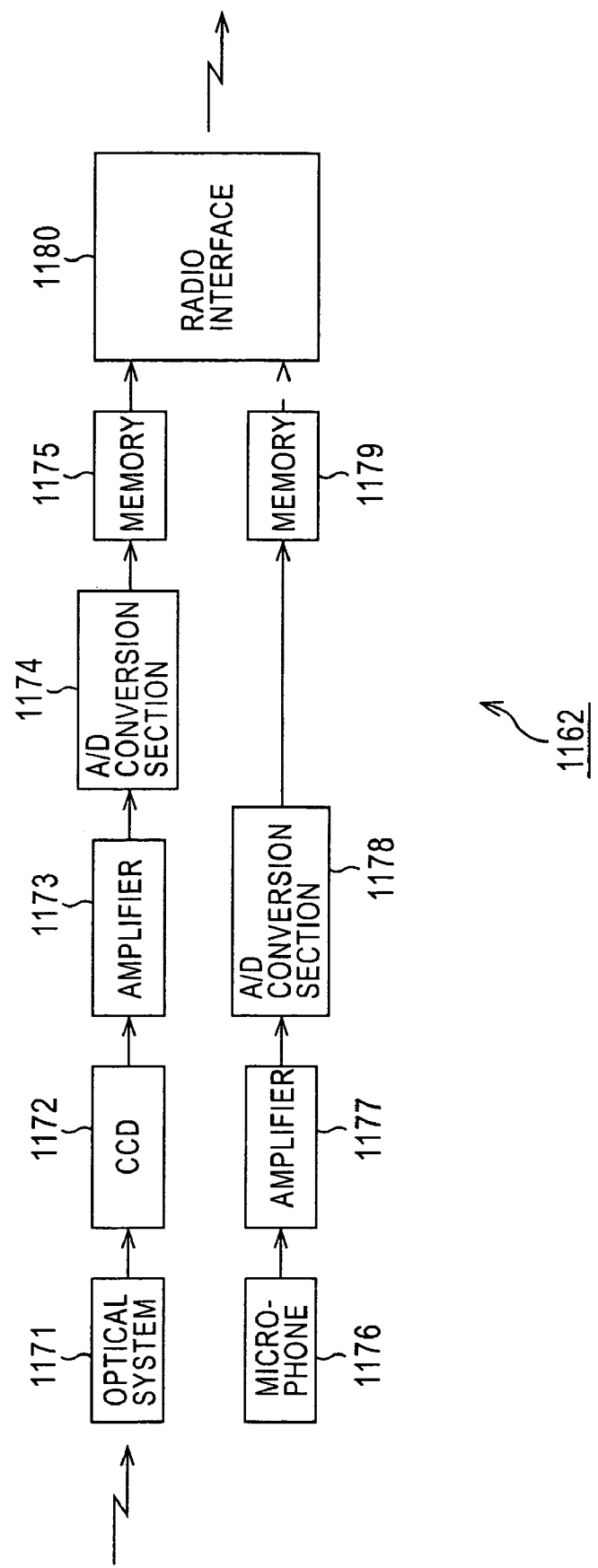
FIG. 67 is a block diagram showing an example structure of a camera 1162.

Next, FIG. 67 shows an example structure of the camera 1162 shown in FIG. 66.

Light from an object is incident on an optical system 1171 formed of a lens, a focus adjustment mechanism, an aperture adjustment mechanism, and others, and condensed on the light receiving plane of a CCD (charge coupled device) 1172. The CCD 1172 photoelectrically converts the light sent from the optical system 1171 and sends an electric signal serving as image data to an amplifier 1173. The amplifier 1173 amplifies the image data sent from the CCD 1172, and sends it to an A/D (analog/digital) conversion section 1174. The A/D conversion section 1174 samples and quantizes (A/D converts) the analog-signal image data sent from the amplifier 1173 to covert to digital-signal image data, and sends to a memory 1175. The memory 1175 temporarily stores the image data sent from the A/D conversion section 1174.

A microphone 1176 converts sound which is air vibrations around the microphone to electric-signal audio data, and sends it to an amplifier 1177. The amplifier 1177 amplifies the audio data sent from the microphone 1176, and sends it to an A/D conversion section 1178. The A/D conversion section 1178 applies A/D conversion to the analog-signal audio data sent from the amplifier 1177 to obtain digital audio data, and sends it to a memory 1179. The memory 1179 temporarily stores the audio data sent from the A/D conversion section 1178.

A radio interface 1180 is the same interface as the radio interface 1137B described by referring to FIG. 64, and sends the image data and the audio data stored in the memories 1175 and 1179 to a predetermined television receiver constituting the scalable TV system 1161 by radio.

Radio communications between the radio interfaces 1137B and 1180 can be performed, for example, by TCP/IP (Transmission Control Protocol/Internet Protocol). In this case, IP addresses can be used to specify television receivers constituting the scalable TV system, to which the cameras $1162_1$ to $1162_3$ send image data and audio data.

The camera 1162 can be a portable camera. In this case, the user can easily install the camera 1162 so as to capture a desired place.

It is also possible that the camera 1162 encodes image data and audio data by MPEG or other methods and sends them.

Figure 68:
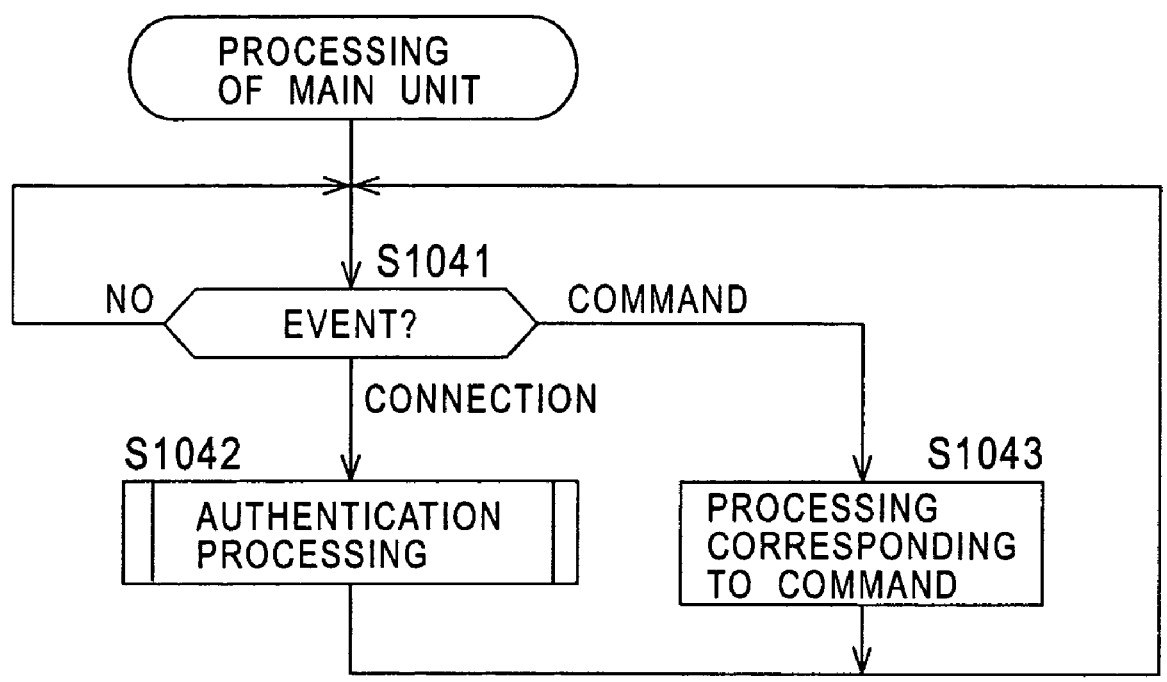
FIG. 68 is a flowchart explaining the processing of the main unit 1.

The processing of the main unit 1 (FIG. 64) serving as a television receiver constituting the scalable TV system 1161 shown in FIG. 66 will be next described by referring to a flowchart shown in FIG. 68.

First, in step S1041, the CPU 1129 determines whether an event has occurred in which any unit is connected to the terminal panel 21 or in which any command is sent through the IEEE-1394 interface 1133 or the IR receiving section 1135. When it is determined that no event has occurred, the processing returns to step S1041.

When it is determined in step S1041 that an event in which a unit is connected to the terminal panel 21 has occurred, the processing proceeds to step S1042, and the CPU 1129 performs authentication processing shown in FIG. 69, described later. Then, the processing returns to step S1041.

To determine whether a unit has been connected to the terminal panel 21, it is necessary to detect a state in which the unit has been connected to the terminal panel 21. This detection is performed, for example, in the following way.

When a unit is connected (through an IEEE-1394 cable) to the IEEE-1394 terminal 21$_{ij}$ provided for the terminal panel 21 (FIG. 3F), the terminal voltage of the IEEE-1394 terminal 21$_{ij}$ is changed. The IEEE-1394 interface 1133 is configured such that it reports the change of the terminal voltage to the CPU 1129. The CPU 1129 receives the report of the change of the terminal voltage from the IEEE-1394 interface 1133 to detect a state in which a new unit has been connected to the terminal panel 21. The CPU 1129 also recognizes a state in which a unit has been disconnected from the terminal panel 21 by, for example, the same method.

When it is determined in step S1041 that an event has occurred in which any command is sent through the IEEE-1394 interface 1133 or the IR receiving section 1135, the processing proceeds to step S1043, and the main unit 1 perform the processing corresponding to the command. Then, the processing returns to step S1041.

Next, the authentication processing performed by the main unit 1 in step S1042 shown in FIG. 68 will be described by referring to a flowchart shown in FIG. 69.

In the authentication processing performed by the main unit 1, two types of authentication is performed, whether a unit (hereinafter called, a connected unit, if necessary) newly connected to the terminal panel 21 is an authorized IEEE-1394 unit, and whether the IEEE-1394 unit is a television receiver (scalable-use unit) serving as a main unit or a subsidiary unit.

More specifically, in the authentication processing performed by the main unit 1, at first in step S1051, the CPU 1129 controls the IEEE-1394 interface 1133 to send an authentication request command for requesting mutual authentication, to the connected unit, and the processing proceeds to step S1052.

In step S1052, the CPU 1129 determines whether a response to the authentication request command has been returned from the connected unit. When it is determined in step S1052 that a response to the authentication request command has not been returned from the connected unit, the processing proceeds to step S1053, and the CPU 1129 determines whether time out has occurred, that is, whether a predetermined time has elapsed since the authentication request command was sent.

When it is determined in step S1053 that time out has occurred, in other words, that a response to the authentication request command was not returned from the connected unit even when the predetermined time elapsed after the authentication request command had been sent to the connected unit, the processing proceeds to step S1054. The CPU 1129 determines that the connected unit is not an authorized IEEE-1394 unit and authentication failed, and sets an operation mode to a stand-alone mode in which any data is not transferred with the connected unit. The processing returns.

Therefore, the main unit 1 does not transfer any data thereafter with the connected unit, which is not an authorized IEEE-1394 unit, as well as does not perform IEEE-1394 communications.

When it is determined in step S1053 that time out has not yet occurred, the processing returns to step S1052, and the same processes are repeated thereafter.

When it is determined in step S1052 that a response to the authentication request command has been returned from the connected unit, in other-words, that a response from the connected unit was received by the IEEE-1394 interface 1133 and sent to the CPU 1129, the processing proceeds to step S1055, and the CPU 1129 generates a random number (pseudo random number) R1 according to a predetermined algorithm and sends it to the connected unit through the IEEE-1394 interface 1133.

Then, the processing proceeds to step S1056, and the CPU 1129 determines whether an encrypted random number E'(R1) obtained by encrypting the random number R1 sent in step S1055, according to a predetermined algorithm (a secret-key encryption method such as DES (Data Encryption Standard), FEAL (Fast Data Encipherment Algorithm), or RC5) has been sent from the connected unit.

When it is determined in step S1056 that an encrypted random number E'(R1) has not been sent from the connected unit, the processing proceeds to step S1057, and the CPU 1129 determines whether time out has occurred, that is, whether a predetermined time has elapsed since the random number R1 was sent.

When it is determined in step S1057 that time out has occurred, in other words, that an encrypted random number E'(R1) was not returned from the connected unit even when the predetermined time elapsed after the random number R1 had been sent to the connected unit, the processing proceeds to step S1054. The CPU 1129, as described above, determines that the connected unit is not an authorized IEEE-1394 unit, and sets the operation mode to a stand-alone mode. The processing returns.

When it is determined in step S1057 that time out has not yet occurred, the processing returns to step S1056, and the same processes are repeated thereafter.

When it is determined in step S1056 that an encrypted random number E'(R1) has been returned from the connected unit, in other words, that an encrypted random number E'(R1) from the connected unit was received by the IEEE-1394 interface 1133 and sent to the CPU 1129, the processing proceeds to step S1058, and the CPU 1129 encrypts the random number R1 generated in step S1055, according to a predetermined encryption algorithm to generate an encrypted random number E(R1). The processing proceeds to step S1059.

In step S1059, the CPU 1129 determines whether the encrypted random number E'(R1) sent from the connected unit is equal to the encrypted random number E(R1) generated by the CPU 1129 in step S1058.

When it is determined in step S1059 that the encrypted random number E'(R1) is not equal to the encrypted random number E(R1), in other words, that the encryption algorithm (including the secret key used for encryption, if necessary) employed by the connected unit is different from the encryption algorithm employed by the CPU 1129, the processing proceeds to step S1054, and the CPU 1129, as described above, determines that the connected unit is not an authorized IEEE-1394 unit, and sets the operation mode to a stand-alone mode. The processing returns.

When it is determined in step S1059 that the encrypted random number E'(R1) is equal to the encrypted random number E(R1), in other words, that the encryption algorithm employed by the connected unit is equal to the encryption algorithm employed by the CPU 1129, the processing proceeds to step S1060, and the CPU 1129 determines whether a random number R2 used by the connected unit to authenticate the main unit 1 has been sent from the connected unit.

When it is determined in step S1060 that the random number R2 has not been received, the processing proceeds to step S1061, and the CPU 1129 determines whether time out has occurred, that is, for example, whether a predetermined time has elapsed after it was determined in step S1059 that the encrypted random number E'(R1) is equal to the encrypted random number E(R1).

When it is determined in step S1061 that time out has occurred, in other words, that the random number R2 was not sent from the connected unit even when the predetermined time elapsed, the processing proceeds to step S1054, and the CPU 1129, as described above, determines that the connected unit is not an authorized IEEE-1394 unit, and sets the operation mode to a stand-alone mode. The processing returns.

On the other hand, when it is determined in step S1061 that time out has not occurred, the processing returns to step S1060 and the same processes are repeated thereafter.

When it is determined in step S1060 that the random number R2 has been sent from the connected unit, in other words, that the random number R2 from the connected unit was received by the IEEE-1394 interface 1133 and sent to the CPU 1129, the processing proceeds to step S1062, and the CPU 1129 encrypts the random number R2 according to a predetermined encryption algorithm to generate an encrypted random number E(R1) and sends it through the IEEE-1394 interface 1133 to the connected unit.

When it is determined in step S1060 that the random number R2 has been sent from the connected unit, the connected unit is successfully authenticated as an IEEE-1394 unit.

Then, the processing proceeds to step S1063, and the CPU 1129 controls the IEEE-1394 interface 1133 to send a function-information request command for requesting the unit ID and the function information of the connected unit, and also sends the unit ID and the function information of the main unit 1 to the connected unit.

The unit ID is a unique ID identifying the television receiver serving as the main unit 1 or the subsidiary unit 2.

The function information is information related to own functions, and includes, for example, the types of commands to be received from the outside (for example, which of commands for controlling power on and off, volume adjustment, the channel, the luminance, and the sharpness is to be received from the outside), whether on-screen display (OSD display) is allowed, whether a muting state is allowed, and whether a sleep state is allowed. In addition, the function information also includes whether the unit has the functions of the main unit or the functions of a subsidiary unit.

The main unit 1 can store the unit ID and the function information, for example, in the EEPROM 1130 or in the vendor_dependent_information field of the configuration ROM shown in FIG. 15.

Then, the processing proceeds to step S1064, and the CPU 1129 waits for the unit ID and the function information of the connected unit to reach in response to the function-information request command sent to the connected unit in step S1063. The CPU 1129 receives the unit ID and the function information through the IEEE-1394 interface 1133 and stores them in the EEPROM 1130, and the processing proceeds to step S1065.

In step S1065, the CPU 1129 refers to the function information stored in the EEPROM 1130 to determine whether the connected unit is a subsidiary unit. When it is determined in step S1065 that the connected unit is a subsidiary unit, in other words, that the connected unit is successfully authenticated as a subsidiary unit, the processing skips steps S1066 and S1067 and proceeds to step S1068. The CPU 1129 sets the operation mode to a full-screen-display possible mode in which full-screen display is allowed. The processing returns.

On the other hand, when it is determined in step S1065 that the connected unit is not a subsidiary unit, the processing proceeds to step S1066, and the CPU 1129 refers to the function information stored in the EEPROM 1130 to determine whether the connected unit is a main unit. When it is determined in step S1066 that the connected unit is a main unit, in other words, that the connected unit is successfully authenticated as a main unit, the processing proceeds to step S1067, and the CPU 1129 performs a main-unit-and-subsidiary-unit adjustment process with the connected unit serving as a main unit.

Specifically, in this case, since the main unit 1 is connected to another main unit, there are two television receivers serving as main units among the television receivers constituting the scalable TV system. In the present embodiment, it is required that there be only one main unit in the scalable TV system. Therefore, in step S1067, the main-unit-and-subsidiary-unit adjustment process is performed in which whether the main unit 1 or the connected unit serving as a main unit functions as a television receiver serving as the main unit is determined.

More specifically, it is determined, for example, whichever main unit becomes earlier a part of the scalable TV system, that is, the main unit 1 in the present embodiment, functions as a television receiver serving as the main unit. The other main unit, which is not determined to function as the main unit, functions as a subsidiary unit.

After the main-unit-and-subsidiary-unit adjustment process is performed in step S1067, the processing proceeds to step S1068, and the CPU 1129, as described above, sets the operation mode to the full-screen-display possible mode, and the processing returns.

When it is determined in step S1066 that the connected unit is not a main unit, in other words, that the connected unit is neither a main unit nor a subsidiary unit, therefore, that the connected unit failed to be authenticated as a main unit or a subsidiary unit, the processing proceeds to step S1069, and the CPU 1129 sets the operation mode to a usual-function-command receiving/providing mode in which the existing AV/C command set can be transferred with the connected unit but control commands for providing the full-screen-display function cannot be transferred, and the processing returns.

In other words, in this case, since the connected unit is neither a main unit nor a subsidiary unit, even if such a connected unit is connected to the main unit 1, the full-screen-display function is not provided. In this case, however, since the connected unit is an authorized IEEE-1394 unit, the existing AV/C command set is allowed to be transferred between the main unit 1 and the connected unit. Therefore, in this case, between the main unit 1 and the connected unit, one (or another IEEE-1394 unit connected to the main unit 1) can control the other by the existing AV/C command set.

Figure 70:
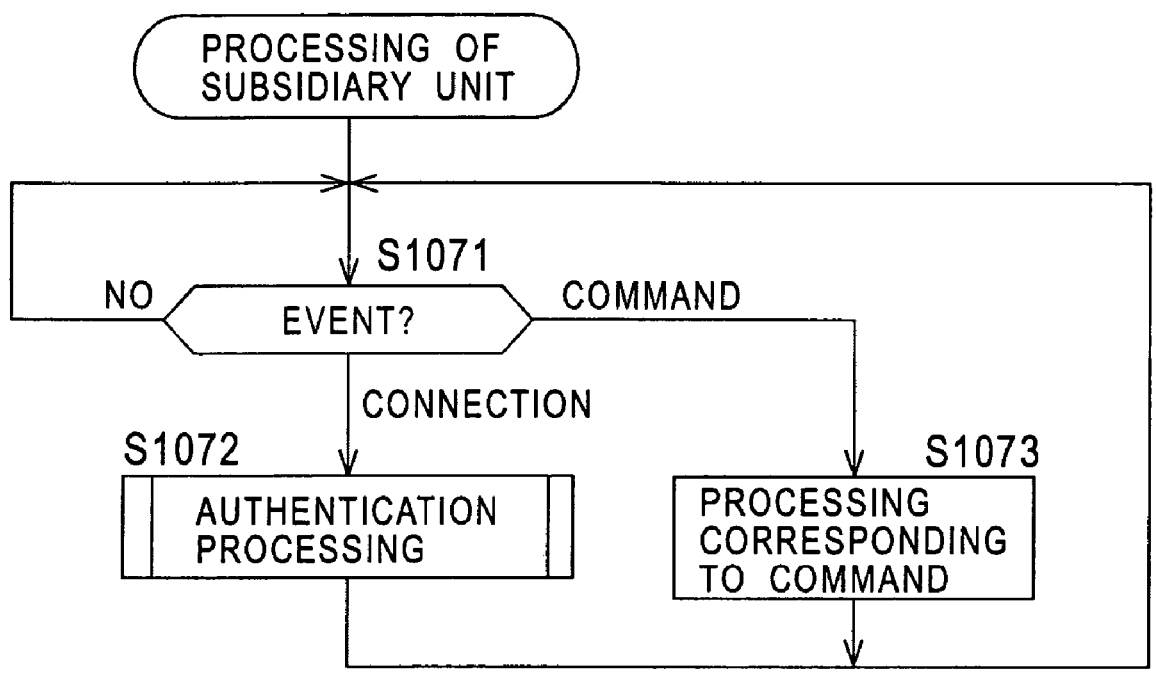
FIG. 70 is a flowchart explaining the processing of the subsidiary unit 2.

The processing of the subsidiary unit 2 (FIG. 65) serving as a television unit constituting the scalable TV system shown in FIG. 66 will be next described by referring to a flowchart shown in FIG. 70.

First, in step S1071, the CPU 1149 determines whether an event has occurred in which any unit is connected to the terminal panel 41 or in which any command is sent through the IEEE-1394 interface 1153 or the IR receiving section 1155. When it is determined that no event has occurred, the processing returns to step S1071.

When it is determined in step S1071 that an event in which a unit is connected to the terminal panel 41 has occurred, the processing proceeds to step S1072, and the CPU 1149 performs authentication processing shown in FIG. 71, described later. Then, the processing returns to step S1071.

To determine whether a unit has been connected to the terminal panel 41, it is necessary to detect a state in which the unit has been connected to the terminal panel 41. This detection is performed, for example, in the same way as that described in step S1041 shown in FIG. 68.

When it is determined in step S1071 that an event has occurred in which any command is sent through the IEEE-1394 interface 1153 or the IR receiving section 1155, the processing proceeds to step S1073, and the subsidiary unit 2 perform the processing corresponding to the command. Then, the processing returns to step S1071.

Next, the authentication processing performed by the subsidiary unit 2 in step S1072 shown in FIG. 70 will be described by referring to a flowchart shown in FIG. 71.

In the authentication processing performed by the subsidiary unit 2, two types of authentication is performed, whether a unit (hereinafter called, a connected unit, if necessary) newly connected to the terminal panel 41 is an authorized IEEE-1394 unit, and whether the IEEE-1394 unit is a main unit.

More specifically, in the authentication processing performed by the subsidiary unit 2, at first in step S1081, the CPU 1149 determines whether an authentication request command for requesting mutual authentication has been sent from the connected unit. When it is determined that the command has not been sent, the processing proceeds to step S1082.

In step S1082, the CPU 1149 determines whether time out has occurred, that is, whether a predetermined time has elapsed since the authentication processing was started.

When it is determined in step S1082 that time out has occurred, in other words, that an authentication request command was not sent from the connected unit even when the predetermined time elapsed after the authentication request command had been started, the processing proceeds to step S1083. The CPU 1149 determines that the connected unit is not an authorized IEEE-1394 unit and authentication failed, and sets an operation mode to a stand-alone mode in which any data is not transferred with the connected unit. The processing returns.

Therefore, the subsidiary unit 2 does not transfer any data with the connected unit, which is not an authorized IEEE-1394 unit, as well as does not perform IEEE-1394 communications, in the same way as the main unit 1.

When it is determined in step S1082 that time out has not yet occurred, the processing returns to step S1081, and the same processes are repeated thereafter.

Figure 69:
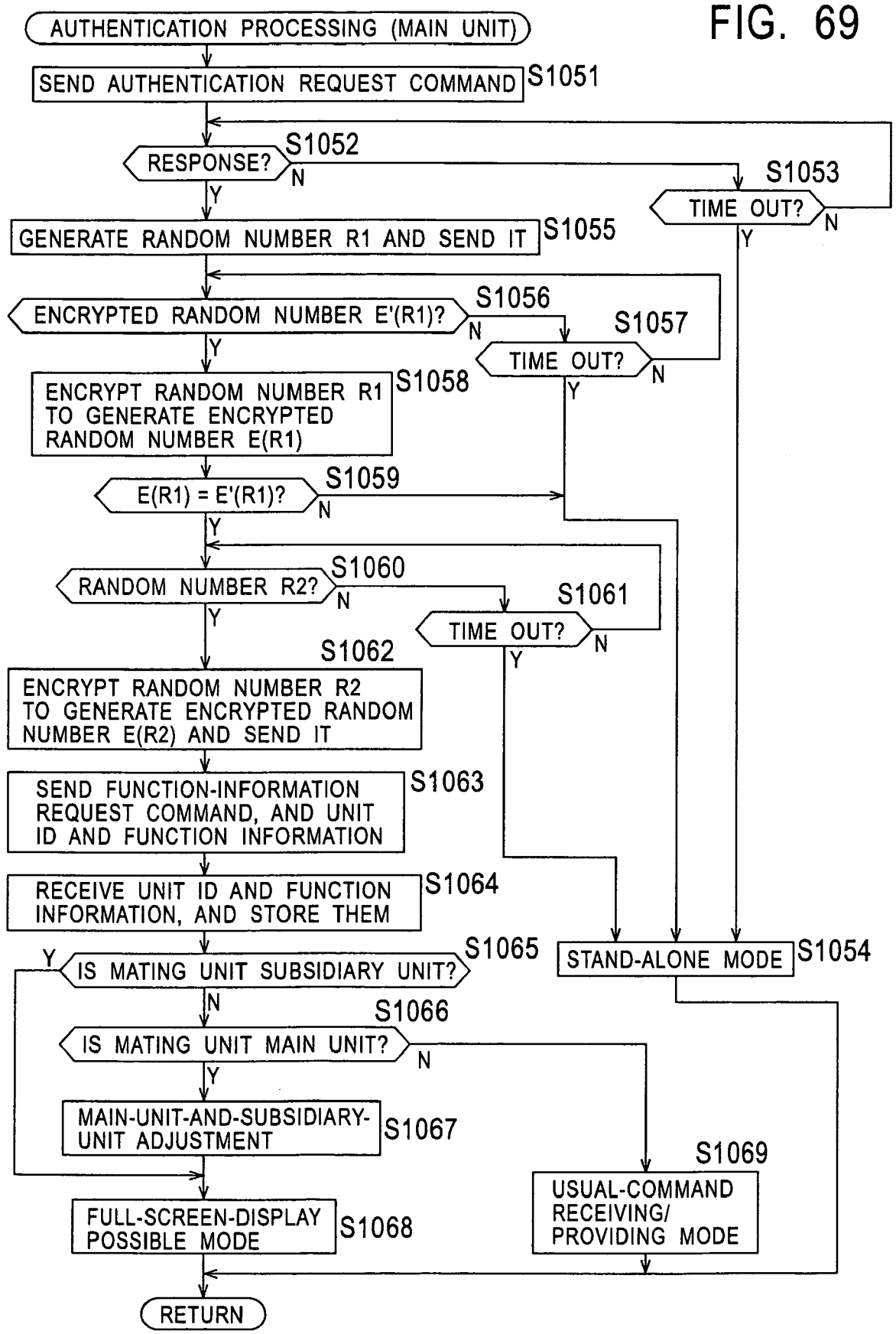
FIG. 69 is a flowchart explaining the authentication processing of the main unit 1.

When it is determined in step S1081 that an authentication request command has been sent from the connected unit, in other words, that an authentication command sent from the main unit 1 serving as the connected unit, in step S1051 shown in FIG. 69, was received by the IEEE-1394 interface 1153 and sent to the CPU 1149, the processing proceeds to step S1084, and the CPU 1149 controls the IEEE-1394 interface 1153 to send a response to the authentication request command to the connected unit.

Figure 71:
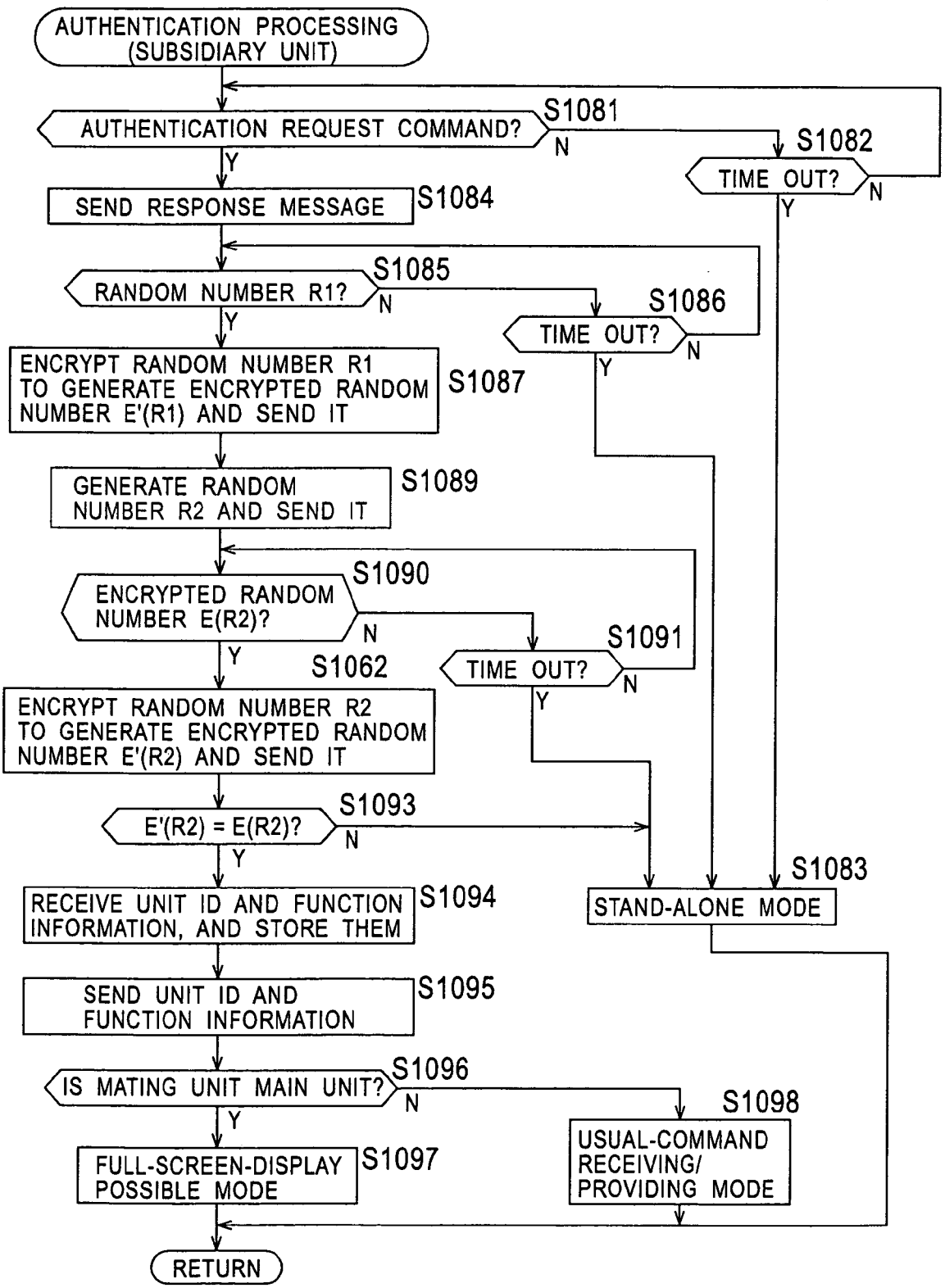
FIG. 71 is a flowchart explaining the authentication processing of the subsidiary unit 2.

In the present embodiment, the main unit 1 performs the processes of steps S1051 to S1053 shown in FIG. 69, and the subsidiary unit 2 performs the processes of steps S1081, S1082, and S1084 shown in FIG. 71. It is also possible that the subsidiary unit 2 performs the processes of steps S1051 to S1053 shown in FIG. 69, and the main unit 1 performs the processes of steps S1081, S1082, and S1084 shown in FIG. 71.

Then, the processing proceeds to step S1085, and the CPU 1149 determines whether a random number R1 has been sent from the connected unit. When it is determined that the random number R1 has not been sent, the processing proceeds to step S1086.

In step S1086, the CPU 1149 determines whether time out has occurred, that is, whether a predetermined time has elapsed since the CPU 1149 sent the response to the authentication request command in step S1084.

When it is determined in step S1086 that time out has occurred, in other words, that the random number R1 was not sent from the connected unit even when the predetermined time elapsed after the CPU 1149 had sent the response to the authentication command, the processing proceeds to step S1083. The CPU 1149, as described above, determines that the connected unit is not an authorized IEEE-1394 unit, and sets the operation mode to a stand-alone mode in which any data is not transferred with the connected unit. The processing returns.

When it is determined in step S1086 that time out has not yet occurred, the processing returns to step S1085, and the same processes are repeated thereafter.

When it is determined in step S1085 that the random number R1 has been sent from the connected unit, in other words, that the random number R1 sent from the main unit 1 serving as the connected unit in step S1055 shown in FIG. 69 was received by the IEEE-1394 interface 1153 and sent to the CPU 1149, the processing proceeds to step S1087, and the CPU 1149 encrypts the random number R1 according to a predetermined encryption algorithm to generate an encrypted random number E'(R1). In addition, in step S1087, the CPU 1149 controls the IEEE-1394 interface 1153 to send the encrypted random number E'(R1) to the connected unit. The processing proceeds to step S1089.

In step S1089, the CPU 1149 generates a random number (pseudo random number) R2, and controls the IEEE-1394 interface 1153 to send the random number R2 to the connected unit. The processing proceeds to step S1090.

In step S1090, the CPU 1149 determines whether the encrypted random number E(R2) generated by the main unit 1 serving as the connected unit in step S1062 shown in FIG. 69 by encrypting the random number R2 has been sent from the connected unit.

When it is determined in step S1090 that the encrypted random number E(R2) has not been received, the processing proceeds to step S1091, and the CPU 1149 determines whether time out has occurred, that is, whether a predetermined time has elapsed after the CPU 1149 sent the random number R2.

When it is determined in step S1091 that time out has occurred, in other words, that the encrypted random number E(R2) was not sent from the connected unit even when the predetermined time elapsed after the CPU had sent the random number R2 to the connected unit, the processing proceeds to step S1083, and the CPU 1149, as described above, determines that the connected unit is not an authorized IEEE-1394 unit, and sets the operation mode to a stand-alone mode. The processing returns.

On the other hand, when it is determined in step S1091 that time out has not occurred, the processing returns to step S1090 and the same processes are repeated thereafter.

When it is determined in step S1090 that the encrypted random number E(R2) has been sent from the connected unit, in other words, that the encrypted random number E(R2) from the connected unit was received by the IEEE-1394 interface 1153 and sent to the CPU 1149, the processing proceeds to step S1092, and the CPU 1149 encrypts the random number R2 generated in step S1089, according to a predetermined encryption algorithm to generate an encrypted random number E'(R2). The processing proceeds to step S1093.

In step S1093, the CPU 1149 determines whether the encrypted random number E(R2) sent from the connected unit is equal to the encrypted random number E'(R2) generated by the subsidiary unit 2 in step S1092.

When it is determined in step S1093 that the encrypted random number E(R2) is not equal to the encrypted random number E'(R2), in other words, that the encryption algorithm (including the secret key used for encryption, if necessary) employed by the connected unit is different from the encryption algorithm employed by the CPU 1149, the processing proceeds to step S1083, and the CPU 1149, as described above, determines that the connected unit is not an authorized IEEE-1394 unit, and sets the operation mode to a stand-alone mode. The processing returns.

When it is determined in step S1093 that the encrypted random number E(R2) is equal to the encrypted random number E'(R2), in other words, that the encryption algorithm employed by the connected unit is equal to the encryption algorithm employed by the CPU 1149, and thereby the connected unit is successfully authenticated as an authorized IEEE-1394 unit, the processing proceeds to step S1094, and the CPU 1149 receives through the IEEE-1394 interface 1153 the unit ID and the function information sent together with the function-information request command by the main unit 1 serving as the connected unit in step S1063 shown in FIG. 69, and stores them in the EEPROM 1150.

Then, the processing proceeds to step S1095, and the CPU 1149 controls the IEEE-1394 interface 1153 to send the unit ID and the function information of the subsidiary unit 2 to the connected unit, in response to the function-information request command received from the connected unit in step S1094. Then, the processing proceeds to step S1096.

The subsidiary unit 2 can store the unit ID and the function information in the EEPROM 1150 or in the vendor_dependent_information field of the configuration ROM shown in FIG. 15, in the same way as the main unit 1 described by referring to FIG. 69.

In step S1096, the CPU 1149 refers to the function information stored in the EEPROM 1150 to determine whether the connected unit is a main unit. When it is determined in step S1096 that the connected unit is a main unit, in other words, that the connected unit is successfully authenticated as a main unit, the processing proceeds to step S1097, and the CPU 1149 sets the operation mode to the full-screen-display possible mode, described in step S1068 of FIG. 69. The processing returns.

On the other hand, when it is determined in step S1096 that the connected unit is not a main unit, in other words, that the connected unit failed to be authenticated as a main unit, the processing proceeds to step S1098, and the CPU 1149 sets the operation mode to a usual-function-command receiving/providing mode in which the existing AV/C command set can be transferred with the connected unit but control commands for providing full-screen-display cannot be transferred, and the processing returns.

In other words, in this case, since the connected unit is not a main unit, even if such a connected unit is connected to the subsidiary unit 2, the full-screen-display function is not provided. Therefore, the full-screen-display function is not provided just by connecting another subsidiary unit to the subsidiary unit 2. In this case, however, since the connected unit is an authorized IEEE-1394 unit, the existing AV/C command set is allowed to be transferred between the subsidiary unit 2 and the connected unit. Therefore, in this case, between the subsidiary unit 2 and the connected unit (including other subsidiary units), one can control the other by the existing AV/C command set.

Figure 72A:
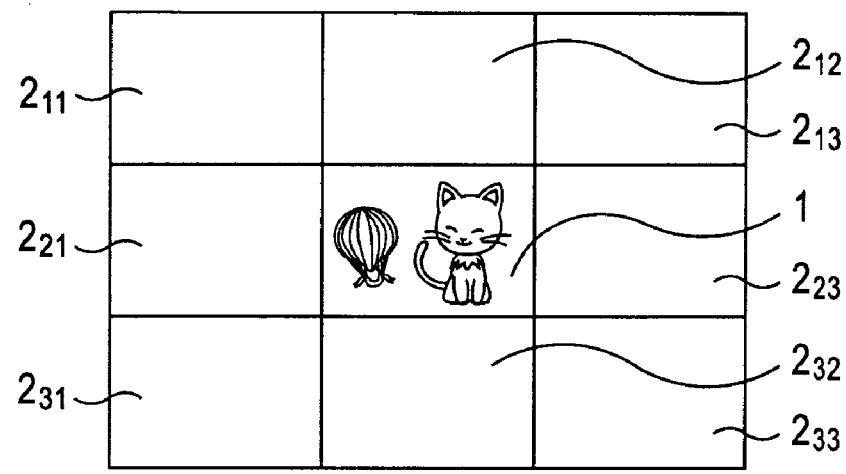
FIG. 72A is a view showing example display in the main unit 1 of a scalable TV system 1161.
Figure 72B:
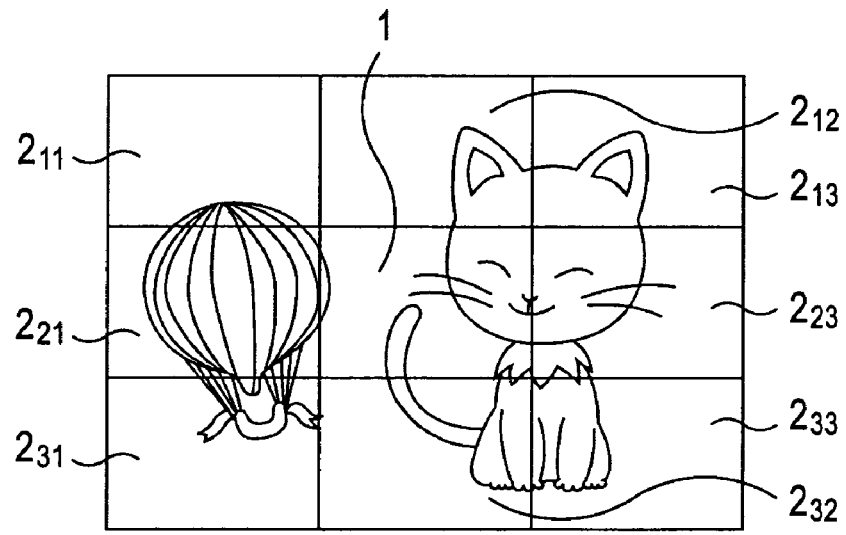
FIG. 72B is a view showing example full-screen display in the scalable TV system 1161.

Next, when the main unit 1 and the subsidiary unit 2 serving as television receivers constituting the scalable TV system shown in FIG. 66 successfully finish the authentication processing described by referring to FIG. 69 and FIG. 71, respectively, and the main unit 1 and the subsidiary unit 2 set their operation mode to the full-screen-display possible mode, the scalable TV system 1161 can perform full-screen display such as those shown in FIG. 72A and FIG. 72B.

In other words, for example, when the main unit 1 displays image data as shown in FIG. 72A, if the controller 15 (or 35) is operated to instruct to perform full-screen display, the scalable TV system 1161 displays the image data displayed in the main unit 1, over the full display screen of the television receivers constituting the scalable TV system, as shown in FIG. 72B.

Specifically, when the main unit 1 outputs the image and sound of a program (displays the image and outputs the sound), for example, if the user operates the menu button switch 54 in the controller 15 (FIG. 7) so as to turn the switch on, the controller 15 emits the infrared ray corresponding to the user's operation. The infrared ray is received by the IR receiving section 1135 of the main unit 1 (FIG. 64), and the menu screen is displayed on the CRT 11 of the main unit 1. An icon (hereinafter called a full-screen-display icon, if necessary) indicating full-screen display is, for example, displayed in the menu screen. When the user operates the controller 15 to click on the full-screen-display icon, the main unit 1 and the subsidiary units 2 perform full-screen display.

In other words, in this case, the CPU 1129 of the main unit 1 (FIG. 64) obtains the area of the image data to be displayed by the main unit 1 and the area of the image data to be displayed by each subsidiary unit $2_{ij}$ in the area of the image data displayed on the CRT 11. In addition, the CPU 1129 of the main unit 1 controls the IEEE-1394 interface 1133 to send the image data to be displayed in each subsidiary unit $2_{ij}$ to the subsidiary unit $2_{ij}$ together with a full-screen-display command for instructing to perform full-screen display. The CPU 1129 of the main unit 1 converts the image data to the area to be displayed by the main unit 1 to image data having the full-screen size of the CRT 11, for example, by interpolation, and sends it through the selector 1127 and the NTSC encoder 1128 to the CRT 11 and displays thereon. According to the full-screen-display command sent from the main unit 1, each subsidiary unit 2 performs the same processing as the main unit 1 to display the image data sent from the main unit 1 on the whole of the CRT 31.

With the foregoing operation, the television receivers constituting the scalable TV system 1161 display the image data over the whole of the display screens, as shown in FIG. 72B.

When the image data displayed over the whole of the display screens of the television receivers constituting the scalable TV system 1161 is called full-screen image data, the scalable TV system 1161 does not display a part of the full-screen image data. Since the scalable TV system 1161 actually has the housings of the television receivers constituting the scalable TV system 1161, the housings are located at the boundaries of adjacent television receivers, and an image is not displayed at the boundaries. In FIG. 72A and FIG. 72B, to make the figures simple, the housings located at the boundaries of adjacent television receivers are omitted. Actually, the housings exist at the boundaries of adjacent television receivers, and therefore, the full-screen image data is not displayed at the housings of the television receivers although just a part thereof, and the image data is partitioned.

However, since the human sense of sight has an interpolation function for interpolating a part of an image, hidden by a minute-width line, from surrounding parts of the image, the above-described problem is not a large one when viewing full-screen image data.

After the full-screen image data is displayed as described above, when the user operates the controller 15 (FIG. 7) to display the menu screen on the CRT 11 and further clicks on the full-screen-display icon on the menu screen, and thereby the infrared ray indicating a full-screen-display termination command for instructing to terminate full-screen display, corresponding to the operation on the controller 15, is emitted from the controller 15, received by the IR receiving section 1135, and sent to the CPU 1129, for example, the display of the main unit 1 returns to a usual-size display as shown in FIG. 72A. In this case, a full-screen-display termination command is sent from the main unit 1 to each subsidiary unit $2_{ij}$ through the IEEE-1394 interface 1133, and thereby the display of each subsidiary unit $2_{ij}$ returns to the original state.

In the present embodiment, only when the authentication described by referring to FIG. 69 and FIG. 71 is successfully performed, the full-screen-display function is provided. Even when the authentication fails, the full-screen-display function can be provided.

Next, processing for warning the user of the occurrence of an emergency state, executed by the security system section 1137 (FIG. 64) in the main unit 1 will be described.

The security system section 1157 (FIG. 65) of the subsidiary unit 2 also performs processing for warning the user of the occurrence of an emergency state. Since the processing is the same as that performed by the security system section 1137 of the main unit 1, a description thereof is omitted.

The processing for warning the user of the occurrence of an emergency state can be performed by a television receiver along serving as the main unit 1 or the subsidiary unit. In the same way as when the full-screen-display function is provided, it is possible that the processing is performed only when the authentication described by referring to FIG. 69 and FIG. 71 is successfully performed.

Figure 73:
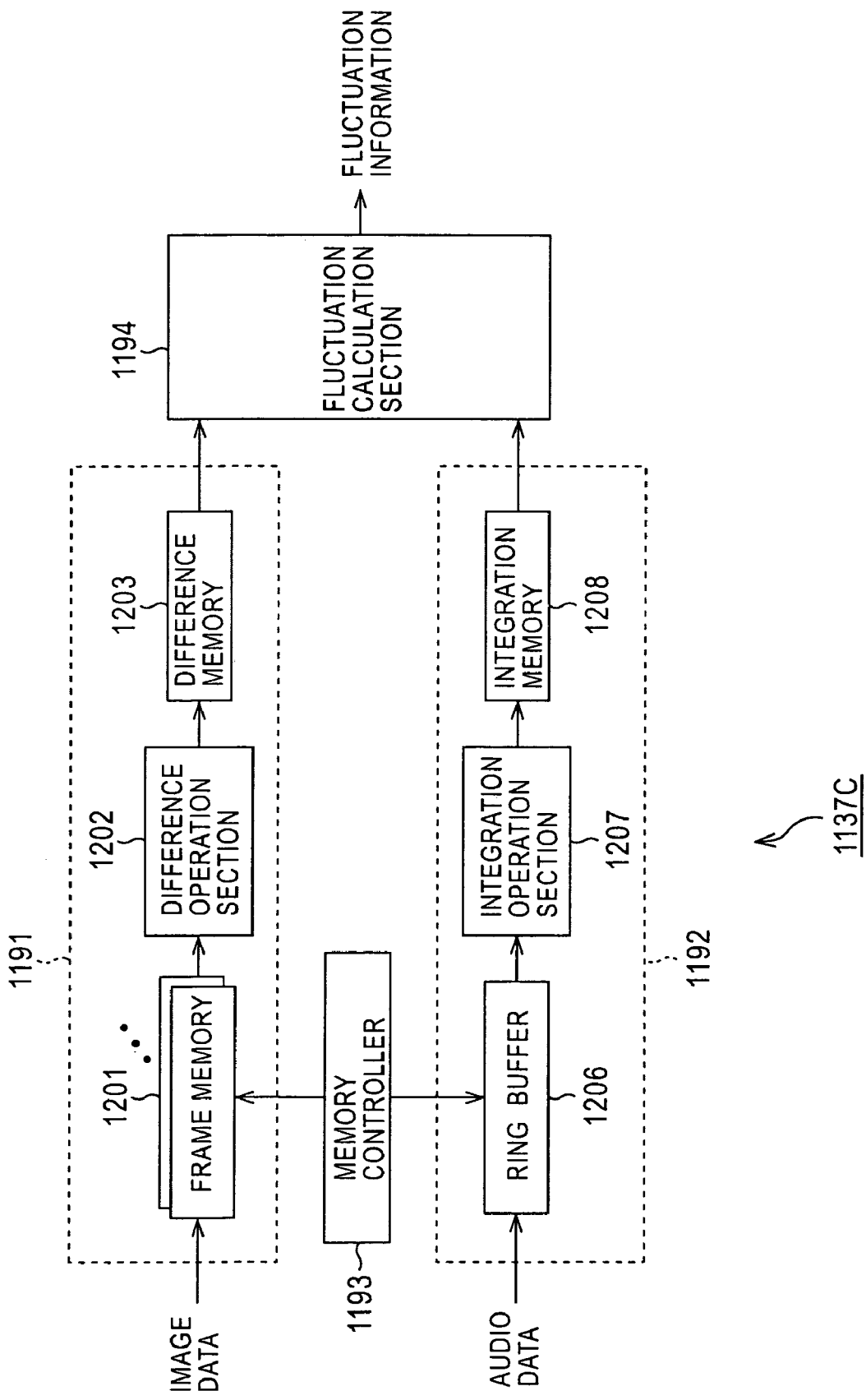
FIG. 73 is a block diagram showing an example structure of a data processing section 1137C.

FIG. 73 shows an example structure of the data processing section 1137C of the security system section 1137 shown in FIG. 64.

In the security system section 1137, the image data and the audio data sent from the camera 1162 and received by the radio interface 1137B are sent to an image processing section 1191 and an audio processing section 1192.

The image processing section 1191 detects the feature amount of the image data sent from the radio interface 1137B, for example, in each frame or in each field, and sends it to a fluctuation calculation section 1194.

More specifically, the image processing section 1191 is formed of a frame memory 1201, a difference operation section 1202, and a difference memory 1203. The frame memory 1201 temporarily stores the image data sent from the radio interface 1137B according to the control of a memory controller 1193. The difference operation section 1202 sequentially sets one of the time-sequential frames of image data stored in the frame memory 1201 to a designated frame, and calculates the differences between the image data of the designated frame and the image data of the frame (hereinafter called a preceding frame, if necessary) one frame before the designated frame, and sends difference image data formed of the differences to the difference memory 1203. The difference memory 1203 temporarily stores the difference image data in units of frames sent from the difference operation section 1202.

The audio processing section 1192 detects the feature amount of the audio data sent from the radio interface 1137B, every predetermined number of frames, and sends it to a fluctuation calculation section 1194.

More specifically, the audio processing section 1192 is formed of a ring buffer 1206, an integration operation section 1207, and an integration memory 1208. The ring buffer 1206 temporarily stores the audio data sent from the radio interface 1137B according to the control of the memory controller 1193. The integration operation section 1207 sequentially sets one of frames each formed of a predetermined number of samples in the time-sequential audio data stored in the ring buffer 1206 to a designated frame, and integrates (adds) the audio-data samples constituting the designated frame, and sends the integral to the integration memory 1208. The integration memory 1208 temporarily stores the integral of the audio data in units of frames sent from the integration operation section 1207.

The integration operation section 1207 calculates the integral of audio data in units of frames, and further, for example, can extract a one predetermined sample of the audio data constituting a frame.

The memory controller 1193 controls writing addresses and reading addresses for the frame memory 1201 of the image processing section 1191 and for the ring buffer 1206 of the audio processing section 1192.

The fluctuation calculation section 1194 reads the difference image data in units of frames from the difference memory 1203 of the image processing section 1191 as the feature amount of the image data of the frame, and also reads the integral in units of frames from the integration memory 1208 of the audio processing section 1192 as the feature amount of the audio data of the frame. In addition, the fluctuation calculation section 1194 obtains a fluctuation component in the feature amount of the image data and a feature component in the feature amount of the audio data, and sends them to the warning processing section 1137D (FIG. 64) in a subsequent stage as fluctuation information.

In the data processing section 1137C structured in the foregoing way, image-data processing and audio-data processing for processing the image data and the audio data sent from the radio interface 1137B are performed.

The image-data processing and the audio-data processing performed by the data processing section 1137C will be described by referring to flowcharts shown in FIG. 74A and FIG. 74B.

Figure 74B:
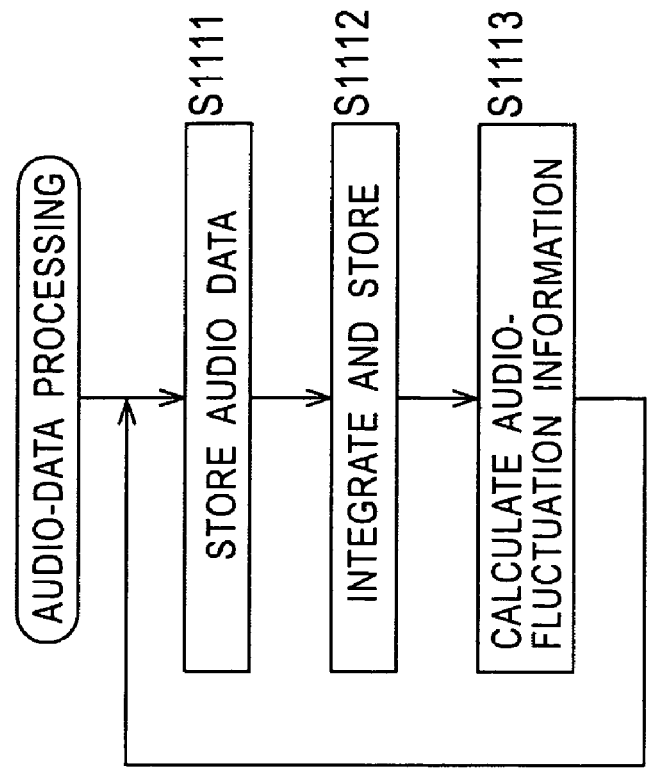
FIG. 74B is a flowchart explaining the audio data processing of the data processing section 1137C.
Figure 74A:
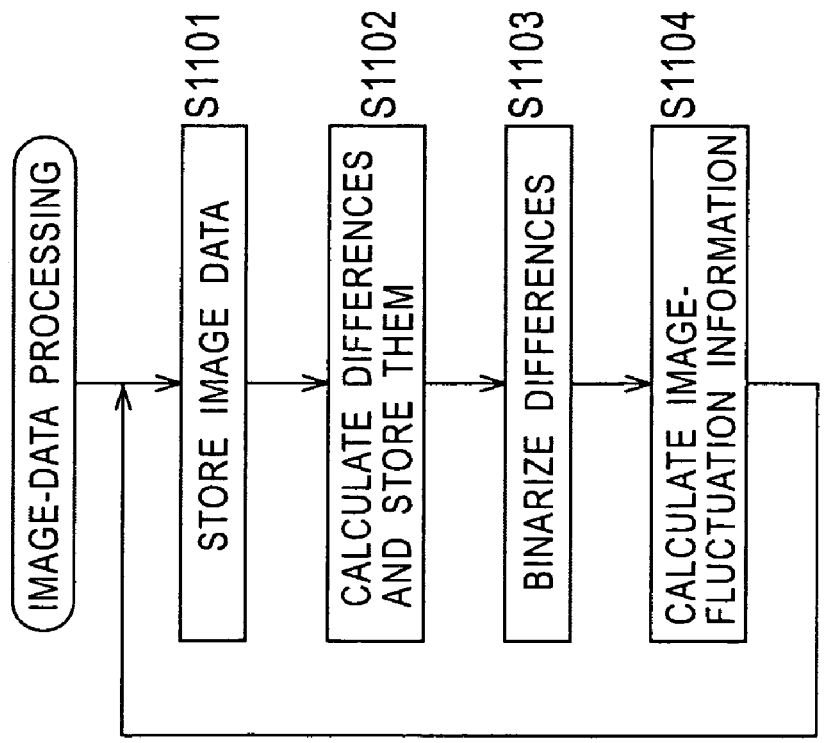
FIG. 74A is a flowchart explaining the image data processing of the data processing section 1137C.

The image-data processing will be first described by referring to the flowchart shown in FIG. 74A.

In the image-data processing, first in step S1101, the frame memory 1201 stores one-frame image data sent from the radio interface 1137B. The processing proceeds to step S1102. In step S1102, the difference operation section 1202 sets the image-data frame stored in the frame memory 1201 in the process of step S1101, immediately before, to a designated frame, reads the image data of the designated frame, and also reads the image data of the preceding frame stored in the frame memory 1201 in the process of step S1101 in the preceding time. Further, in step S1102, the difference operation section 1202 subtracts the pixel values of each pixel constituting the image data of the preceding frame from the pixel value of the corresponding pixel constituting the image data of the designated frame, and obtains the absolute values of the obtained differences to generate difference image data having the absolute values as pixel values. The difference image data of the designated frame is sent to the difference memory 1203 and stored therein.

Then, the processing proceeds to step S1103, and the fluctuation calculation section 1194 reads the difference image data of the designated frame from the difference memory 1203, and binarizes it. More specifically, the fluctuation calculation section 1194 compares the pixel value of each pixel constituting the difference image data with a predetermined threshold. Further, when the pixel value is larger than (or equal to or larger than) the predetermined threshold, the fluctuation calculation section 1194 sets the pixel value, for example, to "1", and when the pixel value is equal to or smaller than (smaller than) the predetermined threshold, the fluctuation calculation section 1194 sets the pixel value, for example, to "0". The processing proceeds to step S1104.

In step S1104, the fluctuation calculation section 1194 counts the number of certain pixels in the image data (hereinafter called binarized image data, if necessary) having pixel values of "0" and "1", as described above, for the designated frame. More specifically, the fluctuation calculation section 1194 counts the number of pixels having a pixel value of, for example, "1" among "0" and "1" in the binarized image data, and outputs it to the warning processing section 237D as the fluctuation information of the image data of the designated frame.

Then, the image data of the next frame is waited for to be sent from the radio interface 1137B. The processing proceeds to step S1101, and the same processes are repeated thereafter.

The audio-data processing will be described next by referring to the flowchart shown in FIG. 74B.

In the audio-data processing, at first, in step S1111, the ring buffer 1206 stores one-frame audio data sent from the radio interface 1137B. The processing proceeds to step S1112. In step S1112, the integration operation section 1207 sets the frame of the audio data stored in the ring buffer 1206 in the process of step S1111 immediately before, to a designated frame, reads the audio data of the designated frame, and calculates the sum of the samples in the audio data of the designated frame, that is, the integral thereof. The integral of the audio data is sent to the integration memory 1208 and stored therein.

Then, the processing proceeds to step S1113, and the fluctuation calculation section 1194 reads the integrals of the audio data of the designated frame and the audio data of the frame (preceding frame) one frame before the designated frame, and obtains the difference therebetween. The fluctuation calculation section 1194 outputs the difference to the warning processing section 237D as the fluctuation information of the audio data of the designated frame.

Then, the audio data of the next frame is waited for to be sent from the radio interface 1137B. The processing proceeds to step S1111, and the same processes are repeated thereafter.

Figure 75:
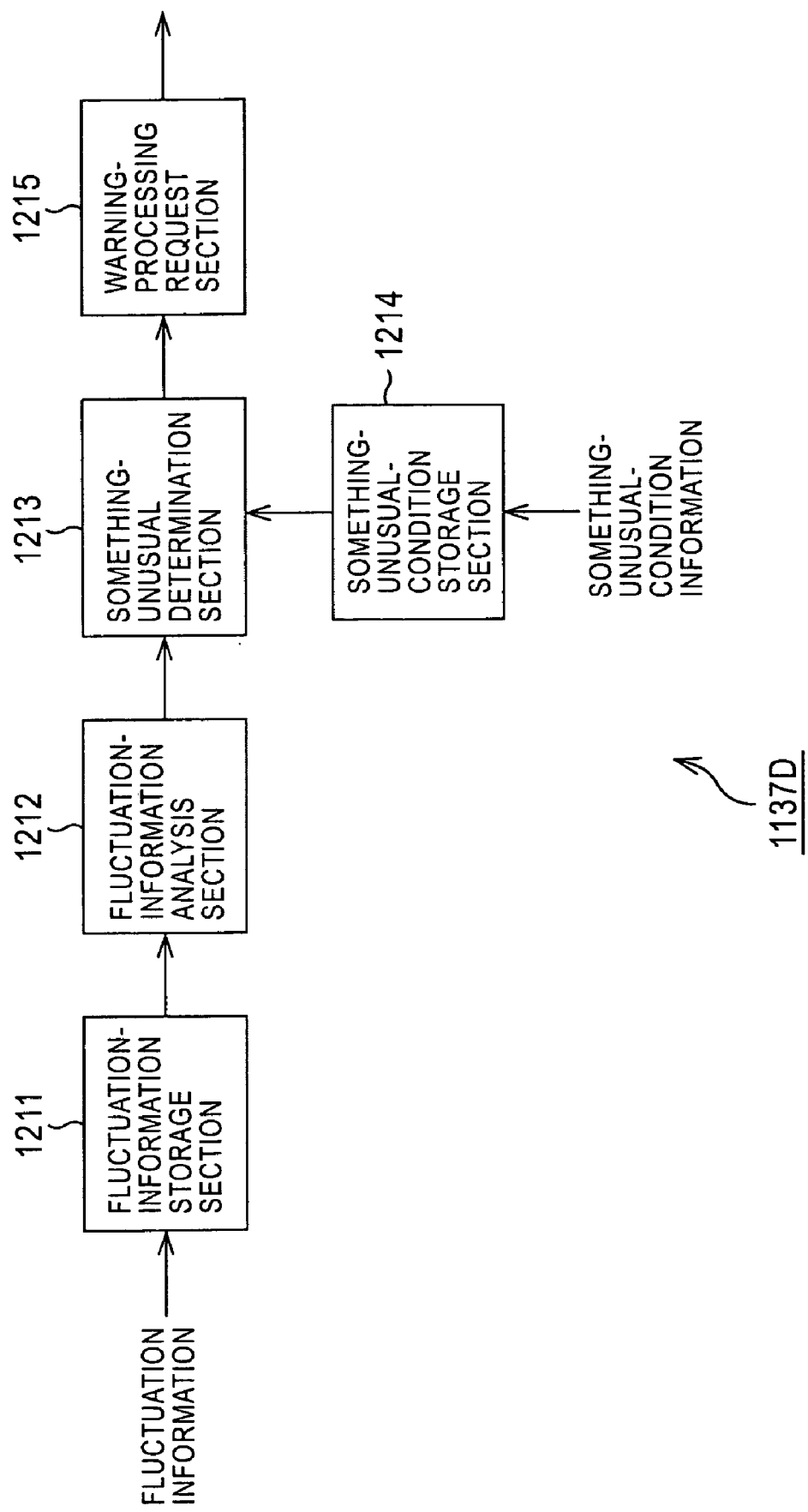
FIG. 75 is a block diagram showing an example structure of a warning processing section 1137D.

Next, FIG. 75 shows an example structure of the warning processing section 1137D shown in FIG. 64.

A fluctuation-information storage section 1211 temporarily stores the fluctuation information of the image data and the audio data, sent from the data processing section 1137C as described by referring to FIG. 73, FIG. 74A, and FIG. 74B.

The fluctuation-information analysis section 1212 analyzes the fluctuation information of the image data and the audio data, stored in the fluctuation-information storage section 1211 to obtain fluctuation components in time of the feature amounts of the image data and the audio data, and sends them to a something-unusual determination section 1213.

The something-unusual determination section 1213 determines whether the fluctuation components in time of the feature amounts of the image data and the audio data, sent from the fluctuation-information analysis section 1212 satisfy an something-unusual condition stored in a something-unusual-condition storage section 1214, and sends the results of determination to a warning-processing request section 1215.

The warning-processing request section 1215 requests the security controller 1137 (FIG. 64) to perform the warning processing for warning the user of the occurrence of an emergency state (something unusual), according to the results of determination sent from the something-unusual determination section 1213.

The something-unusual-condition storage section 1214 stores the something-unusual condition which the fluctuation components in time of the feature amounts of the image data and the audio data should satisfy when the something-unusual determination section 1213 determines that a something unusual has occurred.

In the something-unusual-condition storage section 1214, an error condition can be specified in advance, or a something-unusual condition specified by the user can be stored. Specifically, the user can operate the controller 15, for example, to input a something-unusual condition. The something-unusual condition input by operating the controller 15 is sent through the IR receiving section 1135, the CPU 1129, and the security controller 1137A to the something-unusual-condition storage section 1214 of the warning processing section 1137D and stored therein.

In the warning processing section 1137D structured as described above, it is determined according to the fluctuation information of image data and audio data whether a something unusual has occurred, and when a something unusual has occurred, something-unusual-determination/warning processing for warning the user of something unusual is performed.

The something-unusual-determination/warning processing performed by the warning processing section 1137D will be described by referring to a flowchart shown in FIG. 76.

The fluctuation-information storage section 1211 successively receives the fluctuation information of the image data and the audio data, output from the data processing section 1137C in the preceding stage, and temporarily stores the fluctuation information.

In step S1121, the fluctuation-information analysis section 1212 analyzes the fluctuation information of the image data and the audio data, stored in the fluctuation-information storage section 1211 to obtain fluctuation components in time of the feature amounts of the image data and the audio data, and sends them to the something-unusual determination section 1213. The processing proceeds to step. S1122.

In step S1122, the something-unusual determination section 1213 determines whether the fluctuation components in time of the feature amounts of the image data and the audio data, sent from the fluctuation-information analysis section 1212 satisfy a something-unusual condition stored in the something-unusual-condition storage section 1214.

When it is determined in step S1122 that the fluctuation components in time of the feature amounts of the image data and the audio data, sent from the fluctuation-information analysis section 1212 do not satisfy the something-unusual condition, the fluctuation information of the next image data and audio data is waited for to be stored in the fluctuation-information storage section 1211. The processing returns to step S1121.

When it is determined in step S1122 that the fluctuation components in time of the feature amounts of the image data and the audio data, sent from the fluctuation-information analysis section 1212 satisfy the something-unusual condition, the something-unusual determination section 1213 sends the result of determination, indicating that the something-unusual condition is satisfied, to the warning-processing request section 1215. The processing proceeds to step S1123.

In step S1123, the warning-processing request section 1215 requests the security controller 1137 (FIG. 64) to perform the warning processing for warning the user of the occurrence of an emergency state, in response to the result of determination, indicating that the something-unusual condition is satisfied, sent from the something-unusual determination section 1213. The fluctuation information of the next image data and audio data is waited for to be stored in the fluctuation-information storage section 1211, and the processing returns to step S1121.

Next, the processing of the something-unusual determination section 1213 will be further described by referring to FIG. 77A to FIG. 77D and FIG. 78A to FIG. 78I.

The something-unusual determination section 1213 determines that the something-unusual condition is satisfied, when the fluctuation information of image data and audio data is changed, for example, in a manner different from before.

Specifically, when fluctuation information which has not been largely changed is largely changed suddenly, or when fluctuation information which has been changed to some extent becomes unchanged suddenly, for example, the fluctuation-information analysis section 1212 determines that the something-unusual condition is satisfied.

Whether fluctuation information which has not been largely changed is largely changed suddenly can be determined, for example, when the fluctuation-information analysis section 1212 differentiate the fluctuation information (calculates the differences between adjacent pieces of fluctuation information consecutive time sequentially), and the something-unusual determination section 1213 determines whether the absolute value of the differential is equal to or larger than a predetermined threshold. In this case, the predetermined threshold is stored in the something-unusual-condition storage section 1214 as a something-unusual condition.

Whether fluctuation information which has been changed to some extent becomes unchanged suddenly can be determined, for example, when the something-unusual determination section 1213 determines whether the fluctuation information has a value close to zero continuously for a period equal to or longer than a predetermined period. In this case, the predetermined period is stored in the something-unusual-condition storage section 1214 as a something-unusual condition.

FIG. 77A to FIG. 77D show examples of image data captured by the camera 1162 and the fluctuation information of the image data.

As shown in FIG. 77A, for example, when the camera 1162 is capturing the images of an aged persons who is walking in a room, the fluctuation information of the image data is changed moderately, as shown in FIG. 77B. When the camera 1162 captures the image of an aged person who had been walking but suddenly fell, as shown in FIG. 77C, for example, the fluctuation information of the image data is largely changed, and becomes almost zero thereafter, as shown in FIG. 77D.

Therefore, when a state in which the fluctuation information of image data suddenly exceeds a predetermined threshold, that is, a state in which the differential of the fluctuation information of image data becomes equal to or larger than a predetermined threshold, is set to a something-unusual condition, an unusual state in which an aged person fell can be detected. By warning the user of such an unusual state, the aged person can be quickly nursed (rescued).

As shown in FIG. 77C, if a person suddenly falls, the fluctuation information of the image data suddenly exceeds a predetermined threshold and becomes close to zero thereafter. Therefore, the differential of the fluctuation information of image data becomes equal to or larger than a predetermined threshold and the fluctuation information of the image data becomes close to zero thereafter. When a state in which the fluctuation information is continuously close to zero for a predetermined period or more is set to a something-unusual condition, it is possible to detect an unusual state in which a person fell.

FIG. 78A to FIG. 78I show examples of image data and audio data captured by the camera 1162 and the fluctuation information of the image data and the audio data.

Figure 78A:
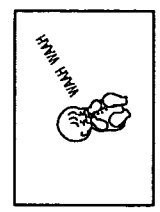
FIG. 78A is a view explaining the processing of the something-unusual determination section 1213.
Figure 78D:
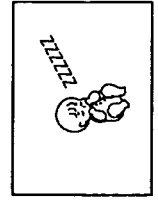
FIG. 78D is a view explaining the processing of the something-unusual determination section 1213.
Figure 78G:
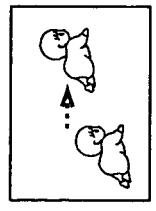
FIG. 78G is a view explaining the processing of the something-unusual determination section 1213.
Figure 78B:
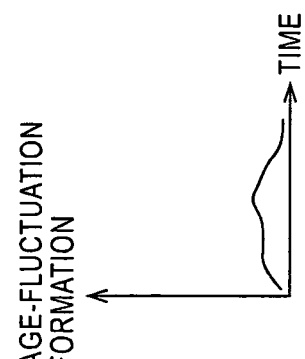
FIG. 78B is a view explaining the processing of the something-unusual determination section 1213.
Figure 78E:
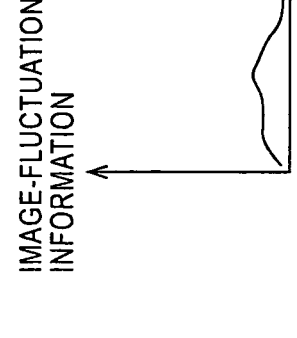
FIG. 78E is a view explaining the processing of the something-unusual determination section 1213.
Figure 78H:
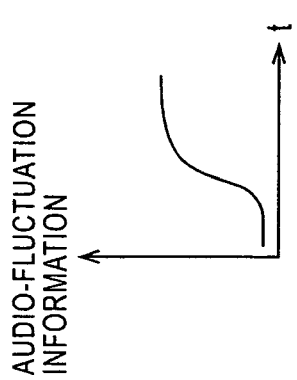
FIG. 78H is a view explaining the processing of the something-unusual determination section 1213.
Figure 78C:
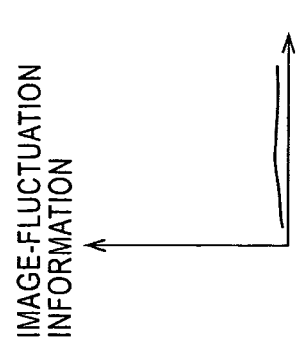
FIG. 78C is a view explaining the processing of the something-unusual determination section 1213.
Figure 78F:
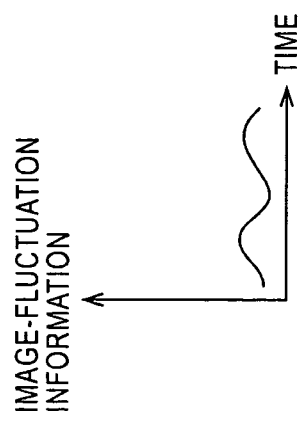
FIG. 78F is a view explaining the processing of the something-unusual determination section 1213.

As shown in FIG. 78A, for example, when the camera 1162 is capturing the images of an infant who is crawling in a room, the fluctuation information of the image data and the audio data is changed moderately, as shown in FIG. 77B and FIG. 78C. When the camera 1162 captures the image of an infant who had been crawling in the room but fell asleep, as shown in FIG. 77D, for example, the fluctuation information of the image data and the audio data becomes almost zero and is changed little, as shown in FIG. 78E and FIG. 78F.

Therefore, in this case, when a state in which the fluctuation information of the image data and the audio data becomes close to zero and is continuously close to zero for a predetermined period is set to a something-unusual condition, an unusual state in which the infant fell asleep can be detected. By warning the user of such an unusual state, the user can promptly perform some action, such as putting a blanket over the infant.

Figure 78I:
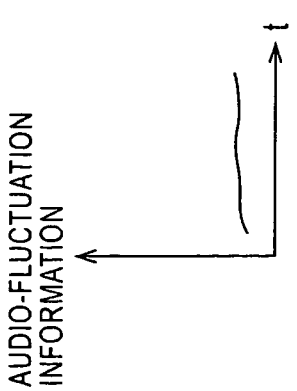
FIG. 78I is a view explaining the processing of the something-unusual determination section 1213.

As shown in FIG. 78G, if an infant who had been sleeping suddenly waked up and starts crying, the fluctuation information of the image data and the audio data captured by the camera 1162 becomes like that shown in FIG. 78H and that shown in FIG. 78I.

In this case, the crying infant moves more than when the infant is sleeping, but moves less than when the infant is crawling, the fluctuation information of the image data is not much changed, as shown in FIG. 78H.

However, when an infant who was sleeping starts crying, since the infant cries intermittently, the fluctuation information of the audio data suddenly becomes a large value and continues to have the large value for a certain period, as shown in FIG. 78I.

Therefore, in this case, when a state in which the fluctuation information of the audio data suddenly becomes a large value and continues to have the large value for a certain period is set to a something-unusual condition, an unusual state in which the infant waked up and is crying can be detected. By warning the user of such an unusual state, it can be promptly reported that the infant waked up.

Figure 76:
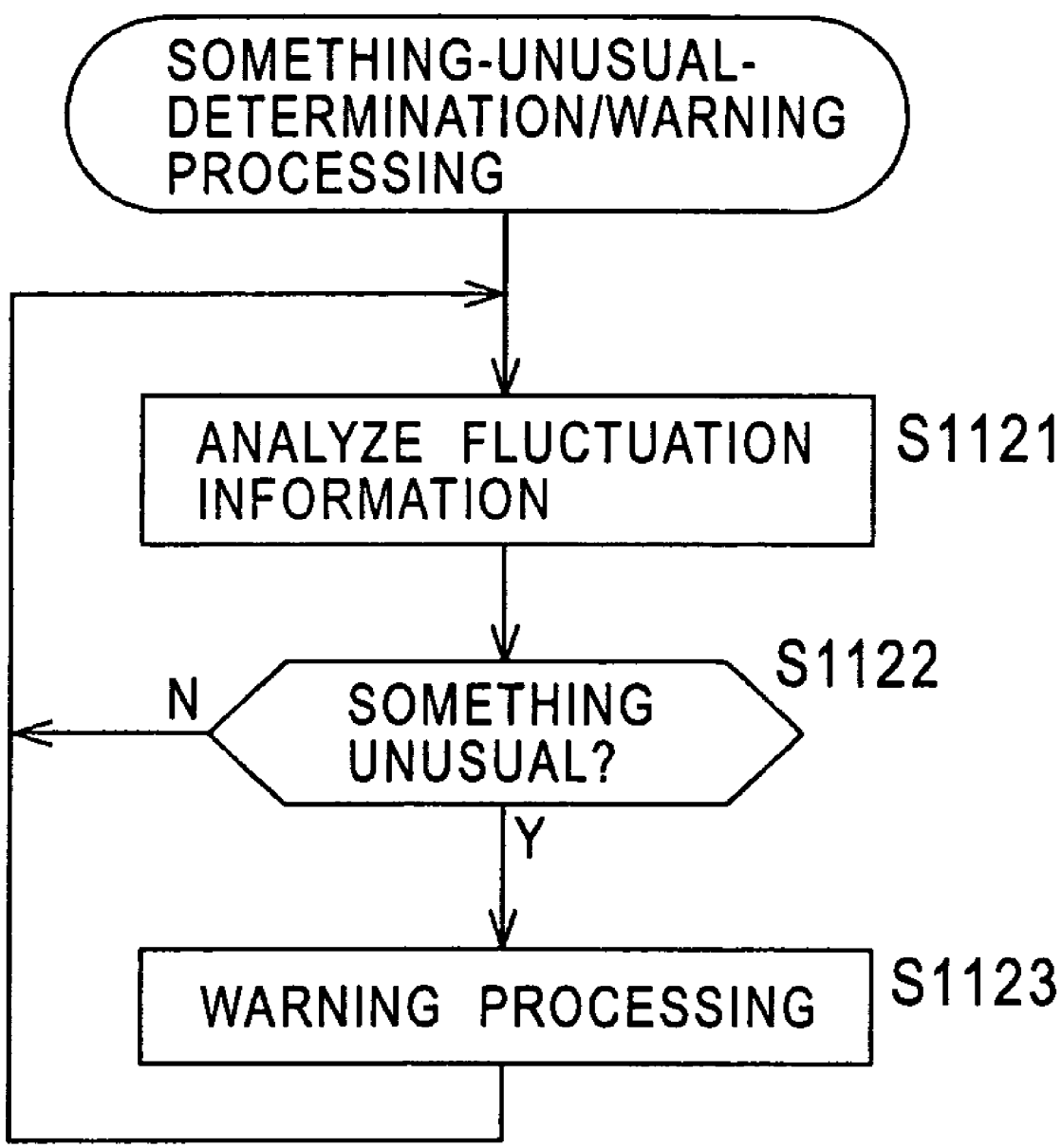
FIG. 76 is a flowchart explaining the something-unusual determination/warning processing of the warning processing section 1137D.

Next, as described by referring to FIG. 75 and FIG. 76, the warning processing section 1137D requests the security controller 1137A (FIG. 64) to perform the warning processing for warning the user of the occurrence of an emergency state when a something-unusual state which satisfies the something-unusual condition has occurred. Warning processing executed by the security controller 1137A when it receives the warning-processing request will be described by referring to FIG. 79A and FIG. 79B, and FIG. 80A and FIG. 80B.

When the security controller 1137A receives a warning processing request, the security controller 1137A, for example, requests the CPU 1129 to make the selector 1127 select image data and audio data output from the radio interface 1137A.

With this, the selector 1127 selects the image data and the audio data output from the radio interface 1137A, and sends them to the NTSC encoder 1128 and to the amplifier 1138. The image data sent to the NTSC encoder 1138 is sent to the CRT 11 and displayed thereon. The audio data sent to the amplifier 1138 is sent to the speaker units 12L and 12R and output therefrom.

As a result, the CRT 11 displays the image data sent from the camera 1162 and received by the radio interface 1137B, and the speakers 12L and 12R output the audio data sent from the camera 1162 and received by the radio interface 1137B.

Figure 79A:
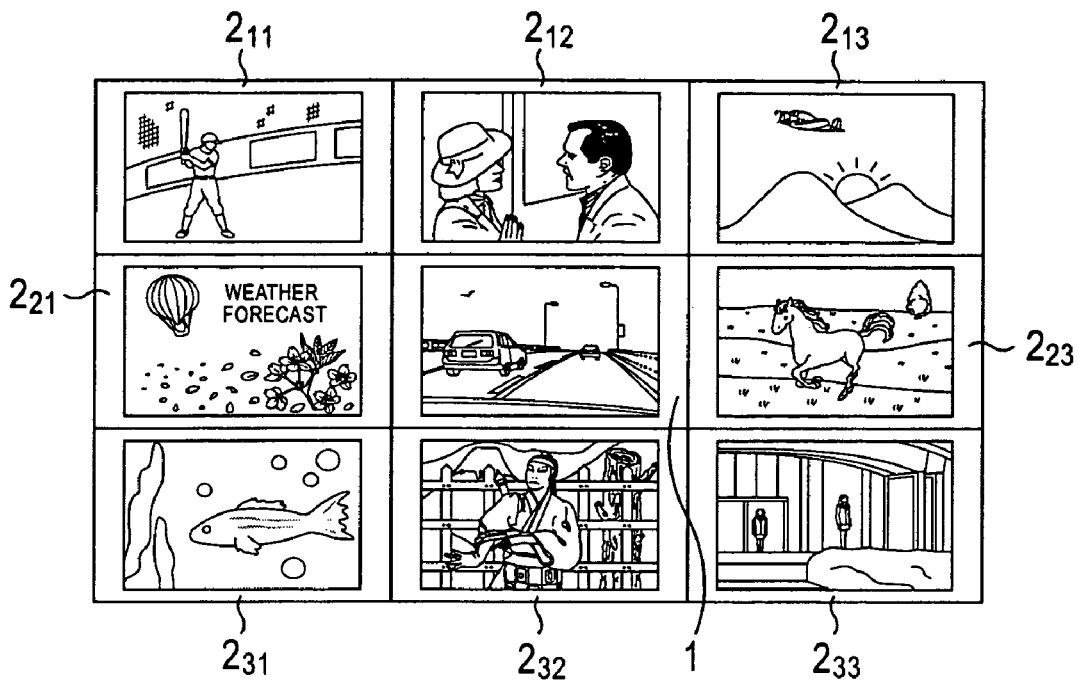
FIG. 79A is a view explaining the warning processing of a security controller 1137A.
Figure 79B:
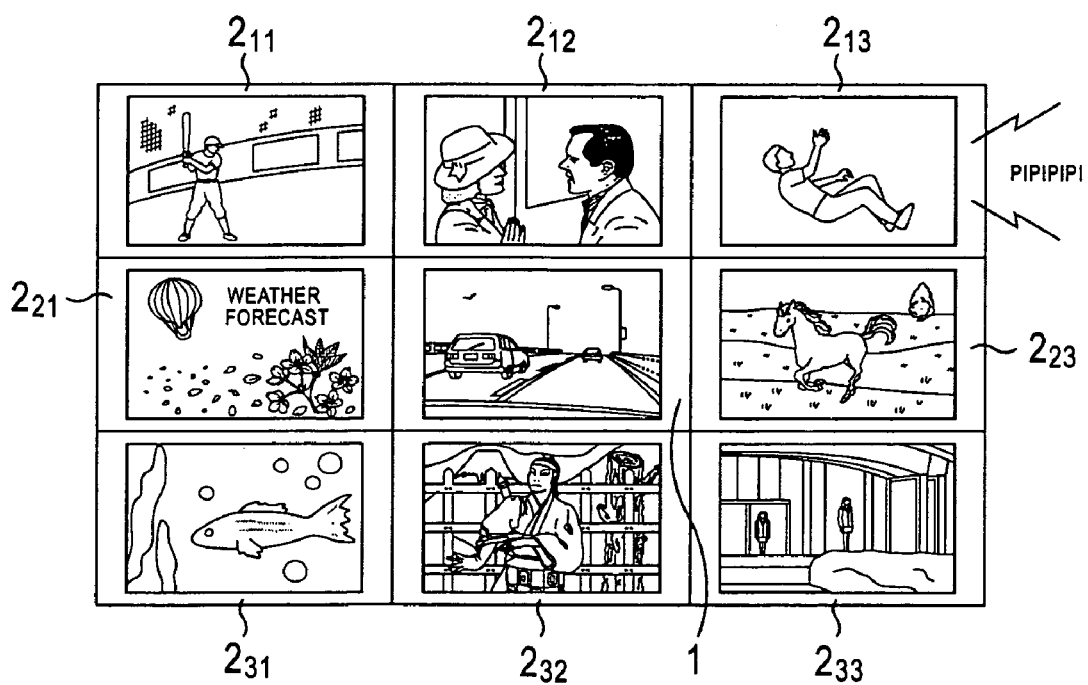
FIG. 79B is a view explaining the warning processing of the security controller 1137A.

Specifically, for example, when the main unit 1 and the subsidiary units $2_{ij}$ constituting the scalable TV system 1161 output image data and audio data in certain channels in television broadcasting programs, as shown in FIG. 79A, if the warning processing 1157D of the subsidiary unit $2_{13}$ outputs a warning processing request to the security controller 1157A, the display on the CRT 31 of the subsidiary unit $2_{13}$ is changed from the image data in the television broadcasting program which has been received so far to image data sent from the camera 1162 which is sending the image data and audio data to the subsidiary unit $2_{13}$, as shown in FIG. 79B. In the embodiment shown in FIG. 79A and FIG. 79B, the display on the CRT 31 of the subsidiary unit 213 is changed from the image data in the television broadcasting program to the image data showing a person who fell, sent from the camera 1162.

Further, in this case, in the subsidiary unit $2_{13}$, the audio data sent from the camera 1162 is output from the speaker units 32L and 32R (FIG. 65).

In this case, even when the user is viewing the television broadcasting program, the user can immediately recognize something unusual has occurred, in a condition in which the camera 1162 which is sending the image data and the audio data to the subsidiary unit $2_{13}$ is capturing images.

It is possible that the speaker units 32L and 32R outputs a predetermined warning sound (pipipi . . . ) instead of the audio data sent from the camera 1162, as shown in FIG. 79B.

In the above-described case, the display on the CRT 31 of the subsidiary unit $2_{13}$ is changed from the image data in the television broadcasting program which has been received to the image data sent from the camera 1162, as shown in FIG. 79B. When the power of the subsidiary unit $2_{13}$ is turned off, for example, it is possible that the power of the subsidiary unit $2_{13}$ is turned on, and further the image data sent from the camera 1162 is displayed on the CRT 31.

Further, in the scalable TV system 1161, the image data sent from the camera 1162 that is capturing images in an environment where a something unusual has occurred is displayed on the television receiver which has been receiving the image data and the audio data sent from the camera 1162. In addition, as shown in FIG. 80A and FIG. 80B, it is possible that the image data sent from the camera 1162 is displayed in a full-screen manner.

Figure 80A:
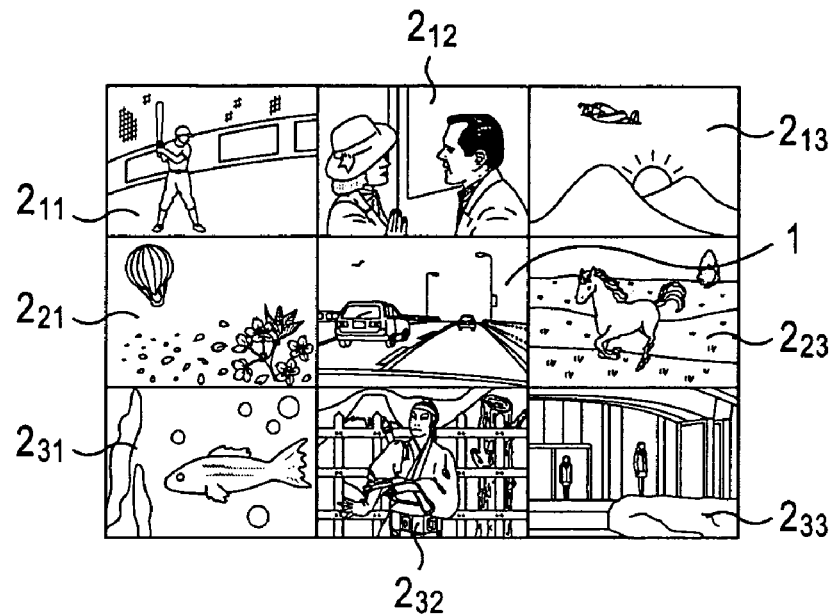
Figure 80B:
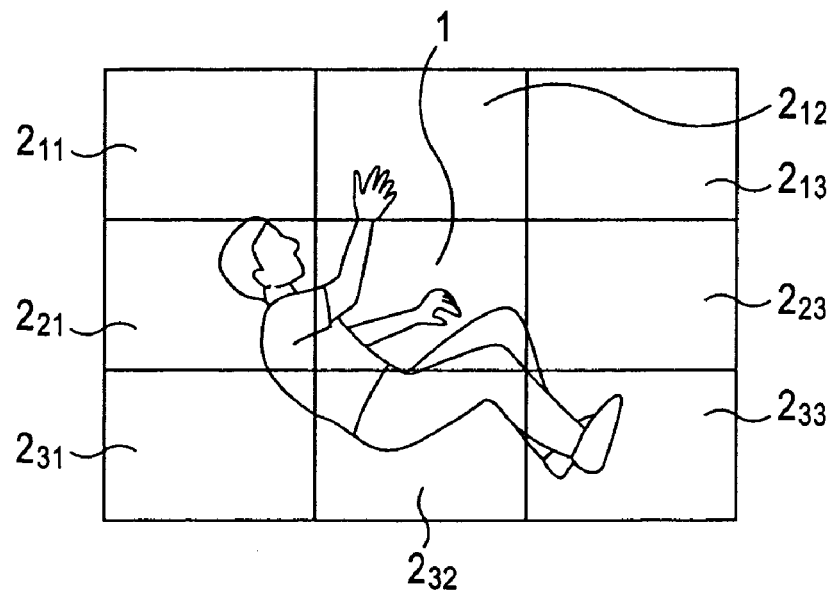

Specifically, for example, when the main unit 1 and the subsidiary units $2_{ij}$ constituting the scalable TV system 1161 output image data and audio data in certain channels in television broadcasting programs, as shown in FIG. 80A, if any television receiver constituting the scalable TV system 1161 outputs a warning processing request, the display of all the television receivers constituting the scalable TV system 1161 is switched, and the image data sent from the camera 1162, which the television receiver that output the warning processing request is receiving, can be displayed in a full-screen manner, as shown in FIG. 80B.

Also in this case, the user can immediately recognize that something unusual has occurred.

When full-screen display is performed, since it is unknown that something unusual has occurred in the environment where which camera 1162 is capturing images, it is preferred that a message indicating that something unusual has been happening or others be displayed at a part or the whole of the display screen of the television receiver of the scalable TV system 1161, which has been receiving the image data and the audio data sent from the camera 1162 that is capturing the environment where something unusual has been happening.

Full-screen display can be performed, for example, when a something unusual having a high level of emergency has occurred. Specifically, it is possible that, when something unusual having a not-high level of emergency has occurred, only the display of the television receiver which has been receiving the image data and the audio data sent from the camera 1162 that is capturing images in the environment where something unusual has occurred is switched, as described by referring to FIG. 79A and FIG. 79B, and when something unusual having a high level of emergency has occurred, the display of all the television receivers constituting the scalable TV system 1161 is switched and full-screen display is implemented, as shown in FIG. 80A and FIG. 80B. Since an image is largely displayed in full-screen display, it is possible to make the user recognize that something unusual having a high level of emergency has occurred.

It is also possible that the size of image data (hereinafter called emergency image data, if necessary) sent from the camera 1162 which is capturing images of an environment where something unusual occurred is changed on the scalable TV system 1161 according to the emergency level of something unusual. Specifically, emergency image data can be displayed with the size of the display screen of one television receiver constituting the scalable TV system 1161 when the emergency level is low, can be displayed with the size of the display screens of two-by-two adjacent television receivers when the emergency level is intermediate, and can be displayed with the size of the display screens of three-by-three adjacent television receivers when the emergency level is high.

The level of emergency can be stored in the something-unusual-condition storage section 1214 (FIG. 75) together with the something-unusual condition. In this case, it is possible to recognize the level of emergency according to the satisfied something-unusual condition.

Figure 81:
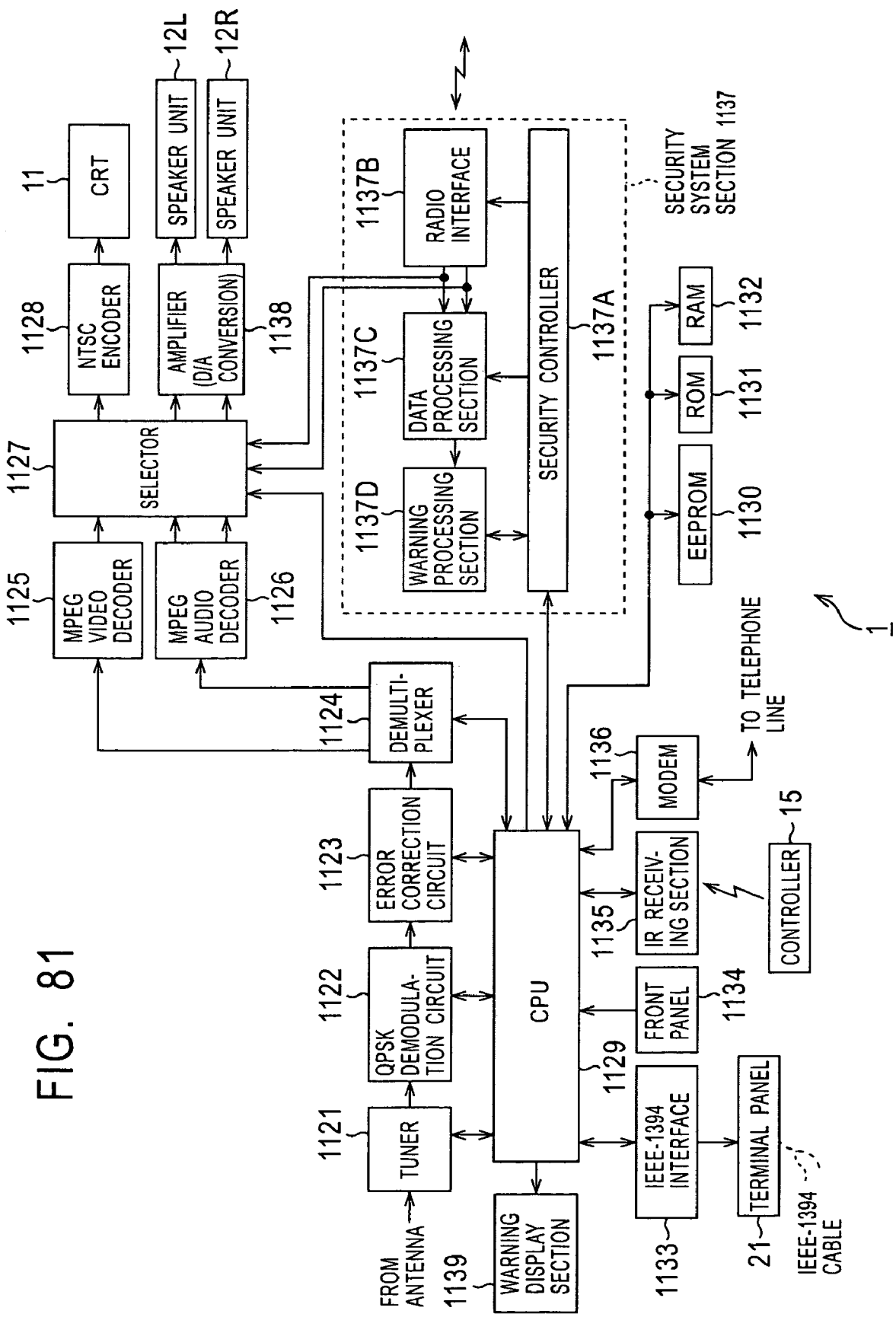

Next, FIG. 81 shows another example structure of a television receiver serving as the main unit 1 constituting the scalable TV system 1161. In the figure, the same symbols as those used in FIG. 64 are assigned to the portions corresponding to those shown in FIG. 64, and a description thereof is omitted, if unnecessary. In other words, the main unit 1 shown in FIG. 81 is basically structured in the same way as in FIG. 64 except that a warning display section 1139 is newly provided.

The warning display section 1139 is turned on or blinks according to the control of the CPU 1129.

The television receiver serving as the subsidiary unit 2 shown in FIG. 65 can also be provided with a warning display section in the same way as the main unit 1 shown in FIG. 81.

Figure 82A:
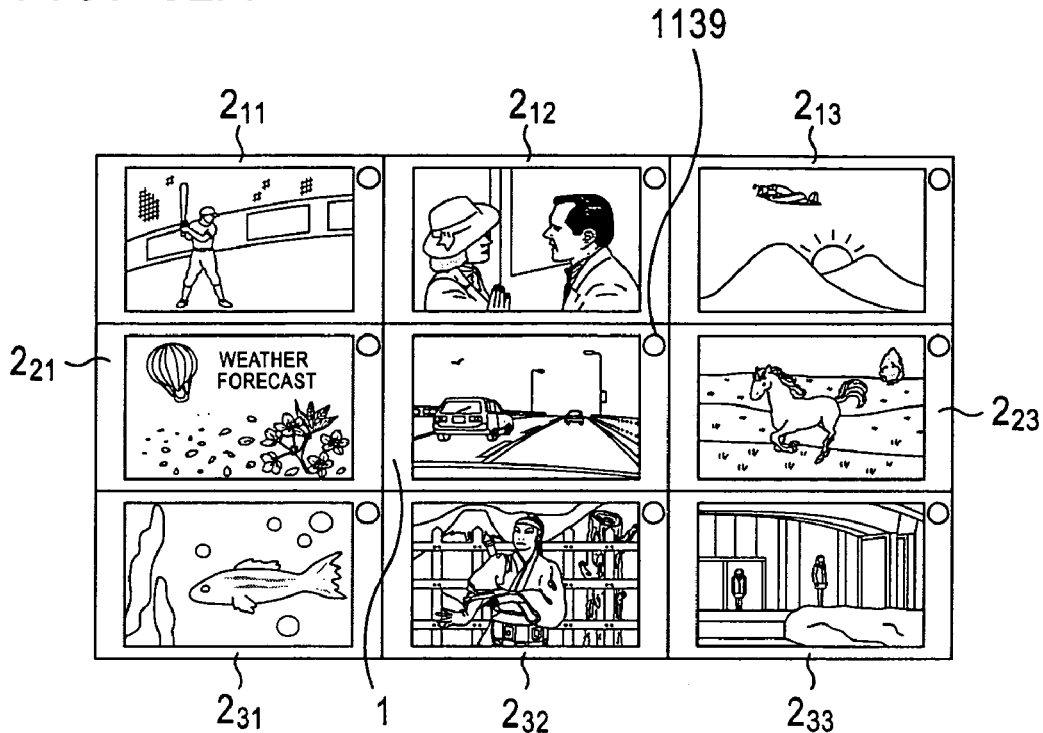
Figure 82B:
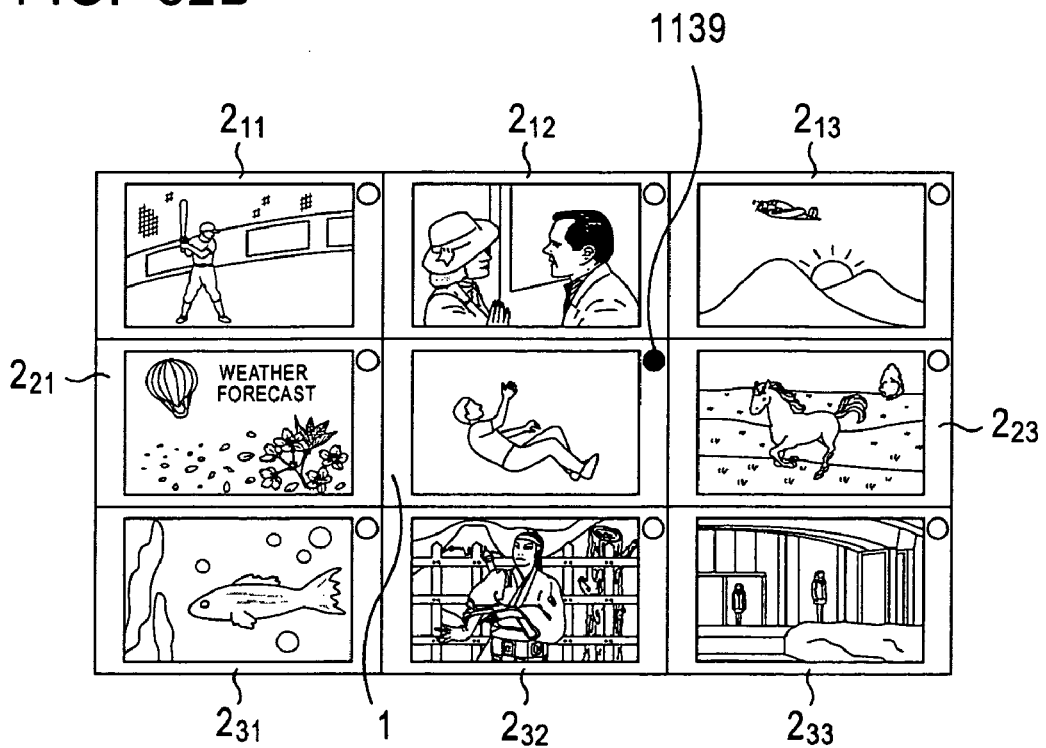

When the main unit 1 is provided with the warning display section 1139 and the subsidiary unit 2 is also provided with a warning display section in the scalable TV system 1161, if something unusual occurs, the warning display section 1139 can be turned on or blinked, as shown in FIG. 82A and FIG. 82B.

Specifically, for example, when the main unit 1 and the subsidiary units $2_{ij}$ constituting the scalable TV system 1161 output image data and audio data in certain channels in television broadcasting programs, as shown in FIG. 82A, if the warning processing 1137D of the main unit 1 outputs a warning processing request to the security controller 1137A, the display on the CRT 11 of the main unit 1 is changed from the image data in the television broadcasting program which has been received so far to image data (emergency image data) sent from the camera 1162 which is sending the image data and audio data to the main unit 1, as shown in FIG. 82B.

Further, the security controller 1137A requests the CPU 1129 to turn on or blink the warning display section 1139, and thereby, the warning display section 1139, which is usually turned off, is turned on or blinks as shown in FIG. 82B.

Also in this case, even when the user is viewing a television broadcasting program, the user can immediately recognize that something unusual has occurred in an environment in which the camera 1162 which is sending the image data and the audio data to the main unit 1 is capturing images.

When the level of emergency is low, it is possible that only the warning display section 1139 is turned on or blinked or only an alarm sound is output without switching to the display of emergency image data.

Figure 83:
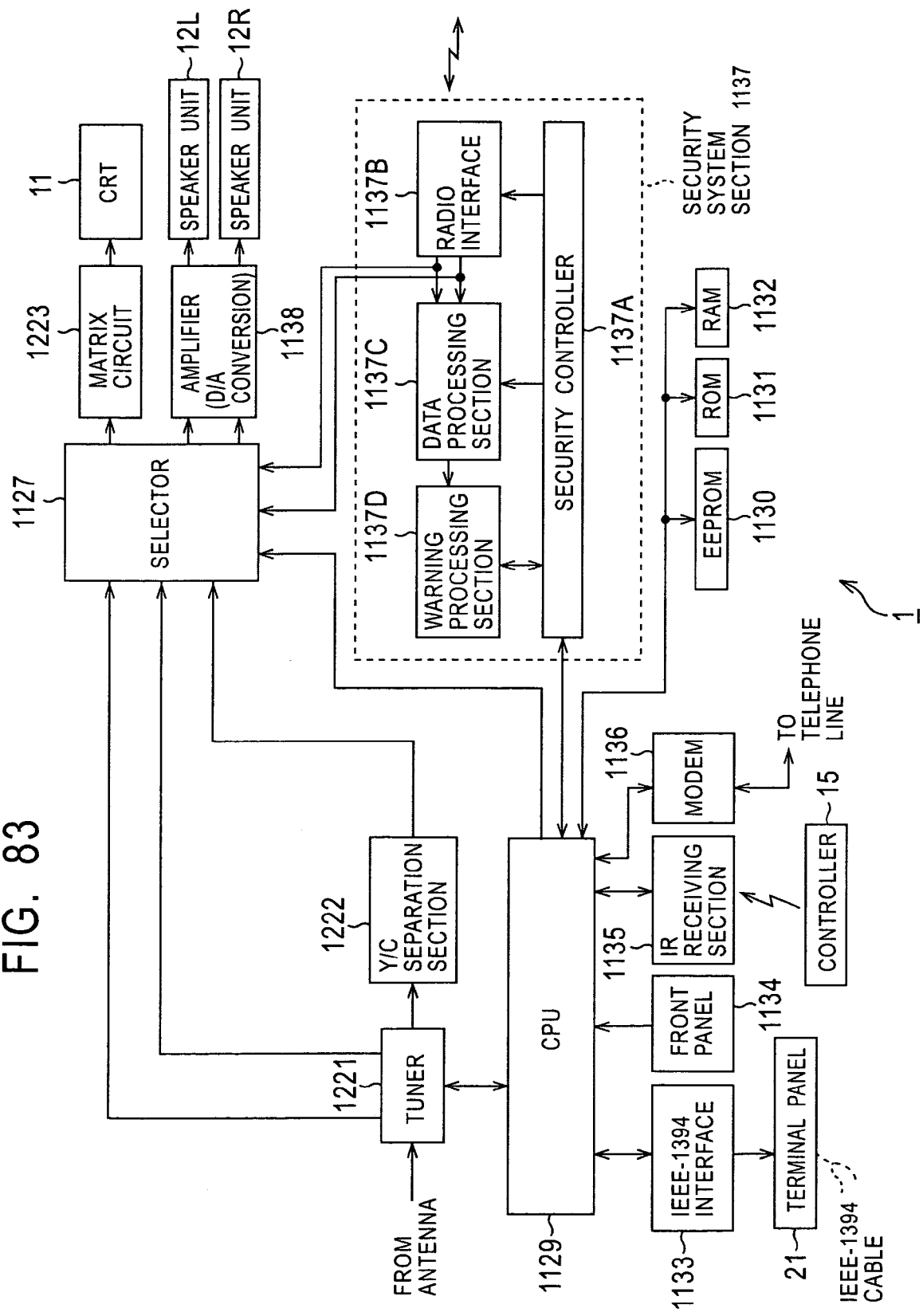

Next, FIG. 83 shows another example structure of a television receiver serving as the main unit 1 constituting the scalable TV system 1161. In the figure, the same symbols as those used in FIG. 64 are assigned to the portions corresponding to those shown in FIG. 64, and a description thereof is omitted, if unnecessary.

Specifically, whereas the main unit 1 shown in FIG. 64 is a television receiver for receiving digital broadcasting, the main unit 1 shown in FIG. 83 is a television receiver for receiving analog broadcasting.

A tuner 1221 detects and demodulates an analog television broadcasting signal in a predetermined channel. The tuner 1221 sends image data obtained by demodulation to a Y/C separation section 1222, and sends audio data to a selector 1127.

The Y/C separation section 1222 separates a luminance signal Y and color signals R-Y and B-Y from the output of the tuner 1221, and sends them to the selector 1127.

A matrix circuit 1223 converts the color space of image data sent from the selector 1127, if necessary, and sends it to the CRT 11.

Even the television receiver for receiving analog broadcasting, structured in the foregoing way can serve constitute the scalable TV system 1161.

A television receiver serving as the subsidiary unit 2 can also be structured as a television receiver for receiving analog broadcasting, in the same way as the television receiver serving as the main unit 1 shown in FIG. 83.

The series of processing described above can be implemented by hardware or software. When the series of processing is achieved by software, a program constituting the software is installed into a general-purpose computer or others.

Figure 84:
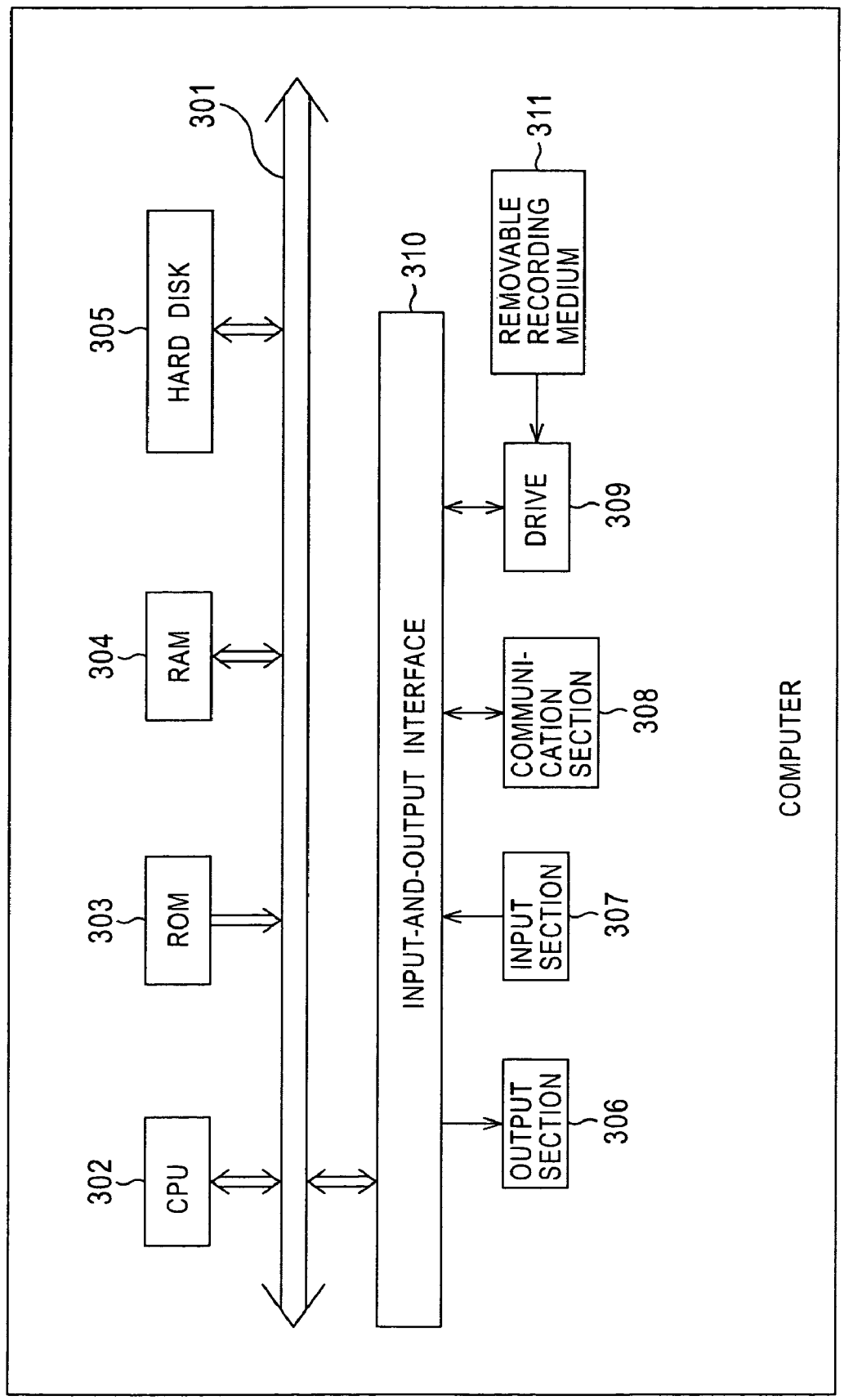

FIG. 84 shows an example structure of a computer into which a program for executing the above-described series of processing is installed, according to an embodiment.

The program can be recorded in advance into a hard disk 305 or a ROM 303 serving as a recording medium which is built in the computer.

Alternatively, the program can be recorded temporarily or perpetually into a removable recording medium 311, such as a floppy disk, a CD-ROM (compact disc read-only memory), a MO (magneto-optical) disk, a DVD (digital versatile disk), a magnetic disk, or a semiconductor memory. Such a removable recording medium 311 can be provided as so-called package software.

The program can be installed from the removable recording medium 311, such as that described above, to the computer. In addition, the program can be transferred by radio from a downloading site to the computer through an artificial satellite for digital satellite broadcasting, or to the computer by wire through a network such as a LAN (local area network) or the Internet; and the program transferred in that way can be received by a communication section 308 and installed into the built-in hard disk 305 in the computer.

The computer includes a CPU (central processing unit) 302. The CPU 302 is connected to an input-and-output interface 310 through a bus 301. When the user operates an input section 307 formed of a keyboard, a mouse, a microphone, and others to input a command through the input-and-output interface 310, the CPU 302 executes a program stored in a ROM (read-only memory) 303 according to the command. Alternatively, the CPU 302 loads into a RAM (random access memory) 304 a program stored in the hard disk 305; a program transferred through a satellite or a network, received by the communication section 308, and installed into the hard disk 305; or a program read from the removable recording medium 311, and installed into the hard disk 305; and executes it. With this, the CPU 302 performs processing based on the flowcharts described above or processing executed by the structures of the block diagrams described above. Then, the CPU 302 outputs the processing result, for example, through the input-and-output interface 310 from an output section 306 formed of an LCD (liquid-crystal display), a speaker, and others; transmits the processing result from the communication section 308; or records the processing result in the hard disk 305, as required.

In the present specification, the processing steps describing the program for making the computer execute various types of processing are not necessarily processed in a time-sequential manner in the order described in the flowcharts, and include processing executed in parallel or separately (such as parallel processing or processing by objects).

The program may be processed by one computer, or may be executed by a plurality of computers by distributed processing. Further, the computer may be transferred to a remote computer and executed.

The sales prices of television receivers constituting the scalable TV system can be made difference depending, for example, on whether a television receiver serves as a main unit or a subsidiary unit, and further on, if it serves as a subsidiary unit, how many subsidiary units have been used before the subsidiary unit is used.

Specifically, since the full-screen-display function cannot be provided in the scalable TV system if there is no main unit, as described above, the main unit has a high value and the sales price of the main unit can be set high.

It is expected that the user will additionally buy subsidiary units, if necessary, after the user buys the main unit. It is possible that the sales prices of first several subsidiary units are set, for example, lower than the sales price of the main unit but higher than usual television receivers. It is also possible that the sales prices of subsidiary units to be bought thereafter are set further lower.

A television receiver serving as the main unit in a scalable TV system can be structured, for example, by adding the security system section 1137 to a usual digital television receiver and by changing the program to be executed by the CPU 1129. Therefore, since a television receiver serving as the main unit in a scalable TV system can be relatively easily manufactured by using a usual digital television receiver, high cost effectiveness is provided with a full-screen-display function and a warning function, such as those described above, being taken into account. This point is also applied to television receivers serving as subsidiary units.

The present invention can also be applied to display apparatuses not provided with tuners, for outputting images and sound sent from the outside, in addition to television receivers serving as display apparatus having built-in tuners.

Further, in the security system shown in FIG. 66, image data and audio data can be transmitted from the camera 1162 to a television receiver constituting the scalable TV system 1161 not by radio but by wire (such as IEEE-1394 communications or USB (universal serial bus) communications).

As the camera 1162, in addition to those prepared for security systems, already installed cameras used for so-called "Doorphone" and surveillance cameras, for example, can be employed.

Further, the security system can be used for monitoring infants and aged persons, and also for monitoring the level of hot water supplied to a bathtub, and water boiling in a kettle which sounds an alarm when water is boiled.

In the present embodiment, the processing is applied to image data captured by a usual camera 1162. As the camera 1162, a camera which senses heat, for example, can be employed and the processing can be applied to image data indicating temperature distributions obtained from the camera.

Further, it is possible that an infrared ray is sensed to monitor a change in temperature, and a warning is issued.

INDUSTRIAL APPLICABILITY

As described above, according to the present invention, when a great number of display apparatuses are connected and used, a higher function is implemented than when a display apparatus is used alone.

Further, according to the present invention, the user can easily recognize something unusual (emergency state) by existing television receivers and others, and as a result, the existing television receivers can be effectively used.

The invention claimed is:

1. A first display apparatus connected to a second display apparatus, comprising:
a display unit configured to display image data;
a feature detection unit configured to detect a feature of input data which includes at least image data;
a control unit configured to perform control such that an image included in the input data is displayed on at least one of the display unit and the second display apparatus according to the result of feature detection performed by the feature detection unit,
wherein the feature detection unit detects a difference between frames or fields of image data included in the input data, as a feature of the input data;
an authentication unit configured to perform authentication for authenticating the second display apparatus, wherein the control unit performs control such that one scene of image data included in the input data is displayed on the second display apparatus when the authentication is successfully performed;
a plurality of input systems;
an analysis unit configured to analyze the output of the feature detection unit; and
a determination unit configured to determine the analysis result of the analysis unit,
wherein the feature detection unit detects a feature amount of information serving as the input data input from a one predetermined input system among the plurality of input systems, at an interval of a predetermined period,
wherein the analysis unit analyzes the fluctuation in time of the feature amount,
wherein the determination unit determines whether the fluctuation in time of the feature amount satisfies a predetermined condition, and
wherein the control unit displays an image in information input from the one predetermined input system, on the display unit when the fluctuation in time of the feature amount satisfies a predetermined condition.

2. The display apparatus according to claim 1, further comprising a receiving unit configured to receive the input data,
wherein the control unit performs control such that one scene of image data included in the input data is displayed on the second display apparatus according to the result of detection of a feature of the input data.

3. The display apparatus according to claim 2, wherein the display unit displays image data included in the input data received by the receiving unit.

4. The display apparatus according to claim 2, further comprising a communication unit configured to communicate with the second display apparatus, and
wherein the control unit controls the communication unit such that the input data is received, and a command is transmitted to the second display apparatus, the command instructing to display one scene of image data included in the input data from which a predetermined feature has been detected.

5. The display apparatus according to claim 2, further comprising a communication unit configured to communicate with the second display apparatus, and
wherein the control unit controls the communication unit such that one scene of image data included in the input data is transmitted to the second display apparatus according to the result of detection of a feature of the input data.

6. The display apparatus according to claim 1, further comprising a determination unit configured to determine the magnitude of the difference between frames or fields of image data included in the input data,
wherein the control unit performs control such that one scene of image data included in the input data is displayed on the second display apparatus when the difference between frames or fields of the image data is smaller than a predetermined threshold.

7. The display apparatus according to claim 6,
wherein the control unit performs control such that one scene of image data included in the input data is displayed on the second display apparatus when a predetermined number of frames or fields of the image data continue, the frames or fields having differences smaller than a predetermined threshold, between frames or fields of the image data.

8. The display apparatus according to claim 2, wherein the input data further comprises audio data; and
   the feature detection unit detects a feature of audio data included in the input data.

9. The display apparatus according to claim 8, wherein the feature detection unit detects the level of the audio data as a feature.

10. The display apparatus according to claim 2, wherein the feature detection unit comprises:
   a reference-pattern storage unit configured to store a predetermined reference pattern to be compared with the input data; and
   a comparison unit configured to compare the input data with the reference pattern,
      wherein result of comparison between the input data and the reference pattern is detected as the feature, and
   the control unit performs control such that one scene of image data included in the input data is displayed on the second display apparatus when the input data matches the reference pattern.

11. The display apparatus according to claim 10, wherein the input data further comprises audio data;
   the reference-pattern storage unit stores the reference pattern for audio data; and
   the comparison unit compares the audio data included in the input data with the reference pattern.

12. The display apparatus according to claim 10, wherein the reference-pattern storage unit stores the reference pattern for image data; and
   the comparison unit compares the image data included in the input data with the reference pattern.

13. The display apparatus according to claim 12, further comprising an update unit configured to update the reference pattern for image data, stored in the reference-pattern storage unit.

14. The display apparatus according to claim 13, wherein the update unit updates the reference pattern by the image data included in the input data.

15. The display apparatus according to claim 13, wherein the update unit updates the reference pattern according to a user's operation.

16. The display apparatus according to claim 2, wherein the first display apparatus is also connected to a third display apparatus; and
   the control unit performs control such that one scene of image data included in the input data is displayed on the second display apparatus or on the third display apparatus according to the result of detection of a feature of the input data.

17. The display apparatus according to claim 1, wherein the control unit displays an image in information input from the one predetermined input system, over the whole of the second display apparatus and the display unit.

18. The display apparatus according to claim 1, further comprising an output unit configured to output sound,
   wherein the control unit displays the image on the display unit and also makes the output unit output sound in information input from the one predetermined input system, when the fluctuation in time of the feature amount satisfies a predetermined condition.

19. The display apparatus according to claim 1, wherein the detection unit detects a feature amount of at least one of an image and sound in information input from the one predetermined input system, at an interval of a predetermined period.

20. The display apparatus according to claim 19, wherein the detection unit detects a feature amount of an image in information input from the one predetermined input system, in units of frames or fields.

21. The display apparatus according to claim 19, wherein the detection unit detects, as a feature amount of an image in information input from the one predetermined input system, the difference between frames or fields of the image.

22. The display apparatus according to claim 19, wherein the detection unit detects a feature amount of sound in information input from the one predetermined input system, at an interval of a predetermined number of frames.

23. The display apparatus according to claim 1, wherein the determination unit determines whether the magnitude relationship between the fluctuation in time of the feature amount and a predetermined threshold has continued for a predetermined period.

24. The display apparatus according to claim 1, wherein the predetermined input system inputs an image sent from an image-capturing unit configured to capture at least an image.

25. The display apparatus according to claim 24, wherein the image-capturing unit also collects sound accompanying the image; and
   the predetermined input system also inputs the sound sent from the image-capturing unit.

26. The display apparatus according to claim 24, wherein the image-capturing unit sends information by radio; and
   a receiving unit configured to receive the information sent from the image-capturing unit by radio is provided as the predetermined input system.

27. A control method for a first display apparatus connected to a second display apparatus and provided with display means for displaying image data, comprising:
   a feature detection step of detecting a feature of input data which includes at least image data,
      wherein the detected feature of the input data is a difference between frames or fields of image data included in the input data;
   a control step of performing control such that an image included in the input data is displayed on at least one of the display means and the second display apparatus according to the result of feature detection performed in the feature detection step;
   an authentication step of performing authentication for authenticating the second display apparatus,
      wherein the control step performs control such that one scene of image data included in the input data is displayed on the second display apparatus when the authentication is successfully performed;
   a plurality of input steps;
   an analysis step of analyzing the output of the feature detection step; and
   a determination step of determining the analysis result of the analysis step,
      wherein the feature detection step detects a feature amount of information serving as the input data input from a one predetermined input system among the plurality of input systems, at an interval of a predetermined period,
      wherein the analysis step analyzes the fluctuation in time of the feature amount,
      wherein the determination step determines whether the fluctuation in time of the feature amount satisfies a predetermined condition, and
      wherein the control step displays an image in information input from the one predetermined input system, on the display means when the fluctuation in time of the feature amount satisfies a predetermined condition.

28. A computer program embodied in a computer-readable medium for making a computer execute control processing for a first display apparatus connected to a second display apparatus and provided with display means for displaying image data, comprising:
- a feature detection step of detecting a feature of input data which includes at least image data,
  - wherein the detected feature of the input data is a difference between frames or fields of image data included in the input data;
- a control step of performing control such that an image included in the input data is displayed on at least one of the display means and the second display apparatus according to the result of feature detection performed in the feature detection step;
- an authentication step of performing authentication for authenticating the second display apparatus,
  - wherein the control step performs control such that one scene of image data included in the input data is displayed on the second display apparatus when the authentication is successfully performed;
- a plurality of input steps;
- an analysis step of analyzing the output of the feature detection step; and
- a determination step of determining the analysis result of the analysis step,
  - wherein the feature detection step detects a feature amount of information serving as the input data input from a one predetermined input system among the plurality of input systems, at an interval of a predetermined period,
  - wherein the analysis step analyzes the fluctuation in time of the feature amount,
  - wherein the determination step determines whether the fluctuation in time of the feature amount satisfies a predetermined condition, and
  - wherein the control step displays an image in information input from the one predetermined input system, on the display means when the fluctuation in time of the feature amount satisfies a predetermined condition.

29. A computer-readable medium for storing a computer program for making a computer execute control processing for a first display apparatus connected to a second display apparatus and provided with display means for displaying image data, the program comprising:
- a feature detection step of detecting a feature of input data which includes at least image data,
  - wherein the detected feature of the input data is a difference between frames or fields of image data included in the input data;
- a control step of performing control such that an image included in the input data is displayed on at least one of the display means and the second display apparatus according to the result of feature detection performed in the feature detection step;
- an authentication step of performing authentication for authenticating the second display apparatus,
  - wherein the control step performs control such that one scene of image data included in the input data is displayed on the second display apparatus when the authentication is successfully performed;
- a plurality of input steps;
- an analysis step of analyzing the output of the feature detection step; and
- a determination step of determining the analysis result of the analysis step,
  - wherein the feature detection step detects a feature amount of information serving as the input data input from a one predetermined input system among the plurality of input systems, at an interval of a predetermined period,
  - wherein the analysis step analyzes the fluctuation in time of the feature amount,
  - wherein the determination step determines whether the fluctuation in time of the feature amount satisfies a predetermined condition, and
  - wherein the control step displays an image in information input from the one predetermined input system, on the display means when the fluctuation in time of the feature amount satisfies a predetermined condition.

30. A first display apparatus connected to a second display apparatus, comprising:
- an authentication unit configured to perform authentication for authenticating the second display apparatus;
- when the authentication is successfully performed, a storage unit configured to store one scene of image data in input data which includes at least image data, according to the control of the second display apparatus;
- when the authentication is successfully performed, a display unit configured to display the image data stored in the storage unit;
- a plurality of input systems;
- a feature detection unit detects a feature amount of information serving as the input data input from a one predetermined input system among the plurality of input systems, at an interval of a predetermined period;
- an analysis unit configured to analyze the output of the feature detection unit;
- a determination unit configured to determine the analysis result of the analysis unit,
  - wherein the analysis unit analyzes the fluctuation in time of the feature amount, and
  - wherein the determination unit determines whether the fluctuation in time of the feature amount satisfies a predetermined condition; and
- a control unit displays an image in information input from the one predetermined input system, on the display unit when the fluctuation in time of the feature amount satisfies a predetermined condition.

31. The display apparatus according to claim 30, further comprising:
- a communication unit configured to communicate with the second display apparatus; and
- a receiving unit configured to receive the input data,
  - wherein when the communication unit receives the input data and receives a command for instructing to display one scene of image data included in the input data, from the second display apparatus,
- the receiving unit receives the input data;
- the storage unit stores one scene of image data included in the input data received by the receiving unit; and
- the display unit displays image data stored in the storage unit.

32. The display apparatus according to claim 30, further comprising:
- a communication unit configured to communicate with the second display apparatus,
  - wherein when the communication unit receives one scene of image data included in the input data, the storage unit stores one scene of image data included in the input data received by the communication unit; and
the display unit displays image data stored in the storage unit.

33. A control method for a first display apparatus connected to a second display apparatus, comprising:
an authentication step of performing authentication for authenticating the second display apparatus;
when the authentication is successfully performed, a storage step of storing one scene of image data in input data which includes at least image data, according to the control of the second display apparatus;
when the authentication is successfully performed, a display step of displaying the image data stored in the storage step;
a plurality of input steps;
a feature detection step of detecting a feature amount of information serving as the input data input from a one predetermined input system among the plurality of input systems, at an interval of a predetermined period;
an analysis step of analyzing the output of the feature detection step;
a determination step of determining the analysis result of the analysis step,
wherein the analysis step analyzes the fluctuation in time of the feature amount,
wherein the determination step determines whether the fluctuation in time of the feature amount satisfies a predetermined condition; and
a control step of displaying an image in information input from the one predetermined input system, when the fluctuation in time of the feature amount satisfies a predetermined condition.

34. A computer program embodied in a computer-readable medium for making a computer execute control processing for a first display apparatus connected to a second display apparatus, comprising:
an authentication step of performing authentication for authenticating the second display apparatus;
when the authentication is successfully performed, a storage step of storing one scene of image data in input data which includes at least image data, according to the control of the second display apparatus;
when the authentication is successfully performed, a display step of displaying the image data stored in the storage step;
a plurality of input steps;
a feature detection step of detecting a feature amount of information serving as the input data input from a one predetermined input system among the plurality of input systems, at an interval of a predetermined period;
an analysis step of analyzing the output of the feature detection step;
a determination step of determining the analysis result of the analysis step,
wherein the analysis step analyzes the fluctuation in time of the feature amount,
wherein the determination step determines whether the fluctuation in time of the feature amount satisfies a predetermined condition; and
a control step of displaying an image in information input from the one predetermined input system, when the fluctuation in time of the feature amount satisfies a predetermined condition.

35. A computer-readable medium for storing a computer program for making a computer execute control processing for a first display apparatus connected to a second display apparatus, the program comprising:
an authentication step of performing authentication for authenticating the second display apparatus;
when the authentication is successfully performed, a storage step of storing one scene of image data in input data which includes at least image data, according to the control of the second display apparatus;
when the authentication is successfully performed, a display step of displaying the image data stored in the storage step;
a plurality of input steps;
a feature detection step of detecting a feature amount of information serving as the input data input from a one predetermined input system among the plurality of input systems, at an interval of a predetermined period;
an analysis step of analyzing the output of the feature detection step;
a determination step of determining the analysis result of the analysis step,
wherein the analysis step analyzes the fluctuation in time of the feature amount,
wherein the determination step determines whether the fluctuation in time of the feature amount satisfies a predetermined condition; and
a control step of displaying an image in information input from the one predetermined input system, when the fluctuation in time of the feature amount satisfies a predetermined condition.

36. A display system comprising:
a first display apparatus and one or more second display apparatuses,
wherein the first display apparatus comprises:
a first display unit configured to display image data;
a feature detection unit configured to detect a feature of input data which includes at least image data;
a control unit configured to perform control such that image data included in the input data is displayed on at least one of the first display apparatus and the one or more second display apparatuses, according to the result of detection of a feature of the input data, and
wherein the one or more second display apparatuses comprise:
an authentication unit configured to perform authentication for authenticating the second display apparatus;
when the authentication is successfully performed, a storage unit configured to store one scene of image data in the input data, according to the control of the first display apparatus; and
when the authentication is successfully performed, a second display unit configured to display the image data stored in the storage unit;
a plurality of input systems;
an analysis unit configured to analyze the output of the feature detection unit; and
a determination unit configured to determine the analysis result of the analysis unit,
wherein the feature detection unit detects a feature amount of information serving as the input data input from a one predetermined input system among the plurality of input systems, at an interval of a predetermined period,
wherein the analysis unit analyzes the fluctuation in time of the feature amount,
wherein the determination unit determines whether the fluctuation in time of the feature amount satisfies a predetermined condition, and
wherein the control unit displays an image in information input from the one predetermined input system, when the fluctuation in time of the feature amount satisfies a predetermined condition.

* * * * *